US008855548B2

(12) United States Patent
Kagan et al.

(10) Patent No.: US 8,855,548 B2
(45) Date of Patent: *Oct. 7, 2014

(54) WIRELESS COMMUNICATIONS SYSTEM AND METHOD

(75) Inventors: Michael L. Kagan, Jerusalem (IL); David Kamien, Jerusalem (IL); Ian Elkan Gamse, London (GB); Charles Anthony Rose, London (GB)

(73) Assignee: Nokia Corporation, Espoo (FI)

( * ) Notice: Subject to any disclaimer, the term of this patent is extended or adjusted under 35 U.S.C. 154(b) by 1920 days.

This patent is subject to a terminal disclaimer.

(21) Appl. No.: 11/646,857

(22) Filed: Dec. 28, 2006

(65) Prior Publication Data

US 2007/0157257 A1 Jul. 5, 2007

Related U.S. Application Data

(63) Continuation of application No. 10/220,659, filed as application No. PCT/IL01/00195 on Mar. 1, 2001, now Pat. No. 7,158,753.

(60) Provisional application No. 60/186,127, filed on Mar. 1, 2000.

(51) Int. Cl.
*H04H 60/09* (2008.01)

(52) U.S. Cl.
USPC .................. 455/3.04; 455/114.1; 705/26.1

(58) Field of Classification Search
USPC ........... 455/3.01, 3.02, 3.03, 3.04, 3.05, 12.1,
455/45, 412.1, 414.1, 414.2, 427, 517, 563,
455/564, 566; 705/26, 26.1; 340/825.26,
340/825.49
See application file for complete search history.

(56) References Cited

U.S. PATENT DOCUMENTS

| 5,063,610 | A | | 11/1991 | Alwadish |
| 5,146,612 | A | | 9/1992 | Grosjean et al. |
| 5,301,359 | A | | 4/1994 | Van den Heuvel et al. |
| 5,491,838 | A | * | 2/1996 | Takahisa et al. ............. 455/3.06 |
| 5,507,024 | A | | 4/1996 | Richards et al. |
| 5,553,315 | A | | 9/1996 | Sobti et al. |
| 5,579,537 | A | | 11/1996 | Takahisa |
| 5,661,787 | A | | 8/1997 | Pocock |
| 5,708,478 | A | | 1/1998 | Tognazzini |
| 5,759,101 | A | | 6/1998 | Von Kohorn |
| 5,832,223 | A | | 11/1998 | Hara et al. |
| 5,848,352 | A | | 12/1998 | Dougherty et al. |
| 5,857,156 | A | | 1/1999 | Anderson |
| 5,902,865 | A | | 5/1999 | Gausepohl et al. |
| 5,907,793 | A | | 5/1999 | Reams |
| 5,949,492 | A | | 9/1999 | Mankovitz et al. |
| 5,961,603 | A | | 10/1999 | Kunkel et al. |

(Continued)

*Primary Examiner* — Quochien B Vuong
(74) *Attorney, Agent, or Firm* — Ditthavong & Steiner, P.C.

(57) ABSTRACT

This invention discloses a method of communicating with a user including wirelessly broadcasting content which is accessible to a multiplicity of users and which includes at least some non-audio content which is not visible to the users without user actuation and which includes product-specific information, enabling a user to select a portion of the content, responsive to a selection by the user, capturing at least part of the non-audio content, corresponding to the portion of the content selected by the user and employing at least part of the captured content to access a contact using a mobile communicator by initially establishing contact with a non product-specific communication facility and employing product-specific information contained in the non-audio content. A system for communicating with a user is also disclosed.

37 Claims, 46 Drawing Sheets

(56) References Cited

U.S. PATENT DOCUMENTS

| | | |
|---|---|---|
| 5,991,737 A | 11/1999 | Chen |
| 5,991,799 A | 11/1999 | Yen et al. |
| 6,018,764 A | 1/2000 | Field et al. |
| 6,028,644 A | 2/2000 | Maeda et al. |
| 6,035,304 A | 3/2000 | Machida et al. |
| 6,038,434 A | 3/2000 | Miyake |
| 6,067,447 A | 5/2000 | Zucker |
| 6,081,699 A | 6/2000 | Kaneko |
| 6,085,193 A * | 7/2000 | Malkin et al. ................ 709/200 |
| 6,101,381 A | 8/2000 | Tajima et al. |
| 6,163,711 A | 12/2000 | Juntunen et al. |
| 6,167,235 A | 12/2000 | Sibecas, Jr. |
| 6,252,522 B1 | 6/2001 | Hampton et al. |
| 6,549,625 B1 | 4/2003 | Rautila et al. |
| 7,215,949 B2 * | 5/2007 | Sauriol et al. ................ 455/3.01 |
| 2002/0087969 A1 * | 7/2002 | Brunheroto et al. ............ 725/13 |

* cited by examiner

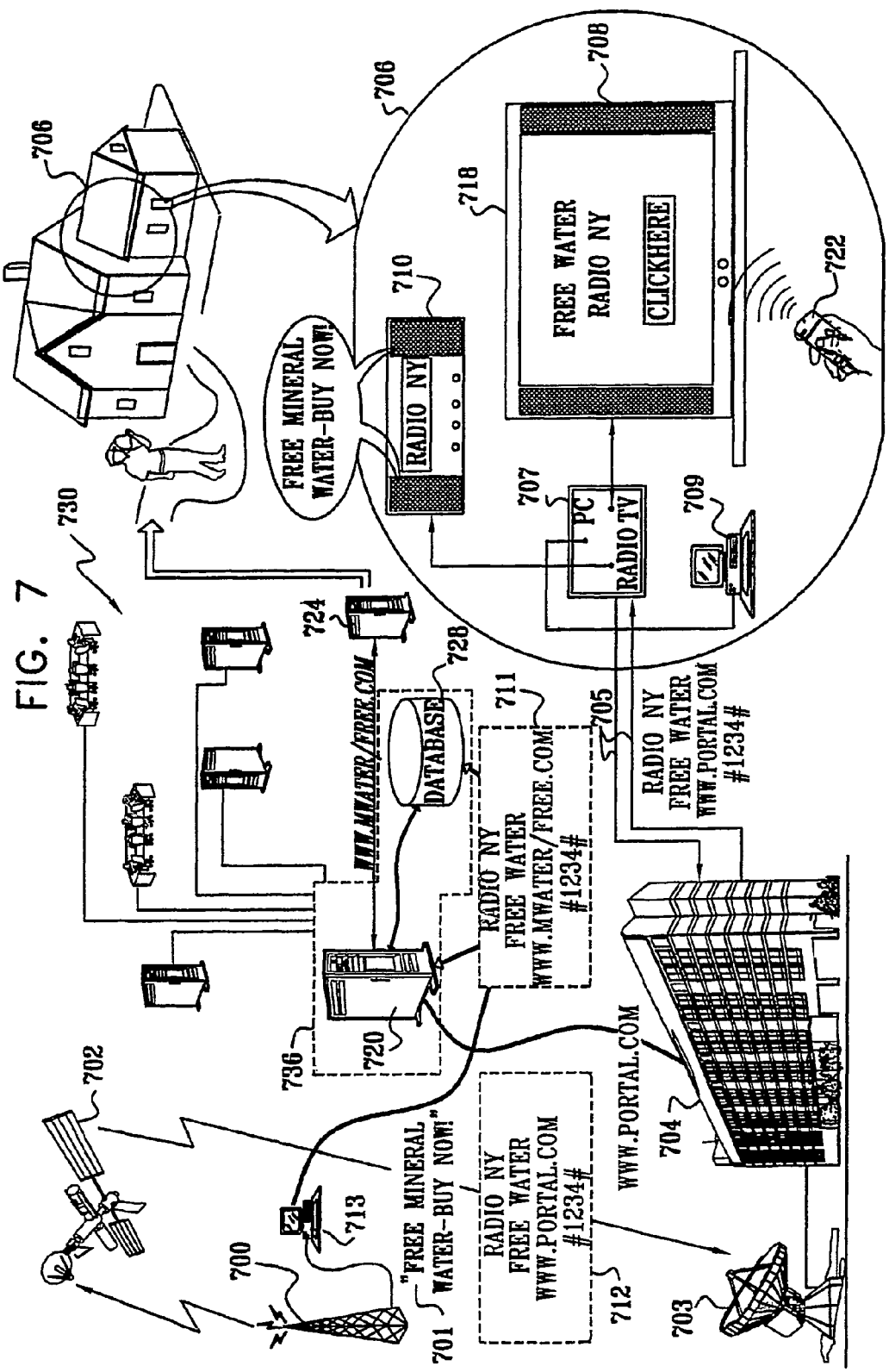

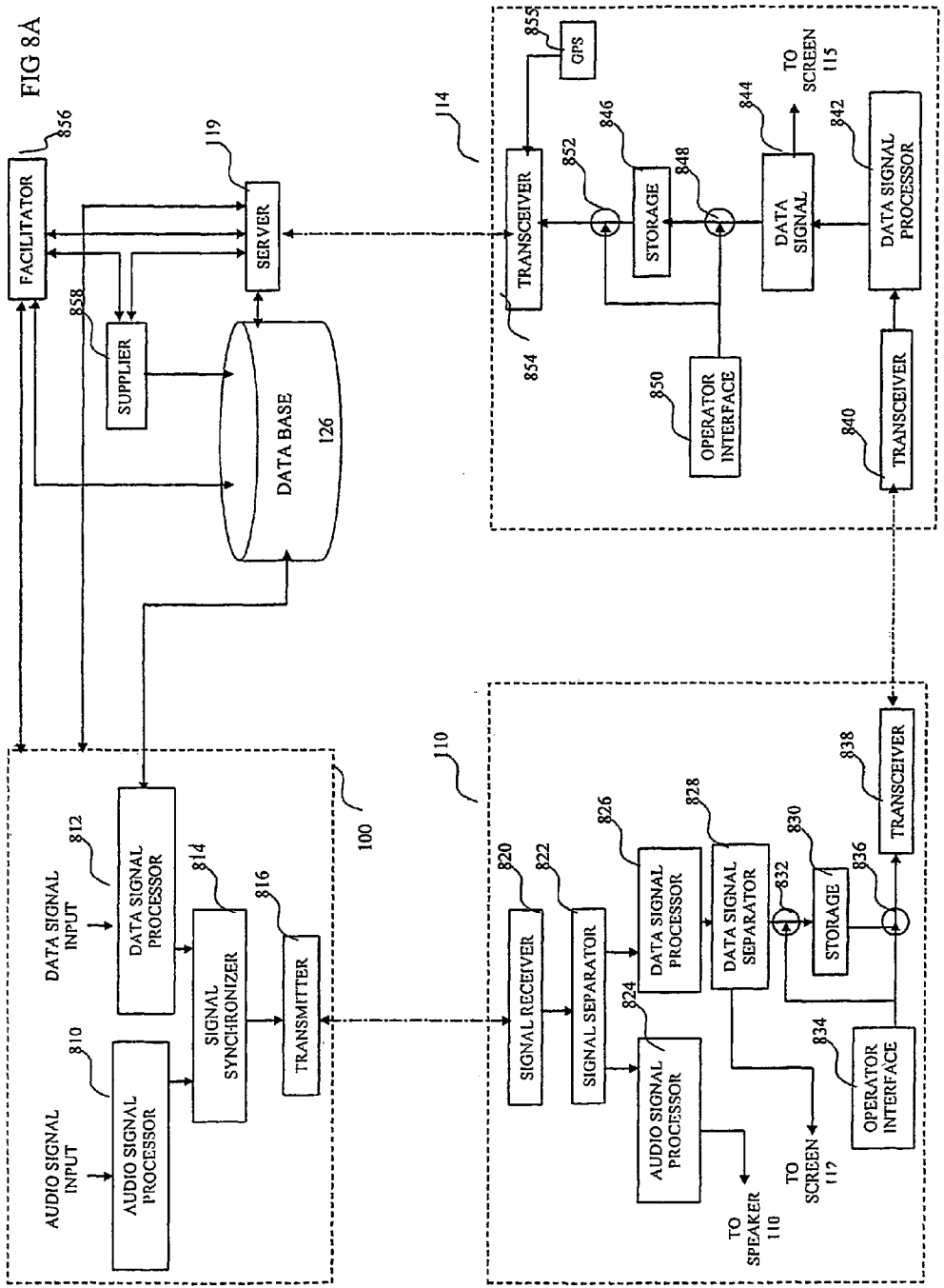

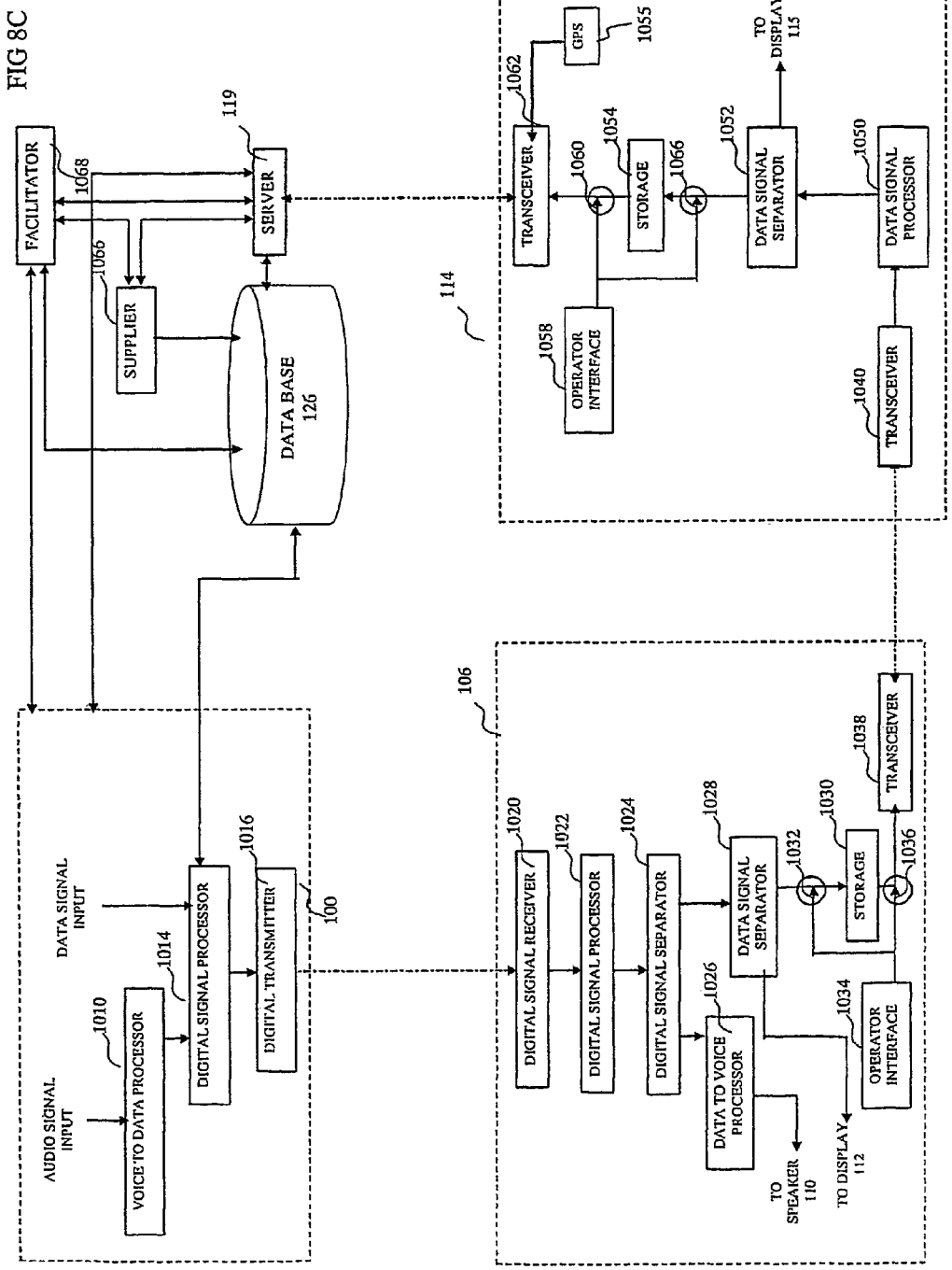

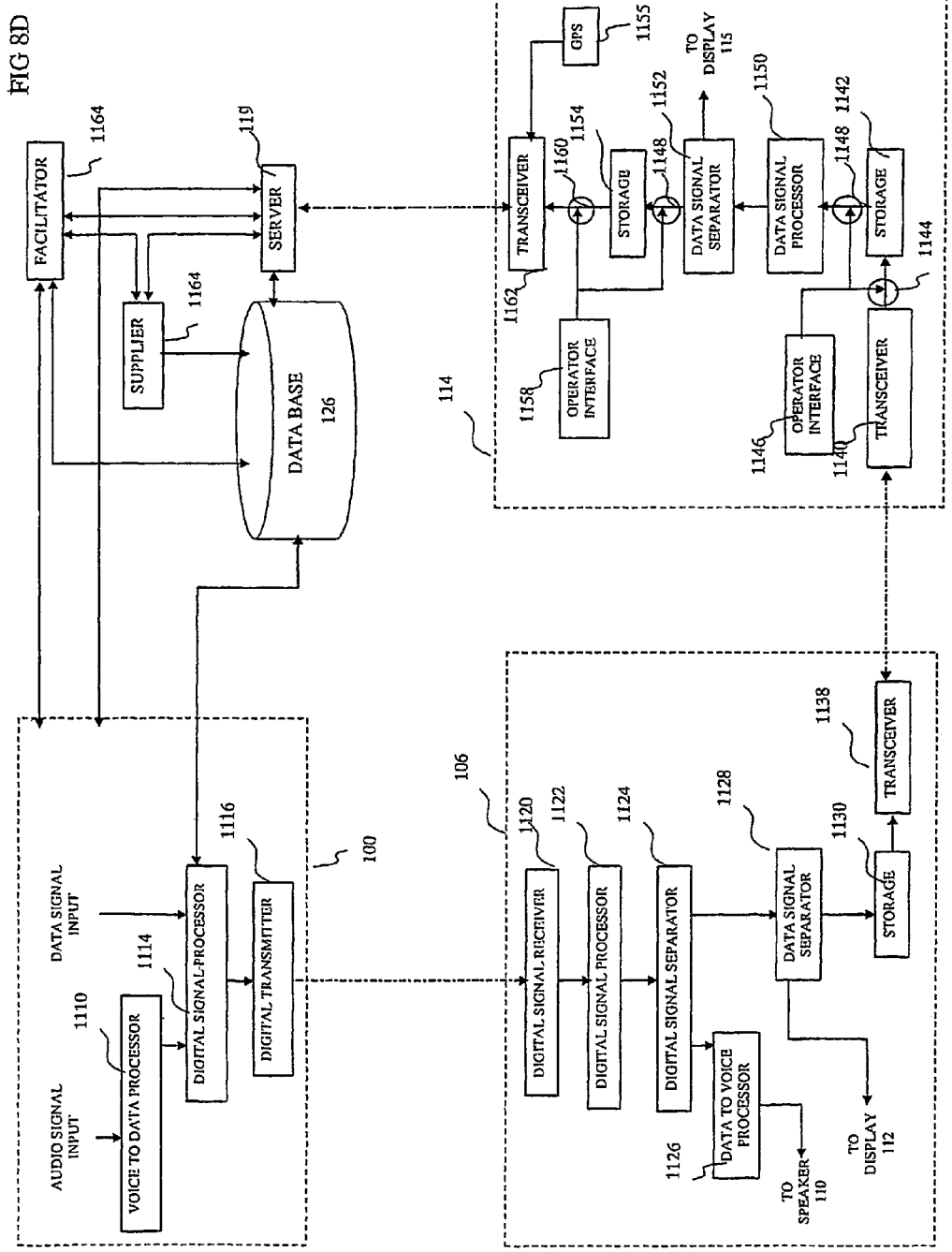

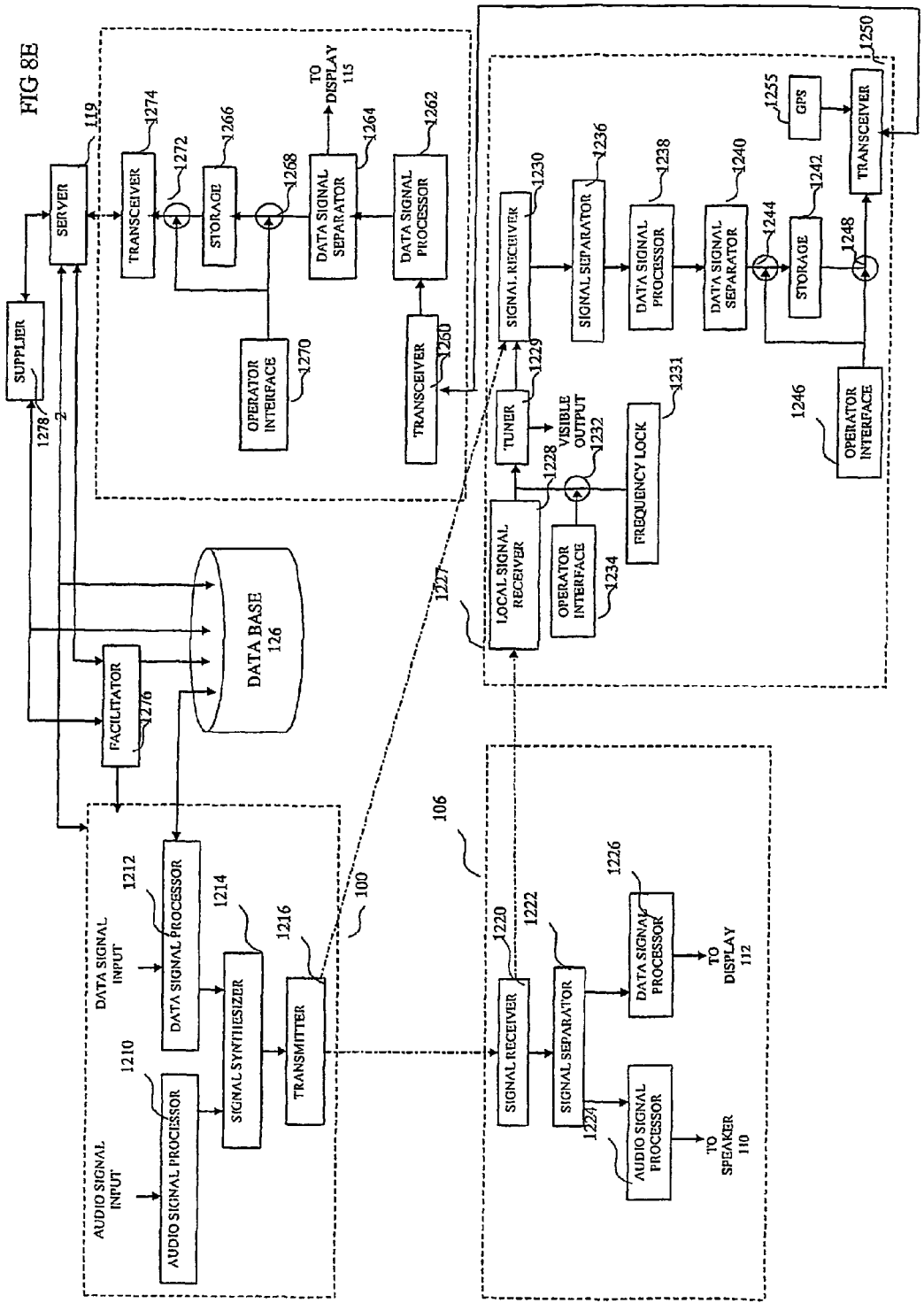

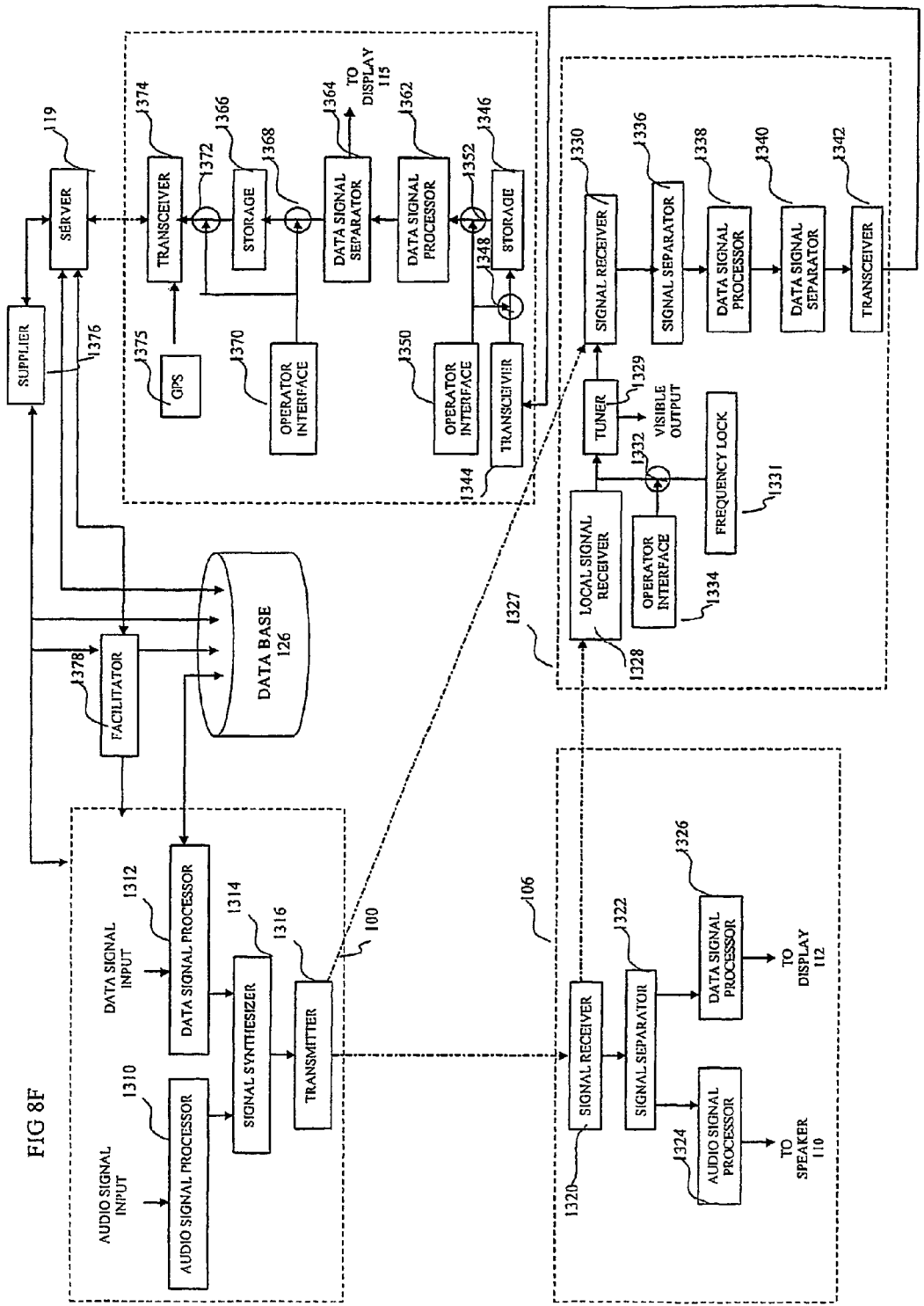

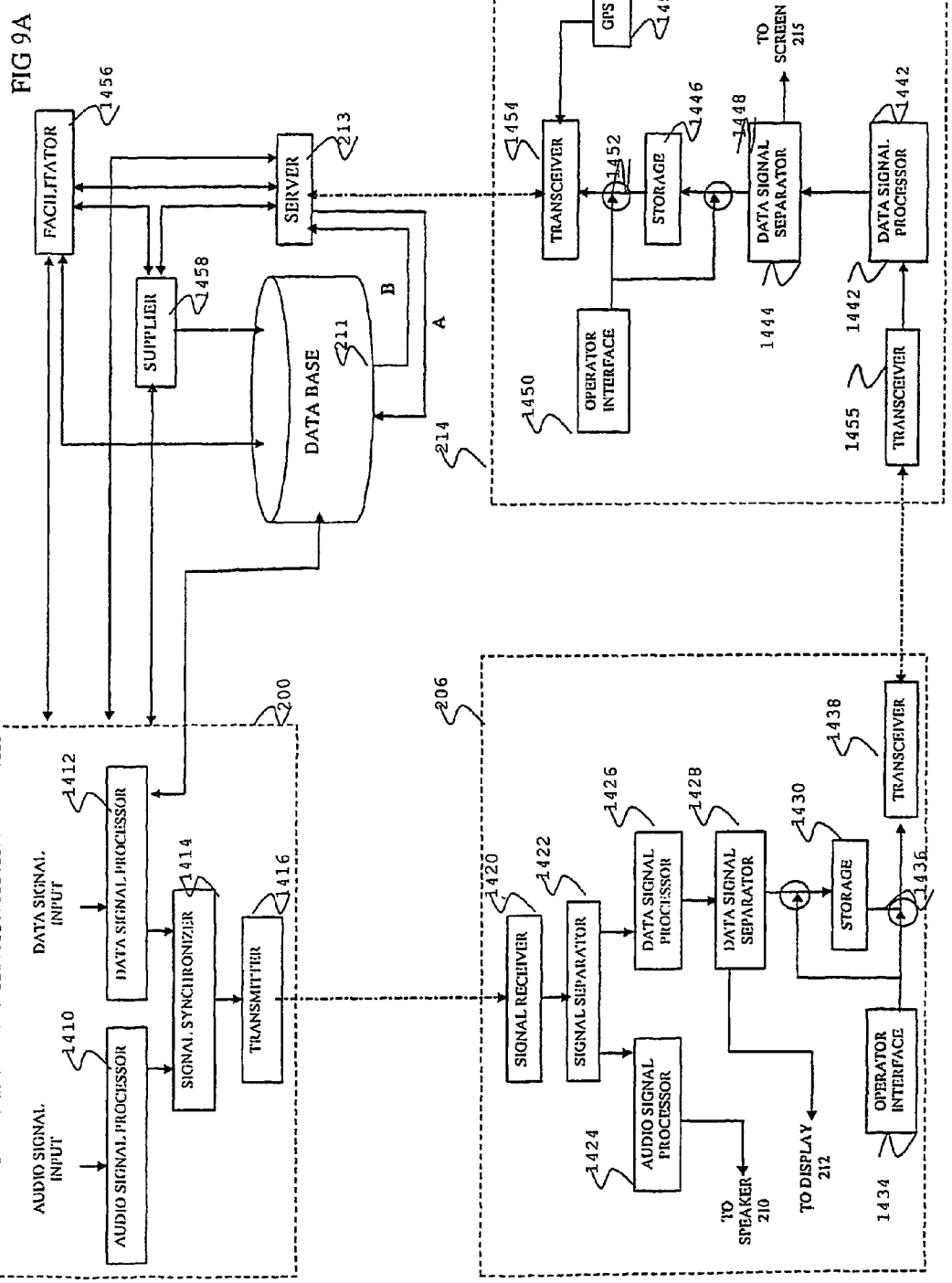

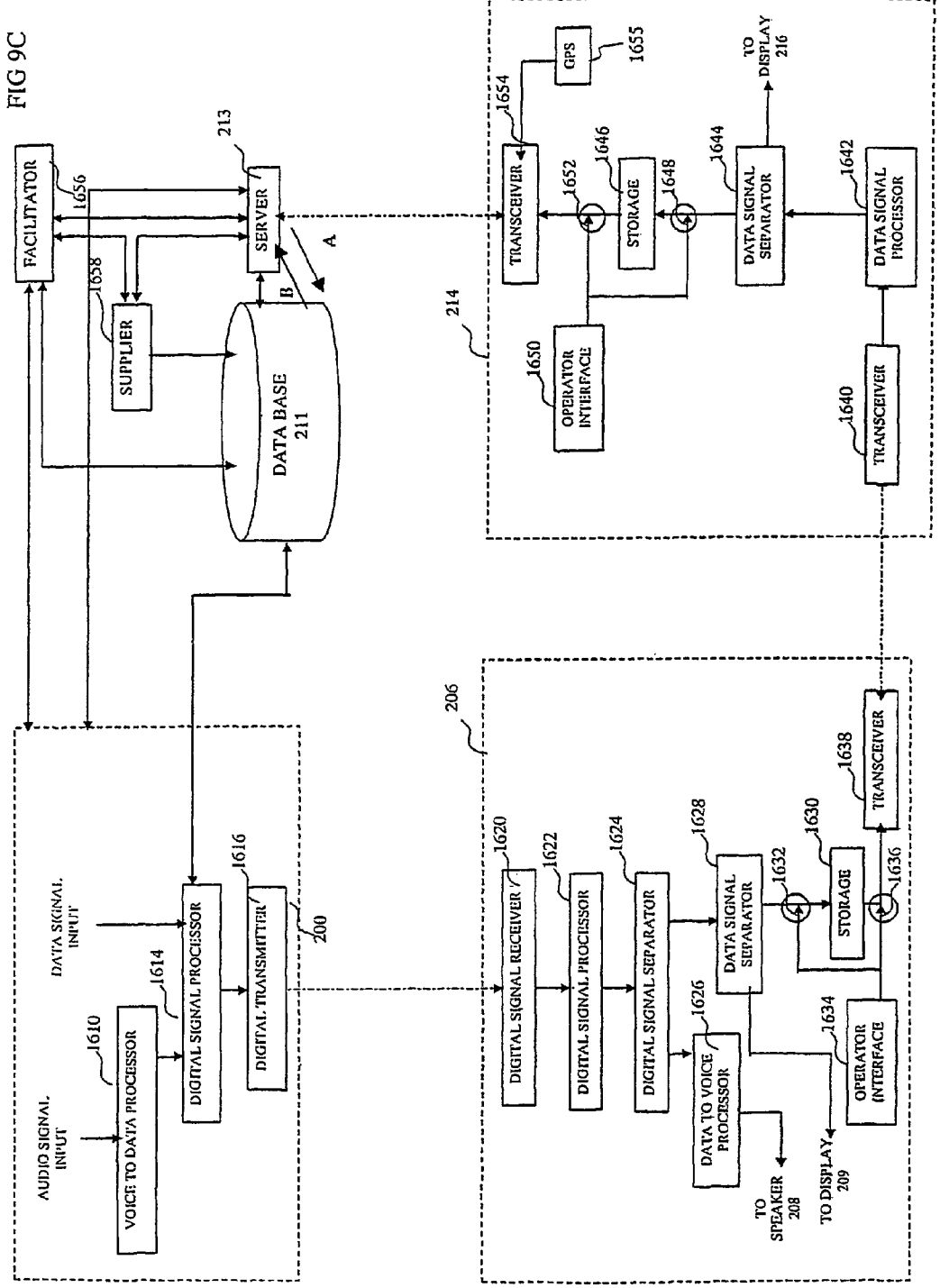

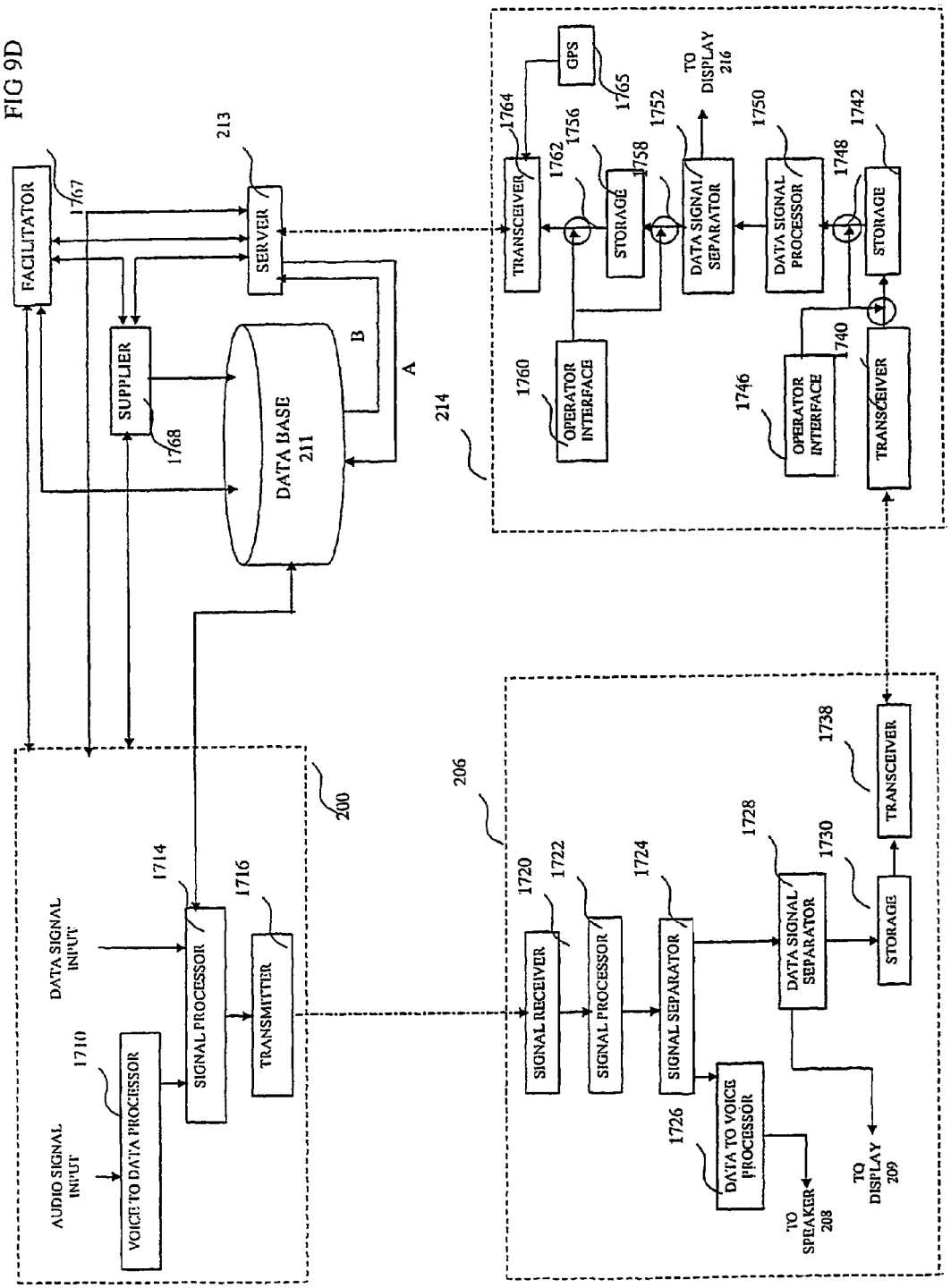

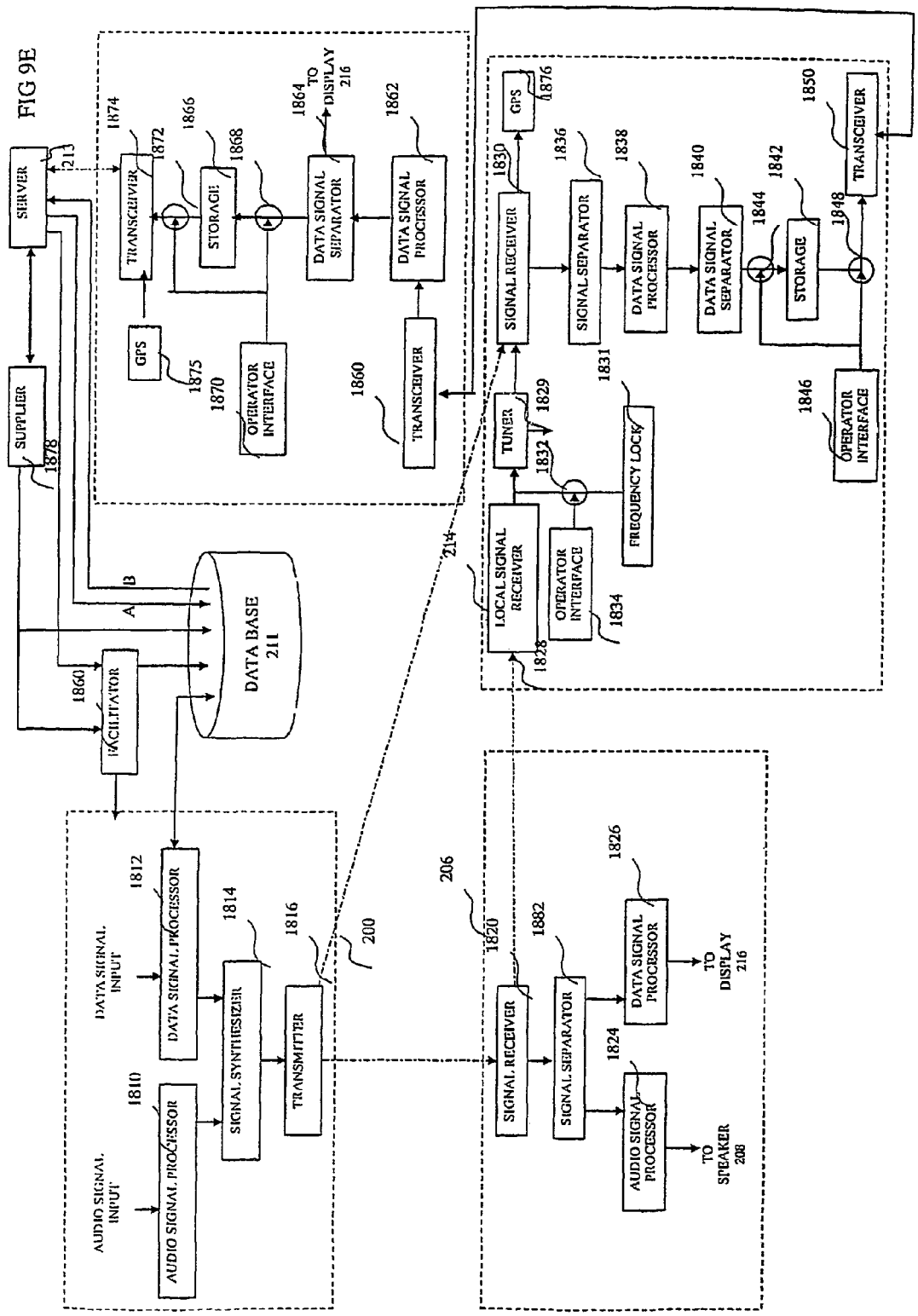

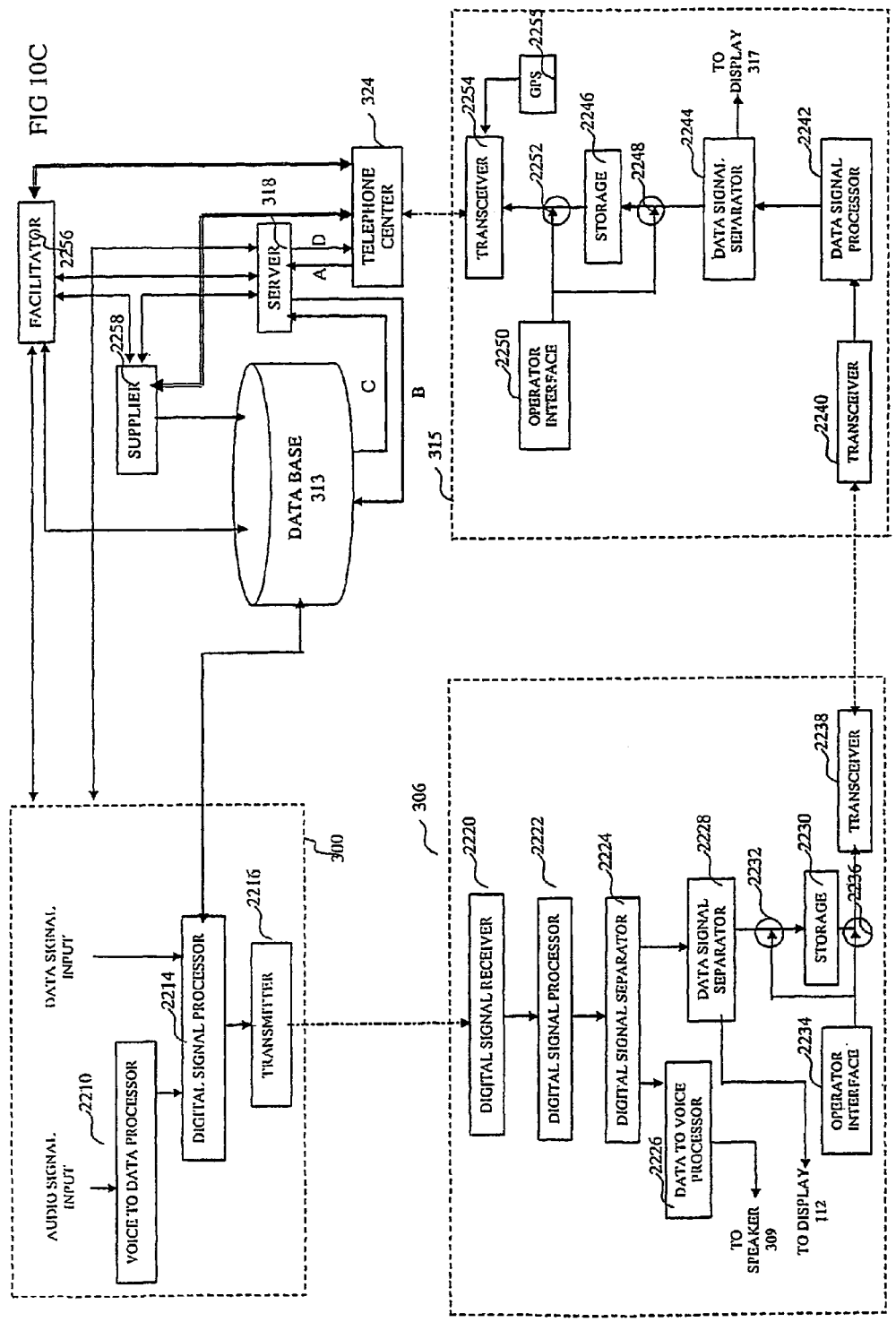

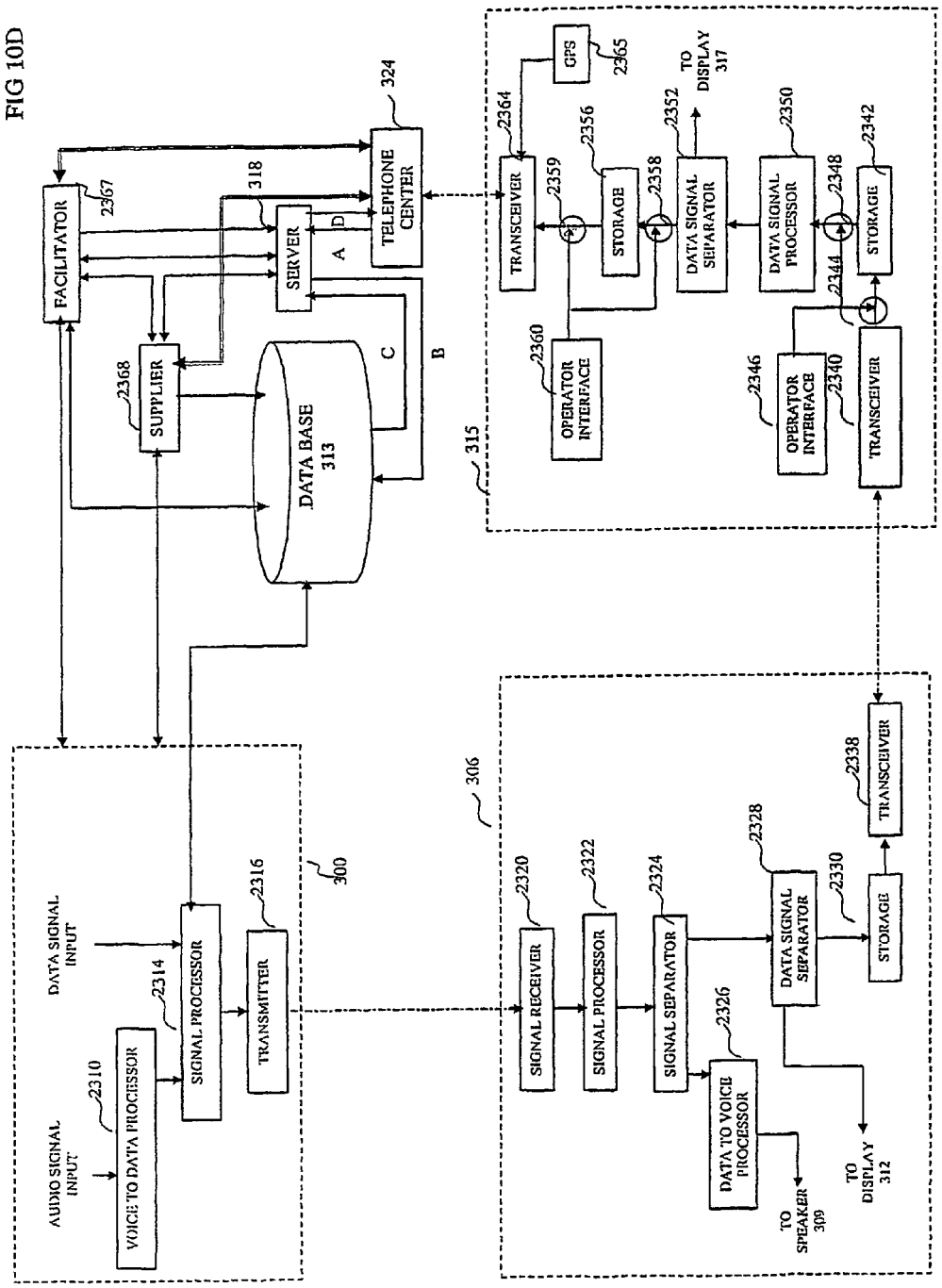

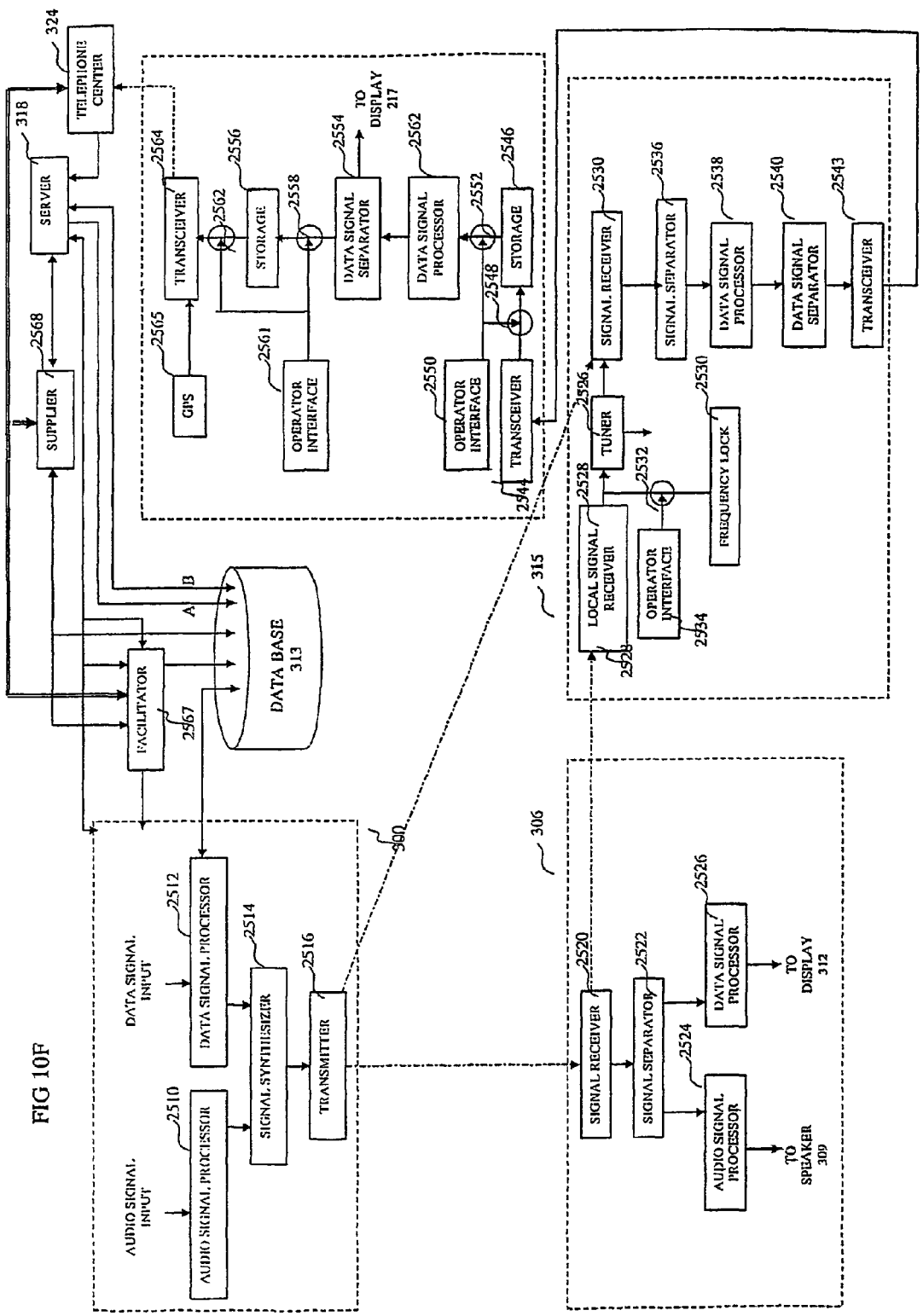

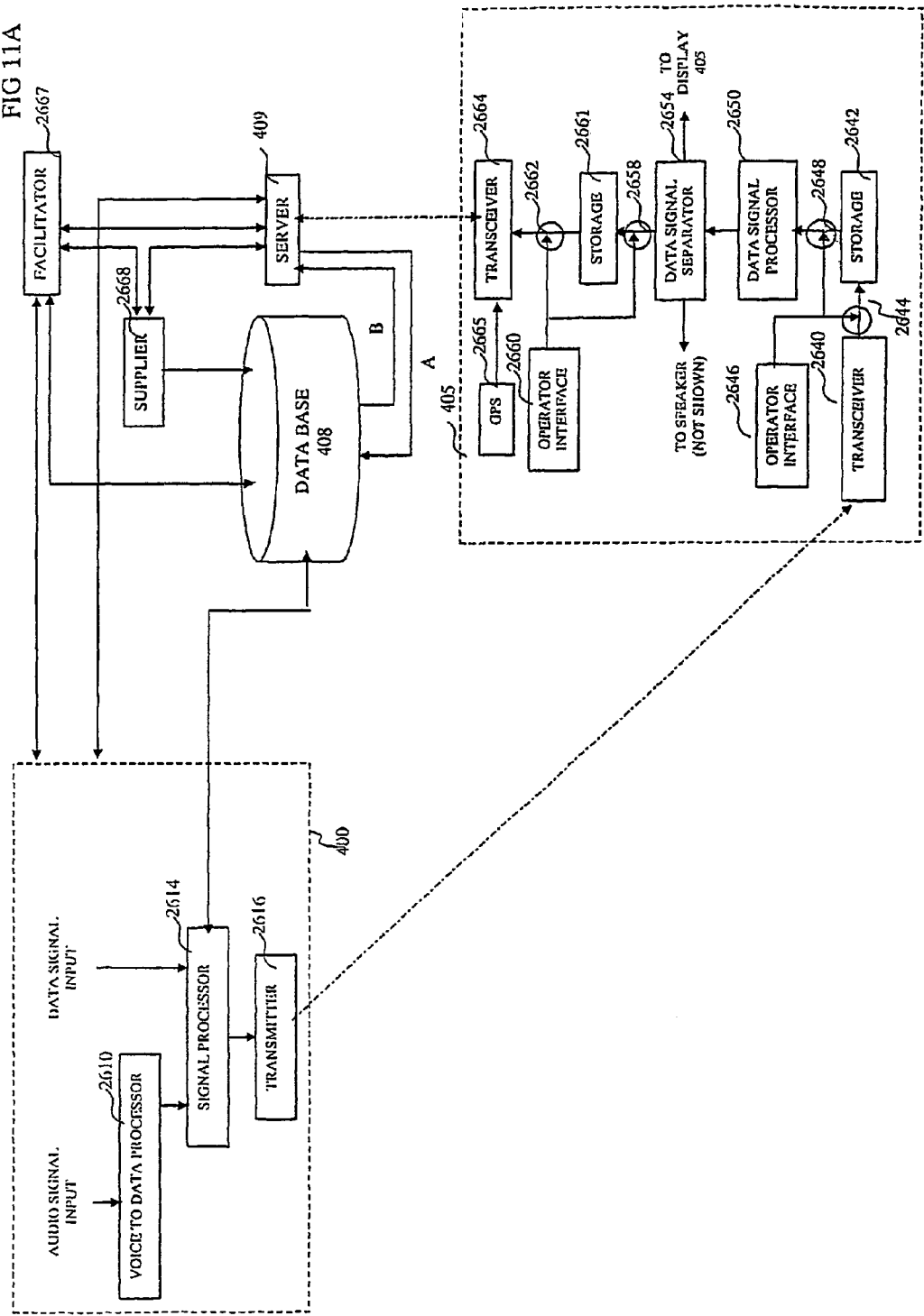

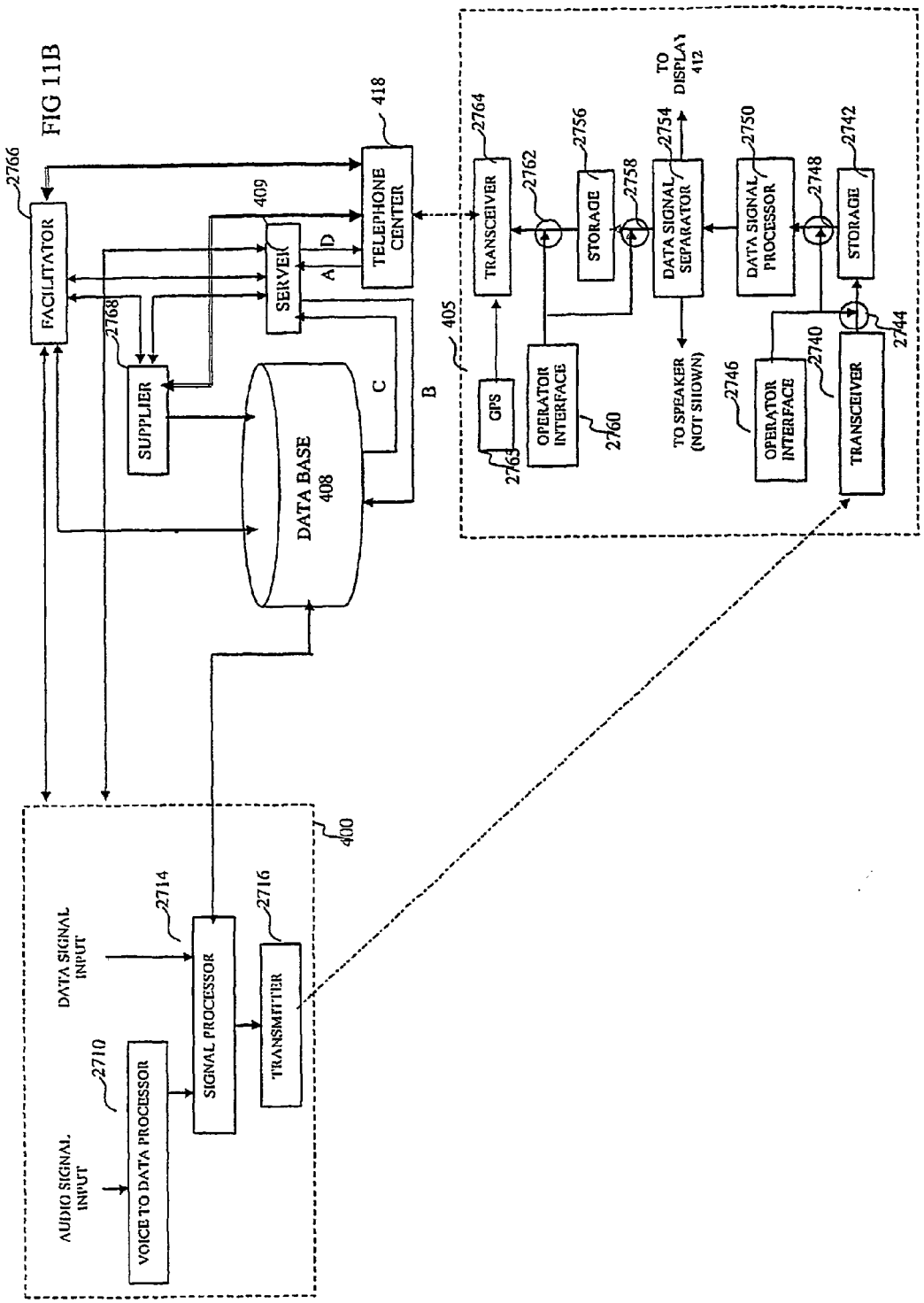

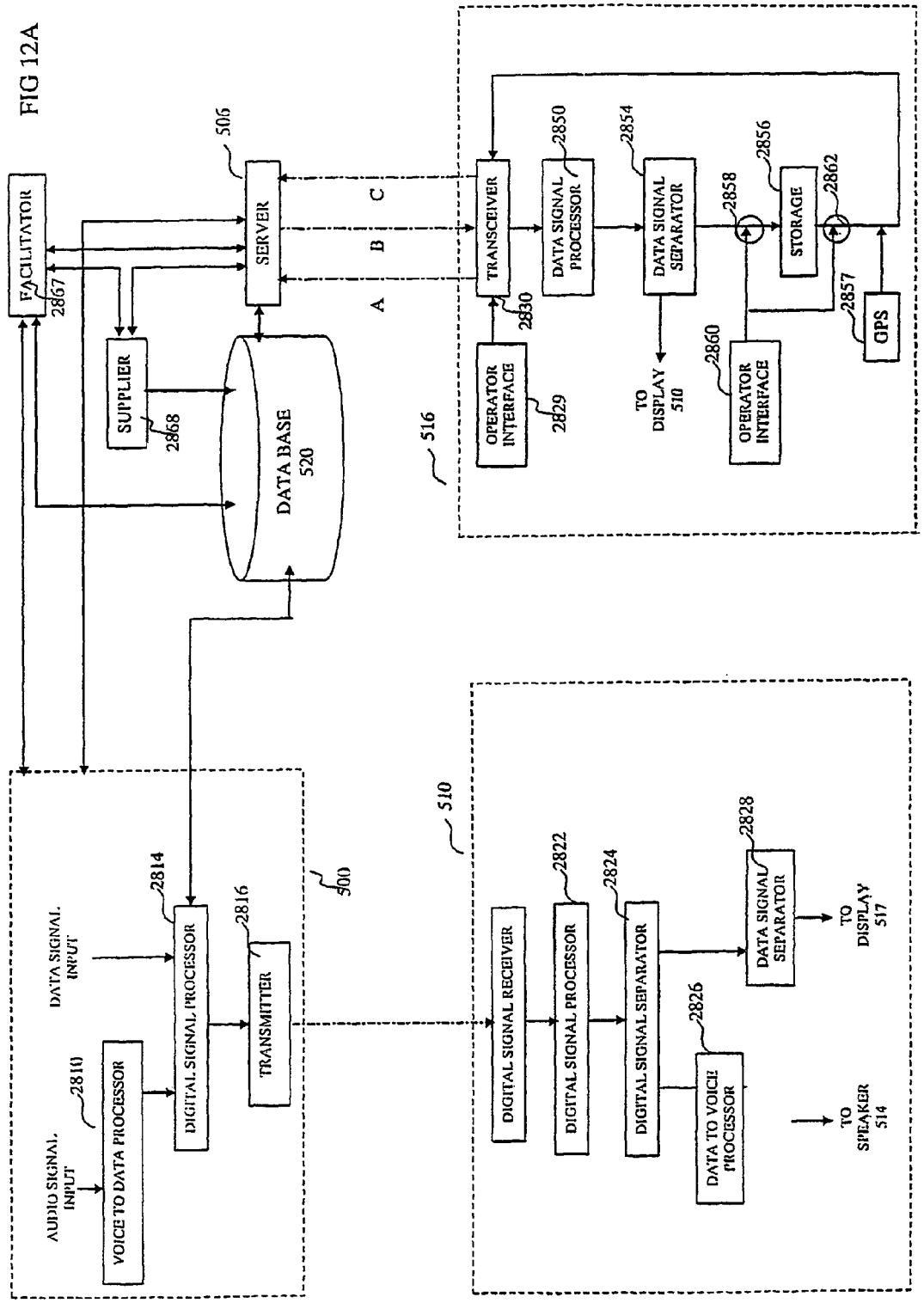

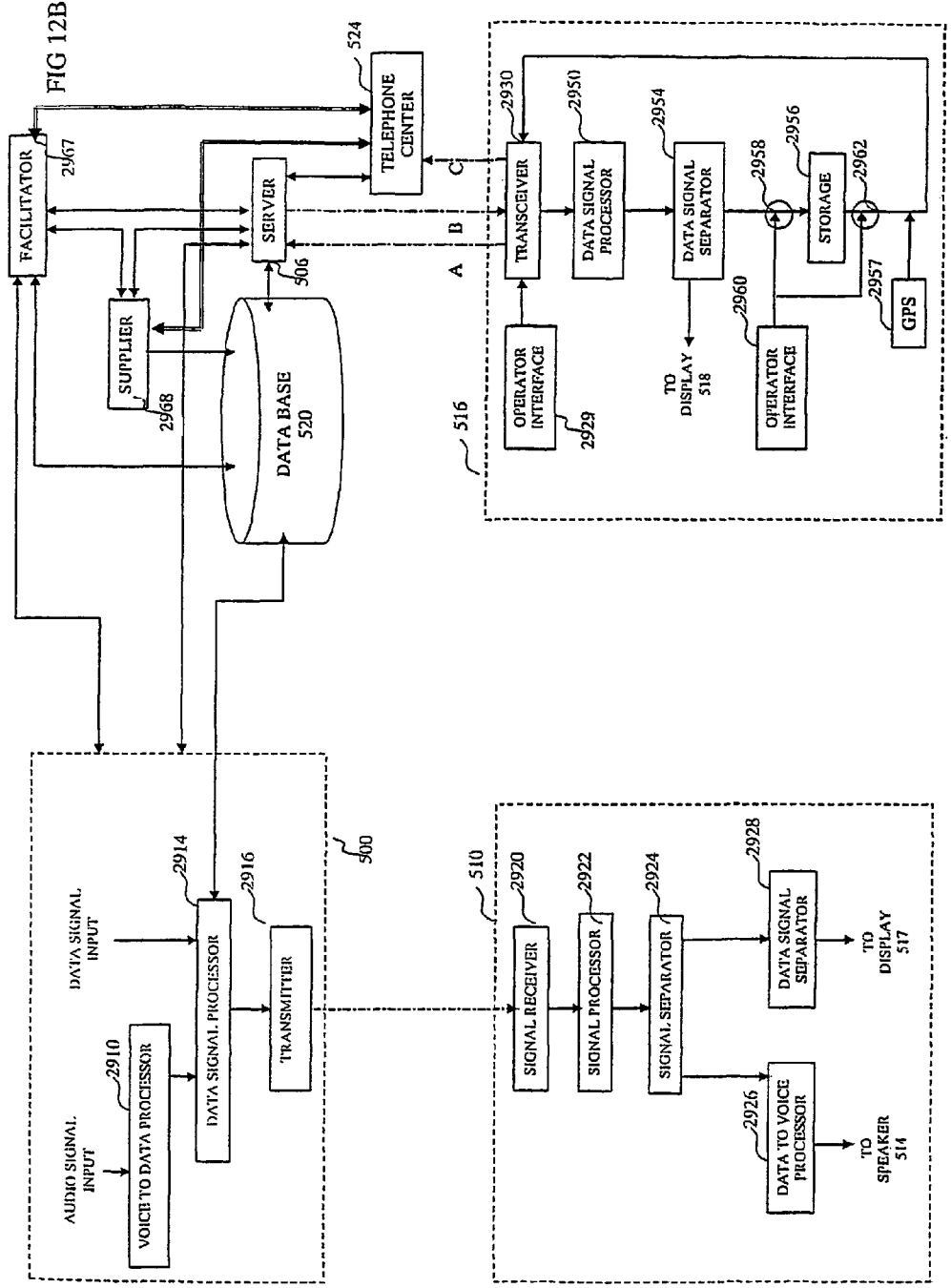

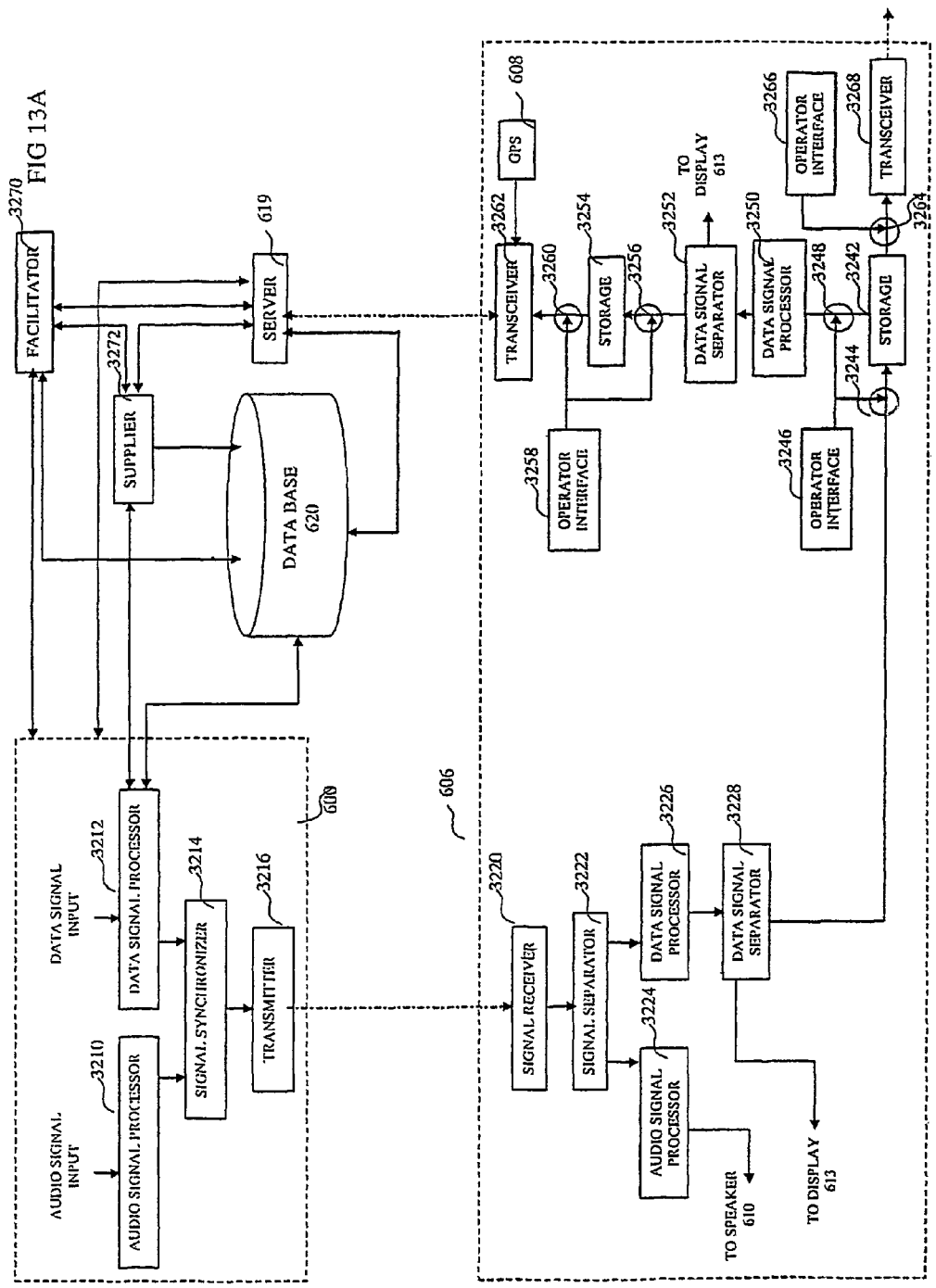

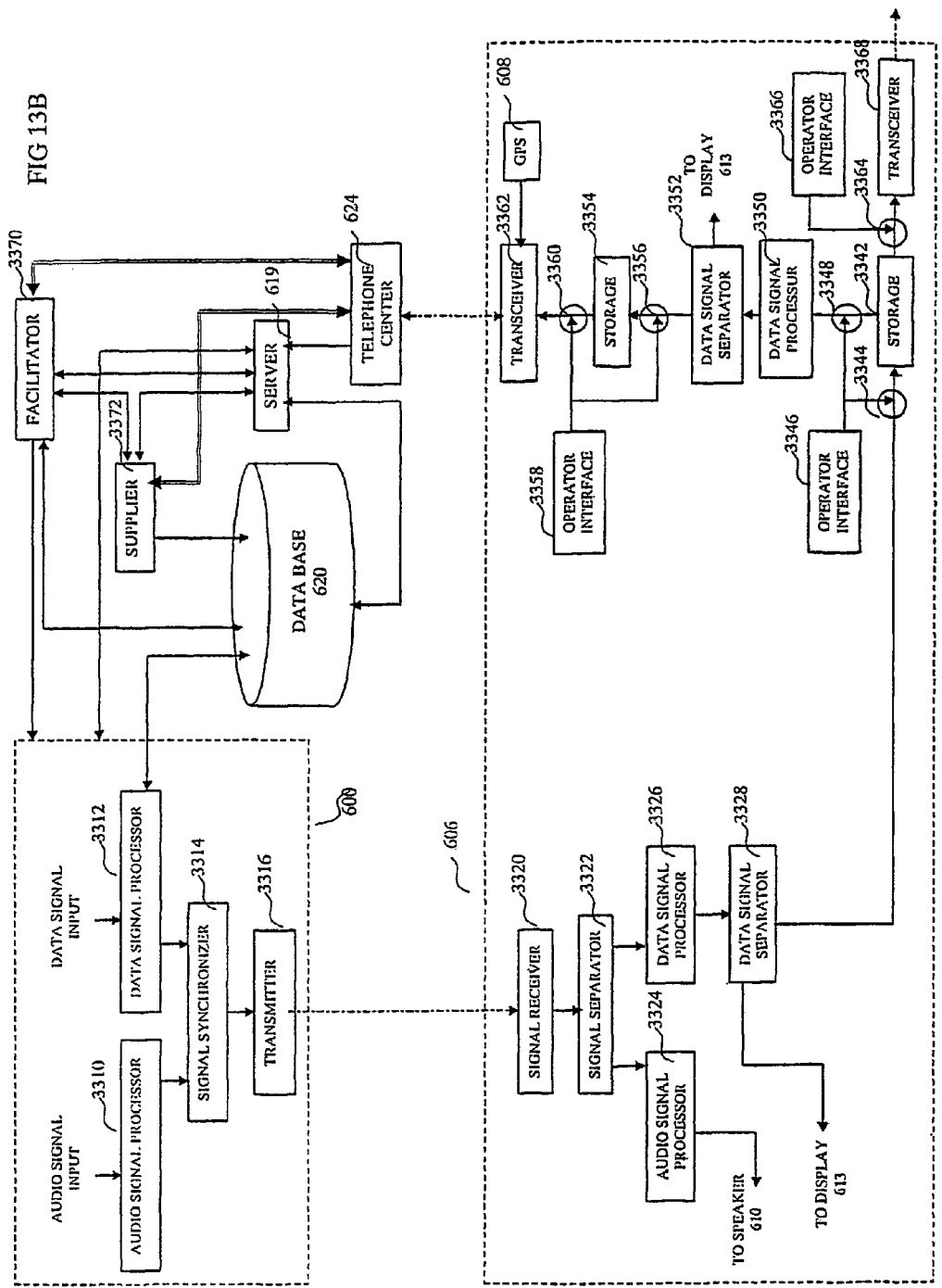

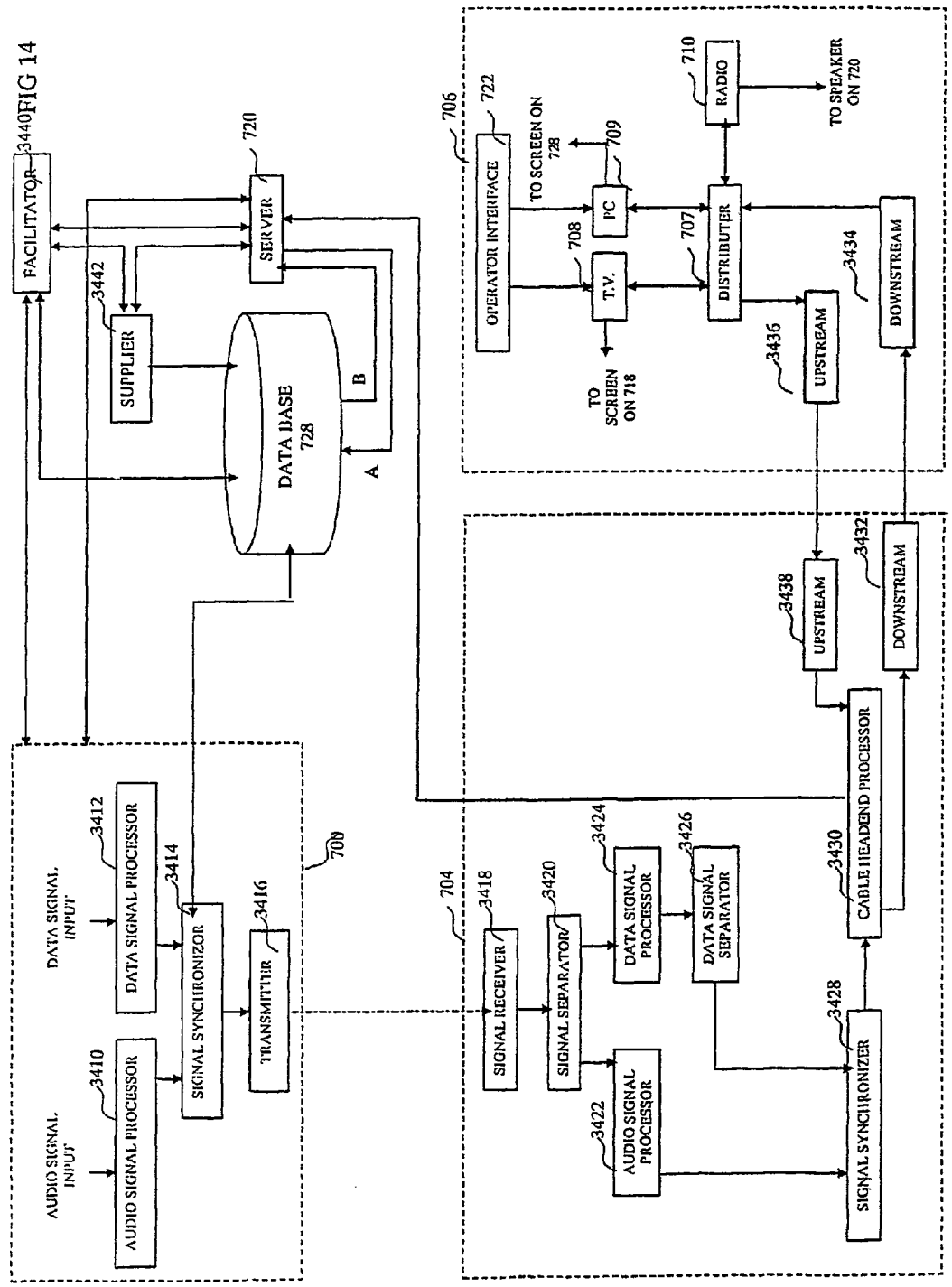

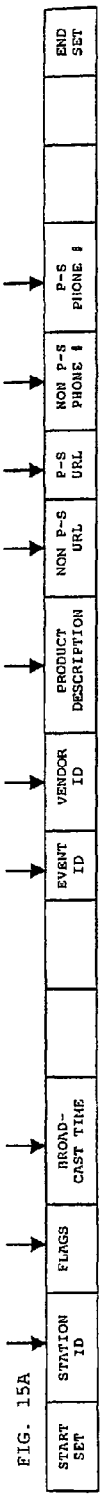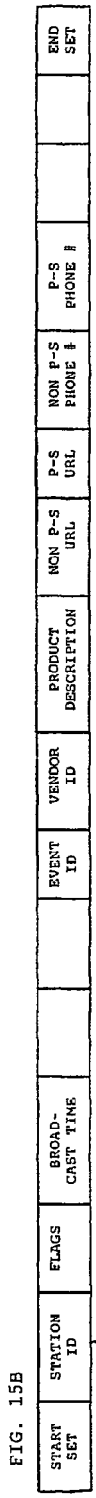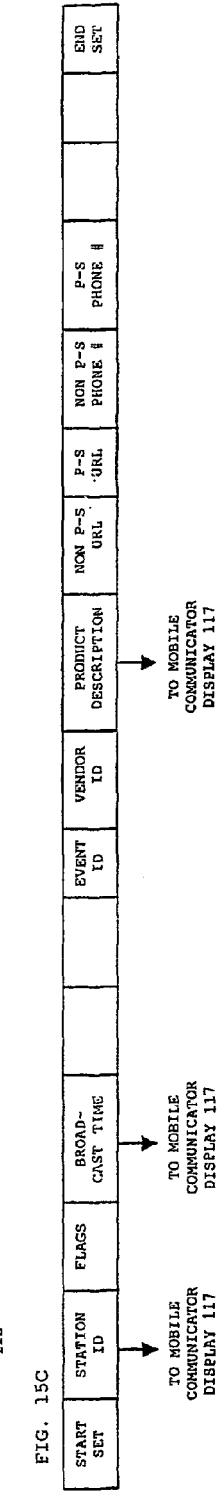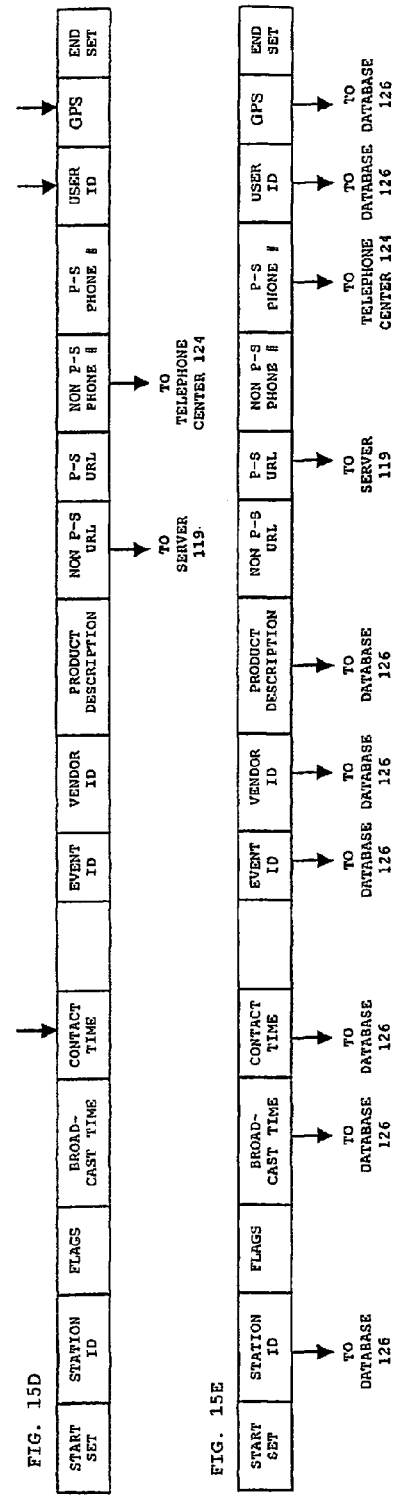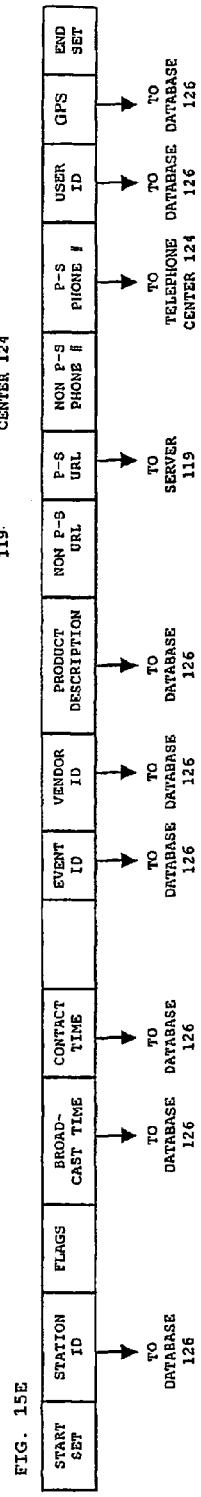

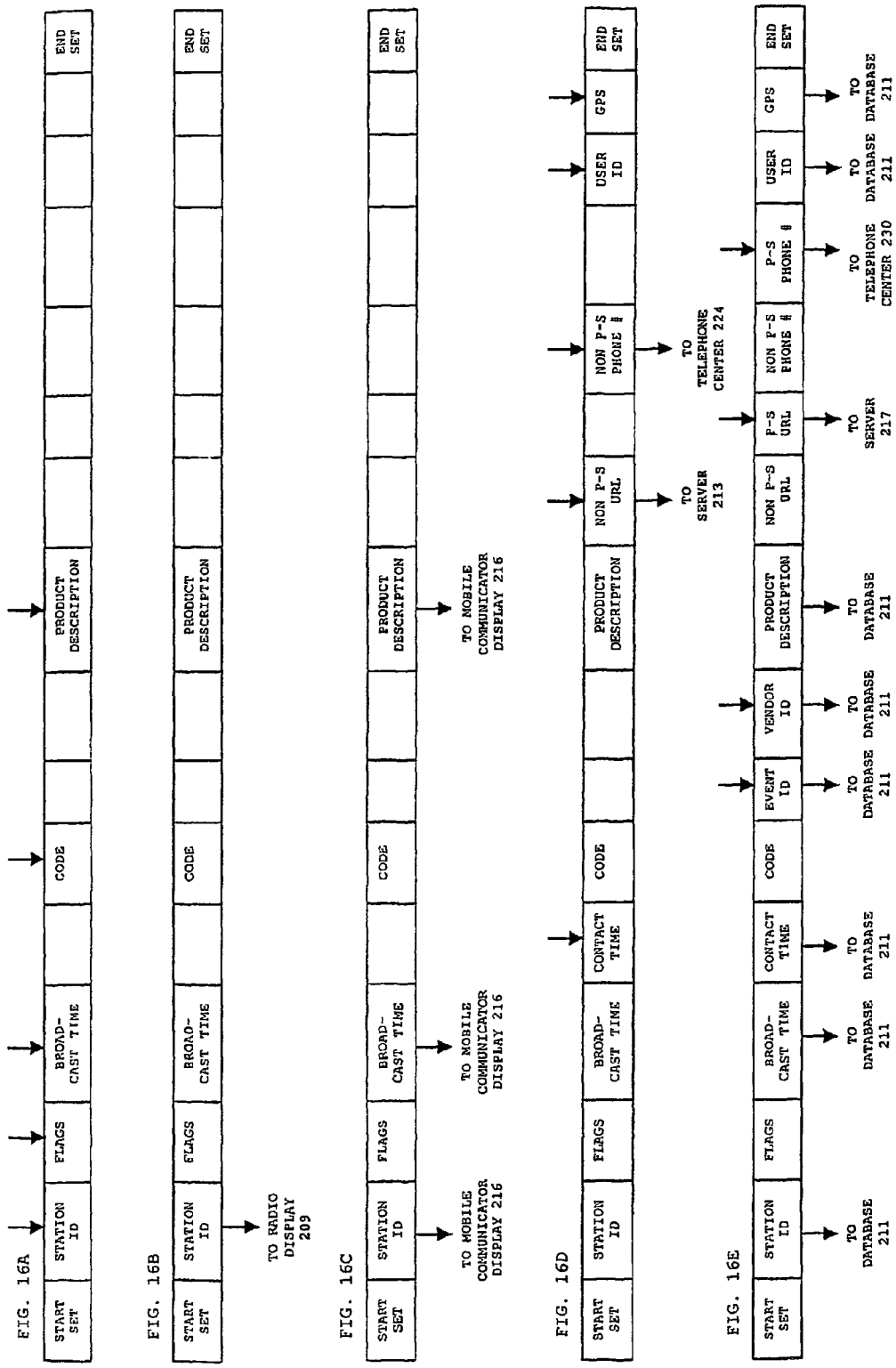

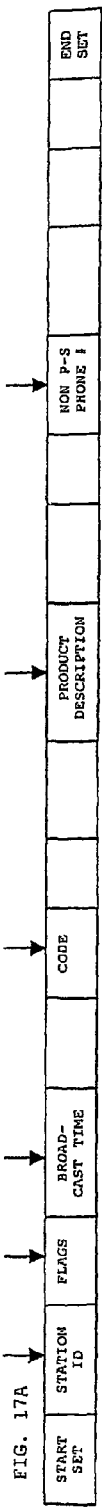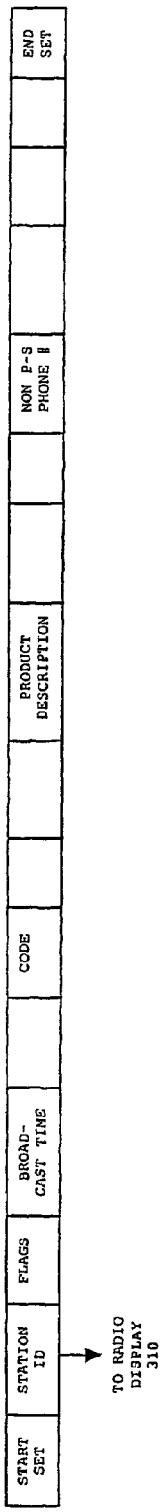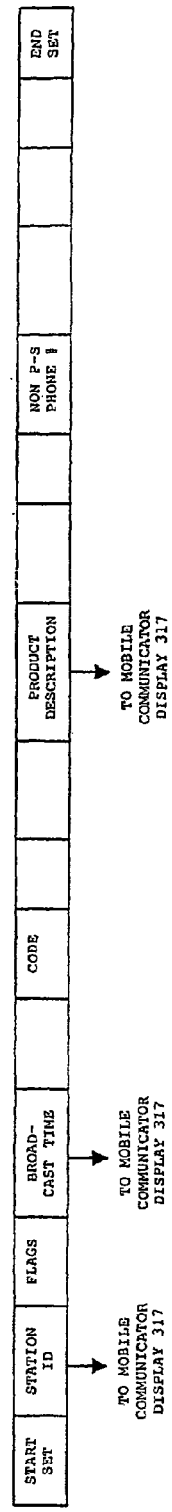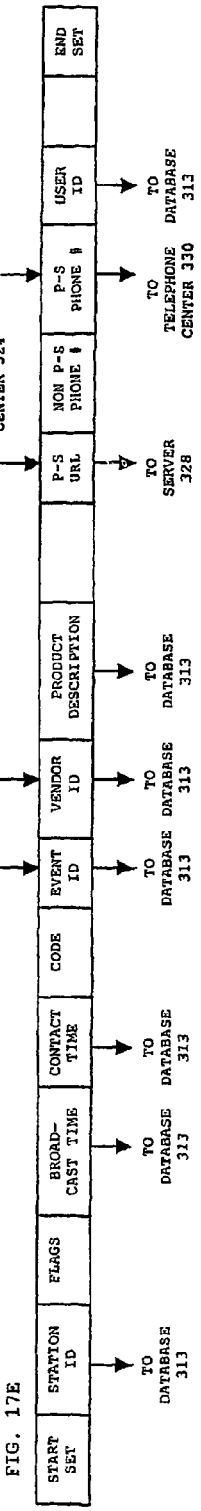
FIG. 17A
FIG. 17B
FIG. 17C
FIG. 17D
FIG. 17E

FIG. 18A, FIG. 18B, FIG. 18C, FIG. 18D, FIG. 18E

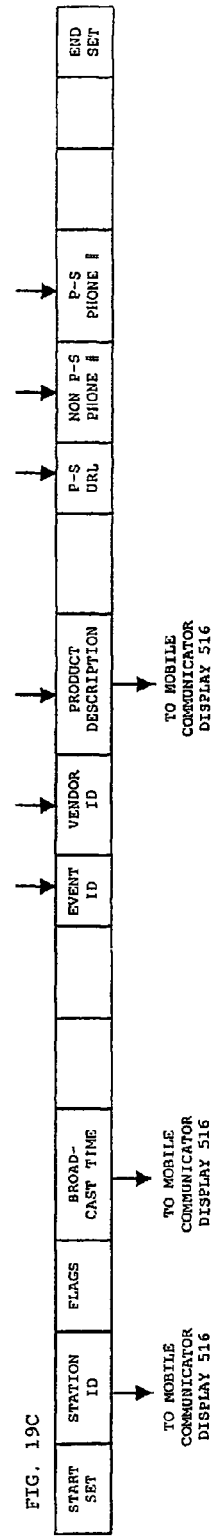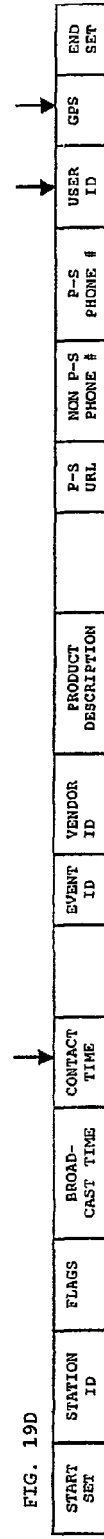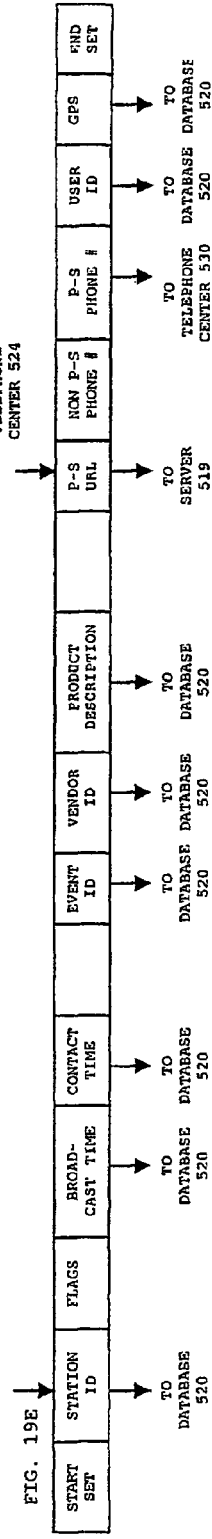

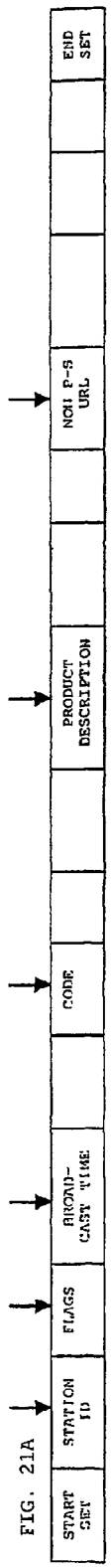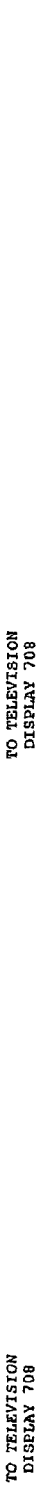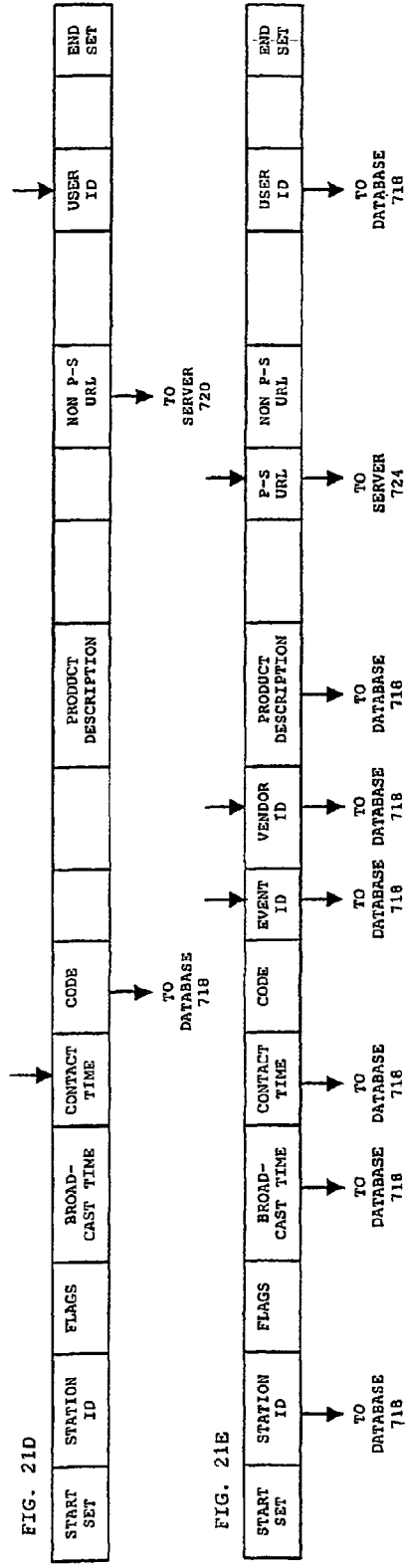

US 8,855,548 B2

WIRELESS COMMUNICATIONS SYSTEM AND METHOD

CROSS REFERENCE TO RELATED APPLICATIONS

This application is a continuation application that claims priority from U.S. patent application Ser. No. 10/220,659, filed on Jan. 2, 2007, now U.S. Pat. No. 7,158,753, which is a national stage filing of International Patent Application No. PCT/IL01/00195, filed on Mar. 1, 2001, which claims the benefit of U.S. Provisional Application No. 60/186,127, filed Mar. 1, 2000.

FIELD OF THE INVENTION

The present invention relates to wireless communications generally and more particularly to accessing information using contact information received wirelessly.

BACKGROUND OF THE INVENTION

The current state of the art relevant to the present invention is believed to be represented by the following U.S. Pat. Nos. 5,063,610, 5,146,612, 5,301,359, 5,507,024, 5,553,315, 5,579,537, 5,661,787, 5,708,478, 5,832,223, 5,857,156, 5,902,865, 5,907,793, 5,949,492, 5,961,603, 5,991,737, 6,018,764, 6,028,644, 6,035,304, 6,038,434, 6,067,447, 6,081,699, 6,163,711

SUMMARY OF THE INVENTION

There is thus provided in accordance with a preferred embodiment of the present invention a method of communicating with a user. The method includes wirelessly broadcasting content which is accessible to a multiplicity of users and which includes at least some non-audio content which is not visible to the users without user actuation and which includes product-specific information, enabling a user to select a portion of the content, responsive to a selection by the user, capturing at least part of the non-audio content, corresponding to the portion of the content selected by the user and employing at least part of the captured content to access a contact using a mobile communicator by initially establishing contact with a non product-specific communication facility and employing product-specific information contained in the non-audio content.

There is provided in accordance with another preferred embodiment of the present invention a method of communicating with a user and includes wirelessly broadcasting content including non-audio content which is accessible to a multiplicity of users and is not visible to the users without user actuation, enabling a user to preselect certain non-audio content based on user determined criteria, responsive to the preselection, capturing at least part of the non-audio content and employing a mobile communicator using at least part of the captured non-audio content to access a contact.

There is further provided in accordance with a preferred embodiment of the present invention a method of communicating with a user and includes wirelessly broadcasting content which is accessible to a multiplicity of users and which is carried by a carrier and a sub-carrier, a non-audible portion of the content including product-specific interactive information, enabling a user to select a portion of the content, responsive to a selection by the user, capturing at least part of the content carried by the sub-carrier, corresponding to the portion of the content selected by the user and employing at least part of the captured content to access a contact for at least partially product-specific interaction.

There is also provided in accordance with yet another preferred embodiment of the present invention a method for providing at least partially automatic product-specific interaction between a multiplicity of users and a plurality of product-specific communication facilities. The method includes broadcasting user-sensible content in synchronization with user non-sensible content, enabling a user to capture selected user non-sensible content in response to the user-sensible content and providing at least partially automatic product-specific mobile interaction via a non-product specific communication facility with at least one of the plurality of product-specific communication facilities.

There is further provided in accordance with another preferred embodiment of the present invention a method for providing at least partially automatic product-specific interaction between a multiplicity of users and a plurality of product-specific communication facilities. The method includes broadcasting user-sensible content to a first user receiver in synchronization with broadcasting user non-sensible content to a second user receiver, enabling a user to capture selected user non-sensible content on the second receiver in response to the user-sensible content received by the user via the first receiver and providing at least partially automatic product-specific interaction via a non-product specific communication facility with at least one of the plurality of product-specific communication facilities.

There is further provided in accordance with yet another preferred embodiment a system for providing at least partially automatic product-specific interaction between a multiplicity of users and a plurality of product-specific communication facilities. The system includes a broadcast facility operative to broadcast user-sensible content in synchronization with user non-sensible content, a user operative content capture functionality enabling a user to capture selected user non-sensible content in response to the user-sensible content, a non-product specific communication facility and a user actuable contact access functionality including a mobile communicator and providing at least partially automatic product-specific interaction via the non-product specific communication facility with at least one of the plurality of product-specific communication facilities.

There is further provided in accordance with yet another preferred embodiment of the present invention a system for providing at least partially automatic product-specific interaction between a multiplicity of users and a plurality of product-specific communication facilities. The system includes a synchronized broadcast facility operative to broadcast user-sensible content to a first user receiver in synchronization with broadcasting user non-sensible content to a second user receiver, user capture functionality enabling a user to capture selected user non-sensible content on the second receiver in response to the user-sensible content received by the user via the first receiver and user actuable access functionality providing at least partially automatic product-specific interaction via a non-product specific communication facility between the user and at least one of the plurality of product-specific communication facilities.

Further in accordance with a preferred embodiment of the present invention the step of employing at least part of the captured content involves an action by the user. Alternatively, the step of employing at least part of the captured content takes place automatically.

Still further in accordance with a preferred embodiment of the present invention the step of wirelessly broadcasting includes radio broadcasting, television broadcasting, Bluetooth transmitting and/or satellite broadcasting. The radio broadcasting typically includes FM broadcasting.

Further in accordance with a preferred embodiment of the present invention the step of enabling a user to select a portion of the content includes enabling a user to make a selection, to make an unprompted selection, to make a selection orally, to make a selection by a manual actuation and/or to preselect certain content based on user determined criteria.

Still further in accordance with a preferred embodiment of the present invention the step of capturing at least part of the non-audio content includes capturing at least part of the content carried by a subcarrier, corresponding to the portion of the content selected by the user.

Further in accordance with a preferred embodiment of the present invention the contact is a web site and/or a telephone communicator.

Additionally in accordance with a preferred embodiment of the present invention the method also includes providing communication via at least one facilitator between a broadcast facility providing the wirelessly broadcasting and at least one of a product-specific communication facility and the non product-specific communication facility. Preferably, the wirelessly broadcasting includes digital broadcasting.

Further in accordance with a preferred embodiment of the present invention the step of enabling a user to select a portion of the content includes providing communication between the non product-specific communication facility and at least one product specific communication facility. Preferably, the step of enabling includes automatically providing product specific interactive communication between the user via non product-specific communication facility with at least one product specific communication facility.

Still further in accordance with a preferred embodiment of the present invention the capture includes capturing at least part of the content carried by a sub-carrier, corresponding to the portion of the content selected by the user.

Additionally in accordance with a preferred embodiment of the present invention the step of providing at least partially automatic product-specific mobile interaction includes providing communication between the non product-specific communication facility and a plurality of product specific communication facilities. The step of providing also includes automatically providing product specific interactive communication between the user via non product-specific communication facility with at least one product specific communication facility.

There is further provided in accordance with another preferred embodiment of the present invention a method for providing interaction between a multiplicity of users and at least one communication facility. The method include receiving non-user sensible content on a mobile communicator, broadcasting user-sensible content to a first user receiver in synchronization with providing the non-user sensible content to the mobile communicator, enabling a user to capture selected user non-sensible content on the mobile communicator in response to the user-sensible content received by the user via the first receiver and providing interaction between the user and the at least one communication facility based on the user non-sensible content.

There is also provided in accordance with another preferred embodiment of the present invention a system for providing interaction between a multiplicity of users and at least one communication facility. The system includes a mobile communicator operative to receive non-user sensible content, a billboard facility providing user viewable content to a user in synchronization with provision of the user non-sensible content to the mobile communicator, user capture functionality enabling a user to capture selected user non-sensible content on the mobile communicator in response to the user-sensible content received by the user and user actuable access functionality providing interaction between the user and the at least one communication facility based on the user non-sensible content.

There is further provided in accordance with a preferred embodiment of the present invention a system for providing interaction between a multiplicity of users and at least one communication facility. The system includes a mobile communicator operative to receive non-user sensible content, at least one synchronized broadcast facility operative to broadcast user-sensible content to the mobile communicator in synchronization with provision of the user non-sensible content to the mobile communicator, user capture functionality enabling a user to capture selected user non-sensible content on the mobile communicator in response to the user-sensible content received by the user via the mobile communicator and user actuable access functionality providing interaction between the user and the at least one communication facility based on the user non-sensible content.

There is also provided in accordance with a preferred embodiment of the present invention a system for providing interaction between a multiplicity of users and at least one communication facility, including broadcasting user-sensible content to the mobile communicator in synchronization with provision of the user non-sensible content to the mobile communicator, enabling a user to capture selected user non-sensible content on the mobile communicator in response to the user-sensible content received by the user via the mobile communicator and providing interaction between the user and the at least one communication facility based on the user non-sensible content.

Further in accordance with a preferred embodiment of the present invention the user capture involves input to the mobile communicator of information identifying the user-sensible content which is synchronized with the user non-sensible content.

Still further in accordance with a preferred embodiment of the present invention the input to the mobile communicator of information identifying the user-sensible content which is synchronized with the user non-sensible content is effected automatically in response to a user capture command.

Further in accordance with a preferred embodiment of the present invention the user capture functionality involves input to the mobile communicator of information identifying the user-sensible content which is synchronized with the user non-sensible content Still further in accordance with a preferred embodiment of the present invention the input to the mobile communicator of information identifying the user-sensible content which is synchronized with the user non-sensible content is effected automatically in response to a user capture command.

Further in accordance with a preferred embodiment of the present invention the step of enabling the user to capture selected user non-sensible content, involves inputting to the mobile communicator of information identifying the user-sensible content which is synchronized with the user non-sensible content Still further in accordance with a preferred embodiment of the present invention the input to the mobile communicator of information, identifying the user-sensible content which is synchronized with the user non-sensible content, is effected automatically in response to a user capture command.

Additionally in accordance with a preferred embodiment of the present invention the input to the mobile communicator of information, identifying the user-sensible content which is synchronized with the user non-sensible content, is effected in response to a user capture command specifying a broadcast channel along which the user is receiving the user sensible content. A time indication enabling the user sensible content on the broadcast channel to be unambiguously identified, is also provided Preferably, the step of enabling the user to capture selected user non-sensible content includes prompting a user to make a selection, enabling a user to make an unprompted selection, to make a selection orally, to make a selection by a manual actuation and/or to preselect certain content based on user determined criteria.

Further in accordance with a preferred embodiment of the present invention the step of capturing selected user non-sensible content includes capturing at least part of the content carried by a sub-carrier, corresponding to the portion of the content selected by the user.

Additionally in accordance with a preferred embodiment of the present invention the contact is a web site and/or a telephone communicator.

Further in accordance with a preferred embodiment of the present invention, the method also includes providing communication via at least one facilitator between a broadcast facility and at least one of a product-specific communication facility and the non product-specific communication facility.

Still further in accordance with a preferred embodiment of the present invention the step of enabling includes providing communication between a non product-specific communication facility and at least one product specific communication facility. Additionally or alternatively, the step of enabling includes automatically providing product specific interactive communication between the user via non product-specific communication facility with at least one product specific communication facility.

Further in accordance with a preferred embodiment of the present invention, the method also includes radio broadcasting, television broadcasting, FM broadcasting, satellite broadcasting the content and/or broadcasting the content via Bluetooth communication protocol.

Still further in accordance with a preferred embodiment of the present invention the user capture functionality involves input to the mobile communicator of information identifying the user-sensible content.

Preferably, the input to the mobile communicator of information identifying the user-sensible content is synchronized automatically.

Further in accordance with a preferred embodiment of the present invention the billboard facility is a stationary billboard facility.

There is also provided in accordance with yet another preferred embodiment of the present invention a method for providing interaction between a multiplicity of users and at least one communication facility. The method includes receiving non-user sensible content at a mobile communicator, providing user viewable content to a user in synchronization with provision of the user non-sensible content to the mobile communicator, enabling a user to capture selected user non-sensible content on the mobile communicator in response to the user-sensible content received by the user and providing interaction between the user and the at least one communication facility based on the user non-sensible content.

There is further provided in accordance with a preferred embodiment of the present invention a method for providing interaction between a multiplicity of users and at least one communication facility. The method includes receiving non-user sensible content at a mobile communicator, broadcasting user-sensible content to the mobile communicator in synchronization with provision of the user non-sensible content to the mobile communicator, enabling a user to capture selected user non-sensible content on the mobile communicator in response to the user-sensible content received by the user via the mobile communicator and providing interaction between the user and the at least one communication facility based on the user non-sensible content.

Further in accordance with a preferred embodiment of the present invention, the step of enabling a user to capture selected user non-sensible content includes enabling the user to capture involves input to the mobile communicator of information identifying the user-sensible content.

Still further in accordance with a preferred embodiment of the present invention, the input to the mobile communicator of information identifying the user-sensible content is synchronized automatically.

Further in accordance with a preferred embodiment of the present invention, the method also includes inputting to the mobile communicator of information identifying the user-sensible content.

Still further in accordance with a preferred embodiment of the present invention, the input to the mobile communicator of information identifying the user-sensible content is synchronized automatically. Alternatively, the input to the mobile communicator of information identifying the user-sensible content, which is synchronized with the user non-sensible content, is effected automatically in response to a user capture command.

Further in accordance with a preferred embodiment of the present invention, the input to the mobile communicator of information identifying the user-sensible content which is synchronized with the user non-sensible content is effected in response to a user capture command specifying a broadcast channel along which the user is receiving the user sensible content and providing a time indication enabling the user sensible content on the broadcast channel to be unambiguously identified.

Additionally in accordance with a preferred embodiment of the present invention, the method also includes inputting to the mobile communicator of information identifying the user-sensible content which is synchronized with the user non-sensible content There is also provided in accordance with a preferred embodiment of the present invention a system for communicating with a user. The system includes a wireless broadcasting facility operative to provide content to a multiplicity of users and which includes at least some non-audio product-specific content, a user operable content selection functionality, a content capture functionality responsive to a selection by the user to capture at least part of the non-audio content, corresponding to the portion of the content selected by the user and a product-specific contact access functionality, employing at least part of the captured content to access a contact via a non-product specific communication facility.

There is further provided in accordance with another preferred embodiment of the present invention a system for communicating with a user. The system includes a wireless broadcasting facility operative to provide content to a multiplicity of users, a user operable content selection functionality, a content capture functionality, responsive to a selection by the user to capture at least part of the content based on predetermined criteria, a contact access functionality, employing at least part of the captured content to access a contact and a facilitator operative to functionally interconnect the wireless broadcasting facility and the contact access functionality.

There is provided in accordance with yet another preferred embodiment of the present invention a system for providing interaction between a multiplicity of users and at least one communication facility. The system includes a mobile communicator operative to receive non-user sensible content, at least one synchronized broadcast facility operative to broadcast user-sensible content to a first user receiver in synchronization with provision of the user non-sensible content to the mobile communicator, user capture functionality enabling a user to capture selected user non-sensible content on the mobile communicator in response to the user-sensible content received by the user via the first receiver and user actuable access functionality providing interaction between the user and the at least one communication facility based on the user non-sensible content.

Further in accordance with a preferred embodiment of the present invention the contact access functionality includes a user actuation interface. Preferably, the contact access functionality includes a mobile communicator employed by the user for automatically establishing product-specific contact using at least some of the content. Additionally, the content includes non-audible content.

Still further in accordance with a preferred embodiment of the present invention, the content includes non-audible and non-visible content. Preferably, the non-audible content is not visible on a receiver of the content directly from the broadcast facility.

Additionally in accordance with a preferred embodiment of the present invention the contact access functionality operates automatically.

Further in accordance with a preferred embodiment of the present invention the radio broadcasting facility includes an FM broadcasting facility.

Still further in accordance with a preferred embodiment of the present invention the user operable content selection functionality includes prompting functionality for prompting a user to make a selection.

Further in accordance with a preferred embodiment of the present invention the user operable content selection functionality includes user selection functionality enabling a user to make an unprompted selection, to make a selection orally and/or to make a selection by a manual actuation.

Additionally in accordance with a preferred embodiment of the present invention the user operable content selection functionality includes preselection functionality enabling a user to preselect certain content based on user determined criteria.

Further in accordance with a preferred embodiment of the present invention the content capture functionality includes sub-carrier content capture functionality operative to capture at least part of the content carried by the sub-carrier, corresponding to the portion of the content selected by the user.

Additionally in accordance with a preferred embodiment of the present invention the user operable content selection functionality includes manually activated user selection functionality enabling a user to make a selection by a manual actuation and/or preselection functionality enabling a user to preselect certain content based on user determined criteria.

Further in accordance with a preferred embodiment of the present invention the content capture functionality includes sub-carrier content capture functionality operative to capture at least part of the content carried by the sub-carrier, corresponding to the portion of the content selected by the user.

Preferably, the contact is a web site, a telephone communicator, a radio broadcasting facility, a television broadcasting facility, a Bluetooth broadcasting facility, an FM broadcasting facility and/or a satellite broadcasting facility.

Further in accordance with a preferred embodiment of the present invention the facilitator also is functionally interconnected with an advertising content administrator. Additionally, the facilitator also provides financial clearinghouse functionality to at least the wireless broadcasting facility and the contact access functionality.

Further in accordance with a preferred embodiment of the present invention the contact access functionality includes at least one non-product specific communication facility and a plurality of product specific communication facilities.

Additionally in accordance with a preferred embodiment of the present invention the contact access functionality includes a mobile communicator employed by the user for automatically establishing product-specific contact using at least some of the content. Preferably, the contact access functionality includes a user actuation interface.

Further in accordance with a preferred embodiment of the present invention the user operable content pre-selection functionality includes voice activated user selection functionality enabling a user to make a selection orally. Preferably, the user operable content selection functionality includes manually activated user selection functionality enabling a user to make a selection by a manual actuation.

There is also provided in accordance with another preferred embodiment of the present invention a system for communicating with a user-including a wireless broadcasting facility operative to provide content to a multiplicity of users, which content is inaudible and is not visible to the users without user actuation, a user operable content selection functionality, a content capture functionality, responsive to a selection by the user to capture at least part of the content and contact access functionality, employing at least part of the content captured by the user to automatically access a contact in response to user actuation.

Further in accordance with a preferred embodiment of the present invention the contact access functionality provides automatic product-specific contact access using at least part of the content captured by the user.

Still further in accordance with a preferred embodiment of the present invention the wireless broadcasting facility includes a Bluetooth facility.

Additionally in accordance with a preferred embodiment of the present invention the radio broadcasting facility includes an FM broadcasting facility.

Further in accordance with a preferred embodiment of the present invention, the system includes user operable content pre-selection functionality including voice activated user selection functionality enabling a user to make a selection orally and/or to make a selection by a manual actuation. The user operable content selection functionality also includes a preselection functionality enabling a user to preselect certain content based on user determined criteria.

Preferably, the content capture functionality includes sub-carrier content capture functionality operative to capture at least part of the content carried by the sub-carrier, corresponding to the portion of the content pre-selected by the user.

BRIEF DESCRIPTION OF THE DRAWINGS

The present invention will be understood and appreciated more fully from the following detailed description, taken in conjunction with the drawings in which:

FIG. 7 is a simplified pictorial illustration of a system and methodology for communicating with a user in accordance with a further preferred embodiment of the present invention;

FIGS. 8A, 8B, 8C, 8D, 8E & 8F are simplified functional block diagrams of six alternative embodiments of the system of FIG. 1;

FIGS. 9A, 9B, 9C, 9D, 9E & 9F are simplified functional block diagrams of a preferred embodiment of the system of FIG. 2;

FIGS. 10A, 10B, 10C, 10D, 10E and 10F are simplified functional block diagrams of a preferred embodiment of the system of FIG. 3;

FIGS. 11A and 11B are simplified functional block diagrams of a preferred embodiment of the system of FIG. 4;

FIGS. 12A and 12B are simplified functional block diagrams of a preferred embodiment of the system of FIG. 5;

FIGS. 13A and 13B are simplified functional block diagrams of a preferred embodiment of the system of FIG. 6;

FIG. 14 is a simplified functional block diagram of a preferred embodiment of the system of FIG. 7;

FIGS. 15A-15E are simplified illustrations of typical data sets employed in the embodiment of FIG. 1;

FIGS. 16A-16E are simplified illustrations of typical data sets employed in the embodiment of FIG. 2;

FIGS. 17A-17E are simplified illustrations of typical data sets employed in the embodiment of FIG. 3;

FIGS. 18A-18E are simplified illustrations of typical data sets employed in the embodiment of FIG. 4;

FIGS. 19A-19E are simplified illustrations of typical data sets employed in the embodiment of FIG. 5;

FIGS. 21A-21E are simplified illustrations of typical data sets employed in the embodiment of FIG. 7;

DETAILED DESCRIPTION OF PREFERRED EMBODIMENTS

Figure 1:
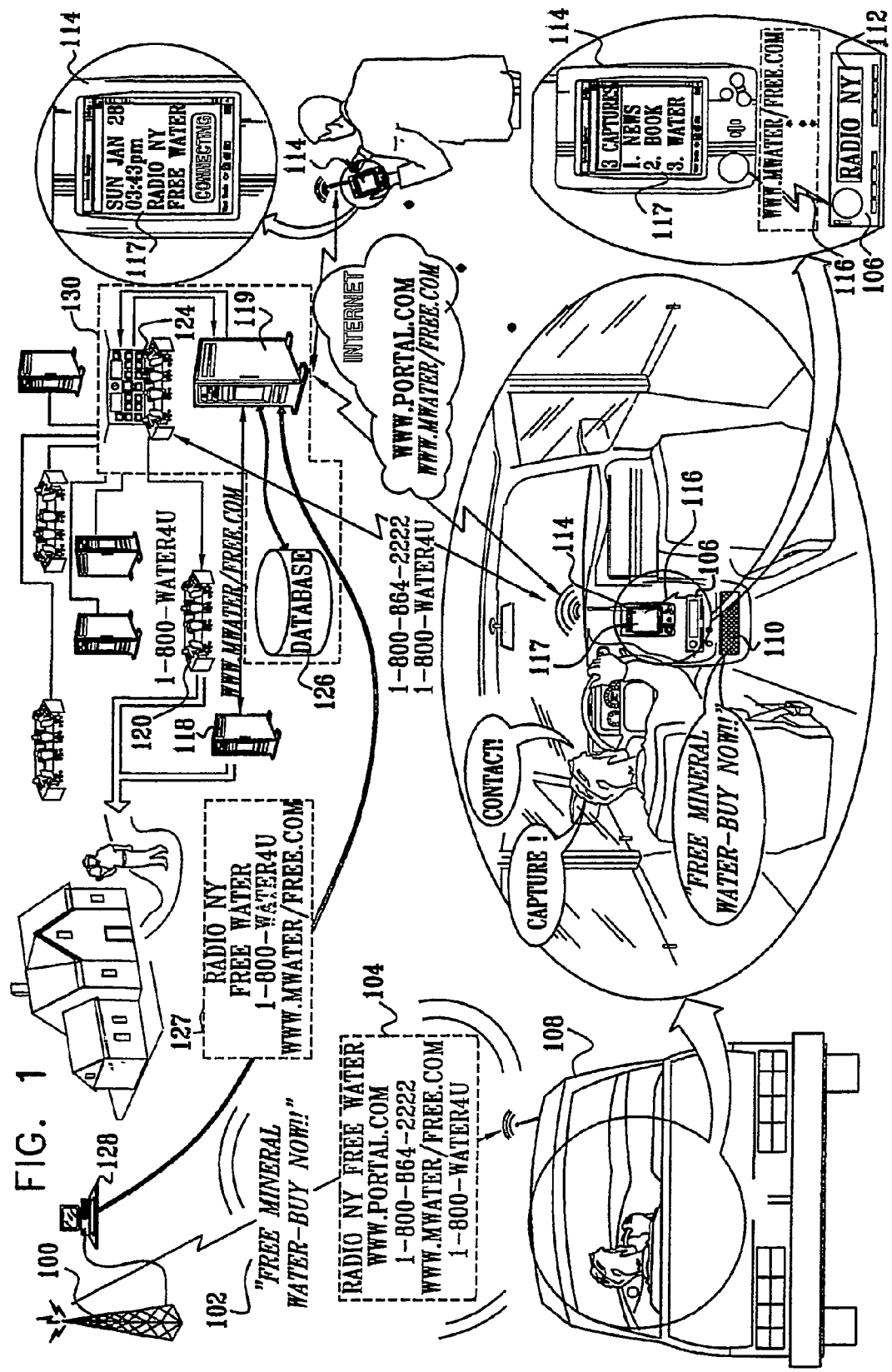
FIG. 1 is a simplified pictorial illustration of a system and methodology for communicating with a user in accordance with a preferred embodiment of the present invention.

Reference is now made to FIG. 1, which is a simplified pictorial illustration of a methodology and system for accessing information using both non-product specific information and product-specific information received wirelessly by a user in accordance with a preferred embodiment of the present invention. As seen in FIG. 1, there is provided a system and methodology wherein a message, here a commercial message, is broadcast, typically by a radio broadcast facility, such as an FM broadcast facility. Non product-specific information is to be understood as information which is not necessarily applicable to accessing a given product or service, while product-specific information is to be understood as information which is applicable to accessing a given product or service. It is appreciated that the product-specific information may have any suitable level of specificity, i.e. it can refer to a single product or service or to a class of products and services as appropriate. The term "non-sensible," as used in this disclosure, means not perceptible to the senses, such as by being inaudible or by not being visible.

In the illustrated embodiment of FIG. 1, the radio broadcast facility, represented by an antenna tower designated by reference numeral 100, is a FM broadcast facility having subcarrier broadcast functionality, such as via a RDS, RBDS or a DARC protocol. Alternatively or additionally the radio broadcast facility may be a digital radio broadcast facility. As illustrated in FIG. 1, the broadcast message includes an audible audio content portion, designated by reference numeral 102, which says "FREE MINERAL WATER—BUY NOW!!" and an inaudible non-audio content portion, designated by reference numeral 104, which contains at least the following information: "RADIO NY FREE WATER WWW.PORTAL.COM 1-800-864-2222 WWW.MWATER/ FREE. COM 1-800-WATER4U". The inaudible non-audio content portion 104 is preferably a subcarrier content portion when the radio broadcast facility is an FM broadcast facility having a subcarrier broadcast functionality.

In this embodiment it is seen that both non-product specific information, for example a telephone number such as "1-800-864-2222" or a web address such as "WWW.POR-TAL.COM" and product-specific information, for example "1-800-WATER4U" or the product-specific web address "WWW.MWATER/FREE. COM" are provided in the inaudible non-audio content portion 104.

The broadcast message may be received, for example, by a radio 106 in a vehicle 108. The audible audio content portion 102 may be heard by a user in the vehicle 108, via a speaker 110 while the inaudible non-audio content portion 104 is not heard.

A typical data set representing the contents of the inaudible non-audio content portion transmitted by broadcast facility 100 and received by radio 106 appears in FIG. 15A as described herein below with reference to FIG. 25.

It is noted that at least part of the inaudible non-audio content portion 104 is not only not heard but is also not visible to the user on a radio display, so as to prevent possible distraction of the user.

It is further noted that avoidance of display of at least part of the content portion 104 on a radio display is an important safety feature of the present invention and distinguishes the inaudible non-audio content portion 104 from conventional subcarrier messages, such as commercial RDS messages, which are conventionally displayed on radio displays.

Thus, it is seen that only the legend "RADIO NY" is displayed on the radio display, designated by reference numeral 112. This message typically continues to be displayed as long as the radio is tuned to Radio NY and thus is considered not to be distracting.

A typical data set representing the contents of the inaudible non-audio content portion transmitted by broadcast facility 100, indicating that portion displayed by display 112 of radio 106 appears in FIG. 15B as described herein below with reference to FIG. 25.

In response to hearing the audio content portion, "FREE MINERAL WATER—BUY NOW!!", the user may issue a command, typically orally, such as "CAPTURE". This command, in accordance with a preferred embodiment of the present invention, is received by either the radio 106 or by a mobile communicator 114, such as a mobile telephone or a suitable equipped personal digital assistant.

In response to receipt of the "CAPTURE" command, at least some, if not all of the information contained in the inaudible non-audio content portion 104 is supplied from radio 106 to the mobile communicator 114, as indicated symbolically at reference numeral 116. In FIG. 1, for example only the product-specific web address part of content portion 104 is shown as being supplied, it being understood that any other part of content portion 104 may be alternatively or additionally supplied. A mobile communicator display 117 can list subject titles of other such capture events captured in a similar manner as described herein. Thus, capture event #1 concerns a news item, capture event #2 concerns a book, and capture event #3 concerns water. Further information contained in the inaudible non-audio content portion 104 and pertaining to the captured event may be displayed on alternative menus on the mobile communicator display 117 as shown in FIG. 1

A typical data set representing the contents of the inaudible non-audio content portion 104 transmitted by broadcast facility 100, indicating those portions displayed by display 114 of mobile communicator 117 appears in FIG. 15C as described herein below with reference to FIG. 25.

In the illustrated embodiment of FIG. 1, the user may at any time thereafter actuate the mobile communicator 114 by issuing a command, typically orally, such as "CONTACT". In response to receipt of the "CONTACT" command the mobile communicator 114 can establish contact on the basis of part or all of the content contained in the inaudible non-audio content portion 104.

FIG. 1 shows an example, wherein a user actuates the mobile communicator 114, typically embodied as a web-enabled wireless personal digital assistant, by issuing a command, typically orally, such as "CONTACT" to access a destination web site identified by the product-specific web address "WWW.MWATER/FREE.COM" which forms part of the product-specific information of content portion 104 and is designated in FIG. 1 by the server 118.

In the illustrated embodiment, this product-specific access is achieved via a non product-specific portal, embodied in a non product-specific server 119, which is accessed via the Internet by use of a non product-specific web address, such as WWW.PORTAL.COM, which forms part of the non product-specific information of content portion 104. Alternatively, the non product-specific web address' need not be broadcast and can be stored in the mobile communicator 114, such as by means of a cookie.

A typical data set representing the contents of a communication sent by the mobile communicator 114 and received by a non product-specific server 119 appears in FIG. 15D as described herein below with reference to FIG. 25.

Once the user has accessed the product-specific web site identified by the product-specific web address WWW.MWATER/FREE.COM at the product-specific destination server 118, the user may obtain information or, as shown in FIG. 1 enter into any appropriate commercial transaction, such as one which results in water being delivered to the residence of the user, as described hereinbelow.

Alternatively, where the mobile communicator 114 has cellular telephone capabilities the user, upon issuing a command, typically orally, such as "CONTACT" to access a product-specific telephone center 120 identified by the product-specific telephone number 1-800-WATER4U which forms part of the product-specific information of contact portion 104. In the illustrated embodiment, this access is achieved via a non-product specific telephone center 124 by use of a non product-specific telephone number, such as "1-800-864-2222" which forms part of the non product-specific information of content portion 104. Alternatively the non product-specific telephone center number need not be broadcast and can be stored in the mobile communicator 114, by means such as a cookie or SMS.

A feature of the mobile communicator 114 may be an associated GPS locator (not shown). The geographical location coordinates from the GPS locator (not shown) may be transmitted from the mobile communicator 114 to the non product-specific server 119 and used in such a manner that thereby facilitates the appropriate commercial transaction. Such facilitation may include directing the user to the nearest product-specific facility, or enable the non product-specific server 119 to notify a product-specific facility of the whereabouts of a user.

In accordance with a preferred embodiment of the present invention, a database 126 may be provided which may receive all or part of a data set containing content portion 127 from the non product-specific server 1198 via a computer network communication, as from a computer 128, associated with the broadcast facility 100. This database 126 is preferably coupled to the non product-specific server 119 so as to collect and correlate user information, including cellular location information supplied by the cellular operators, and activities in connection with given content portions 104, in order to enable suitable payments to be made among the various parties to the activities illustrated in FIG. 1.

A typical data set representing the contents of the communication from the non product-specific server 119 indicating those portions stored in database 126 appears in FIG. 15E as described herein below with reference to FIG. 25.

It is appreciated that the non product-specific telephone center 124 or other user contact interface may be provided alternatively or in addition to server 119 and may thus be coupled to database 126. Typically the server 119, the telephone center 124 and the database 126 are provided by a non-product specific communication facility 130.

Figure 2:
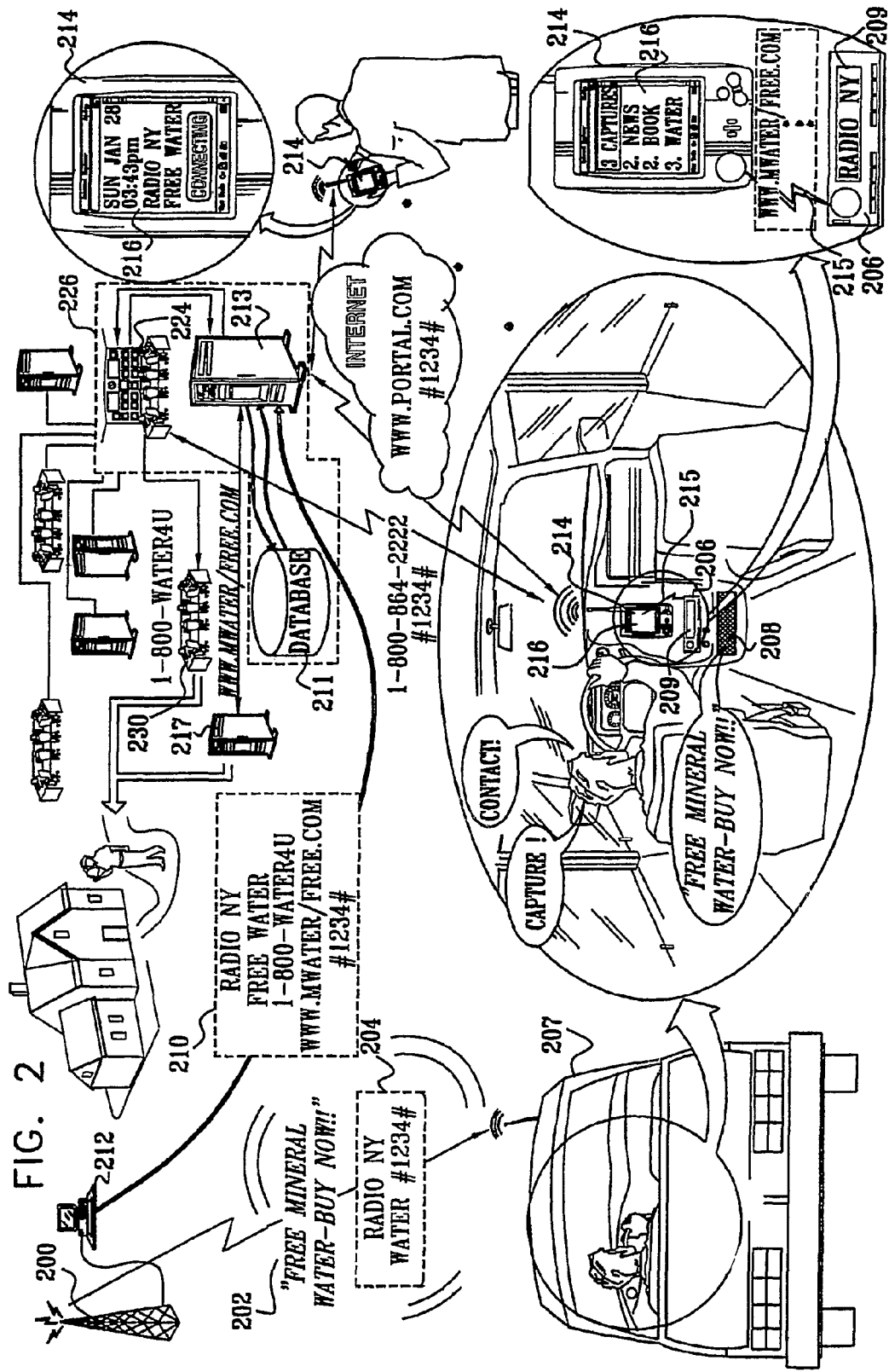
FIG. 2 is a simplified pictorial illustration of a system and methodology for communicating with a user in accordance with another preferred embodiment of the present invention.

Reference is now made to FIG. 2, which is a simplified pictorial illustration of a methodology and system for accessing information using both non-product specific information and product-specific information received wirelessly by a user in accordance with another preferred embodiment of the present invention. As seen in FIG. 2, there is provided a system and methodology wherein a message here a commercial message, is broadcast, typically by a radio broadcast facility, such as an FM broadcast facility. Non product-specific information is to be understood as information which is not necessarily applicable to accessing a given product or service, while product specific information is to be understood as information which is applicable to accessing a given product or service.

In the illustrated embodiment of FIG. 2, the radio broadcast facility, represented by an antenna tower designated by reference numeral 200, is a FM broadcast facility having subcarrier broadcast functionality, such as via a RDS, RBDS or a DARC protocol. Alternatively or additionally the radio broadcast facility may be a digital radio broadcast facility. {Fill in}. As illustrated in FIG. 2, the broadcast message includes an audible audio content portion, designated by reference numeral 202, which says "FREE MINERAL WATER—BUY NOW!!" and an inaudible non-audio content portion, designated by reference numeral 204, which contains at least the following information: "RADIO NY WATER #1234#". The inaudible non-audio content portion 204 is preferably a subcarrier content portion when the radio broadcast facility is an FM broadcast facility having a subcarrier broadcast functionality. In contrast to inaudible non-audio content portion 104 (FIG. 1), portion 204 does not contain non product-specific information, such as telephone numbers or web addresses but rather contains a product-specific code which may be read by one or more downstream devices, as will be described hereinbelow, to provide the required contact addresses or functional equivalents the thereof.

As in the embodiment of FIG. 1, the broadcast message may be received, for example, by a radio 206 in a vehicle 207. The audible audio content portion 202 may be heard by a user in the vehicle 207, via a speaker 208 while the inaudible non-audio content portion 204 is not heard.

A typical data set representing the contents of the inaudible non-audio content portion transmitted by broadcast facility 200 and received by radio 206 appears in FIG. 16A as described herein below with reference to FIG. 25.

As in the embodiment of FIG. 1, it is noted that at least part of the inaudible non-audio content portion 204 is not only not heard but is also not visible to the user on a radio display, so as to prevent possible distraction of the user.

It is further noted that avoidance of display of at least part of the content portion 204 on a radio display is an important safety feature of the present invention and distinguishes the inaudible non-audio content portion 204 from conventional subcarrier messages, such as commercial RDS messages, which are conventionally displayed in their on radio displays.

Thus, it is seen that only the legend "RADIO NY" is displayed on the radio display, designated by reference numeral 209. This message typically continues to be displayed as long as the radio is tuned to Radio NY and thus is considered not to be distracting.

A typical data set representing the contents of the inaudible non-audio content portion transmitted by broadcast facility 200, indicating that portion displayed by display 209 of radio 206 appears in FIG. 16B as described herein below with reference to FIG. 25.

Concurrent, or any time previous, with the broadcasting of the broadcast message, full product-specific information 210 and, but not necessarily, other information pertaining to the broadcast message corresponding to the code contained in portion 204 can be transmitted via a computer network communication, as from a computer 212, associated with the broadcast facility 200 to a database 211 via a portal server 213.

In response to hearing the audio content portion, "FREE MINERAL WATER—BUY NOW!!", the user may issue a command, typically orally, such as "CAPTURE". This command, in accordance with a preferred embodiment of the present invention, is received by either the radio 206 or by a mobile communicator 214, such as a mobile telephone or a suitable equipped personal digital assistant. In response to receipt of the "CAPTURE" command, the code contained in the inaudible non-audio content portion 204 is supplied from radio 206 to the mobile communicator 214, as indicated symbolically at reference numeral 215.

A mobile communicator display 216 can list subject titles of other such capture events captured in a similar manner as described herein. Thus capture event #1 concerns a news item, capture event #2 concerns a book, and capture event #3 concerns water. Further information contained in the inaudible non-audio content portion 204 and pertaining to the captured event may be displayed on alternative menus on the mobile communicator display 216 as shown in FIG. 2

A typical data set representing the contents of the inaudible non-audio content portion transmitted by broadcast facility 200, indicating those portions displayed by display 216 of mobile communicator 214 appears in FIG. 16C as described herein below with reference to FIG. 25.

In the illustrated embodiment, FIG. 2, the user may at any time thereafter actuate the mobile communicator 214 by issuing a command, typically orally, such as "CONTACT". In response to receipt of the "CONTACT" command the mobile communicator 214 can establish contact on the basis of the code contained in the inaudible non-audio content portion 204. FIG. 2 shows an example wherein a user actuates the mobile communicator 214, typically embodied as a web-enabled wireless personal digital assistant, by issuing a command, typically orally, such as "CONTACT" to access a destination web site identified by the product-specific web address WWW.MWATER/FREE.COM, which forms part of the product-specific information 210, and is designated in FIG. 2 by the server 213. In the illustrated embodiment, this access is achieved via a portal, embodied in the portal server 213, which is accessed via the Internet by use of a non specific-product non product-specific web address, such as "WWW.PORTAL.COM".

FIG. 2 shows an example wherein a user actuates the mobile communicator 214, typically embodied as a web-enabled wireless personal digital assistant, to access a portal, embodied in the portal server 213, via the Internet by use of non product-specific information, namely a non product-specific web address, such as "WWW.PORTAL.COM". The non product-specific web address need not be broadcast and is typically stored in the mobile communicator 214, such as by means of a coolie. Alternatively, the non product-specific web address may be broadcast as part of inaudible non-audible content portion 204 or otherwise.

Once the user has accessed the portal server 213, the portal server 213 transmits the product-specific information code embodied in inaudible non-audible portion 204 to the database 211, which decodes the code and provides to portal server 213 the product-specific information 210 and any further details of the broadcast communication as received from the broadcast facility 200 via the computer 212. All or part of this information can be received by the mobile communicator 214 and displayed on alternative menus on the mobile communicator display 216 as shown in FIG. 2. Upon request by the user the server 213, identified by non-product specific address www.portal.com, may access the product-specific web-address, such as "WWW.MWATER/FREE.COM", of a web-site identified by the code. The server 213 accesses the web site so identified by employing the web-address. Alternatively the mobile communicator may access the product-specific web-address, such as WWW.MWATER/FREE.COM, directly.

Once the user has accessed the web site identified by the product-specific web address "WWW.MWATER/FREE.COM", the user may obtain information pertaining to the captured event or, as further shown in FIG. 2 enter into any appropriate commercial transaction; such as one which results in water being delivered to the residence of the user.

A feature of the mobile communicator 214 may be an associated GPS locator (not shown). The geographical location coordinates from the GPS locator (not shown) may be transmitted from the mobile communicator 214 to the non product-specific server 213 and used in such a manner that thereby enhances the appropriate commercial transaction. Such enhancement may include directing the user to the nearest product-specific facility, or enable the non product-specific server 213 to notify a product-specific facility of the whereabouts of a user.

Alternatively, where the mobile communicator 214 has cellular telephone capabilities the user, upon issuing a command, typically orally, such as "CONTACT" to access a product-specific telephone destination center 230 identified by the product-specific telephone number 1-800-WATER4U which forms part of the product-specific information 210. In the illustrated embodiment, this access is achieved via the non product-specific telephone center 224 by use of a non product-specific telephone number, such as "1-800-864-2222". The non product-specific telephone center number need not be broadcast and can be stored in the mobile communicator 214, by means such as a cookie or SMS.

A typical data set representing the contents of a communication sent by the mobile communicator 214 and received by a non product-specific server 213 appears in FIG. 16D as described herein below with reference to FIG. 25.

In accordance with a preferred embodiment of the present invention, database 211 may receive full contact information corresponding to the code contained in portion 204 via a computer network communication, as from a computer 212, associated with the broadcast facility 200. As in the embodiment of FIG. 1, this database 212 is preferably coupled to the non product-specific portal server 213 so as to collect and correlate user information, including cellular location information supplied by the cellular operators, and activities in connection with given content portions 204, in order to enable suitable payments to be made among the various parties to the activities illustrated in FIG. 2.

A typical data set representing the contents of the communication from the non product-specific server 213, indicating those portions stored in database 211 appears in FIG. 16E as described herein below with reference to FIG. 25.

It is appreciated that the non product-specific telephone center 224 or other user contact interface may be provided alternatively or in addition to server 218 and may thus be coupled to database 220. Typically the portal server 218, the non product-specific telephone center 224 and the database 212 are provided by a non-product specific communication facility 226.

In the embodiment of FIG. 2, access to the telephone center 224 may be via a telephone number stored in mobile communicator 214 and communication of the code in content portion 204 provides information to an operator in the telephone center in order to enable the operator to deal with user requests.

Figure 3:
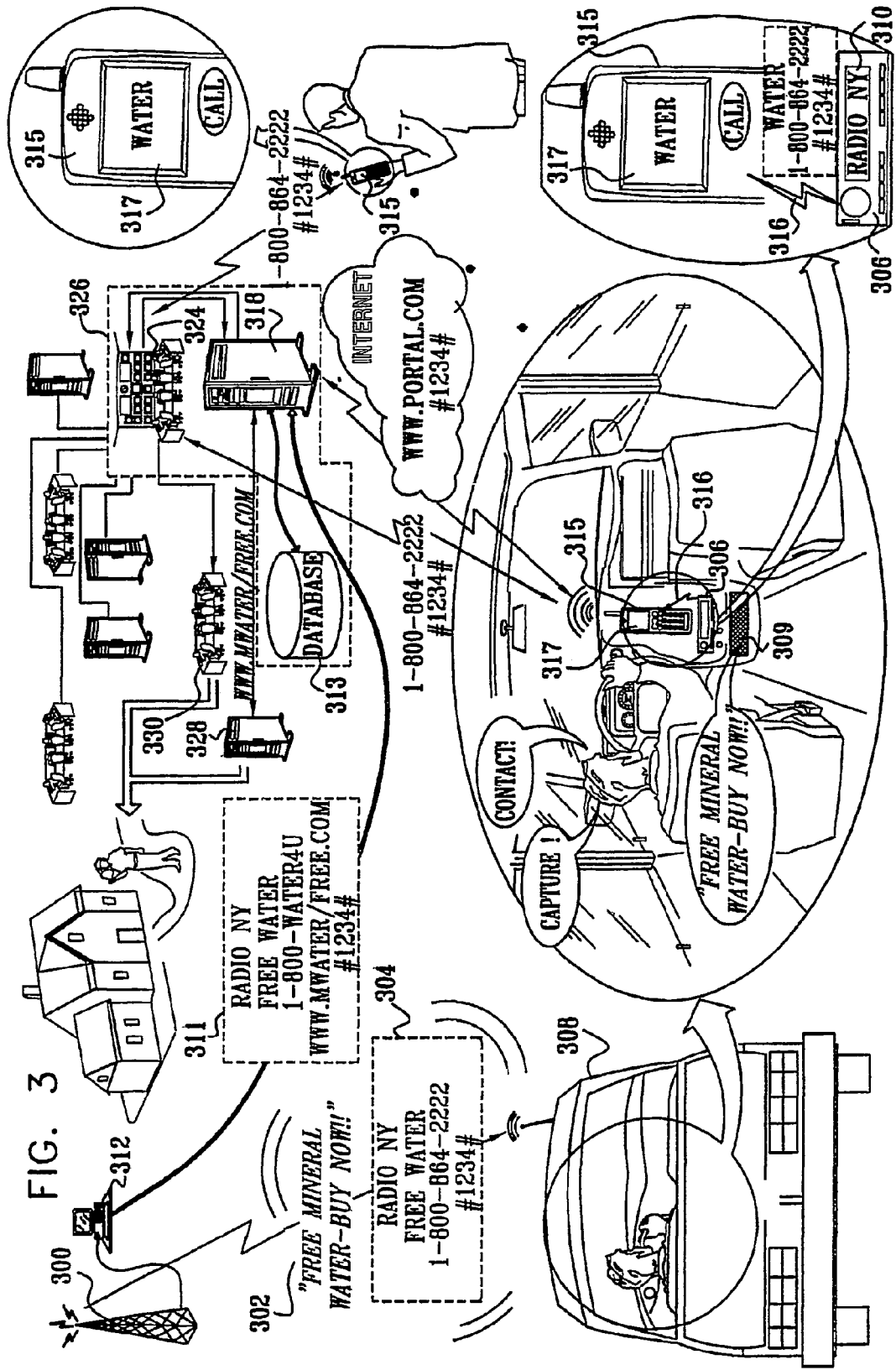
FIG. 3 is a simplified pictorial illustration of a system and methodology for communicating with a user in accordance with a yet another preferred embodiment of the present invention.

Reference is now made to FIG. 3, which is a simplified pictorial illustration of a methodology and system for accessing information using both non-product specific information and product-specific information received wirelessly by a user in accordance with yet another preferred embodiment of the present invention. As seen in embodiments illustrated in FIGS. 1&2, there is provided a system and methodology wherein a message, here a commercial message, is broadcast, typically by a radio broadcast facility, such as an FM broadcast facility. Non product-specific information is to be understood as information which is not necessarily applicable to accessing a given product or service, while product-specific information is to be understood as information which is applicable to accessing a given product or service.

In the illustrated embodiment of FIG. 3, the radio broadcast facility, represented by an antenna tower designated by reference numeral 300, is a FM broadcast facility having subcarrier broadcast functionality, such as via a RDS, RBDS or a DARC protocol. Alternatively or additionally the radio broadcast facility may be a digital radio broadcast facility. "BU99FM", Israel. As illustrated in FIG. 3, the broadcast message includes an audible audio content portion, designated by reference numeral 302, which says "FREE MINERAL WATER—BUY NOW!!" and an inaudible non-audio content portion, designated by reference numeral 304, which contains at least the following information: "RADIO NY FREE WATER 1-800-864-2222 #1234#". The inaudible non-audio content portion 304 is preferably a subcarrier content portion when the radio broadcast facility is an FM broadcast facility having a subcarrier broadcast functionality. In contrast to inaudible non-audio content portion 204 (FIG. 2), portion 304 does contain non product-specific information, such as a telephone numbers, and, in contrast to inaudible non-audible content portion 104 (FIG. 1), portion 304 does not contain explicit product-specific address but rather contains a product-specific code which may be read by one or more downstream devices, as will be described hereinbelow, to provide the required product-specific contact addresses or functional equivalents thereof.

As in the embodiments of FIGS. 1 and 2, broadcast message may be received, for example, by a radio 306 in a vehicle 308. The audible audio content portion 302 may be heard by a user in the vehicle 308, via a speaker 309 while the inaudible non-audio content portion 304 is not heard.

A typical data set representing the contents of the inaudible non-audio content portion transmitted by broadcast facility 300 and received by radio 306 appears in FIG. 17A as described herein below with reference to FIG. 25.

As in the embodiments of FIGS. 1 and 2, it is noted that at least part of the inaudible non-audio content portion 304 is not only not heard but is also not visible to the user on a radio display, so as to prevent possible distraction of the user.

It is further noted that avoidance of display of at least part of the content portion 304 on a radio display 312 is an important safety feature of the present invention and distinguishes the inaudible non-audio content portion 304 from conventional subcarrier messages, such as commercial RDS messages, which are conventionally displayed in their on radio displays.

Thus, it is seen that only the legend "RADIO NY" is displayed on the radio display, designated by reference numeral 312. This message typically continues to be displayed as long as the radio is tuned to Radio NY and thus is considered not to be distracting.

A typical data set representing the contents of the inaudible non-audio content portion transmitted by broadcast facility 300, indicating that portion displayed by display 310 of radio 366 appears in FIG. 17B as described herein below with reference to FIG. 25.

Concurrent, or any time previous, with the broadcasting of the broadcast message, full product-specific information 311 and, but not necessarily, other information pertaining to the broadcast message corresponding to the product-specific code contained in portion 304 can be transmitted via a computer network communication, as from a computer 312, associated with the broadcast facility 300 to a database 313 via a server 318.

In response to hearing the audio content portion, "FREE MINERAL WATER—BUY NOW!!", the user may issue a command, typically orally, such as "CAPTURE". This command, in accordance with a preferred embodiment of the present invention, is received by either the radio 306 or by a mobile communicator 315, here preferably a mobile telephone. In response to receipt of the "CAPTURE" command, the non product-specific telephone number and the product-specific code contained in the inaudible non-audio content portion 304 is supplied from radio 306 to the mobile communicator 315, as indicated symbolically at reference numeral 316.

A mobile communicator display 317 can list information pertaining to such capture events captured in a manner as described herein. Thus, the capture event "WATER" or any other information relating to the audio content portion 302 may be displayed on the mobile communicator display 317 as shown in FIG. 3.

A typical data set representing the contents of the inaudible non-audio content portion as transmitted by broadcast facility 300, indicating those portions displayed by display 317 of mobile communicator 315 appears in FIG. 17C as described herein below with reference to FIG. 25.

In the illustrated embodiment, FIG. 3, the user may at any time thereafter actuate the mobile communicator 315 by issuing a command, typically orally, such as "CONTACT". In response to receipt of the "CONTACT" command the mobile communicator 315 can establish contact on the basis of part or all of the content contained in the inaudible non-audio content portion 304. FIG. 3 shows an example wherein a user actuates the mobile communicator 315, typically embodied as a mobile telephone, by issuing a command, typically orally, such as "CONTACT" to contact a product-specific telephone destination by dialing the non product-specific telephone number contained in portion 304, such as 1-800-864-2222, and shown on the mobile telephone display 317, and followed by the product-specific code, such as #1234#, and which is not typically shown on the mobile telephone display 317. The non product-specific telephone center 324 may access a non product-specific portal, embodied in the server 318, via the Internet by use of a non product-specific web address, such as "WWW.PORTAL.COM".

A typical data set representing the contents of a communication sent by the mobile communicator 315 and received by a non product-specific server 314 appears in FIG. 17D as described herein below with reference to FIG. 25.

Once the non product-specific telephone center 326 has accessed the non product-specific server 318, the non product-specific server 318 transmits the product-specific code embodied in portion 304 to the database 313, which decodes the product-specific code and provides the non product-specific telephone center 324 a product-specific forwarding telephone number, such as 1-800-WATER4U. It is appreciated that the product-specific forwarding telephone number may access a vocal portal providing access to the Internet for telephone users.

Once the user has accessed the product-specific telephone number identified by 1-800-WATER4U, the user may obtain information or, as shown in FIG. 3, enter into any appropriate commercial transaction, such as one which results in water being delivered to the residence of the user.

As in the embodiment of FIGS. 1 and 2, the database 313 is preferably coupled to the non product-specific server 318 so as to collect and correlate user information, including database 313 is also operative to collect and correlate user information, including cellular location information supplied by the cellular operators, and activities in connection with given content portions 304, in order to enable suitable payments to be made among the various parties to the activities illustrated in FIG. 3.

A typical data set representing the contents of the communication from the non product-specific server 314, indicating those portions stored in database 313 appears in FIG. 17E as described herein below with reference to FIG. 25.

It is appreciated that the non product-specific telephone center 324 or other user contact interface may be provided alternatively or in addition to server 318 and may thus be coupled to database 313. Typically the non product-specific server 318, the non product-specific telephone center 324 and the database 313 are provided by a non-product specific communication facility 326.

Figure 4:
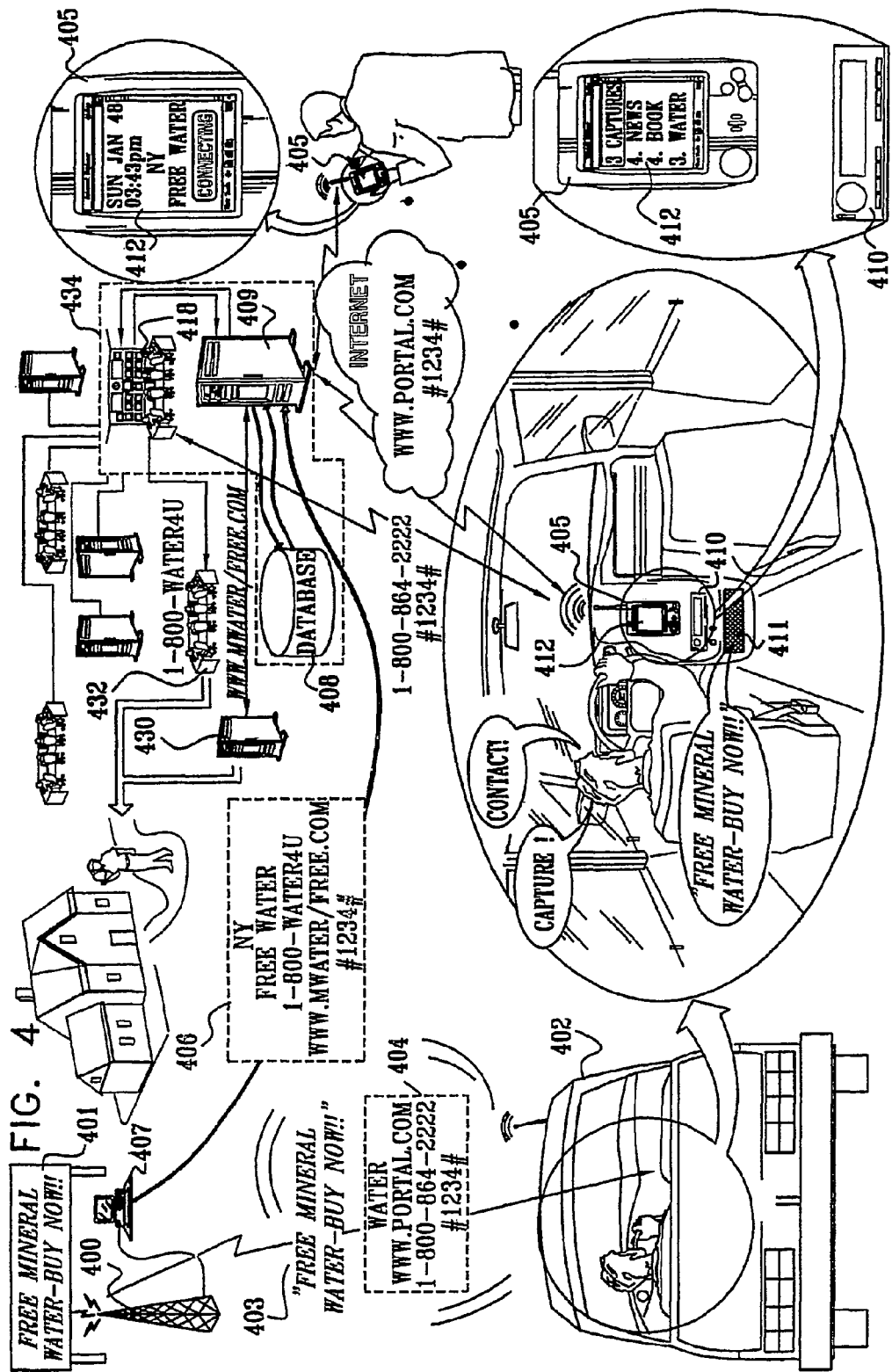
FIG. 4 is a simplified pictorial illustration of a system and methodology for communicating with a user in accordance with a still another preferred embodiment of the present invention.

Reference is now made to FIG. 4, which is a simplified pictorial illustration of a methodology and system for accessing information using both non-product specific information and product-specific information received wirelessly by a user in accordance with still another preferred embodiment of the present invention. As seen in FIG. 4, there is provided a system and methodology wherein a message, here a commercial message, is broadcast, typically by a relatively short range digital broadcast facility, such as a Bluetooth broadcast facility. Non product-specific information is to be understood as information which is not necessarily applicable to accessing a given product or service, while product specific information is to be understood as information which is applicable to accessing a given product or service.

In the illustrated embodiment of FIG. 4, the short range digital radio broadcast facility, represented by an antenna 400 associated with a billboard 401, is a Bluetooth broadcast facility broadcasting to a vehicle 402 containing at least one Bluetooth-enabled communicator. For the purposes of this invention a "billboard" is any public visual advertising platform such as electronic or printed fixed position banners, or electronic or printed vehicle-mounted banners.

As illustrated in FIG. 4 the broadcast message, includes an audible audio content portion, designated by reference numeral 403, which says "FREE MINERAL WATER—BUY NOW!!" and an inaudible non-audio content portion, designated by reference numeral 404, which contains non product-specific information such as: "WATER WWW.PORTAL. COM 1-800-864-222" and coded product-specific information, such as #1234#". As in the inaudible non-audio content portion 104 (FIG. 1) portion 404 contains both product-specific information and non product-specific information however in contrast to inaudible non-audio content portion 104 (FIG. 1), portion 404 does not contain product-specific contact addresses, such as telephone numbers or web addresses, but rather contains a product-specific code which may be read by one or more downstream devices, as will be described hereinbelow, to provide the required product-specific contact addresses or functional equivalents thereof. It is appreciated that the product-specific information may have any suitable level of specificity, i.e. it can refer to a single product or service or to a class of products and services as appropriate.

Figures 18A, 18B, 18C, 18D, 18E:
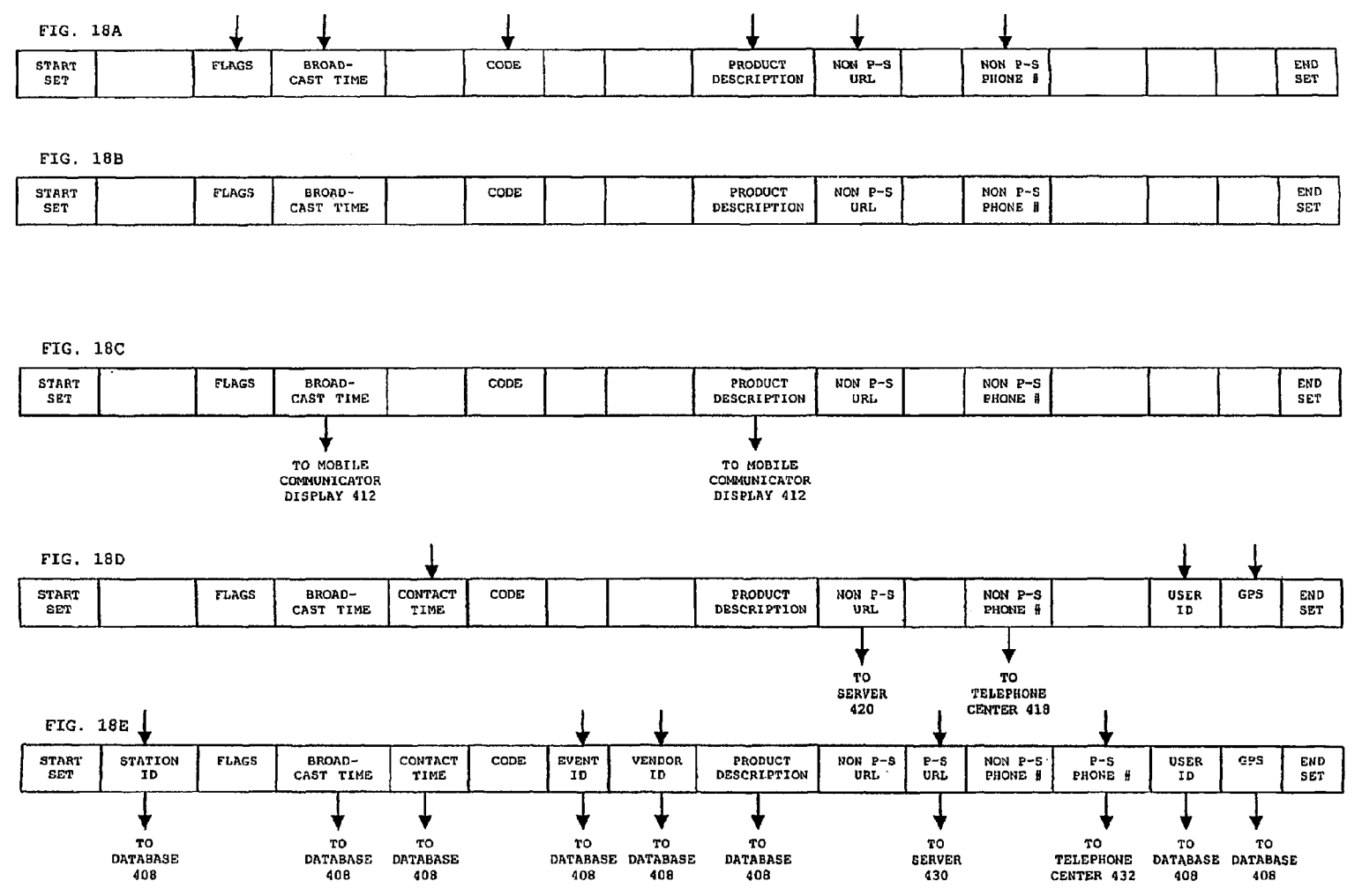

A typical data set representing the contents of the inaudible non-audio content portion transmitted by broadcast facility 400 appears in FIG. 18A as described herein below with reference to FIG. 25.

As distinct from the embodiments of FIGS. 1-3, the digital broadcast message may be received by a Bluetooth receiver forming part of any suitable device, such as, for example, a suitable configured radio 410 in a vehicle 402 or a suitably configured mobile communicator 405.

A typical data set representing the contents of the in audible non-audio content portion transmitted by broadcast facility 400 and received by mobile communicator 405 appears in FIG. 18B as described herein below with reference to FIG. 25.

Concurrent, or any time previous, with the broadcasting of the digital broadcast message, full contact information 406 and, but not necessarily, other information pertaining to the broadcast message, such as a location identify for the digital transmitter facility 400, corresponding to the product-specific code contained in portion 404 can be transmitted via a computer network communication, as from a computer 407, associated with the broadcast facility 400 to a database 408 via a server 409.

In response to seeing the billboard 401 bearing the legend, "FREE MINERAL WATER—BUY NOW!!", or hearing the digitized audio portion 403 via the speaker (not shown) of the mobile communicator 405 or the car radio speaker 411 of car radio 410, by means of a short range communication protocol, such as Bluetooth, the user may issue a command, typically orally, such as "CAPTURE". This command, in accordance with a preferred embodiment of the present invention, is received by the mobile communicator 405, such as a suitably equipped mobile telephone or a suitable equipped personal digital assistant. In response to receipt of the "CAPTURE" command, the product-specific code contained in the inaudible non-audio content portion 404 is supplied to a memory storage medium within the mobile communicator 405. The mobile communicator display 412 can list subject titles, obtained from the inaudible non-audio content portion 404, of other such capture events captured in similar manner as described herein. Thus, capture event #1 concerns a news item, capture event #2 concerns a book, and capture event #3 concerns water.

A typical data set representing the contents of the inaudible non-audio content portion transmitted by broadcast facility 400, indicating those portions displayed by display 412 of mobile communicator 405 appears in FIG. 18C as described herein below with reference to FIG. 25.

In the illustrated embodiment, the user may at any time thereafter actuate the mobile communicator 405 to establish contact on the basis of the code contained in the inaudible non-audio content portion 404.

In the illustrated embodiment, FIG. 4, the user may at any time thereafter actuate the mobile communicator 405 by issuing a command, typically orally, such as "CONTACT". In response to receipt of the "CONTACT" command the mobile communicator 405 can establish contact on the basis of part or all of the content contained in the inaudible non-audio content portion 404. FIG. 4 shows an example wherein a user actuates the mobile communicator 405, typically embodied as a Bluetooth, web-enabled wireless personal digital assistant, by issuing a command, typically orally, such as "CONTACT" to access a product-specific web site identified by the web address WWW.MWATER/FREE.COM.

FIG. 4 shows an example wherein a user actuates the mobile communicator 405, typically embodied as a Bluetooth, web-enabled wireless personal digital assistant, to access a non product-specific, embodied in the server 409, via the Internet by use of a non product-specific web address, such as "WWW.PORTAL.COM". The non product-specific web address may be broadcast as part of content portion 404. Alternatively, the non-product-specific web address need not be broadcast and can be stored in the mobile communicator 405, such as by means of a cookie.

A typical data set representing the contents of a communication sent by the mobile communicator 405 and received by the non product-specific server 409 appears in FIG. 18D as described herein below with reference to FIG. 25.

Once the user has accessed the non product-specific portal server 409, the non product-specific portal server 409 transmits the product-specific code embodied in portion 406 to a database 408, which decodes the product specific code and provides to non product-specific portal server 409 the full product-specific contact information and any further details of the broadcast communication, such as location of broadcast facility 400, as received from the broadcast facility 400 via the computer 407. All or part of this information can be received by the mobile communicator 405 and displayed on alternative menus on a mobile communicator display 412 as shown in FIG. 4.

Upon request by the user the server 409, identified by non product-specific address www.PORTAL.COM, may access the product-specific web-address, such as "WWW.MWATER/FREE.COM", of a product-specific server web-site 430 identified by the product-specific code. The server 409 accesses the web site so identified by employing the web-address. Alternatively the mobile communicator may access the product-specific web-address, such as WWW.MWATER/FREE.COM, directly.

Once the user has accessed the product-specific server web site identified 430 by the web address "WWW.MWATER/FREE.COM", the user may obtain in formation pertaining to the captured event or, as further shown in FIG. 4 enter into any appropriate commercial transaction, such as one which results in water being delivered to the residence of the user.

Alternatively, where the mobile communicator 405 has cellular telephone capabilities the user, upon issuing a command, typically orally, such as "CONTACT" to access a product-specific telephone destination center 432 identified by the product-specific telephone number 1-800-WATER4U which forms part of the product-specific information 406. In the illustrated embodiment, this access is achieved via the non product-specific telephone center 418 by use of a non product-specific telephone number, such as "1-800-864-2222". The non product-specific telephone center number need not be broadcast and can be stored in the mobile communicator 405, by means such as a cookie or SMS.

A feature of the mobile communicator 405 may be an associated GPS locator (not shown). The geographical location coordinates from the GPS locator (not shown) may be transmitted from the mobile communicator 405 to the non product-specific server 409 and used in such a manner that thereby enhances the appropriate commercial transaction. Such enhancement may include directing the user to the nearest product-specific facility, or enable the non product-specific server 409 to notify a product-specific facility of the whereabouts of a user.

As in the embodiment of FIG. 1, the database 408 is preferably coupled to the non product-specific portal server 409 so as to collect and correlate user information, including cellular location information supplied by the cellular operators, and activities in connection with given content portions 404, in order to enable suitable payments to be made among the various parties to the activities illustrated in FIG. 4.

A typical data set representing the contents of the communication from the non product-specific server 409, indicating those portions stored in database 408 appears in FIG. 18E as described herein below with reference to FIG. 25.

It is appreciated that a non product-specific telephone center 418 or other user contact interface may be provided alternatively or in addition to non product-specific portal server 409 and may thus be coupled to database 408. In the embodiment of FIG. 4, access to the non product-specific telephone center 418 may be via a non product-specific telephone number contained in the content portions 404 and communication of the product-specific code in content portion 404 provides information to an operator in the product-specific telephone center 432 having product-specific web address in order to enable the operator to deal with user requests.

It is appreciated that the non product-specific telephone center 418 or other user contact interface may be provided alternatively or in addition to server 409 and may thus be coupled to database 408. Typically the portal server 409, the non product-specific telephone center 418 and the database 408 are provided by a non-product specific communication facility 434.

Figure 5:
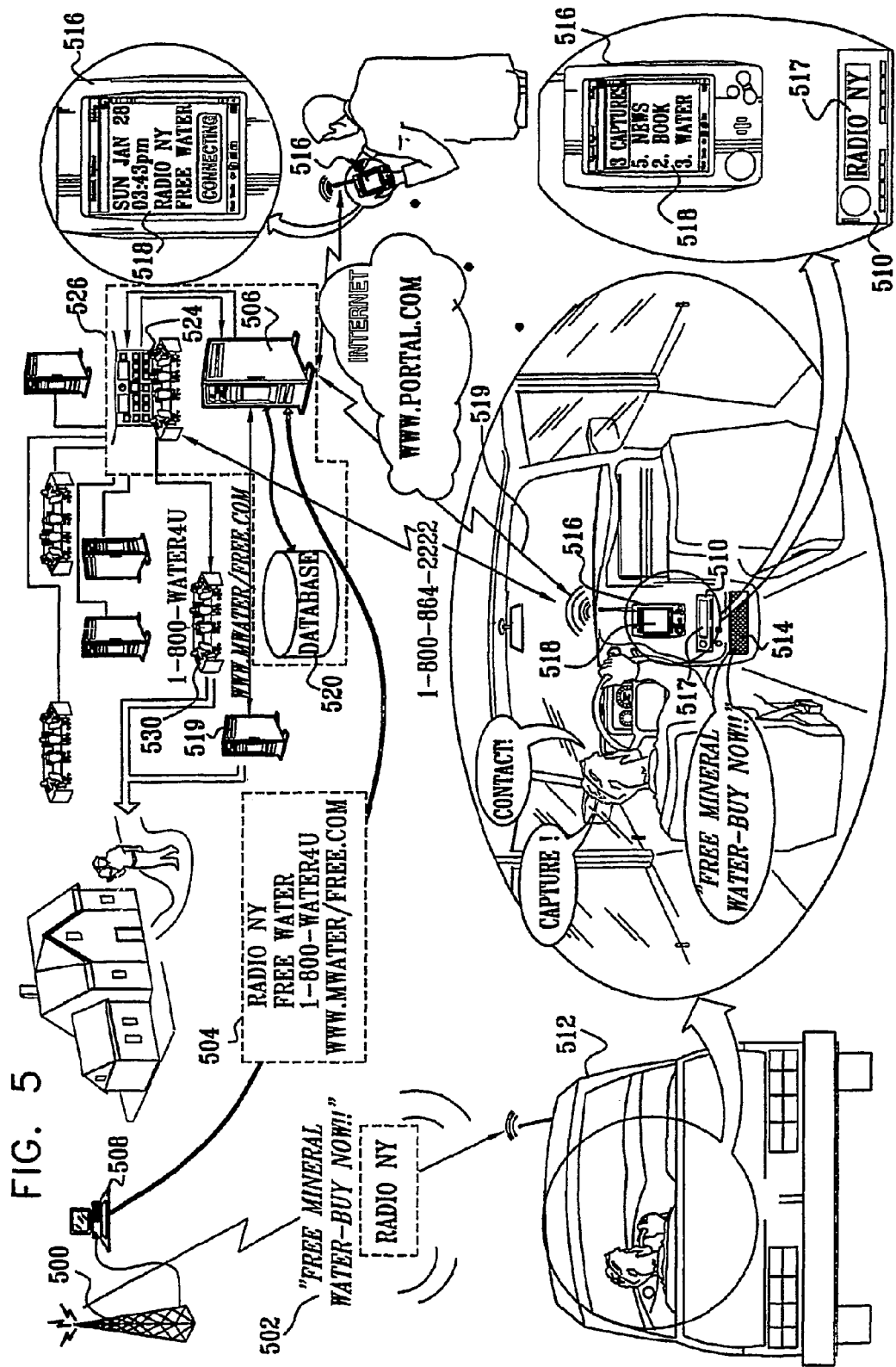
FIG. 5 is a simplified pictorial illustration of a system and methodology for communicating with a user in accordance with a further preferred embodiment of the present invention.

Reference is now made to FIG. 5, which is a simplified pictorial illustration of methodology and system for accessing information using contact information received wirelessly by a user in accordance with a further preferred embodiment of the present invention. As seen in FIG. 5, there is provided a system and methodology wherein a message, here a commercial message, is broadcast, typically by a radio broadcast facility, of such type as including analogue or digital broadcast facilities.

In the illustrated embodiment of FIG. 5, the radio broadcast facility, represented by an antenna tower designated by reference numeral 500, is a broadcast facility of type including analogue or digital broadcasting. As illustrated the broadcast message, includes an audible audio content portion, designated by reference numeral 502, which says "FREE MINERAL WATER—BUY NOW!!" and an inaudible non-audio portion containing station identification information, in this case "RADIO NY", that is typically transmitted as subcarrier content. An inaudible non-audio data content portion, designated by reference numeral 504, which contains at least the following product-specific information: "FREE WATER 1-800-WATER4U WWW.MWATER/FREE.COM" is concurrently provided to a server 506 via a computer network communication, as from a computer 508, associated with the broadcast facility 500.

The broadcast message 502 may be received, for example, by a radio 510 in a vehicle 512. The audible audio content portion 502 may be heard by a user in the vehicle 512, via a speaker 514.

A typical data set representing the contents of the inaudible non-audio content portion transmitted by broadcast facility 500 and received by radio 510 appears in FIG. 19A as described herein below with reference to FIG. 25.

As distinct from the embodiments of FIGS. 1-4, no inaudible non-audio product-specific or non product-specific content portion such as 104 in FIG. 1 is broadcast by the broadcast facility 500 as part of the broadcast message. Furthermore, no communication of product-specific or non product-specific content portion necessarily occurs between the radio 510 and the mobile communicator 516.

The mobile communicator 516, present in the vehicle 512, and with capabilities to be on-line-all-the-time such as gprs-enabled communicator, such as Ericsson Mobile Phones R520 for GSM 900/1800 and GSM 1900, and third generation mobile communicators, is accessed to the server 506 via the Internet by a non product-specific web address, such as "www.portal.com". The non product-specific server web address is typically stored in the mobile communicator 516 such as by means of a cookie.

Alternatively, where the mobile communicator 516, in this embodiment being a GPRS or 3G device, has digital radio reception capabilities, the audible audio content portion 502 will be received by the mobile communicator 516 and can be heard by the user via a speaker (not shown) in the mobile communicator 516, or alternatively by the speaker 514 where the communication between the mobile communicator 516 and the speaker 514 is by means of short range communication, such as Bluetooth.

The mobile communicator 516 is synchronized to the identical station frequency as that of the car radio 510, for example as shown "Radio NY", by inputting relevant data into the mobile communicator 516 by automatic means or by manual means. Synchronization of radio station frequencies may be indicated on the radio display 517 and the mobile communicator display 518. Thus, concurrent with the audible audio content portion 502 being heard by a user via the speaker 514, a part of the inaudible non-audio data content portion 504 is received by means of a streaming data channel 519 to the mobile communicator 516 from the server 506.

As in the previous embodiments FIGS. 1, 2, 3, 4, it is noted that at least part of the inaudible non-audio content portion 504 is not only not heard but is also not visible to the user on a radio display, so as to prevent possible distraction of the user.

It is further noted that avoidance of display of at least part of the content portion 504 on a display is an important safety feature of the present invention and distinguishes the inaudible non-audio content portion 504 from conventional sub-carrier messages, such as commercial RDS messages, which are conventionally displayed in their on radio displays.

Thus, it is seen that only the legend "RADIO NY" is displayed on the radio display 517. This message typically continues to be displayed as long as the radio is tuned to Radio NY and thus is considered not to be distracting.

A typical data set representing the contents of the inaudible non-audio content portion transmitted by broadcast facility 500, indicating that portion displayed by display 517 of radio 510 appears in FIG. 19B as described herein below with reference to FIG. 25.

In response to hearing the audio content portion, "FREE MINERAL WATER—BUY NOW!!", the user may issue a command, typically orally, such as "CAPTURE". This command, in accordance with a preferred embodiment of the present invention, is received by the mobile communicator 516, such as a gprs-enabled mobile telephone or any other suitably equipped 3G personal digital assistant. In response to receipt of the "CAPTURE" command, at least some, if not all of the information contained in the inaudible non-audio data content portion 504 is transferred from streaming-data mode, represented by the communication arrow 519, between the database 520, the server 506 and the mobile communicator 516 to a storage medium within the mobile communicator 516. Part of the stored inaudible non-audio data content portion is shown on the mobile communicator display 518. For example, the mobile communicator display 518 can list subject titles of other such capture events captured in a similar manner as described herein. Thus, capture event #1 concerns a news item, capture event #2 concerns a book, and capture event #3 concerns water. Further information contained in the inaudible non-audio content portion 504 and pertaining to the captured event may be displayed on alternative menus on the mobile communicator display 518 as shown in FIG. 5.

A typical data set representing the contents of the inaudible non-audio content portion transmitted by broadcast facility 500, indicating those portions displayed by display 518 of mobile communicator 516 appears in FIG. 19C as described herein below with reference to FIG. 25.

In the illustrated embodiment, the user may at any time thereafter actuate the mobile communicator 516 to establish contact on the basis of part or all of the content contained in the inaudible non-audio data content portion 504. FIG. 5 shows an example wherein a user actuates the mobile communicator 516, typically embodied as a gprs mobile communicator or 3G web-enabled wireless personal digital assistant, by issuing a command, typically orally, such as "CONTACT" to access a product-specific web site identified by the product-specific web address WWW.MWATER/FREE.COM, resident on the product-specific server 519 which formed part of the content portion 504. In the illustrated embodiment, this access is achieved via the non product-specific portal, embodied in the non product-specific server 506, which is accessed via the Internet by use of a non product-specific web address, such as WWW.PORTAL.COM, The non product-specific web address is typically stored in the mobile communicator 516, such as by means of a cookie.

A typical data set representing the contents of a communication sent by the mobile communicator 516 and received by a non product-specific server 506 appears in FIG. 19D as described herein below with reference to FIG. 25.

Once the user has accessed the product-specific web site 519 identified by the web address "WWW.MWATER/FREE.COM", the user may obtain information or, as shown in FIG. 5 enter into any appropriate commercial transaction, such as one which results in water being delivered to the residence of the user.

Alternatively, where the mobile communicator 516 has cellular telephone capabilities the user, upon issuing a command, typically orally, such as "CONTACT" to access a product-specific telephone destination center 530 identified by the product-specific telephone number "1-800-WATER4U" which forms part of the product-specific information 504. In the illustrated embodiment, this access is achieved via the non product-specific telephone center 524 by use of a non product-specific telephone number, such as "1-800-864-2222". The non product-specific telephone center number need not be broadcast and can be stored in the mobile communicator 514, by means such as a cookie or SMS.

A feature of the mobile communicator 516 may be an associated GPS locator (not shown). The geographical location coordinates from the GPS locator (not shown) may be transmitted from the mobile communicator 516 to the non product-specific server 506 and used in such a manner that thereby enhances the appropriate commercial transaction. Such enhancement may include directing the user to the nearest product-specific facility, or enable the non product-specific server 506 to notify a product-specific facility of the whereabouts of a user.

In accordance with a preferred embodiment of the present invention, database 520 may be preferably coupled to the non product-specific portal server 506 as to collect and correlate user information and activities in connection with given content portions 504, in order to enable suitable payments to be made among the various parties to the activities illustrated in FIG. 5.

A typical data set representing the contents of the communication from the non product-specific server 506, indicating those portions stored in database 520 appears in FIG. 19E as described herein below with reference to FIG. 25.

It is appreciated that a non product-specific telephone center 524 or other user contact interface may be provided alternatively or in addition to non-product-specific server 506 and may thus be coupled to database 520.

It is further appreciated that the non product-specific telephone center 524 or other user contact interface may be provided alternatively or in addition to server 506 and may thus be coupled to database 520. Typically the portal server 506, the non product-specific telephone center 524 and the database 520 are provided by a non-product specific communication facility 526.

Figure 6:
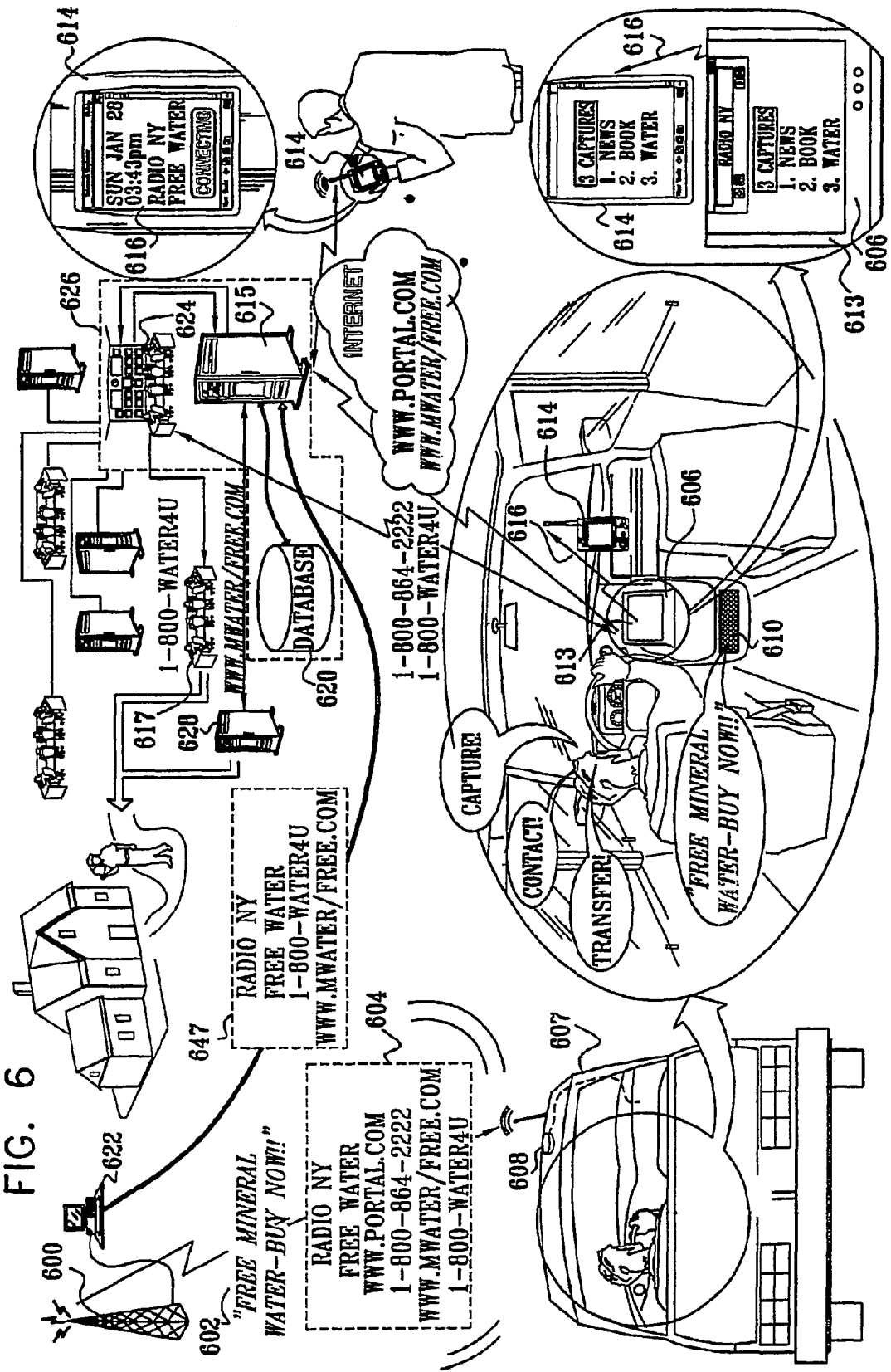
FIG. 6 is a simplified pictorial illustration of a system and methodology for communicating with a user in accordance with a further preferred embodiment of the present invention.

Reference is now made to FIG. 6, which is a simplified pictorial illustration of a methodology and system for accessing information using both non-product specific information and product-specific information received wirelessly by a user in accordance with a further preferred embodiment of the present invention. As seen in FIG. 6, there is provided a system and methodology wherein a message, here a commercial message, is broadcast, typically by a radio broadcast facility, such as a digital broadcast facility or Internet based web radio. Non product-specific information is to be understood as information which is not necessarily applicable to accessing a given product or service, while product-specific information is to be understood as information which is applicable to (accessing a given product or service.

In the illustrated embodiment of FIG. 6, the radio broadcast facility, represented by an antenna tower designated by reference numeral 600, is a digital broadcast facility with both audio and data broadcast capabilities. Alternatively or additionally the radio broadcast facility may be an Internet web radio broadcast facility. As illustrated in FIG. 6, the broadcast message includes a digital audible audio content portion, designated by reference numeral 602, which says "FREE MINERAL WATER—BUY NOW!!" and a digital inaudible non-audio content portion, designated by reference numeral 604, which contains at least the following information: "RADIO NY FREE WATER WWW.PORTAL.COM 1-800-864-2222 WWW.MWATER/FREE.COM 1-800-WATER4U".

In this embodiment it is seen that both non-product specific information, for example a telephone number such as "1-800-864-2222" or a web address such as "WWW.PORTAL.COM" and product-specific information, for example "1-800-WATER4U" or the product-specific web address "WWW.MWATER/FREE.COM" are provided in the digital inaudible non-audio content portion 604. It is appreciated that the product-specific information may have any suitable level of specificity, i.e. it can refer to a single product or service or to a class of products and services as appropriate.

The broadcast message may be received, for example, by a computerized integrated vehicle information system 606, in a vehicle 607. Examples of computerized integrated vehicle information system 606 are Clarion Auto PC, AC Electric Vehicles Ltd. Compact Mobile Computer, and Delphi Automotive Systems Infotainment PC. Such computerized integrated vehicle information systems incorporate integrated communication systems such as a digital radio receiver, wireless modem for Internet connectivity, cellular telephone, computerized car guidance system utilizing GPS 608. The digital audible audio content portion 602 may be heard by a user in the vehicle 607, via a speaker 610 while the digital inaudible non-audio data content portion 604 is not heard.

A typical data set representing the contents of the inaudible non-audio content portion transmitted by broadcast facility 600 and received by integrated radio 609 appears in FIG. 20A as described herein below with reference to FIG. 25.

It is noted that at least part of the digital inaudible non-audio content portion 604 is not only not heard but is also not visible to the user on the computer display 613, so as to prevent possible distraction of the user.

It is further noted that avoidance of display of at least part of the digital content portion 604 on the computer display 613 is an important safety feature of the present invention and distinguishes the digital inaudible non-audio content portion

604 from conventional subcarrier messages, such as commercial RDS messages, which are conventionally displayed on radio displays.

Thus, it is seen that only static information, such as the legend "RADIO NY", is displayed on the computer display 613. This message typically continues to be displayed as long as the radio is tuned to Radio NY and thus is considered not to be distracting.

A typical data set representing the contents of the inaudible non-audio content portion transmitted by broadcast facility 600, indicating that portion displayed by display 613 of integrated radio 609 appears in FIG. 20B as described herein below with reference to FIG. 25.

In response to hearing the digital audio content portion, "FREE MINERAL WATER—BUY NOW!!" 602, the user may issue a command, typically orally, such as "CAPTURE". This command, in accordance with a preferred embodiment of the present invention, is received by the computerized integrated vehicle information system 606. In response to receipt of the "CAPTURE" command, at least some, if not all of the information contained in the digital inaudible non-audio data content portion 604 is supplied from can integrated digital radio located within the computerized integrated vehicle information system 606- to a data storage medium also located within the computerized integrated vehicle information system 606. In FIG. 6, for example only the product name part of captured digital content portion 604 is shown on the computer display 613 of the computerized integrated vehicle information system 606, it being understood that any other part of captured digital content portion 604 may be alternatively or additionally made visible. For example, the computer display 613, of the computerized integrated vehicle information system 606, can list subject titles of other such capture events captured in a similar manner as described herein. Thus capture event #1 concerns a news item, capture event #2 concerns a book, and capture event #3 concerns water. Further information contained in the inaudible non-audio content portion 604 and pertaining to the captured event may be displayed on alternative menus on the computer display 613 of the computerized integrated vehicle information system 606 as shown in FIG. 6.

A typical data set representing the contents of the inaudible non-audio content portion transmitted by broadcast facility 600, indicating those portions displayed by display 613 of the computerized integrated vehicle information system 606 appears in FIG. 20C as described herein below with reference to FIG. 25.

In the illustrated embodiment, FIG. 6, the user may at any time thereafter actuate an integrated mobile communicator located within the computerized integrated vehicle information system 606 by issuing a command, typically orally, such as "CONTACT". In response to receipt of the "CONTACT" command, FIG. 6 shows an example wherein a user actuates the integrated mobile communicator located within the computerized integrated vehicle information system 606, accesses a product-specific web site identified by the product-specific web address "WWW.MWATER/FREE.COM" which forms part of the digital data content portion 604. In the illustrated embodiment, this access is achieved via a non product-specific portal, embodied in a server 619, which is accessed via the Internet by use of a non product-specific web address, such as "WWW.PORTAL.COM". The non product-specific web address need not be broadcast and can be stored in the computerized integrated vehicle information system 606, such as by means of a cookie. Alternatively, the non product-specific web address may be broadcast as part of the digital content portion 604 or otherwise.

Once the user has accessed the product-specific web site identified by the product-specific web address "WWW.MWATER/FREE.COM", the user may obtain information or, as shown in FIG. 6 enter into any appropriate commercial transaction, such as one which results in water being delivered to the residence of the user.

A typical feature of the computerized integrated vehicle information systems 606 is a GPS locator 608. The geographical location coordinates from the GPS locator 608 may be transmitted from the computerized integrated vehicle information system 606 to the non product-specific server 619 and used in such a manner that thereby enhances the appropriate commercial transaction. Such enhancement may include directing the user to the nearest product-specific facility, or enable the non product-specific server 619 to notify a product-specific facility of the whereabouts of a user.

As illustrated in FIG. 6, the user may alternatively wish to transfer the digital content portion 604 to a hand-held mobile communicator 614, such as an appropriately equipped mobile telephone or personal digital assistant, for use independent of the computerized integrated vehicle information system 606. In accordance with a preferred embodiment of the present invention, the user can issue a command typically orally, such as "TRANSFER", which is received by either the computerized integrated vehicle information system 606 or by mobile communicator 614, here preferably a Bluetooth, web-enabled PDA. Once actuated in response to receipt of the "TRANSFER" command, the captured digital content portion 604 is supplied from computerized integrated vehicle information system 606 to the mobile communicator 614, as indicated symbolically at reference numeral 616.

The mobile communicator display 616 can list subject titles of other such capture events captured in a similar manner as described herein. Thus capture event #1 concerns a news item, capture event #2 concerns a book, and capture event #3 concerns water. Further information contained in the inaudible non-audio content portion 604 and pertaining to the captured event may be displayed on alternative menus on the mobile communicator display 616 as shown in FIG. 6.

As illustrated in FIG. 6, the mobile communicator 614 accesses a product-specific web site located on a product-specific server 628 identified by the product-specific web address "WWW.MWATERFREE.COM" which forms part of the digital content portion 604. In the illustrated embodiment, this access is achieved via a non product-specific portal, embodied in a server 619, which is accessed via the Internet by use of a non product-specific web address, such as WWW.PORTAL.COM located on non product-specific server 619. The non product-specific web address need not be broadcast and can be stored in the mobile communicator 614, such as by means of a cookie. Alternatively, the non product-specific web address may be transferred as part of digital content portion 604 or otherwise as shown symbolically at reference 616.

Alternatively, where the mobile communicator 614 has cellular telephone capabilities the user, upon issuing a command, typically orally, such as "CONTACT" to access a product-specific telephone destination center 617 identified by the product-specific telephone number "1-800-WATER4U" which forms part of the product-specific information of digital content portion 604. In the illustrated embodiment, this access is achieved via the non product-specific telephone center 624 by use of a non product-specific telephone number, such as "1-800-864-2222". The non product-specific telephone center number need not be broadcast and can be stored in the mobile communicator 614, by means such as a cookie or SMS.

A typical data set representing the contents of a communication sent by the mobile communicator 614 and received by a non product-specific server 615 appears in FIG. 20D as described herein below with reference to FIG. 25.

In accordance with a preferred embodiment of the present invention, the database 620 may be provided which may receive all or part of the digital content portion 647 via a computer network communication, as from a computer 622, associated with the broadcast facility 600 via the non product-specific portal server 619. This database 620 is preferably coupled to the non product-specific server 619 so as to collect and correlate user information, including cellular location information supplied by the cellular operators, and activities in connection with given digital content portions 604, in order to enable suitable payments to be made among the various parties to the activities illustrated in FIG. 6.

A typical data set representing the contents of the communication from the non product-specific server 619, indicating those portions stored in database 620 appears in FIG. 20E as described herein below with reference to FIG. 25.

It is appreciated that a non product-specific telephone center 624 or other user contact interface may be provided alternatively or in addition to non product-specific server 619 and may thus be coupled to database 620.

It is further appreciated that the non product-specific telephone center 624 or other user contact interface may be provided alternatively or in addition to server 619 and may thus be coupled to database 620. Typically the portal server 619, the non product-specific telephone center 624 and the database 620 are provided by a non-product specific communication facility 626.

Reference is now made to FIG. 7, which is a simplified pictorial illustration of a methodology and system for accessing information using both non-product specific information and product-specific information received wirelessly and non-wirelessly by a user in accordance with a further preferred embodiment of the present invention. As seen in FIG. 7, there is provided a system and methodology wherein a message, here a commercial message, is broadcast, typically by a radio broadcast facility 700, such as an FM broadcast facility or a satellite radio facility. Non product-specific information is to be understood as information which is not necessarily applicable to accessing a given product or service, while product-specific information is to be understood as information which is applicable to accessing a given product or service.

In the illustrated embodiment of FIG. 7, the radio broadcast facility, represented by an antenna tower designated by reference numeral 700, is a FM broadcast facility having subcarrier broadcast functionality, such as via a RDS, RBDS or a DARC protocol. Alternatively or additionally the radio broadcast facility may be a digital radio broadcast facility or a satellite broadcast facility such as XMRADIO. As illustrated in FIG. 7, the broadcast message includes an audible audio content portion, designated by reference numeral 701, which says "FREE MINERAL WATER—BUY NOW!!" and an inaudible non-audio content portion, designated by reference numeral 712, which contains at least the following information: "RADIO NY FREE WATER WWW.PORTAL.COM #1234#", where the web address WWW.PORTAL.COM is a non product-specific web address and #1234# is coded product-specific information. The inaudible non-audio content portion 712 is preferably a subcarrier content portion when the radio broadcast facility is an FM broadcast facility having a subcarrier broadcast functionality.

The broadcast message may be received by a receiver, for example, a satellite 702 that retransmits the broadcast message to a further receiver, for example a satellite receiver dish 703. The broadcast message is transferred by wired means to a head-end station 704. A typical data set representing the contents of the inaudible non-audio content portion transmitted by broadcast facility 700 and received by headend station 712 appears in FIG. 21A as described herein below with reference to FIG. 25.

The combined transmission signal for radio, television, and PC is transferred by means of a cable communicator 705 to a user's domicile 706. A set-top box deplexer 707 provides connectivity input for a cable television 708, and cable-connected PC 709 and a cable-connected radio 710. The audible audio content portion 701 is broadcast via the cable radio 710 simultaneous to which at least part of the inaudible non-audio content portion 712 is shown on a dedicated cable channel on the cable television display screen 718. In FIG. 7, for example only the product description and broadcast station identity part of content portion 712 is shown as being supplied, it being understood that any other part of content portion 712 may be alternatively or additionally supplied.

A typical data set representing the contents of the inaudible non-audio content portion transmitted by broadcast facility 700, indicating that portion displayed by radio 710 appears in FIG. 21B as described herein below with reference to FIG. 25.

Concurrent, or any time previous, with the broadcasting of the broadcast message, full product-specific information 711 and, but not necessarily, other information pertaining to the broadcast message corresponding to the product-specific code contained in portion 712 can be transmitted via a computer network communication, as from a computer 713, associated with the broadcast facility 700 to a database 728 via a non product-specific server 720.

In response to hearing the audible audio content portion 701, "FREE MINERAL WATER—BUY NOW!!", the user may issue a command, typically manually via the remote control device 722 that actuates a hyperlink connection back up in the cable communicator 705 to the head-end station 704.

In the illustrated embodiment, FIG. 7, shows an example wherein a user actuates the hyperlink via the cable television remote device 722 to access a product-specific web site located on a server 724 identified by the product-specific web address WWW.MWATER/FREE.COM. In the illustrated embodiment, this product-specific access is achieved via a non product-specific portal, embodied in the server 720, which is accessed from the head-end station 704 via the Internet by use of a non product-specific web address, such as "WWW.PORTAL.COM". The non product-specific web address may be broadcast as part of content portion 712 or otherwise.

A typical data set representing the contents of the inaudible non-audio content portion transmitted by broadcast facility 700, indicating those portions displayed by television 708 appears in FIG. 21C as described herein below with reference to FIG. 25.

The product-specific code, shown for example as #1234#, is transmitted back up the cable 705 from the set-top box 707 together with the non-product-specific web address WWW.PORTAL.COM to the head-end station 704. The product-specific code is received by the non product-specific portal server 720 and sent to the database 728. The product-specific code is matched in the database 728 to the content information 711 received from the computer 713 associated with the broadcast facility 700. The matched product-specific web address WWW.MWATER/FREE.COM that results is accessed via the non product-specific portal server 720.

A typical data set representing the contents of a communication sent by the headend facility 704 and received by a non product-specific server 720 appears in FIG. 21D as described herein below with reference to FIG. 25.

It is appreciated that displaying the inaudible non-audio content portion 712 and accessing an associated URL via cable television 718, according to the embodiment illustrated in FIG. 7, can also be performed via a cable-connected PC 709. It is further appreciated that the audible audio content portion 701 can be made audible via the cable television 705 and alternatively via the cable-connected PC 709.

Once the user has accessed the product-specific web site identified by the product-specific web address "WWW.M-WATER/FREE.COM", the user may obtain information or, as shown in FIG. 7 enter into any appropriate commercial transaction, such as one which results in water being delivered to the residence of the user.

In accordance with a preferred embodiment of the present invention, The database 728 is preferably also coupled to the non product-specific server 720 so as to collect and correlate user information and activities in connection with given content portions 712, in order to enable suitable payments to be made among the various parties to the activities illustrated in FIG. 7.

A typical data set representing the contents of the communication from the non product-specific server 720, indicating those portions stored in database 728 appears in FIG. 21E as described herein below with reference to FIG. 25.

Typically the portal server 720, and the database 728 are provided by a non-product specific communication facility 730.

Figure 8B:
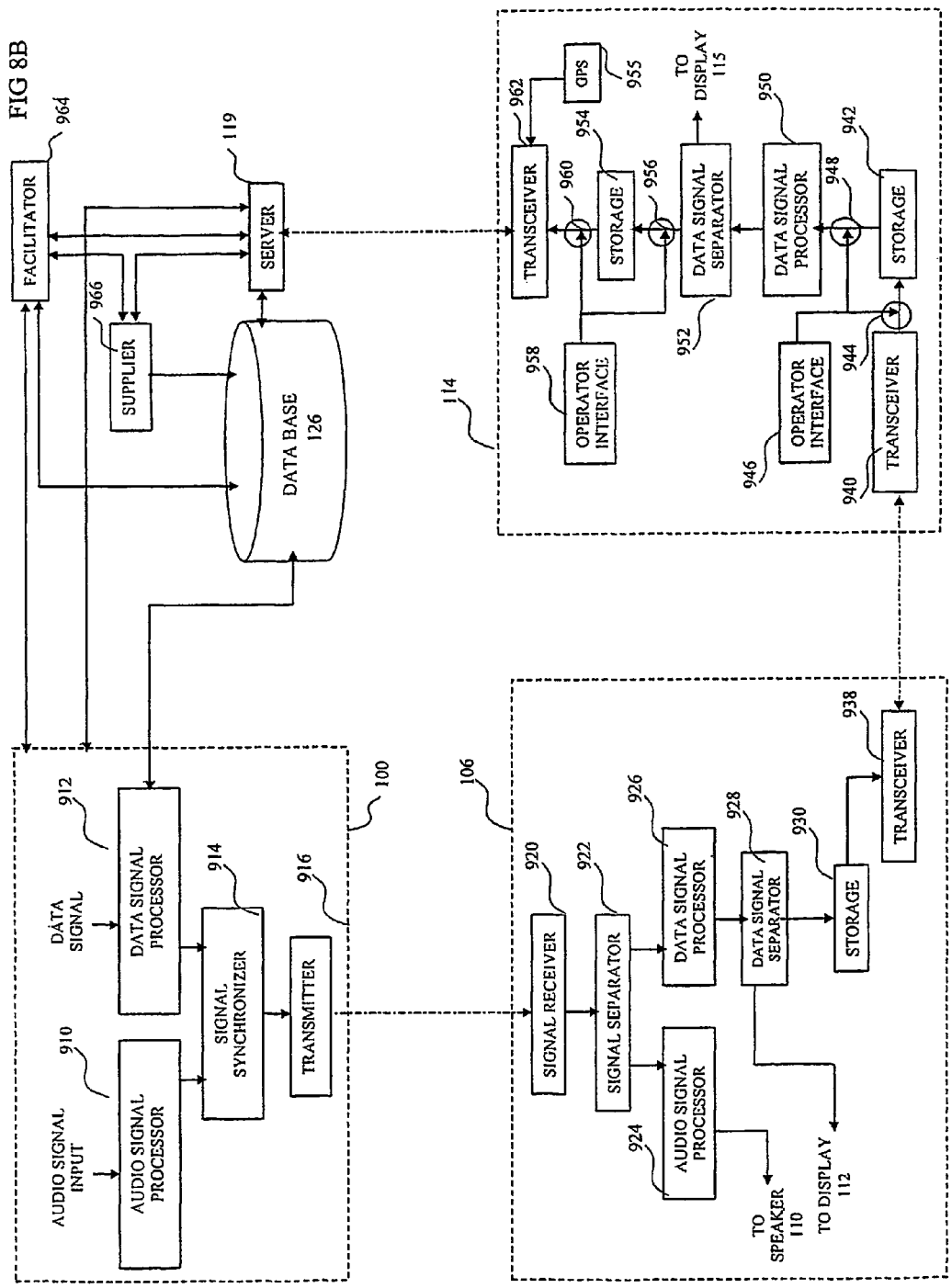

Reference is now made to FIGS. 8A, 8B, 8C, 8D, 8E & 8F which are simplified functional block diagrams of six alternative embodiments of the system of FIG. 1. As seen in FIG. 8A, there is provided a system and methodology of the type shown in FIG. 1, wherein a commercial message is broadcast by a radio broadcast facility, such as an FM or digital broadcast facility.

In the illustrated embodiment of FIG. 8A, the radio broadcast facility 100 (FIG. 1), typically a FM broadcast facility having subcarrier broadcast functionality, such as via a RDS, RBDS or a DARC protocol, includes an audio signal processor 810, receiving an audio signal input, as well as a data signal processor 812, receiving a data signal input. Outputs of processors 810 and 812 are supplied to a signal synchronizer 814, which combines these outputs with suitable synchronization therebetween and supplies a combined output to a transmitter 816.

As illustrated in FIG. 1, the broadcast message preferably includes an audible audio content portion and an inaudible non-audio content portion.

The broadcast message may be received, for example, by a radio 106 (FIG. 1), typically located in a vehicle. As seen in FIG. 8A, the radio is a non-standard radio including a signal receiver 820 which outputs to a signal separator 822, which is operative to separate the received signal into audio and data portions which are processed respectively by an audio signal processor 824 and a data signal processor 826. The output of the audio signal processor 824 may be heard by a user via a speaker, such as speaker 110 (FIG. 1).

The output of the data signal processor 826 is supplied to a data signal separator 828 which may provide a visible output to a suitable radio display, such as display 112 (FIG. 1). It is a particular feature of the present invention that the data signal separator 828 also provides a non-audio, non-visible output, which may be stored in a signal storage medium 830. Such storage may be, but need not necessarily be, governed by a switch 832 controlled by an operator using an operator interface 834.

In the example shown in FIG. 8A, the operator interface 834 may be speech actuated, such that when the operator says "CAPTURE" as illustrated in FIG. 1, the non-audio, non-visible output of data signal separator 828 is stored in storage medium 830.

Additionally or alternatively, a switch 836 may be provided at an output of storage medium 830 and may be actuated by an operator using operator interface 834. The operation of switch 836 may be similar to that of switch 832, the only difference in their effect being that switch 832 governs storage of the non-audio, non-visible output, while switch 836 governs supply thereof to a transceiver 838.

The non-audio, non-visible output transmitted by transceiver 838 may be received by a transceiver 840 forming part of the mobile communicator 114 (FIG. 1). It is appreciated that transceivers 838 and 840 and the communication link therebetween may be replaced by any other suitable wired or wireless communication link, such as a ohmic connection, an IR communication link, a Bluetooth communication link or another short range communication link.

The output of transceiver 840 is preferably supplied to a data signal processor 842. The output of the data signal processor 842 may be supplied to a data signal separator 844, which may provide a visible data output which may be displayed on a screen 115 of the mobile communicator 114 and also provides a contact information output, which may be stored in a signal storage medium 846. In the context of FIG. 1, the contact information output may include, for example, a web address such as "WWW.MWATER/FREE.COM" and/or a telephone number. Such storage may be, but need not necessarily be, governed by a switch 848 controlled by an operator using an operator interface 850.

In the example shown in FIG. 8A, the operator interface 850 may be speech actuated, such that when the operator says "CONTACT" as illustrated in FIG. 1, the contact information output of data signal separator 844 is stored in storage medium 846.

Additionally or alternatively, a switch 852 may be provided at an output of storage medium 846 and may be actuated by an operator using operator interface 850. The operation of switch 852 may be similar to that of switch 848, the only difference in their effect being that switch 848 governs storage of the contact information output, while switch 852 governs supply thereof to a transceiver 854.

Transceiver 854 preferably includes a wireless modem which is enabled to communicate via the Internet with server 119 (FIG. 1), which in turn communicates with database 126 (FIG. 1).

In the illustrated embodiment, which is described functionally hereinabove with reference to FIG. 1, the user may at any time actuate the mobile communicator 114 to establish contact via transceiver 854 on the basis of part or all of the contact information output from data signal separator 844.

A GPS device 855 may be associated with the mobile communicator 114 and may transmit the user's geographic coordinates to the server 119 via the transceiver 854

FIG. 1 shows an example wherein a user actuates the mobile communicator 114, typically embodied as a web-enabled wireless personal digital assistant, to access a web site identified by the web address "WWW.MWATER/FREE.COM" which forms part of the content information output. In the illustrated embodiment, this access is achieved via a portal, embodied in server 119, which is accessed via the Internet by use of a non product-specific web address, such as "WWW.PORTAL.COM". The non product-specific web address need not be broadcast and is typically stored in the mobile communicator 114, such as by means of a cookie.

Alternatively, the non product-specific web address may be broadcast as part of content portion 104 (FIG. 1) or otherwise.

Once the user has accessed the web site identified by the web address "WWW.MWATER/FREE.COM", the user may obtain information or, as shown in FIG. 1, enter into any appropriate commercial transaction, such as one which results in water being delivered to the residence of the user.

In accordance with a preferred embodiment of the present invention, database 126 may receive all or part of the content information output from data signal separator 844 via a computer network communication, and from data signal processor 812. Database 126 is preferably operative to collect and correlate user information and activities in connection with given contact information and to communicate with a facilitator 856. The facilitator 856 may have multiple functionalities which may be combined in a single entity or divided among various separate entities. The facilitator preferably interfaces among and between a broadcast facility 100 (FIG. 1) a user, a supplier of goods or services 858 and various elements of communication facility 130 (FIG. 1) such as database 126, server 119 and telephone center 124. The facilitator 856 may be operated by the operator of communication facility 130 or by another entity.

The facilitator 856 preferably provides at least one of coordination and financial arrangements between one or more of a broadcast facility 100 (FIG. 1) a user, a supplier of goods or services 858 and various elements of communication facility 130 (FIG. 1) such as database 126, server 119 and telephone center 124. Though it is appreciated that the facilitator 856 may provide payment arrangements between two or more of a broadcast facility 100 (FIG. 1), a user, a supplier of goods or services 858 and an advertiser.

Turning to FIG. 8B, there is provided a system and methodology of the type shown in FIG. 1, wherein a message, here a commercial message, is broadcast, typically by a radio broadcast facility, such as an FM broadcast facility.

In the illustrated embodiment of FIG. 8B, the radio broadcast facility 100 (FIG. 1), typically a FM broadcast facility having subcarrier broadcast functionality, such as via a RDS, RBDS or a DARC protocol, includes an audio signal processor 910, receiving an audio signal input, as well as a data signal processor 912, receiving a data signal input. Outputs of processors 910 and 912 are supplied to a signal synchronizer 914, which combines these outputs with suitable synchronization therebetween and supplies a combined output to a transmitter 916.

As illustrated in FIG. 1, the broadcast message, preferably includes an audible audio content portion, and the inaudible non-audio subcarrier content portion.

The broadcast message may be received, for example, by radio 106 (FIG. 1), typically located in a vehicle. As seen in FIG. 8B, the radio is a non-standard radio including a signal receiver 920 which outputs to a signal separator 922, which is operative to separate the received signal into audio and data portions and are processed respectively by an audio signal processor 924 and a data signal processor 926. The output of the audio signal processor 924 may be heard by a user via a speaker, such as speaker 110 (FIG. 1).

The output of the data signal processor 926 is supplied to a data signal separator 928 which may provide a visible data output to a suitable radio display, such as display 112 (FIG. 1). It is a particular feature of the present invention that the data signal separator 928 also provides a non-audio, non-visible output, which may be stored in a signal storage medium 930 and is provided to a transceiver 938.

The non-audio, non-visible output transmitted by transceiver 938 may be received by a transceiver 940 forming part of a mobile communicator 114 (FIG. 1). It is appreciated that transceivers 938 and 940 and the communication link therebetween may be replaced by any other suitable wired or wireless communication link, such as a ohmic connection, an IR communication link, a Bluetooth communication link or another short range communication link.

The output of transceiver 940 may be supplied to a storage medium 942. Such storage may be, but need not necessarily be, governed by a switch 944 controlled by an operator using an operator interface 946.

In the example shown in FIG. 1, the operator interface 946 may be speech actuated, such that when the operator says. "CAPTURE" as illustrated in FIG. 1, the non-audio, non-visible output of data signal separator is stored in storage medium 942.

Additionally or alternatively, a switch 948 may be provided at an output of storage medium 942 and may be actuated by an operator using operator interface 946. The operation of switch 948 may be similar to that of switch 944, the only difference in their effect being that switch 948 governs storage of the non-audio, non-visible output, while switch 944 governs supply thereof to a data signal processor 950.

The output of the data signal processor 950 may be supplied to a data signal separator 952, which may provide a visible output which may be displayed on a screen 115 of the mobile communicator 114 and also provides a contact information output, which may be stored in a signal storage medium 954. In the context of FIG. 1, the contact information output may include, for example, a web address such as "WWW.MWATER/FREE.COM" or a telephone number. Such storage may be, but need not necessarily be, governed by a switch 956 controlled by an operator using an operator interface 958.

In the example shown in FIG. 1, the operator interface 958 may be speech actuated, such that when the operator says "CONTACT" as illustrated in FIG. 1, the contact information output is stored in storage medium 954.

Additionally or alternatively, a switch 960 may be provided at an output of storage medium 954 and may be actuated by an operator using operator interface 958. The operation of switch 960 may be similar to that of switch 956, the only difference in their effect being that switch 956 governs storage of the contact information output, while switch 960 governs supply thereof to a transceiver 962.

A GPS device 955 may be associated with the mobile communicator 114 and may transmit the user's geographic coordinates to the server 119 via the transceiver 962.

Transceiver 962 preferably includes a wireless modem which is enabled to communicate via the Internet with server 119 (FIG. 1), which in turn communicates with database 126 (FIG. 1).

In the illustrated embodiment, which is described functionally hereinabove with reference to FIG. 1, the user may at any time actuate the mobile communicator 114 to establish contact via transceiver 962 on the basis of part or all of the contact information output from data signal separator 952.

FIG. 1 shows an example wherein a user actuates the mobile communicator 114, typically embodied as a web-enabled wireless personal digital assistant, to access a web site identified by the web address "WWW.MWATER/FREE.COM" which forms part of the content information output. In the illustrated embodiment, this access is achieved via a portal, embodied in server 119, which is accessed via the Internet by use of a non product-specific web address, such as "WWW.PORTAL.COM". The non product-specific web address need not be broadcast and is typically stored in the mobile communicator 114, such as by means of a cookie.

Alternatively, the non product-specific web address may be broadcast as part of content portion 104 (FIG. 1) or otherwise.

Once the user has accessed the web site identified by the web address "WWW.MWATER/FREE.COM", the user may obtain information or, as shown in FIG. 1 enter into any appropriate commercial transaction, such as one which results in water being delivered to the residence of the user.

In accordance with a preferred embodiment of the present invention, database 126 may receive all or part of the content information output from data signal separator 952 via a computer network communication, and from data signal processor 950. Database 126 is preferably operative to collect and correlate user information and activities in connection with given contact information and to communicate with a facilitator 964. The facilitator 964 may have multiple functionalities which may be combined in a single entity or divided among various separate entities. The facilitator 964 preferably interfaces among and between a broadcast facility 100 (FIG. 1) a user, a supplier of goods or services 966 and various elements of communication facility 130 (FIG. 1) such as database 126, server 119 and telephone center 124. The facilitator 964 may be operated by the operator of communication facility 130 or by another entity.

The facilitator 964 preferably provides at least one of coordination and financial arrangements between one or more of a broadcast facility 100 (FIG. 1) a user, a supplier of goods or services 966 and various elements of communication facility 130 (FIG. 1) such as database 126, server 119 and telephone center 124. Though it is appreciated that the facilitator 964 may provide payment arrangements between two or more of a broadcast facility 100 (FIG. 1), a user, a supplier of goods or services 966 and an advertiser.

In the illustrated embodiment of FIG. 8C, the radio broadcast facility 100 (FIG. 1), typically a digital broadcast facility, includes a voice to data processor 1010, receiving an audio signal input. The output of processor 1010 and a data signal input are supplied to a digital signal processor 1014, which combines these outputs with suitable synchronization therebetween and supplies a combined output to a digital transmitter 1016.

As illustrated in FIG. 1, the broadcast message, preferably includes an audible audio content portion, and an inaudible non-audio content portion.

The digital broadcast message may be received, for example, by a radio 106 (FIG. 1), typically located in a vehicle. As seen in FIG. 8C, the radio is a non-standard digital radio including a digital signal receiver 1020 which outputs to a digital signal processor 1022. The processed signal is delivered to a digital signal separator 1024 which is operative to separate the received digital signal into audio and data portions which are processed respectively by a data to voice processor 1026 and a data signal separator 1028. The output of the data to voice processor 1026 may be heard by a user via a speaker, such as speaker 110 (FIG. 1).

The output of the data signal separator 1028 may provide a visible data output to a suitable radio display, such as display 112 (FIG. 1). It is a particular feature of the present invention that the data signal separator 1028 also provides a non-audio, non-visible output, which may be stored in a signal storage medium 1030. Such storage may be, but need not necessarily be, governed by a switch 1032 controlled by an operator using an operator interface 1034.

In the example shown in FIG. 1, the operator interface 1034 may be speech actuated, such that when the operator says "CAPTURE" as illustrated in FIG. 1, the non-audio, non-visible output of data signal separator is stored in storage medium 1030.

Additionally or alternatively, a switch 1036 may be provided at an output of storage medium 1030 and may be actuated by an operator using operator interface 1034. The operation of switch 1036 may be similar to that of switch 1032, the only difference in their effect being that switch 1032 governs storage of the non-audio, non-visible output, while switch 1036 governs supply thereof to a transceiver 1038.

The non-audio, non-visible output transmitted by transceiver 1038 may be received by a transceiver 1040 forming part of a mobile communicator 114 (FIG. 1). It is appreciated that transceivers 1038 and 1040 and the communication link therebetween may be replaced by any other suitable wired or wireless communication link, such as a ohmic connection, an IR communication link, a Bluetooth communication link or another short range communication link.

The output of transceiver 1040 may be supplied to a data signal processor 1050. The output of the data signal processor 1050 may be supplied to a data signal separator 1052, which may provide a visible output which may be displayed on a screen of the mobile communicator 114 and also provides a contact information output, which may be stored in a signal storage medium 1054. In the context of FIG. 1, the contact information output may include, for example, a web address such as "WWW.MWATER/FREE.COM" or a telephone number. Such storage may be, but need not necessarily be, governed by a switch 1056 controlled by an operator using an operator interface 1058.

In the example shown in FIG. 1, the operator interface 1058 may be speech actuated, such that when the operator says "CONTACT" as illustrated in FIG. 1, the contact information output is stored in storage medium 1054.

Additionally or alternatively, a switch 1060 may be provided at an output of storage medium 1054 and may be actuated by an operator using operator interface 1058. The operation of switch 1060 may be similar to that of switch 1056, the only difference in their effect being that switch 1056 governs storage of the contact information output, while switch 1060 governs supply thereof to a transceiver 1062.

A GPS device 1055 may be associated with the mobile communicator 114 and may transmit the user's geographic coordinates to the server 119 via the transceiver 1062.

Transceiver 1062 preferably includes a wireless modem which is enabled to communicate via the Internet with server 119 (FIG. 1), which in turn communicates with database 126 (FIG. 1).

In the illustrated embodiment, which is described functionally hereinabove with reference to FIG. 1, the user may at any time actuate the mobile communicator 114 to establish contact via transceiver 1062 on the basis of part or all of the contact information output from data signal separator 1052.

FIG. 1 shows an example wherein a user actuates the mobile communicator 114, typically embodied as a web-enabled wireless personal digital assistant, to access a web site identified by the web address "WWW.MWATER/FREE.COM" which forms part of the content information output. In the illustrated embodiment, this access is achieved via a portal, embodied in server 119, which is accessed via the Internet by use of a non product-specific web address, such as "WWW.PORTAL.COM". The non product-specific web address need not be broadcast and is typically stored in the mobile communicator 114, such as by means of a cookie. Alternatively, the non product-specific web address may be broadcast as part of content portion 104 (FIG. 1) or otherwise.

Once the user has accessed the web site identified by the web address "WWW.MWATER/FREE.COM", the user may obtain information or, as shown in FIG. 1 enter into any appropriate commercial transaction, such as one which results in water being delivered to the residence of the user.

In accordance with a preferred embodiment of the present invention, database 126 may receive all or part of the content information output from data signal separator 1052 via a computer network communication, and from data signal processor 1050. Database 126 is preferably operative to collect and correlate user information and activities in connection with given contact information and to communicate with a facilitator 1068. The facilitator 1068 may have multiple functionalities which may be combined in a single entity or divided among various separate entities. The facilitator preferably interfaces among and between a broadcast facility 100 (FIG. 1) a user, a supplier of goods or services 1066 and various elements of communication facility 130 (FIG. 1) such as database 126, server 119 and telephone center 124. The facilitator 1068 may be operated by the operator of communication facility 130 or by another entity.

The facilitator 1068 preferably provides at least one of coordination and financial arrangements between one or more of a broadcast facility 100 (FIG. 1) a user, a supplier of goods or services 1066 and various elements of communication facility 130 (FIG. 1) such as database 126, server 119 and telephone center 124. Though it is appreciated that the facilitator 1068 may provide payment arrangements between two or more of a broadcast facility 100 (FIG. 1), a user, a supplier of goods or services 1066 and an advertiser.

In the illustrated embodiment of FIG. 8D, the radio broadcast facility 100 (FIG. 1), typically a digital broadcast facility, includes a voice to data processor 1110, receiving an audio signal input. Output of processor 1110 and data signal input are supplied to a signal processor 1114, which combines these outputs with suitable synthesis therebetween and supplies a combined output to a transmitter 1116.

As illustrated in FIG. 1, the digitized broadcast message, preferably includes an audible audio content portion, and an inaudible non-audio content portion.

The broadcast message may be received, for example, by a radio 106 (FIG. 1), typically located in a vehicle. As seen in FIG. 8D, the radio is a non-standard radio including a signal receiver 1120 which outputs to a signal processor 1122. The processed signal is delivered to a signal separator 1124 which is operative to separate the received signal into audio and data portions which are processed respectively by a data to voice processor 1126 and a data signal separator 1128. The output of the data to voice processor 1126 may be heard by a user via a speaker, such as speaker 110 (FIG. 1).

The output of the signal processor 1124 is supplied to a data signal separator 1128 which may provide a visible data output to a suitable radio display, such as display 112 (FIG. 1). It is a particular feature of the present invention that the data signal separator 1128 also provides a non-audio, non-visible output, which may be provided to a transceiver 1138.

The non-audio, non-visible output transmitted by transceiver 1138 may be received by a transceiver 1140 forming part of a mobile communicator 114 (FIG. 1). It is appreciated that transceivers 1138 and 1140 and the communication link therebetween may be replaced by any other suitable wired or wireless communication link, such as a ohmic connection, an IR communication link, a Bluetooth communication link or another short range communication link.

The output of transceiver 1140 may be supplied to a storage medium 1142 but need not necessarily be, governed by a switch 1144 controlled by an operator using an operator interface 1146.

In the example shown in FIG. 1, the operator interface 1146 may be speech actuated, such that when the operator says "CAPTURE" as illustrated in FIG. 1, the non-audio, non-visible output of data signal separator is stored in storage medium 1142.

Additionally or alternatively, a switch 1148 may be provided at an output of storage medium 1142 and may be actuated by an operator using operator interface 1146. The operation of switch 1148 may be similar to that of switch 1144, the only difference in their effect being that switch 1148 governs storage of the non-audio, non-visible output, while switch 1144 governs supply thereof to a data signal processor 1150.

The output of the data signal processor 1150 may be supplied to a data signal separator 1152, which may provide a visible output which may be displayed on a screen 115 of the mobile communicator 114 and also provides a contact information output, which may be stored in a signal storage medium 1154. In the context of FIG. 1, the contact information output may include, for example, a product-specific web address such as "WWW.MWATER/FREE.COM" or a product-specific telephone number. Such storage may be, but need not necessarily be, governed by a switch 1156 controlled by an operator using an operator interface 1158.

In the example shown in FIG. 1, the operator interface 1158 may be speech actuated, such that when the operator says "CONTACT" as illustrated in FIG. 1, the contact information output is stored in storage medium 1154.

Additionally or alternatively, a switch 1160 may be provided at an output of storage medium 1154 and may be actuated by an operator using operator interface 1158. The operation of switch 1160 may be similar to that of switch 1156, the only difference in their effect being that switch 1156 governs storage of the contact information output, while switch 1160 governs supply thereof to a transceiver 1162.

A GPS device 1155 may be associated with the mobile communicator 114 and may transmit the user's geographic coordinates to the server 119 via the transceiver 1162.

Transceiver 1162 preferably includes a wireless modem which is enabled to communicate via the Internet with server 119 (FIG. 1), which in turn communicates with database 126 (FIG. 1).

In the illustrated embodiment, which is described functionally hereinabove with reference to FIG. 1, the user may at any time actuate the mobile communicator 114 to establish contact via transceiver 1162 on the basis of part or all of the contact information output from data signal separator 1152.

FIG. 1 shows an example wherein a user actuates the mobile communicator 114, typically embodied as a web-enabled wireless personal digital assistant, to access a web site identified by the product-specific web address "WWW.MWATER/FREE.COM" which forms part of the content information output. In the illustrated embodiment, this access is achieved via a non product-specific portal, embodied in server 119, which is accessed via the Internet by use of a non product-specific web address, such as "WWW.PORTAL.COM". The product-specific web address may be broadcast as part of content portion 104 (FIG. 1) or otherwise. Alternatively the non product-specific web address need not be broadcast and may stored in the mobile communicator 114, such as by means of a cookie.

Once the user has accessed the web site identified by the web address "WWW.MWATER/FREE.COM", the user may obtain information or, as shown in FIG. 1, enter into any appropriate commercial transaction, such as one which results in water being delivered to the residence of the user.

In accordance with a preferred embodiment of the present invention, database 126 may receive all or part of the content information output from data signal separator 1152 via a computer network communication, and from data signal processor 1150. Database 126 is preferably operative to collect and correlate user information and activities in connection with given contact information and to communicate with a facilitator 1164. The facilitator 1164 may have multiple functionalities which may be combined in a single entity or divided among various separate entities. The facilitator preferably interfaces among and between a broadcast facility 100 (FIG. 1) a user, a supplier of goods or services 1166 and various elements of communication facility 130 (FIG. 1) such as database 126, server 119 and telephone center 124. The facilitator 1164 may be operated by the operator of communication facility 130 or by another entity.

The facilitator 1164 preferably provides at least one of coordination and financial arrangements between one or more of a broadcast facility 100 (FIG. 1) a user, a supplier of goods or services 1166 and various elements of communication facility 130 (FIG. 1) such as database 126, server 119 and telephone center 124. Though it is appreciated that the facilitator 1164 may provide payment arrangements between two or more of a broadcast facility 100 (FIG. 1), a user, a supplier of goods or services 1166 and an advertiser.

In the illustrated embodiment of FIG. 8E, the radio broadcast facility 100 (FIG. 1), typically an FM broadcast facility having subcarrier broadcast functionality, such as via a RDS, RBDS or a DARC protocol, includes an audio signal processor 1210, receiving an audio signal input, as well as a data signal processor 1212, receiving a data signal input. Outputs of processors 1210 and 1212 are supplied to a signal synchronizer 1214, which combines these outputs with suitable synchronization therebetween and supplies a combined output to a transmitter 1216.

As illustrated in FIG. 1, the broadcast message, preferably includes an audible audio content portion, and an inaudible non-audio content portion.

The broadcast message may be received, for example, by a radio 106 (FIG. 1), typically located in a vehicle. As seen in FIG. 8E, the radio may be a conventional RDS enabled radio, such as a JVC CH-KP950R, including a signal receiver 1220 which outputs to a signal separator 1222, which is operative to separate the received signal into audio and data portions which are processed respectively by an audio signal processor 1224 and a data signal processor 1226. The output of the audio signal processor 1224 may be heard by a user via a speaker, such as speaker 110 (FIG. 1) and the output of the data signal processor 1226 may provide a visible data output to a suitable radio display, such as display 112 (FIG. 1). Alternatively, radio 126 may be a conventional non-RDS enabled radio, such as a Pioneer KEH-1900, which does not include a signal separator or a data signal processor.

It is typical of conventional radios 106 that a local signal is transmitted from the signal receiver 1220 over short distances typically 3 feet. In accordance with a preferred embodiment of the present invention, this local signal is employed by a wireless interface assembly 1227 to provide contact information from the radio 106 to the mobile communicator 114 (FIG. 1).

Interface assembly 1227, which is not shown in FIG. 1, may reside anywhere within the local signal reception range of the radio 106 and may be a separate element or may be integrated with a mobile communicator or in any other suitable vehicle element.

Interface assembly 1227 preferably includes a local signal receiver 1228, which receives the local signal from radio 106 and configures a tuner 1226 to the identical frequency of the signal receiver 1220 in radio 106 (FIG. 1). This allows the signal receiver 1228 to receive the identical broadcast message as signal receiver 1220. The tuned frequency number can be made visible on a display such as an LED display 1229. It is a particular feature of the present invention that the frequency of the tuner 1226 may be manually locked by means of a frequency lock 1230 via a switch 1232 operated by an operator interface 1234, typically a touch button.

The signal receiver 1228 provides the signal received from the transmitter 1216 to a signal separator 1236 that isolates therefrom a non-audio, non-visible output. The non-audio, non-visible output is received by a data signal processor 1238 which outputs to a data signal separator 1240, the output of which may be stored in a signal storage medium 1242. Such storage may be but need not necessarily be governed by a switch 1244 controlled by an operator using an operator interface 1246.

In the example shown in FIG. 8E, the operator interface 1246 may be speech actuated, such that when the operator says "CAPTURE" as illustrated in FIG. 1, the non-audio, non-visible output of data signal separator is stored in storage medium 1242.

Additionally or alternatively, a switch 1248 may be provided at an output of storage medium 1242 and may be actuated by an operator using operator interface 1246. The operation of switch 1248 may be similar to that of switch 1244, the only difference in their effect being that switch 1244 governs storage of the non-audio, non-visible output, while switch 1248 governs supply thereof to a transceiver 1250.

The non-audio, non-visible output transmitted by transceiver 1250 may be received by a transceiver 1260 forming part of a mobile communicator 114 (FIG. 1). It is appreciated that transceivers 1250 and 1260 and the communication link therebetween may be replaced by any other suitable wired or wireless communication link, such as a ohmic connection, an IR communication link a Bluetooth communication link or another short range communication link.

The output of transceiver 1260 is preferably supplied to a data signal processor 1262. The output of the data signal processor 1262 may be supplied to a data signal separator 1264, which may provide a visible data output which may be displayed on a screen 115 of the mobile-communicator 114 and also provides a contact information output, which may be stored in a signal storage medium 1266. In the context of FIG. 1, the contact information output may include, for example, a web address such as "WWW.MWATER/FREE.com" and/or a telephone number. Such storage may be, but need not necessarily be, governed by a switch 1268 controlled by an operator using an operator interface 1270.

In the example shown in FIG. 1, the operator interface 1270 may be speech actuated, such that when the operator says "CONTACT" as illustrated in FIG. 1, the contact information output is stored in storage medium 1266.

Additionally or alternatively, a switch 1272 may be provided at an output of storage medium 1266 and may be actuated by an operator using operator interface 1270. The operation of switch 1272 may be similar to that of switch 1268, the only difference in their effect being that switch 1268 governs storage of the contact information output, while switch 1272 governs supply thereof to a transceiver 1274.

A GPS device 1255 may be associated with the mobile communicator 114 and may transmit the user's geographic coordinates to the server 119 via the transceiver 1274.

Transceiver 1274 preferably includes a wireless modem which is enabled to communicate via the Internet with server 119 (FIG. 1), which in turn communicates with database 126 (FIG. 1).

In the illustrated embodiment, which is described functionally hereinabove with reference to FIG. 1, the user may at any time actuate the mobile communicator 114 to establish contact via transceiver 1274 on the basis of part or all of the contact information output from data signal separator 1264.

FIG. 1 shows an example wherein a user actuates the mobile communicator 114, typically embodied as a web-enabled wireless personal digital assistant, to access a web site identified by the web address "WWW.MWATER/FREE.COM" which forms part of the content information output. In the illustrated embodiment, this access is achieved via a portal, embodied in server 119, which is accessed via the Internet by use of a non product-specific web address, such as "WWW.PORTAL.COM". The non product-specific web address need not be broadcast and is typically stored in the mobile communicator 114, such as by means of a cookie. Alternatively, the non product-specific web address may be broadcast as part of content portion 104 (FIG. 1) or otherwise.

Once the user has accessed the web site identified by the web address "WWW.MWATER/FREE.COM", the user may obtain information or, as shown in FIG. 1, enter into any appropriate commercial transaction, such as one which results in water being delivered to the residence of the user.

In accordance with a preferred embodiment of the present invention, database 126 may receive all or part of the content information output from data signal separator 1264 via a computer network communication, and from data signal processor 1262. Database 126 is preferably operative to collect and correlate user information and activities in connection with given contact information and to communicate with a facilitator 1276. The facilitator 1276 may have multiple functionalities which may be combined in a single entity or divided among various separate entities. The facilitator preferably interfaces among and between a broadcast facility 100 (FIG. 1) a user, a supplier of goods or services 1278 and various elements of communication facility 130 (FIG. 1) such as database 126, server 119 and telephone center 124. The facilitator 1276 may be operated by the operator of communication facility 130 or by another entity.

The facilitator 1276 preferably provides at least one of coordination and financial arrangements between one or more of a broadcast facility 100 (FIG. 1) a user, a supplier of goods or services 1278 and various elements of communication facility 130 (FIG. 1) such as database 126, server 119 and telephone center 124. Though it is appreciated that the facilitator 1276 may provide payment arrangements between two or more of a broadcast facility 100 (FIG. 1), a user, a supplier of goods or services 1278 and an advertiser.

In the illustrated embodiment of FIG. 8F, the radio broadcast facility 100 (FIG. 1), typically a FM broadcast facility having subcarrier broadcast functionality, such as via a RDS, RBDS or a DARC protocol, includes an audio signal processor 1310, receiving an audio signal input, as well as a data signal processor 1312, receiving a data signal input. Outputs of processors 1310 and 1312 are supplied to a signal synchronizer 1314, which combines these outputs with suitable synchronization therebetween and supplies a combined output to a transmitter 1316.

As illustrated in FIG. 1, the broadcast message, preferably includes an audible audio content portion and an inaudible non-audio subcarrier content portion.

The broadcast message may be received, for example, by a radio 106 (FIG. 1), typically located in a vehicle. As seen in FIG. 8F, the radio is a standard radio including a signal receiver 1320 which outputs to a signal separator 1322, which is operative to separate the received signal into audio and data portions which are processed respectively by an audio signal processor 1324 and a data signal processor 1326. The output of the audio signal processor 1324 may be heard by a user via a speaker, such as speaker 110 (FIG. 1) and the output of the data signal processor 1326 may provide a visible data output to a suitable radio display, such as display 112 (FIG. 1).

It is typical of such radios 106 as illustrated in FIG. 1 that a local signal is transmitted from the signal receiver 1320 over short distances, typically 3 ft. This local signal is detected by a local signal tuner device 1322 not shown in FIG. 1 but that may reside in the radio 106 FIG. 1), in the mobile communicator 114 (FIG. 1), or in close proximity to these.

The local signal issuing from radio 106 is detected by a local signal receiver 1324 that configures a tuner 1326 to the identical frequency of the signal receiver 1320 in radio 106 (FIG. 1). This allows the signal receiver 1328 to receive the identical broadcast message as signal receiver 1320. The tuned frequency number can be made visible on a display such as an LED display (not shown). It is a particular feature of the present invention that the frequency of the tuner 1326 maybe manually locked by means of a frequency lock 1330 via a switch 1332 operated by an operator interface 1334, typically a touch button.

The signal receiver 1328 passes on the signal received from the transmitter 1316 to a signal separator 1336 that separates a non-audio, non-visible output from the audio signal. The non-audio, non-visible output is received by a data signal processor 1338 and is subsequently received by a data signal separator 1340 the output of which is received by a transceiver 1342.

The non-audio, non-visible output transmitted by transceiver 1342 may be received by a transceiver 1344 forming part of a mobile communicator 114 (FIG. 1). It is appreciated that transceivers 1342 and 1344 and the communication link therebetween may be replaced by any other suitable wired or wireless communication link, such as a ohmic connection, an IR communication link, a Bluetooth communication link or another short range communication link.

The output from the transceiver 1344 may be stored in a signal storage medium 1346. Such storage may be but need not necessarily be controlled by a switch 1348 controlled by an operator using an operator interface 1350.

In the example shown in FIG. 1, the operator interface 1350 may be speech actuated, such that when the operator says "CAPTURE" as illustrated in FIG. 1, the non-audio, non-visible output of data signal separator is stored in storage medium 1346.

Additionally or alternatively, a switch 1352 may be provided at an output of storage medium 1346 and may be actuated by an operator using operator interface 1350. The operation of switch 1352 may be similar to that of switch 1348, the only difference in their effect being that switch 1348 governs storage of the non-audio, non-visible output, while switch 1352 governs supply thereof to a data signal processor 1362.

The output of the data signal processor 1362 may be supplied to a data signal separator 1364, which may provide a visible data output which may be displayed on a screen of the mobile communicator 114 and also provides a contact information output, which may be stored in a signal storage medium 1366. In the context of FIG. 1, the contact information output may include, for example, a web address such as "WWW.MWATER/FREE.com" and/or a telephone number. Such storage may be, but need not necessarily be, governed by a switch 1368 controlled by an operator using an operator interface 1370.

In the example shown in FIG. 1, the operator interface 1370 may be speech actuated, such that when the operator says "CONTACT" as illustrated in FIG. 1, the contact information output is stored in storage medium 1366.

Additionally or alternatively, a switch 1372 may be provided at an output of storage medium 1366 and may be actuated by an operator using operator interface 1370. The operation of switch 1372 may be similar to that of switch 1368, the only difference in their effect being that switch 1368 governs storage of the contact information output, while switch 1372 governs supply thereof to a transceiver 1374.

A GPS device 1375 may be associated with the mobile communicator 114 and may transmit the user's geographic coordinates to the server 119 via the transceiver 1374.

Transceiver 1374 preferably includes a wireless modem which is enabled to communicate via the Internet with server 119 (FIG. 1), which in turn communicates with database 126 (FIG. 1).

In the illustrated embodiment, which is described functionally hereinabove with reference to FIG. 1, the user may at any time actuate the mobile communicator 114 to establish contact via transceiver 1374 on the basis of part or all of the contact information output from data signal separator 1364.

FIG. 1 shows an example wherein a user actuates the mobile communicator 114, typically embodied as a web-enabled wireless personal digital assistant to access a web site identified by the web address "WWW.MWATER/FREE.COM" which forms part of the content information output. In the illustrated embodiment, this access is achieved via a portal, embodied in server 119, which is accessed via the Internet by use of a non product-specific web address, such as "WWW.PORTAL.COM". The non product-specific web address need not be broadcast and is typically stored in the mobile communicator 114, such as by means of a cookie. Alternatively, the non product-specific web address may be broadcast as part of content portion 104 (FIG. 1) or otherwise.

Once the user has accessed the web site identified by the web address "WWW.MWATER/FREE.COM", the user may obtain information or, as shown in FIG. 1, enter into any appropriate commercial transaction, such as one which results in water being delivered to the residence of the user.

In accordance with a preferred embodiment of the present invention, database 126 may receive all or part of the content information output from data signal separator 1364 via a computer network communication, and from data signal processor 1362. Database 126 is preferably operative to collect and correlate user information and activities in connection with given contact information and to communicate with a facilitator 1378. The facilitator 1378 may have multiple functionalities which may be combined in a single entity or divided among various separate entities. The facilitator preferably interfaces among and between a broadcast facility 100 (FIG. 1) a user, a supplier of goods or services 1376 and various elements of communication facility 130 (FIG. 1) such as database 126, server 119 and telephone center 124. The facilitator 1378 may be operated by the operator of communication facility 130 or by another entity.

The facilitator 1378 preferably provides at least one of coordination and financial arrangements between one or more of a broadcast facility 100 (FIG. 1) a user, a supplier of goods or services 1376 and various elements of communication facility 130 (FIG. 1) such as database 126, server 119 and telephone center 124. Though it is appreciated that the facilitator 1378 may provide payment arrangements between two or more of a broadcast facility 100 (FIG. 1), a user, a supplier of goods or services 1376 and an advertiser.

Figure 9B:
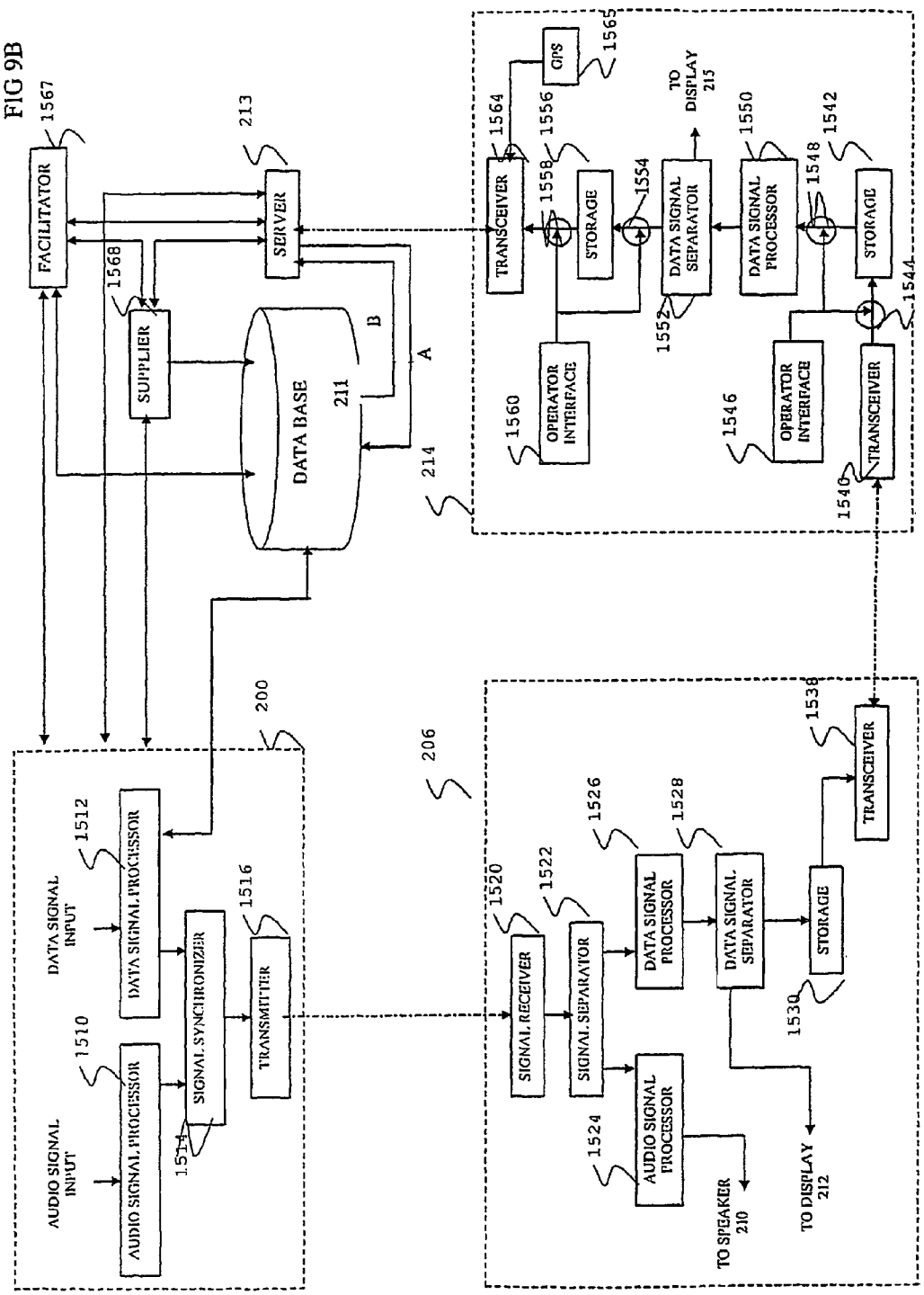

Reference is now made to FIGS. 9A, 9B, 9C, 9D, 9E & 9F are simplified functional block diagrams of six alternative embodiments of the system of FIG. 2. As seen in FIG. 9A, there is provided a system and methodology of the type shown in FIG. 2, wherein a commercial message is broadcast by a radio broadcast facility, such as an FM or digital broadcast facility.

In the illustrated embodiment of FIG. 9A, the radio broadcast facility 200 (FIG. 2), typically a FM broadcast facility having subcarrier broadcast functionality, such as via a RDS, RBDS or a DARC protocol, includes an audio signal processor 1410, receiving an audio signal input, as well as a data signal processor 1412, receiving a data signal input. Outputs of processors 1410 and 1412 are supplied to a signal synchronizer 1414, which combines these outputs with suitable synchronization therebetween and supplies a combined output to a transmitter 1416.

As illustrated in FIG. 2, the broadcast message preferably includes an audible audio content portion and an inaudible non-audio content portion.

The broadcast message may be received, for example, by a radio 206 (FIG. 2), typically located in a vehicle. As seen in FIG. 9A, the radio is a non-standard radio including a signal receiver 1420 which outputs to a signal separator 1422, which is operative to separate the received signal into audio and data portions which are processed respectively by an audio signal processor 1424 and a data signal processor 1426. The output of the audio signal processor 1424 may be heard by a user via a speaker, such as speaker 208 (FIG. 2).

The output of the data signal processor 1426 is supplied to a data signal separator 1428 which may provide a visible output to a suitable radio display, such as display 209 (FIG. 2). It is a particular feature of the present invention that the data signal separator 1428 also provides a non-audio, non-visible output, which may be stored in a signal storage medium 1430. Such storage may be, but need not necessarily be, governed by a switch 1432 controlled by an operator using an operator interface 1434.

In the example shown in FIG. 9A, the operator interface 1434 may be speech actuated, such that when the operator says "CAPTURE" as illustrated in FIG. 2, the non-audio, non-visible output of data signal separator 1428 is stored in storage medium 1430.

Additionally or alternatively, a switch 1436 may be provided at an output of storage medium 1430 and may be actuated by an operator using operator interface 1434. The operation of switch 1436 may be similar to that of switch 1432, the only difference in their effect being that switch 1432 governs storage of the non-audio, non-visible output, while switch 1436 governs supply thereof to a transceiver 1438.

The non-audio, non-visible output transmitted by transceiver 1438 may be received by a transceiver 1440 forming part of a mobile communicator 214 (FIG. 2). It is appreciated that transceivers 1438 and 1440 and the communication link therebetween may be replaced by any other suitable wired or wireless communication link, such as a ohmic connection, an IR communication link, a Bluetooth communication link or another short range communication link.

The output of transceiver 1440 is preferably supplied to a data signal processor 1442. The output of the data signal processor 1442 may be supplied to a data signal separator 1444, which may provide a visible data output which may be displayed on a screen 216 of the mobile communicator 214. The output from the data signal separator 1444 is typically a product-specific code which, in the context of FIG. 2 is shown as #1234#, and which may be stored in a signal storage medium 1446. As distinct from the embodiment in FIG. 8A, non product-specific contact information is not necessarily contained within the non-audio, non-visible output and may be provided by means other than the inaudible non-audio content portion, such as by a cookie. The non product-specific contact information may also be stored in signal storage medium 1446. In the context of FIG. 2, the non-product specific contact information may include, for example, a web address such as "WWW.PORTAL.COM" and/or a telephone number, such as "1-800-864-2222". Such storage may be, but need not necessarily be, governed by a switch 1448 controlled by an operator using an operator interface 1450.

In the example shown in FIG. 9A, the operator interface 1450 may be speech actuated, such that when the operator says "CONTACT" as illustrated in FIG. 2, the product-specific contact information output of data signal separator 1444 is stored in storage medium 1446.

Additionally or alternatively, a switch 1452 may be provided at an output of storage medium 1446 and may be actuated by an operator using operator interface 1450. The operation of switch 1452 may be similar to that of switch 1448, the only difference in their effect being that switch 1448 governs storage of the product-specific contact information output, while switch 1452 governs supply of both the product-specific contact information and the non product-specific to a transceiver 1454.

Transceiver 1454 preferably includes a wireless modem which is enabled to communicate via the Internet with a server 213 (FIG. 2), which in turn communicates with database 211 (FIG. 2).

A GPS device 1455 may be associated with the mobile communicator may transmit the user's geographic coordinates to the server 213.

In the illustrated embodiment, which is described functionally hereinabove with reference to FIG. 2, the user may at any time actuate the mobile communicator 214 (FIG. 2) to establish contact via transceiver 1454 on the basis of part or all of the product-specific contact information output from data signal separator 1444 and the non product-specific contact information preferably stored in the storage medium 1446.

FIG. 2 shows an example wherein a user actuates the mobile communicator 214, typically embodied as a web-enabled wireless personal digital assistant, to access a product-specific web site 230 (FIG. 2) identified by the web address WWW.MWATER/FREE.COM. In the illustrated embodiment, this access is achieved via a non product-specific server, embodied in server 213, which is accessed via the Internet by use of a non product-specific web address, such as "WWW.PORTAL.COM".

Upon accessing the non product-specific web server 213, the product-specific contact information, such as a code, may be transferred to the database 211 via the pathway designated as "A". The code may be matched against the full product-specific information, shown as 208 in FIG. 2. The product-specific contact information may be transferred from the database 211 via the pathway designated as "B" to the non product-specific server 213. The non product-specific server 213 allows contact to be established between the user and a product-specific server 217 (FIG. 2). Once the user has accessed the product-specific web site identified by the web address "WWW.MWATER/FREE.COM", the user may obtain information or, as shown in FIG. 2, enter into any appropriate commercial transaction, such as one which results in water being delivered to the residence of the user.

In accordance with a preferred embodiment of the present invention, database 211 may receive all or part of the content information output from data signal separator 1444 via a computer network communication, as from data signal processor 1412. Database 211 is preferably operative to collect and correlate user information and activities in connection with given contact information and to communicate with a facilitator 1456. The facilitator 1456 may have multiple functionalities which may be combined in a single entity or divided among various separate entities. The facilitator 1456 preferably interfaces among and between a broadcast facility 200 (FIG. 2) a user, a supplier of goods or services 1458 and various elements of communication facility 226 (FIG. 2) such as database 211, server 213 and telephone center 224. The facilitator 1456 may be operated by the operator of communication facility 226 or by another entity.

The facilitator 1456 preferably provides at least one of coordination and financial arrangements between one or more of a broadcast facility 200 (FIG. 2) a user, a supplier of goods or services 1458 and various elements of communication facility 226 (FIG. 2) such as database 211, server 213 and telephone center 224. Thus it is appreciated that the facilitator may provide payment arrangements between two or more of a broadcast facility 200 (FIG. 2), a user, a supplier of goods or services 1458 and an advertiser.

Turning to FIG. 9B, there is provided a system and methodology of the type shown in FIG. 2, wherein a message, here a commercial message, is broadcast, typically by a radio broadcast facility, such as an FM broadcast facility.

In the illustrated embodiment of FIG. 9B, the radio broadcast facility 200 (FIG. 2), typically a FM broadcast facility having subcarrier broadcast functionality, such as via a RDS, RBDS or a DARC protocol, includes an audio signal processor 1510, receiving an audio signal input, as well as a data signal processor 1512, receiving a data signal input. Outputs of processors 1510 and 1512 are supplied to a signal synchronizer 1514, which combines these outputs with suitable synchronization therebetween and supplies a combined output to a transmitter 1516.

As illustrated in FIG. 2, the broadcast message, preferably includes an audible audio content portion and an inaudible non-audio content portion.

The broadcast message may be received, for example, by a radio 206 (FIG. 2), typically located in a vehicle. As seen in FIG. 9B, the radio is a non-standard radio including a signal receiver 1520 which outputs to a signal separator 1522, which is operative to separate the received signal into audio and data portions which are processed respectively by an audio signal processor 1524 and a data signal processor 1526. The output of the audio signal processor 1524 may be heard by a user via a speaker, such as speaker 208 (FIG. 2).

The output of the data signal processor 1526 is supplied to a data signal separator 1528 which may provide a visible data output to a suitable radio display, such as display 209 (FIG. 2). It is a particular feature of the present invention that the data signal separator 1528 also provides a non-audio, non-visible output, which may be stored in a signal storage medium 1530 and is provided to a transceiver 1538.

The non-audio, non-visible output transmitted by transceiver 1538 may be received by a transceiver 1540 forming part of a mobile communicator 214 (FIG. 2). It is appreciated that transceivers 1538 and 1540 and the communication link therebetween may be replaced by any other suitable wired or wireless communication link, such as a ohmic connection, an IR communication link, a Bluetooth communication link or another short range communication link.

The output of transceiver 1540 may be supplied to a storage medium 1542. Such storage may be, but need not necessarily be, governed by a switch 1544 controlled by an operator using an operator interface 1546.

In the example shown in FIG. 9B, the operator interface 1546 may be speech actuated, such that when the operator says "CAPTURE" as illustrated in FIG. 2, the non-audio, non-visible output of data signal separator is stored in storage medium 1542.

Additionally or alternatively, a switch 1548 may be provided at an output of storage medium 1542 and may be actuated by an operator using operator interface 1546. The operation of switch 1548 may be similar to that of switch 1544, the only difference in their effect being that switch 1548 governs storage of the non-audio, non-visible output, while switch 1544 governs supply thereof to a data signal processor 1550.

The output of the data signal processor 1550 may be supplied to a data signal separator 1554, which may provide a visible data output which may be displayed on a screen 216 of the mobile communicator 214. The output from the data signal separator 1554 is typically a product-specific code which, in the context of FIG. 2 is shown as #1234#, and which may be stored in a signal storage medium 1556. As distinct from the embodiment in FIG. 8B, non product-specific contact information is not necessarily contained within the non-audio, non-visible output and may be provided by means other than the inaudible non-audio content portion, such as by a cookie. The non product-specific contact information may also be stored in signal storage medium 1556. In the context of FIG. 2, the non-product specific contact information may include, for example, a web address such as "WWW.POR-TAL.COM" and/or a telephone number, such as 1-800-864-2222. Such storage may be, but need not necessarily be, governed by a switch 1558 controlled by an operator using an operator interface 1560.

In the example shown in FIG. 9B, the operator interface 1560 may be speech actuated, such that when the operator says "CONTACT" as illustrated in FIG. 2, the product-specific contact information output of data signal separator 1554 is stored in storage medium 1556.

Additionally or alternatively, a switch 1562 may be provided at an output of storage medium 1556 and may be actuated by an operator using operator interface 1560. The operation of switch 1562 may be similar to that of switch 1558, the only difference in their effect being that switch 1558 governs storage of the product-specific contact information output, while switch 1562 governs supply of both the product-specific contact information and the non product-specific to a transceiver 1564.

Transceiver 1564 preferably includes a wireless modem which is enabled to communicate via the Internet with a server 213 (FIG. 2), which in turn communicates with database 211 (FIG. 2).

A GPS device 1565 may be associated with the mobile communicator may transmit the user's geographic coordinates to the server.

In the illustrated embodiment, which is described functionally hereinabove with reference to FIG. 2, the user may at any time actuate the mobile communicator 214 (FIG. 2) to establish contact via transceiver 1564 on the basis of part or all of the product-specific contact information output from data signal separator 1554 and the non product-specific contact information preferably stored in the storage medium 1556.

FIG. 2 shows an example wherein a user actuates the mobile communicator 214, typically embodied as a web-enabled wireless personal digital assistant, to access a product-specific web site 230 (FIG. 2) identified by the web address WWW.MWATER/FREE.COM. In the illustrated embodiment, this access is achieved via a non product-specific server, embodied in server 213, which is accessed via the Internet by use of a non product-specific web address, such as "WWW.PORTAL.COM".

Upon accessing the non product-specific web server 213, the product-specific contact information, such as a code, may be transferred to the database 211 via the pathway designated as A. The code may be matched against the full product-specific information, shown as 210 in FIG. 2. The product-specific contact information may be transferred from the database 211 via the pathway designated as B to the non product-specific server 213. The non product-specific server 213 allows contact to be established between the user and a product-specific server 217 (FIG. 2). Once the user has accessed the product-specific web site identified by the web address "WWW.MWATER/FREE.COM", the user may obtain information or, as shown in FIG. 2, enter into any appropriate commercial transaction, such as one which results in water being delivered to the residence of the user.

In accordance with a preferred embodiment of the present invention, database 211 may receive all or part of the content information output from data signal separator 1554 via a computer network communication, as from data signal processor 1512. Database 211 is preferably operative to collect and correlate user information and activities in connection with given contact information and to communicate with a facilitator 1567. The facilitator 1567 may have multiple functionalities which may be combined in a single entity or divided among various separate entities. The facilitator 1567 preferably interfaces among and between a broadcast facility 200 (FIG. 2) a user, a supplier of goods or services 1568 and various elements of communication facility 226 (FIG. 2) such as database 211, server 213 and telephone center 224. The facilitator 1567 may be operated by the operator of communication facility 226 or by another entity.

The facilitator preferably provides at least one of coordination and financial arrangements between one or more of a broadcast facility 200 (FIG. 2) a user, a supplier of goods or services 1568 and various elements of communication facility 226 (FIG. 2) such as database 211, server 213 and telephone center 224. Thus it is appreciated that the facilitator 1567 may provide payment arrangements between two or more of a broadcast facility 200 (FIG. 2), a user, a supplier of goods or services 1568 and an advertiser.

In the illustrated embodiment of FIG. 9C, the radio broadcast facility 200 (FIG. 2), typically a digital broadcast facility, includes a voice to data processor 1610, receiving an audio signal input. The output of processor 1610 and a data signal input are supplied to a digital signal processor 1614, which combines these outputs with suitable synchronization therebetween and supplies a combined output to a digital transmitter 1616.

As illustrated in FIG. 2, the broadcast message, preferably includes an audible audio content portion, and an inaudible non-audio content portion.

The digital broadcast message may be received, for example, by a radio 206 (FIG. 2), typically located in a vehicle. As seen in FIG. 9C, the radio is a non-standard digital radio including a digital signal receiver 1620 which outputs to a digital signal processor 1622. The processed signal is delivered to a digital signal separator 1624 which is operative to separate the received digital signal into audio and data portions which are processed respectively by a data to voice processor 1626 and a data signal separator 1628. The output of the data to voice processor 1626 may be heard by a user via a speaker, such as speaker 208 (FIG. 2).

The output of the data signal separator 1628 may provide a visible data output to a suitable radio display, such as display 209 (FIG. 2). It is a particular feature of the present invention that the data signal separator 1628 also provides a non-audio, non-visible output, which may be stored in a signal storage medium 1630. Such storage may be, but need not necessarily be, governed by a switch 1632 controlled by an operator using an operator interface 1634.

In the example shown in FIG. 2, the operator interface 1634 may be speech actuated, such that when the operator says "CAPTURE" as illustrated in FIG. 2, the non-audio, non-visible output of data signal separator is stored in storage medium 1630.

Additionally or alternatively, a switch 1636 may be provided at an output of storage medium 1630 and may be actuated by an operator using operator interface 1634. The operation of switch 1636 may be similar to that of switch 1632, the only difference in their effect being that switch 1632 governs storage of the non-audio, non-visible output, while switch 1636 governs supply thereof to a transceiver 1638.

The non-audio, non-visible output transmitted by transceiver 1638 may be received by a transceiver 1640 forming part of a mobile communicator 214 (FIG. 2). It is appreciated that transceivers 1638 and 1640 and the communication link therebetween may be replaced by any other suitable wired or wireless communication link such as a ohmic connection, an IR communication link, a Bluetooth communication link or another short range communication link.

The output of transceiver 1640 is preferably supplied to a data signal processor 1642. The output of the data signal processor 1642 may be supplied to a data signal separator 1644, which may provide a visible data output which may be displayed on a screen 216 of the mobile communicator 214. The output from the data signal separator 1644 is typically a product-specific code which, in the context of FIG. 2 is shown as #1234#, and which may be stored in a signal storage medium 1646. As distinct from the embodiment in FIG. 8C, non product-specific contact information is not necessarily contained within the non-audio, non-visible output and may be provided by means other than the inaudible non-audio content portion, such as by a cookie. The non product-specific contact information may also be stored in signal storage medium 1646. In the context of FIG. 2, the non-product specific contact information may include, for example, a web address such as "WWW.PORTAL.COM" and/or a telephone number, such as 1-800-864-2222. Such storage may be, but need not necessarily be, governed by a switch 1648 controlled by an operator using an operator interface 1650.

In the example shown in FIG. 9C, the operator interface 1650 may be speech actuated, such that when the operator says "CONTACT" as illustrated in FIG. 2, the product-specific contact information output of data signal separator 1644 is stored in storage medium 1646.

Additionally or alternatively, a switch 1652 may be provided at an output of storage medium 1646 and may be actuated by an operator using operator interface 1650. The operation of switch 1652 may be similar to that of switch 1648, the only difference in their effect being that switch 1648 governs storage of the product-specific contact information output, while switch 1652 governs supply of both the product-specific contact information and the non product-specific to a transceiver 1654.

Transceiver 1654 preferably includes a wireless modem which is enabled to communicate via the Internet with a server 213 (FIG. 2), which in turn communicates with database 211 (FIG. 2).

A GPS device 1655 may be associated with the mobile communicator may transmit the user's geographic coordinates to the server.

In the illustrated embodiment, which is described functionary hereinabove with reference to FIG. 2, the user may at any time actuate the mobile communicator 214 (FIG. 2) to establish contact via transceiver 1654 on the basis of part or all of the product-specific contact information output from data signal separator 1644 and the non product-specific contact information preferably stored in the storage medium 1646.

FIG. 2 shows an example wherein a user actuates the mobile communicator 214, typically embodied as a web-enabled wireless personal digital assistant, to access a product-specific web site 217 (FIG. 2) identified by the web address WWW.MWATER/FREE.COM. In the illustrated embodiment, this access is achieved via a non product-specific server, embodied in server 213, which is accessed via the Internet by use of a non product-specific web address, such as "WWW.PORTAL.COM".

Upon accessing the non product-specific web server 213, the product-specific contact information, such as a code, may be transferred to the database 211 via the pathway designated as A. The code may be matched against the full product-specific information, shown as 210 in FIG. 2. The product-specific contact information may be transferred from the database 211 via the pathway designated as B to the non product-specific server 217. The non product-specific server 213 allows contact to be established between the user and a product-specific server 228 (FIG. 2). Once the user has accessed the product-specific web site identified by the web address "WWW.MWATER/FREE.COM", the user may obtain information or, as shown in FIG. 2, enter into any appropriate commercial transaction, such as one which results in water being delivered to the residence of the user.

In accordance with a preferred embodiment of the present invention, database 211 may receive all or part of the content information output from data signal separator 1644 via a computer network communication, as from data signal processor 1612. Database 211 is preferably operative to collect and correlate user information and activities in connection with given contact information and to communicate with a facilitator 1656. The facilitator 1656 may have multiple functionalities which may be combined in a single entity or divided among various separate entities. The facilitator 1656 preferably interfaces among and between a broadcast facility 200 (FIG. 2) a user, a supplier of goods or services 1658 and various elements of communication facility 226 (FIG. 2) such as database 211, server 213 and telephone center 224. The facilitator 1656 may be operated by the operator of communication facility 226 or by another entity.

The facilitator 1656 preferably provides at least one of coordination and financial arrangements between one or more of a broadcast facility 200 (FIG. 2) a user, a supplier of goods or services 1658 and various elements of communication facility 226 (FIG. 2) such as database 211, server 213 and telephone center 224. Thus it is appreciated that the facilitator may provide payment arrangements between two or more of a broadcast facility 200 (FIG. 2), a user, a supplier of goods or services 1658 and an advertiser.

In the illustrated embodiment of FIG. 9D, the radio broadcast facility 200 (FIG. 2), typically a digital broadcast facility, includes a voice to data processor 1710, receiving an audio signal input. Output of processor 1710 and data signal input are supplied to a signal processor 1714, which combines these outputs with suitable synthesis therebetween and supplies a combined output to a transmitter 1716.

As illustrated in FIG. 2, the digitized broadcast message, preferably includes an audible audio content portion and an inaudible non-audio content portion.

The broadcast message may be received, for example, by a radio 206 (FIG. 2), typically located in a vehicle. As seen in FIG. 9D, the radio is a non-standard radio including a signal receiver 1720 which outputs to a signal processor 1722. The processed signal is delivered to a signal separator 1724 which is operative to separate the received signal into audio and data portions which are processed respectively by a data to voice processor 1726 and a data signal separator 1728. The output of the data to voice processor 1726 may be heard by a user via a speaker, such as speaker 208 (FIG. 2).

The output of the signal processor 1724 is supplied to a data signal separator 1728 which may provide a visible data output to a suitable radio display, such as display 209 (FIG. 2). The output from the data signal separator 1728 may be supplied to a storage medium 1730. It is a particular feature of the present invention that the data signal separator 1728 also provides a non-audio, non-visible output, which may be provided to a transceiver 1738.

The non-audio, non-visible output transmitted by transceiver 1738 may be received by a transceiver 1740 forming part of a mobile communicator 214 (FIG. 2). It is appreciated that transceivers 1738 and 1740 and the communication link therebetween may be replaced by any other suitable wired or wireless communication link, such as a ohmic connection, an IR communication link, a Bluetooth communication link or another short range communication link.

The output of transceiver 1740 may be supplied to a storage medium 1742. but need not necessarily be, governed by a switch 1744 controlled by an operator using an operator interface 1746.

In the example shown in FIG. 9D, the operator interface 1746 may be speech actuated, such that when the operator says "CAPTURE" as illustrated in FIG. 2, the non-audio, non-visible output of data signal separator is stored in storage medium 1742.

Additionally or alternatively, a switch 1748 may be provided at an output of storage medium 1742 and may be actuated by an operator using operator interface 1746. The operation of switch 1748 may be similar to that of switch 1744, the only difference in their effect being that switch 1748 governs storage of the non-audio, non-visible output, while switch 1744 governs supply thereof to a data signal processor 1750.

The output of the data signal processor 1750 may be supplied to a data signal separator 1752, which may provide a visible data output which may be displayed on a screen 216 of the mobile communicator 214. The output from the data signal separator 1752 is typically a product-specific code which, in the context of FIG. 2 is shown as #1234#, and which may be stored in a signal storage medium 1756. As distinct from the embodiment in FIG. 8D, non product-specific contact information is not necessarily contained within the non-audio, non-visible output and may be provided by means other than the inaudible non-audio content portion, such as by a cookie. The non product-specific contact information may also be stored in signal storage medium 1756. In the context of FIG. 2, the non-product specific contact information may include, for example, a web address such as "WWW.PORTAL.COM" and/or a telephone number, such as 1-800-864-2222. Such storage may be, but need not necessarily be, governed by a switch 1758 controlled by an operator using an operator interface 1760.

In the example shown in FIG. 9D, the operator interface 1760 may be speech actuated, such that when the operator says "CONTACT" as illustrated in FIG. 2, the product-specific contact information output of data signal separator 1754 is stored in storage medium 1756.

Additionally or alternatively, a switch 1762 may be provided at an output of storage medium 1756 and may be actuated by an operator using operator interface 1760. The operation of switch 1762 may be similar to that of switch 1758, the only difference in their effect being that switch 1758 governs storage of the product-specific contact information output, while switch 1762 governs supply of both the product-specific contact information and the non product-specific to a transceiver 1764.

Transceiver 1764 preferably includes a wireless modem which is enabled to communicate via the Internet with a server 213 (FIG. 2), which in turn communicates with database 211 (FIG. 2).

A GPS device 1765 may be associated with the mobile communicator may transmit the user's geographic coordinates to the server.

In the illustrated embodiment, which is described functionally hereinabove with reference to FIG. 2, the user may at any time actuate the mobile communicator 214 (FIG. 2) to establish contact via transceiver 1764 on the basis of part or all of the product-specific contact information output from data signal separator 1754 and the non product-specific contact information preferably stored in the storage medium 1756.

FIG. 2 shows an example wherein a user actuates the mobile communicator 214, typically embodied as a web-enabled wireless personal digital assistant, to access a product-specific web site 230 (FIG. 2) identified by the web address WWW.MWATER/FREE.COM. In the illustrated embodiment, this access is achieved via a non product-specific server, embodied in server 213, which is accessed via the Internet by use of a non product-specific web address, such as "WWW.PORTAL.COM".

Upon accessing the non product-specific web server 213, the product-specific contact information, such as a code, may be transferred to the database 211 via the pathway designated as A. The code may be matched against the full product-specific information, shown as 210 in FIG. 2. The product-specific contact information may be transferred from the database 211 via the pathway designated as B to the non product-specific server 213. The non product-specific server 213 allows contact to be established between the user and a product-specific server 217 (FIG. 2). Once the user has accessed the product-specific web site identified by the web address "WWW.MWATER/FREE.COM", the user may obtain information or, as shown in FIG. 2, enter into any appropriate commercial transaction, such as one which results in water being delivered to the residence of the user.

In accordance with a preferred embodiment of the present invention, database 211 may receive all or part of the content information output from data signal separator 1754 via a computer network communication, as from data signal processor 1712. Database 211 is preferably operative to collect and correlate user information and activities in connection with given contact information and to communicate with a facilitator 1767. The facilitator 1767 may have multiple functionalities which may be combined in a single entity or divided among various separate entities. The facilitator preferably interfaces among and between a broadcast facility 200 (FIG. 2) a user, a supplier of goods or services 1768 and various elements of communication facility 226 (FIG. 2) such as database 211, server 213 and telephone center 224. The facilitator 1767 may be operated by the operator of communication facility 226 or by another entity.

The facilitator preferably provides at least one of coordination and financial arrangements between one or more of a broadcast facility 200 (FIG. 2) a user, a supplier of goods or services 1768 and various elements of communication facility 226 (FIG. 2) such as database 211, server 213 and telephone center 224. Thus it is appreciated that the facilitator may provide payment arrangements between two or more of a broadcast facility 200 (FIG. 2), a user, a supplier of goods or services 1768 and an advertiser. In the illustrated embodiment of FIG. 9E, the radio broadcast facility 200 (FIG. 2), typically a FM broadcast facility having subcarrier broadcast functionality, such as via a RDS, RBDS or a DARC protocol, includes an audio signal processor 1810, receiving an audio signal input, as well as a data signal processor 1812, receiving a data signal input. Outputs of processors 1810 and 1812 are supplied to a signal synchronizer 1814, which combines these outputs with suitable synchronization therebetween and supplies a combined output to a transmitter 1816.

As illustrated in FIG. 2, the broadcast message, preferably includes an audible audio content portion and an inaudible non-audio content portion.

The broadcast message may be received, for example, by a radio 206 (FIG. 2), typically located in a vehicle. As seen in FIG. 9E, the radio may be a conventional RDS enabled radio, such as a JVC CH-KP950R, including a signal receiver 1820 which outputs to a signal separator 1822, which is operative to separate the received signal into audio and data portions which are processed respectively by an audio signal processor 1824 and a data signal processor 1826. The output of the audio signal processor 1824 may be heard by a user via a speaker, such as speaker 208 (FIG. 2) and the output of the data signal processor 1826 may provide a visible data output to a suitable radio display, such as display 209 (FIG. 2). Alternatively, radio 206 may be a conventional non-RDS enabled radio, such as a Pioneer KEH-1900, which does not include a signal separator or a data signal processor.

It is typical of conventional radios 206 that a local signal is transmitted from the signal receiver 1820 over short distances typically 3 feet. In accordance with a preferred embodiment of the present invention, this local signal is employed by a wireless interface assembly 1827 to provide contact information from the radio 206 to the mobile communicator 214 (FIG. 2).

Interface assembly 1827, which is not shown in FIG. 2, may reside anywhere within the local signal reception range of the radio 206 and may be a separate element or may be integrated with a mobile communicator or in any other suitable vehicle element.

Interface assembly 1827 preferably includes a local signal receiver 1828, which receives the local signal from radio 206 and configures a tuner 1829 to the identical frequency of the signal receiver 1820 in radio 206 (FIG. 2). This allows the signal receiver 1830 in the interface assembly to receive the identical broadcast message as signal receiver 1820 from transmitter 1816. The tuned frequency number can be made visible on a display such as an LED display (not shown). It is a particular feature of the present invention that the frequency of the tuner 1829 may be manually locked by means of a frequency lock 1831 via a switch 1832 operated by an operator interface 1834, typically a touch button. Alternatively the frequency lock 1831 maybe operated automatically.

The signal receiver 1828 provides the signal received from the transmitter 1816 to a signal separator 1836 that isolates therefrom a non-audio, non-visible output. A data signal processor receives the non-audio, non-visible output 1838 which outputs to a data signal separator 1840, the output of which may be stored in a signal storage medium 1842. Such storage may be but need not necessarily be governed by a switch 1844 controlled by an operator using an operator interface 1846.

In the example shown in FIG. 9E, the operator interface 1846 may be speech actuated, such that when the operator says "CAPTURE" as illustrated in FIG. 2, the non-audio, non-visible output of data signal separator is stored in storage medium 1842.

Additionally or alternatively, a switch 1848 may be provided at an output of storage medium 1842 and may be actuated by an operator using operator interface 1846. The operation of switch 1848 may be similar to that of switch 1844, the only difference in their effect being that switch 1844 governs storage of the non-audio, non-visible output, while switch 1848 governs supply thereof to a transceiver 1850.

The non-audio, non-visible output transmitted by transceiver 1850 may be received by a transceiver 1860 forming part of a mobile communicator 214 (FIG. 2). It is appreciated that transceivers 1850 and 1860 and the communication link therebetween may be replaced by any other suitable wired or wireless communication link, such as a ohmic connection, an IR communication link, a Bluetooth communication link or another short range communication link.

The output of transceiver 1860 is preferably supplied to a data signal processor 1862. The output of the data signal processor 1862 may be supplied to a data signal separator 1864, which may provide a visible data output which may be displayed on a screen 216 of the mobile communicator 214. The output from the data signal separator 1864 is typically a product-specific code which, in the context of FIG. 2 is shown as #1234#, and which may be stored in a signal storage medium 1866. As distinct from the embodiment in FIG. 8E, non product-specific contact information is not necessarily contained within the non-audio, non-visible output and may be provided by means other than the inaudible non-audio content portion, such as by a cookie. The non product-specific contact information may also be stored in signal storage medium 1866. In the context of FIG. 2, the non-product specific contact information may include, for example, a web address such as "WWW.PORTAL.COM" and/or a telephone number, such as 1-800-864-2222. Such storage may be, but need not necessarily be, governed by a switch 1868 controlled by an operator using an operator interface 1870.

In the example shown in FIG. 9E, the operator interface 1870 may be speech actuated, such that when the operator says "CONTACT" as illustrated in FIG. 2, the product-specific contact information output of data signal separator 1864 is stored in storage medium 1866.

Additionally or alternatively, a switch 1872 may be provided at an output of storage medium 1866 and may be actuated by an operator using operator interface 1870. The operation of switch 1872 may be similar to that of switch 1868, the only difference in their effect being that switch 1868 governs storage of the product-specific contact information output, while switch 1872 governs supply of both the product-specific contact information and the non product-specific to a transceiver 1874.

Transceiver 1874 preferably includes a wireless modem which is enabled to communicate via the Internet with a server 213 (FIG. 2), which in turn communicates with database 211 (FIG. 2).

A GPS device 1875 may be associated with the mobile communicator may transmit the user's geographic coordinates to the server.

In the illustrated embodiment, which is described functionally hereinabove with reference to FIG. 2, the user may at any time actuate the mobile communicator 214 (FIG. 2) to establish contact via transceiver 1874 on the basis of part or all of the product-specific contact information output from data signal separator 1874 and the non product-specific contact information preferably stored in the storage medium 1876.

FIG. 2 shows an example wherein a user actuates the mobile communicator 214, typically embodied as a web-enabled wireless personal digital assistant, to access a product-specific web site 217 (FIG. 2) identified by the web address WWW.MWATER/FREE.COM. In the illustrated embodiment, this access is achieved via a non product-specific server, embodied in server 213, which is accessed via the Internet by use of a non product-specific web address, such as "WWW.PORTAL.COM".

Upon accessing the non product-specific web server 213, the product-specific contact information, such as a code, may be transferred to the database 211 via the pathway designated as A. The code may be matched against the full product-specific information, shown as 210 in FIG. 2. The product-specific contact information may be transferred from the database 211 via the pathway designated as B to the non product-specific server 213. The non product-specific server 213 allows contact to be established between the user and a product-specific server 217 (FIG. 2). Once the user has accessed the product-specific web site identified by the web address "WWW.MWATER/FREE.COM", the user may obtain information or, as shown in FIG. 2, enter into any appropriate commercial transaction, such as one which results in water being delivered to the residence of the user.

In accordance with a preferred embodiment of the present invention, database 211 may receive all or part of the content information output from data signal separator 1844 via a computer network communication, and from data signal processor 1812. Database 211 is preferably operative to collect and correlate user information and activities in connection with given contact information and to communicate with a facilitator 1876. The facilitator 1876 may have multiple functionalities which may be combined in a single entity or divided among various separate entities. The facilitator preferably interfaces among and between a broadcast facility 200 (FIG. 2) a user, a supplier of goods or services 1878 and various elements of communication facility 226 (FIG. 2) such as database 211, server 213 and telephone center 224. The facilitator 1876 may be operated by the operator of communication facility 226 or by another entity.

The facilitator 1876 preferably provides at least one of coordination and financial arrangements between one or more of a broadcast facility 200 (FIG. 2) a user, a supplier of goods or services 1878 and various elements of communication facility 226 (FIG. 2) such as database 211, server 213 and telephone center 224. Thus it is appreciated that the facilitator may provide payment arrangements between two or more of a broadcast facility 200 (FIG. 2), a user, a supplier of goods or services 1878 and an advertiser. In the illustrated embodiment of FIG. 9F, the radio broadcast facility 200 (FIG. 2), typically a FM broadcast facility having subcarrier broadcast functionality, such as via a RDS, RBDS or a DARC protocol, includes an audio signal processor 1910, receiving an audio signal input, as well as a data signal processor 1912, receiving a data signal input. Outputs of processors 1910 and 1912 are supplied to a signal synthesizer 1914, which combines these outputs with suitable synchronization therebetween and supplies a combined output to a transmitter 1916.

As illustrated in FIG. 2, the broadcast message, preferably includes an audible audio content portion and an inaudible non-audio content portion.

Figure 9F:
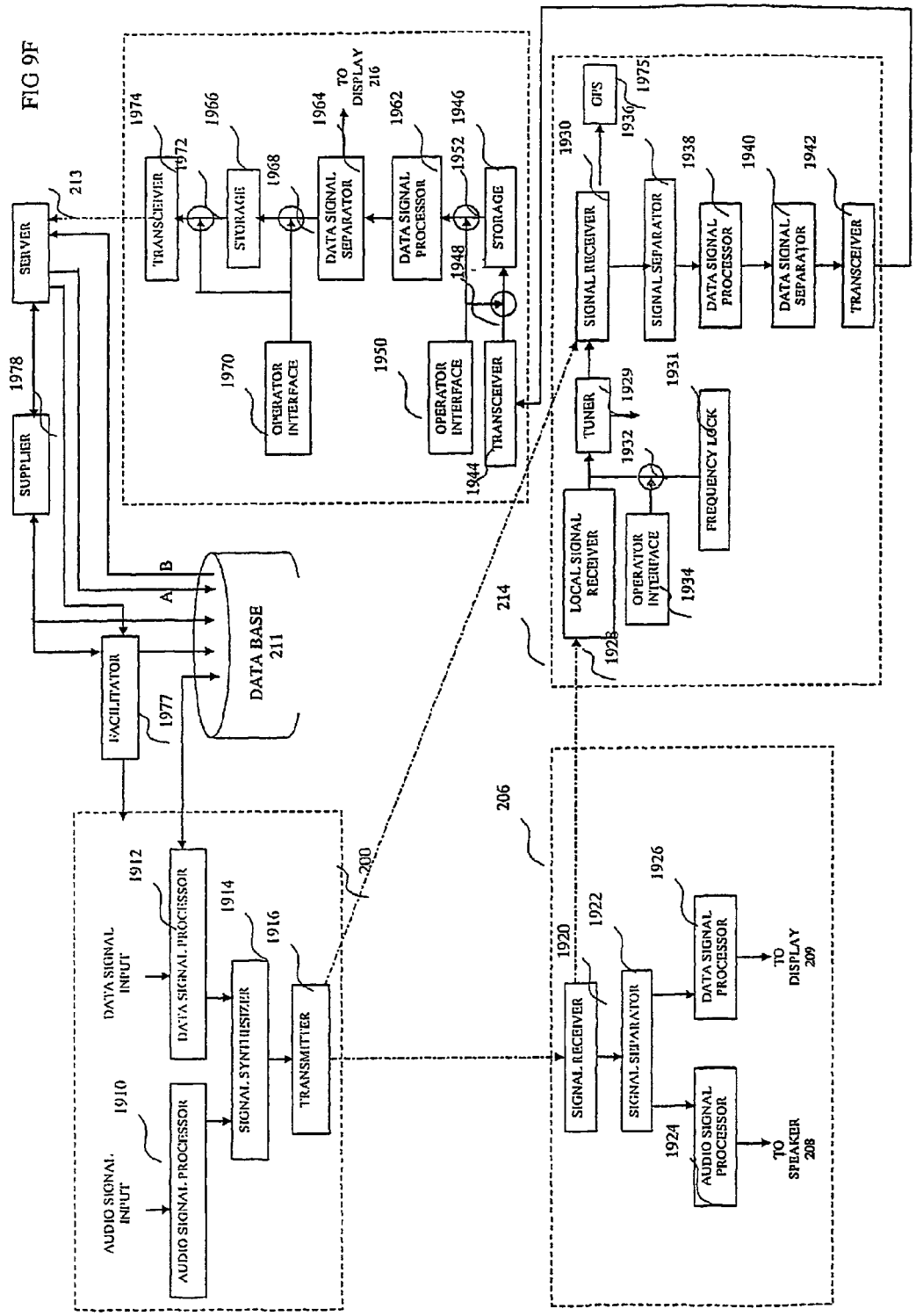

The broadcast message may be received, for example, by a radio 206 (FIG. 2), typically located in a vehicle. As seen in FIG. 9F, the radio is a standard radio including a signal receiver 1920 which outputs to a signal separator 1922, which is operative to separate the received signal into audio and data portions which are processed respectively by an audio signal processor 1924 and a data signal processor 1926. The output of the audio signal processor 1924 may be heard by a user via a speaker, such as speaker 208 (FIG. 2) and the output of the data signal processor 1926 may provide a visible data output to a suitable radio display, such as display 209 (FIG. 2).

It is typical of conventional radios 206 that a local signal is transmitted from the signal receiver 1920 over short distances typically 3 feet. In accordance with a preferred embodiment of the present invention, this local signal is employed by a wireless interface assembly 1927 to provide contact information from the radio 206 to the mobile communicator 214 (FIG. 2).

Interface assembly 1927, which is not shown in FIG. 2, may reside anywhere within the local signal reception range of the radio 206 and may be a separate element or may be integrated with a mobile communicator or in any other suitable vehicle element.

Interface assembly 1927 preferably includes a local signal receiver 1928, which receives the local signal from radio 206 and configures a tuner 1929 to the identical frequency of the signal receiver 1920 in radio 206 (FIG. 2). This allows the signal receiver 1930 in the interface assembly 1927 to receive the identical broadcast message as signal receiver 1920 from transmitter 1916. The tuned frequency number can be made visible on a display such as an LED display (not shown). It is a particular feature of the present invention that the frequency of the tuner 1929 may be manually locked by means of a frequency lock 1931 via a switch 1932 operated by an operator interface 1934, typically a touch button. Alternatively the frequency lock 1931 maybe operated automatically.

The signal receiver 1930 passes on the signal received from the transmitter 1916 to a signal separator 1936 that separates a non-audio, non-visible output from the audio signal. The non-audio, non-visible output is received by a data signal processor 1938 and is subsequently received by a data signal separator 1940 the output of which is received by a transceiver 1942.

The non-audio, non-visible output transmitted by transceiver 1942 may be received by a transceiver 1944 forming part of a mobile communicator 194 (FIG. 2). It is appreciated that transceivers 1942 and 1944 and the communication link therebetween may be replaced by any other suitable wired or wireless communication link, such as a ohmic connection, an IR communication link, a Bluetooth communication link or another short range communication link.

The output from the transceiver 1944 may be stored in a signal storage medium 1946. Such storage may be but need not necessarily be controlled by a switch 1948 controlled by an operator using an operator interface 1950.

In the example shown in FIG. 9F, the operator interface 1950 may be speech actuated, such that when the operator says "CAPTURE" as illustrated in FIG. 2, the non-audio, non-visible output of data signal separator is stored in storage medium 1946.

Additionally or alternatively, a switch 1952 may be provided at an output of storage medium 1946 and may be actuated by an operator using operator interface 1950. The operation of switch 1952 may be similar to that of switch 1948, the only difference in their effect being that switch 1948 governs storage of the non-audio, non-visible output, while switch 1952 governs supply thereof to a data signal processor 1962.

The output of the data signal processor 1962 may be supplied to a data signal separator 1964, which may provide a visible data output which may be displayed on a screen 216 of the mobile communicator 214. The output from the data signal separator 1964 is typically a product-specific code which, in the context of FIG. 2 is shown as #1234#, and which may be stored in a signal storage medium 1966. As distinct from the embodiment in FIG. 8F, non product-specific contact information is not necessarily contained within the non-audio, non-visible output and may be provided by means other than the inaudible non-audio content portion, such as by a cookie. The non product-specific contact information may also be stored in signal storage medium 1966. In the context of FIG. 2, the non-product specific contact information may include, for example, a web address such as "WWW.POR-TAL.COM" and/or a telephone number, such as 1-800-864-2222. Such storage may be, but need not necessarily be, governed by a switch 1968 controlled by an operator using an operator interface 1970.

In the example shown in FIG. 9F, the operator interface 1970 may be speech actuated, such that when the operator says "CONTACT" as illustrated in FIG. 2, the product-specific contact information output of data signal separator 1964 is stored in storage medium 1966.

Additionally or alternatively, a switch 1972 may be provided at an output of storage medium 1966 and may be actuated by an operator using operator interface 1970. The operation of switch 1972 may be similar to that of switch 1968, the only difference in their effect being that switch 1968 governs storage of the product-specific contact information output, while switch 1972 governs supply of both the product-specific contact information and the non product-specific to a transceiver 1974.

Transceiver 1964 preferably includes a wireless modem which is enabled to communicate via the Internet with a server 213 (FIG. 2), which in turn communicates with database 211 (FIG. 2).

A GPS device 1975 may be associated with the mobile communicator may transmit the user's geographic coordinates to the server.

In the illustrated embodiment, which is described functionally hereinabove with reference to FIG. 2, the user may at any time actuate the mobile communicator 214 (FIG. 2) to establish contact via transceiver 1974 on the basis of part or all of the product-specific contact information output from data signal separator 1964 and the non product-specific contact information preferably stored in the storage medium 1966.

FIG. 2 shows an example wherein a user actuates the mobile communicator 214, typically embodied as a web-enabled wireless personal digital assistant, to access a product-specific web site 217 (FIG. 2) identified by the web address WWW.MWATER/FREE.COM. In the illustrated embodiment, this access is achieved via a non product-specific server, embodied in server 213, which is accessed via the Internet by use of a non product-specific web address, such as "WWW.PORTAL.COM".

Upon accessing the non product-specific web server 213, the product-specific contact information, such as a code, may be transferred to the database 211 via the pathway designated as A. The code may be matched against the full product-specific information, shown as 208 in FIG. 2. The product-specific contact information may be transferred from the database 211 via the pathway designated as B to the non product-specific server 213. The non product-specific server 213 allows contact to be established between the user and a product-specific server 217 (FIG. 2). Once the user has accessed the product-specific web site identified by the web address "WWW.MWATER/FREE.COM", the user may obtain information or, as shown in FIG. 2, enter into any appropriate commercial transaction, such as one which results in water being delivered to the residence of the user.

In accordance with a preferred embodiment of the present invention, database 211 may receive all or part of the content information output from data signal separator 1964 via a computer network communication, and from data signal processor 1912. Database 211 is preferably operative to collect and correlate user information and activities in connection with given contact information and to communicate with a facilitator 1977. The facilitator 1977 may have multiple functionalities which may be combined in a single entity or divided among various separate entities. The facilitator 1977 preferably interfaces among and between a broadcast facility 200 (FIG. 2) a user, a supplier of goods or services 1968 and various elements of communication facility 226 (FIG. 2) such as database 211, server 213 and telephone center 224. The facilitator 1977 may be operated by the operator of communication facility 226 or by another entity.

The facilitator 1977 preferably provides at least one of coordination and financial arrangements between one or more of a broadcast facility 200 (FIG. 2) a user, a supplier of goods or services 1968 and various elements of communication facility 226 (FIG. 2) such as database 211, server 213 and telephone center 224. Thus it is appreciated that the facilitator 1977 may provide payment arrangements between two or more of a broadcast facility 200 (FIG. 2), a user, a supplier of goods or services 1978 and an advertiser.

Figure 10A:
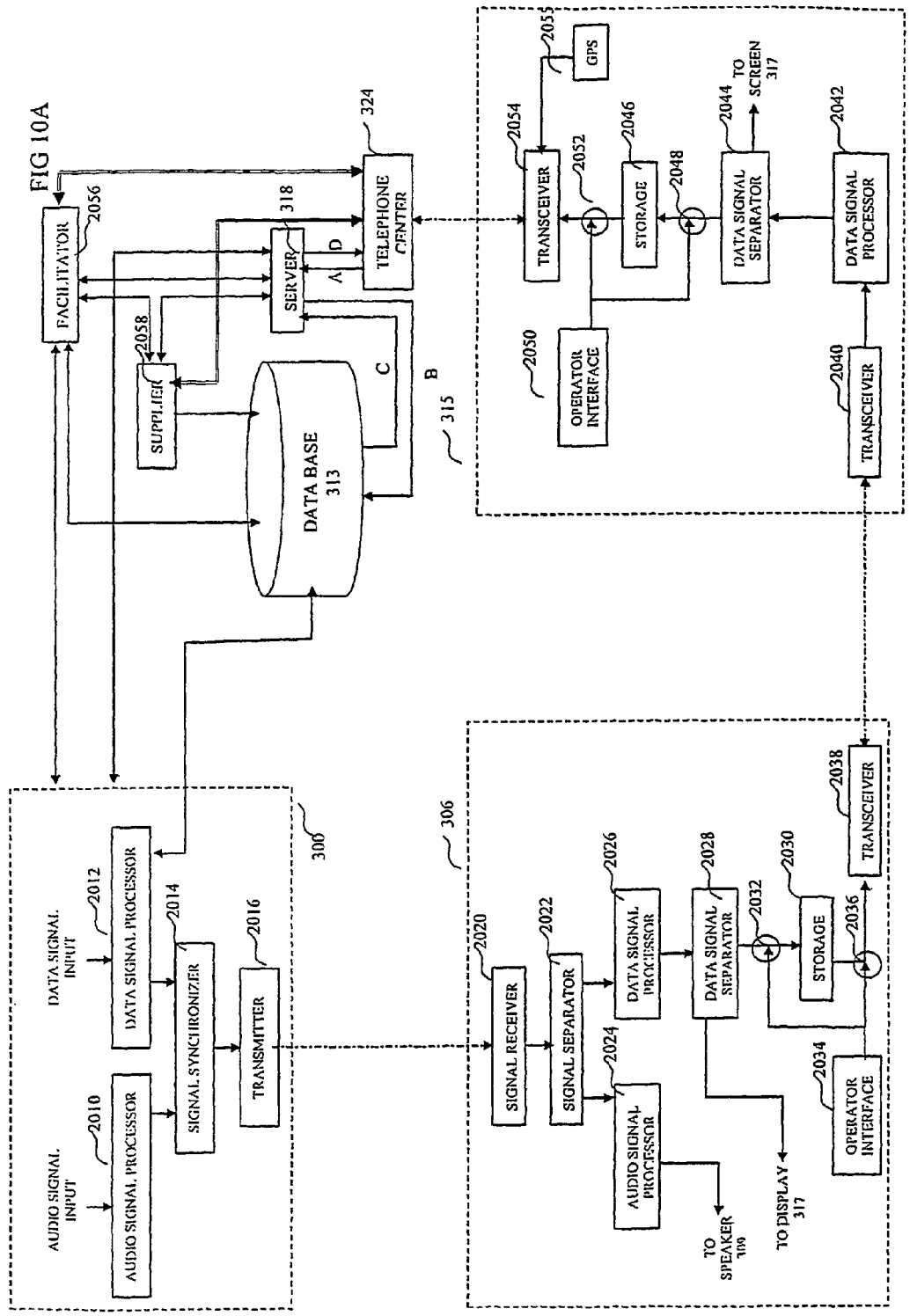

Reference is now made to FIGS. 10A, 10B, 10C, 10D, 10E & 10F are simplified functional block diagrams of six alternative embodiments of the system of FIG. 3. As seen in FIG. 10A, there is provided a system and methodology of the type shown in FIG. 3, wherein a commercial message is broadcast by a radio broadcast facility, such as an FM or digital broadcast facility.

In the illustrated embodiment of FIG. 10A, the radio broadcast facility 300 (FIG. 33), typically a FM broadcast facility having subcarrier broadcast functionality, such as via a RDS, RBDS or a DARC protocol, includes an audio signal processor 2010, receiving an audio signal input, as well as a data signal processor 2012, receiving a data signal input. Outputs of processors 2010 and 2012 are supplied to a signal synchronizer 2014, which combines these outputs with suitable synchronization therebetween and supplies a combined output to a transmitter 2016.

As illustrated in FIG. 3, the broadcast message preferably includes an audible audio content portion and an inaudible non-audio content portion.

The broadcast message may be received, for example, by a radio 306 (FIG. 3), typically located in a vehicle. As seen in FIG. 10A, the radio is a non-standard radio including a signal receiver 2020 which outputs to a signal separator 2022, which is operative to separate the received signal into audio and data portions which are processed respectively by an audio signal processor 2024 and a data signal processor 2026. The output of the audio signal processor 2024 may be heard by a user via a speaker, such as speaker 309 (FIG. 3).

The output of the data signal processor 2026 is supplied to a data signal separator 2028 which may provide a visible output to a suitable radio display, such as display 312 (FIG. 3). It is a particular feature of the present invention that the data signal separator 2028 also provides a non-audio, non-visible output, which may be stored in a signal storage medium 2030. Such storage may be, but need not necessarily be, governed by a switch 2032 controlled by an operator using an operator interface 2034.

In the example shown in FIG. 10A, the operator interface 2034 may be speech actuated, such that when the operator says "CAPTURE" as illustrated in FIG. 3, the non-audio, non-visible output of data signal separator 2028 is stored in storage medium 2030.

Additionally or alternatively, a switch 2036 may be provided at an output of storage medium 2030 and may be actuated by an operator using operator interface 2034. The operation of switch 2036 may be similar to that of switch 2032, the only difference in their effect being that switch 2032 governs storage of the non-audio, non-visible output, while switch 2036 governs supply thereof to a transceiver 2038.

The non-audio, non-visible output transmitted by transceiver 2038 may be received by a transceiver 2040 forming part of a mobile communicator 315 (FIG. 3). It is appreciated that transceivers 2038 and 2040 and the communication link therebetween may be replaced by any other suitable wired or wireless communication link, such as a ohmic connection, an IR communication link, a Bluetooth communication link or another short range communication link.

The output of transceiver 2040 is preferably supplied to a data signal processor 2042. The output of the data signal processor 2042 may be supplied to a data signal separator 2044, which may provide a visible data output which may be displayed on a screen 317 of the mobile communicator 315. The output from the data signal separator 2044 is typically a non product-specific telephone number and a product-specific code which, in the context of FIG. 3 is shown as 1-800-864-2222 and #1234#, and which may be stored in a signal storage medium 2046. As distinct from the embodiment in FIG. 9A, non product-specific contact information, in a form that may include a telephone number, together with product-specific contact information that may include a code, is preferably contained within the non-audio, non-visible output. Alternatively, the non product-specific contact information may be provided by means other than the inaudible non-audio content portion, such as preset contact information stored in the mobile communicator 315. Such storage 2046 may be, but need not necessarily be, governed by a switch 2048 controlled by an operator using an operator interface 2050.

In the example shown in FIG. 10A, the operator interface 2050 may be speech actuated, such that when the operator says "CONTACT" as illustrated in FIG. 3, the product-specific contact information output of data signal separator 2044 is stored in storage medium 2046.

Additionally or alternatively, a switch 2052 may be provided at an output of storage medium 2046 and may be actuated by an operator using operator interface 2050. The operation of switch 2052 may be similar to that of switch 2048, the only difference in their effect being that switch 2048 governs storage of the product-specific contact information output, while switch 2052 governs supply of both the product-specific contact information and the non product-specific to a transceiver 2054.

Transceiver 2054 preferably includes a wireless modem which is enabled to communicate via the Internet with a server 318 (FIG. 3), which in turn communicates with database 313 (FIG. 3).

A GPS device 2055 may be associated with the mobile communicator and may transmit via the transceiver 2054 the user's geographic coordinates to the server 311.

In the illustrated embodiment, which is described functionally hereinabove with reference to FIG. 3, the user may at any time actuate the mobile communicator 315 (FIG. 3) to establish contact via transceiver 2054 on the basis of part or all of the product-specific contact information output from data signal separator 2044 and the non product-specific contact information preferably stored in the storage medium 2046.

FIG. 3 shows an example wherein a user actuates the mobile communicator 315, typically embodied as a cellular telephone or a WAP phone, to access a product-specific telephone center 330 (FIG. 3) identified by phone number 1-800-WATER4U. In the illustrated embodiment, this access is achieved via a non product-specific telephone center, embodied in telephone center 324, which is accessed via a cellular telephone link by use of a non product-specific telephone number, such as "1-800-864-2222".

The non product-specific telephone center 324 preferably maintains an Internet connection with a non product-specific server 318 as shown in FIG. 3. Upon accessing the non product-specific telephone center 324, the product-specific contact information, such as a code, may be transferred to the non product-specific server 318 via the pathway designated as A. The non product-specific server 318 may transfer the product-specific contact information, such as a code, to a database 313 via the pathway designated as B. The code may be matched against the full product-specific information, shown as 310 in FIG. 3. The product-specific contact information may be transferred from the database 313 via the pathway designated as C to the non product-specific server 318. The non product-specific server 318 may transfer the product-specific contact information to the non product-specific telephone center 324 via the pathway designated as D. The non product-specific telephone center 324 allows contact to be established between the user and a product-specific telephone center 330 (FIG. 3). Once the user has accessed the product-specific telephone center identified by the telephone number 1-800-WATER4U, the user may obtain information or, as shown in FIG. 3, enter into any appropriate commercial transaction, such as one which results in water being delivered to the residence of the user.

It is appreciated that where the mobile communicator 315 is embodied as a WAP enabled phone then the product specific contact information may be in the form of a web address such as WWW.MWATER/FREE.COM.

In accordance with a preferred embodiment of the present invention, database 313 may receive all or part of the content information output from data signal separator 2044 via a computer network communication, and from data signal processor 2012. Database 313 is preferably operative to collect and correlate user information and activities in connection with given contact information and to communicate with a facilitator 2056. The facilitator 2056 may have multiple functionalities which may be combined in a single entity or divided among various separate entities. The facilitator 2056 preferably interfaces among and between a broadcast facility 300 (FIG. 3) a user, a supplier of goods or services 2058 and various elements of communication facility 326 (FIG. 3) such as database 313, server 314 and telephone center 324. The facilitator 2056 may be operated by the operator of communication facility 326 or by another entity.

The facilitator preferably provides at least one of coordination and financial arrangements between one or more of a broadcast facility 300 (FIG. 3) a user, a supplier of goods or services 2058 and various elements of communication facility 326 (FIG. 3) such as database 320, server 318 and telephone center 324. Thus it is appreciated that the facilitator may provide payment arrangements between two or more of a broadcast facility 300 (FIG. 3), a user, a supplier of goods or services 2058 and an advertiser.

Figure 10B:
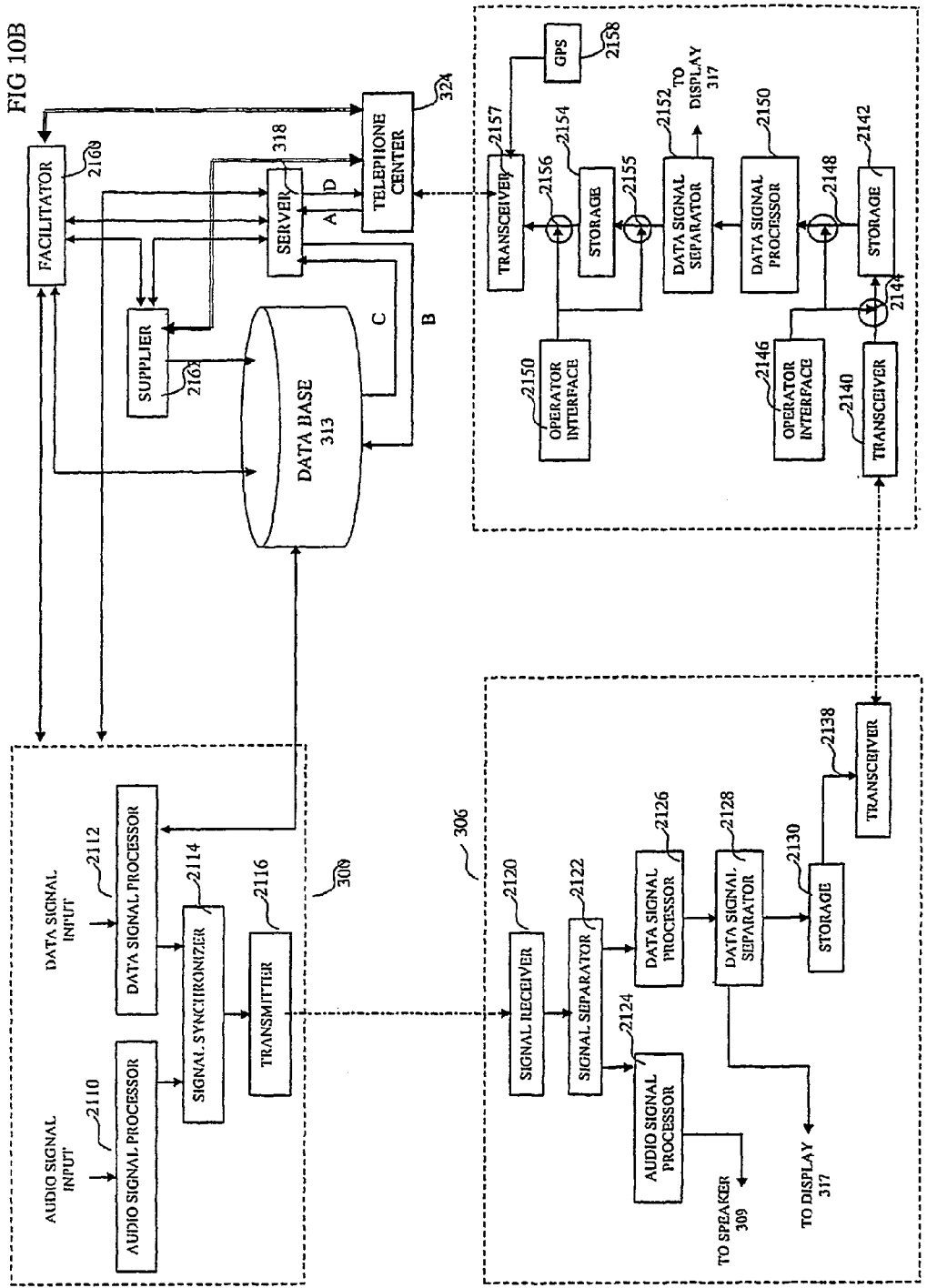

Turning to FIG. 10B, there is provided a system and methodology of the type shown in FIG. 3, wherein a message, here a commercial message, is broadcast, typically by a radio broadcast facility, such as an FM broadcast facility.

In the illustrated embodiment of FIG. 10B, the radio broadcast facility 300 (FIG. 3), typically a FM broadcast facility having subcarrier broadcast functionality, such as via a RDS, RBDS or a DARC protocol, includes an audio signal processor 2110, receiving an audio signal input, as well as a data signal processor 2112, receiving a data signal input. Outputs of processors 2110 and 2112 are supplied to a signal synchronizer 2114, which combines these outputs with suitable synchronization therebetween and supplies a combined output to a transmitter 2116.

As illustrated in FIG. 3, the broadcast message, preferably includes an audible audio content portion and an inaudible non-audio content portion.

The broadcast message may be received, for example, by a radio 306 (FIG. 3), typically located in a vehicle. As seen in FIG. 10B, the radio is a non-standard radio including a signal receiver 2120 which outputs to a signal separator 2122, which is operative to separate the received signal into audio and data portions which are processed respectively by an audio signal processor 2124 and a data signal processor 2126. The output of the audio signal processor 2124 may be heard by a user via a speaker, such as speaker 309 (FIG. 3).

The output of the data signal processor 2126 is supplied to a data signal separator 2128 which may provide a visible data output to a suitable radio display, such as display 312 (FIG. 3). It is a particular feature of the present invention that the data signal separator 2128 also provides a non-audio, non-visible output, which may be stored in a signal storage medium 2130 and is provided to a transceiver 2138.

The non-audio, non-visible output transmitted by transceiver 2138 may be received by a transceiver 2140 forming part of a mobile communicator 314 (FIG. 3). It is appreciated that transceivers 2138 and 2140 and the communication link therebetween may be replaced by any other suitable wired or wireless communication link, such as a ohmic connection, an IR communication link, a Bluetooth communication link or another short range communication link.

The output of transceiver 2140 may be supplied to a storage medium 2142. Such storage may be, but need not necessarily be, governed by a switch 2144 controlled by an operator using an operator interface 2146.

In the example shown in FIG. 3, the operator interface 2146 may be speech actuated, such that when the operator says "CAPTURE" as illustrated in FIG. 3, the non-audio, non-visible output of data signal separator is stored in storage medium 2142.

Additionally or alternatively, a switch 2148 may be provided at an output of storage medium 2142 and may be actuated by an operator using operator interface 2146. The operation of switch 2148 may be similar to that of switch 2144, the only difference in their effect being that switch 2148 governs storage of the non-audio, non-visible output, while switch 2144 governs supply thereof to a data signal processor 2150.

The output of the data signal processor 2150 may be supplied to a data signal separator 2152, which may provide a visible data output which may be displayed on a screen 317 of the mobile communicator 315. The output from the data signal separator 2152 is typically a non product-specific telephone number and a product-specific code which, in the context of FIG. 3 is shown as 1-800-864-2222 and #1234#, and which may be stored in a signal storage medium 2154. As distinct from the embodiment in FIG. 9B, non product-specific contact information, in a form that may include a telephone number, together with product-specific contact information that may include a code, is preferably contained within the non-audio, non-visible output. Alternatively, the non product-specific contact information may be provided by means other than the inaudible non-audio content portion, such as preset contact information stored in the mobile communicator 315. Such storage 2154 may be, but need not necessarily be, governed by a switch 2155 controlled by an operator using an operator interface 2150.

In the example shown in FIG. 10B, the operator interface 2150 may be speech actuated, such that when the operator says "CONTACT" as illustrated in FIG. 3, the product-specific contact information output of data signal separator 2155 is stored in storage medium 2154.

Additionally or alternatively, a switch 2156 may be provided at an output of storage medium 2154 and may be actuated by an operator using operator interface 2150. The operation of switch 2156 may be similar to that of switch 2155, the only difference in their effect being that switch 2155 governs storage of the product-specific contact information output, while switch 2156 governs supply of both the product-specific contact information and the non product-specific to a transceiver 2157.

Transceiver 2157 preferably includes a wireless modem which is enabled to communicate via the Internet with a server 318 (FIG. 3), which in turn communicates with database 313 (FIG. 3).

A GPS device 2158 may be associated with the mobile communicator 315 and may transmit via the transceiver 2157 the user's geographic coordinates to the server 314.

In the illustrated embodiment, which is described functionally hereinabove with reference to FIG. 3, the user may at any time actuate the mobile communicator 314 (FIG. 3) to establish contact via transceiver 2157 on the basis of part or all of the product-specific contact information output from data signal separator 2162 and the non product-specific contact information preferably stored in the storage medium 2154.

FIG. 3 shows an example wherein a user actuates the mobile communicator 315, typically embodied as a cellular telephone or a WAP phone, to access a product-specific telephone center 330 (FIG. 3) identified by phone number 1-800-WATER4U. In the illustrated embodiment, this access is achieved via a non product-specific telephone center, embodied in telephone center 324, which is accessed via a cellular telephone link by use of a non product-specific telephone number, such as "1-800-864-2222".

The non product-specific telephone center 324 (FIG. 3) preferably maintains an Internet connection with a non product-specific server 314 as shown in FIG. 3. Upon accessing the non product-specific telephone center 324 (FIG. 3), the product-specific contact information, such as a code, may be transferred to the non product-specific server 314 (FIG. 3) via the pathway designated as A. The non product-specific server 318 (FIG. 3) may transfer the product-specific contact information, such as a code, to a database 313 (FIG. 3) via the pathway designated as B. The code may be matched against the full product-specific information, shown as 310 in FIG. 3. The product-specific contact information may be transferred from the database 313 (FIG. 3) via the pathway designated as C to the non product-specific server 318 (FIG. 3). The non product-specific server 318 (FIG. 3) may transfer the product-specific contact information to the non product-specific telephone center 324 (FIG. 3) via the pathway designated as D. The non product-specific telephone center 324 (FIG. 3) allows contact to be established between the user and a product-specific telephone center 330 (FIG. 3). Once the user has accessed the product-specific telephone center 330 identified by the telephone number 1-800-WATER4U, the user may obtain information or, as shown in FIG. 3, enter into any appropriate commercial transaction, such as one which results in water being delivered to the residence of the user.

It is appreciated that where the mobile communicator 315 (FIG. 3) is embodied as a WAP enabled phone then the product specific contact information may be in the form of a web address such as WWW.MWATER/FREE.COM.

In accordance with a preferred embodiment of the present invention, database 313 may receive all or part of the content information output from data signal separator 2152 via a computer network communication, and from data signal processor 2112. Database 313 is preferably operative to collect and correlate user information and activities in connection with given contact information and to communicate with a facilitator 2160. The facilitator 2160 may have multiple functionalities which may be combined in a single entity or divided among various separate entities. The facilitator 2160 preferably interfaces among and between a broadcast facility 300 (FIG. 3) a user, a supplier of goods or services 2162 and various elements of communication facility 326 (FIG. 3) such as database 313, server 314 and telephone center 324. The facilitator 2160 may be operated by the operator of communication facility 326 or by another entity.

The facilitator 2160 preferably provides at least one of coordination and financial arrangements between one or more of a broadcast facility 300 (FIG. 3) a user, a supplier of goods or services 2162 and various elements of communication facility 326 (FIG. 3) such as database 313, server 314 and telephone center 324. Thus it is appreciated that the facilitator 2160 may provide payment arrangements between two or more of a broadcast facility 300 (FIG. 3), a user, a supplier of goods or services 2162 and an advertiser.

In the illustrated embodiment of FIG. 10C, the radio broadcast facility 300 (FIG. 3), typically a digital broadcast facility, includes a voice to data processor 2210, receiving an audio signal input. The output of processor 2210 and a data signal input are supplied to a digital signal processor 2214, which combines these outputs with suitable synchronization therebetween and supplies a combined output to a digital transmitter 2216.

As illustrated in FIG. 3, the broadcast message, preferably includes an audible audio content portion and an inaudible non-audio content portion.

The digital broadcast message may be received; for example, by a radio 306 (FIG. 3), typically located in a vehicle. As seen in FIG. 10C, the radio is a non-standard digital radio including a digital signal receiver 2220 which outputs to a digital signal processor 2222. The processed signal is delivered to a digital signal separator 2224 which is operative to separate the received digital signal into audio and data portions which are processed respectively by a data to voice processor 2226 and a data signal separator 2228. The output of the data to voice processor 2226 may be heard by a user via a speaker, such as speaker 309 (FIG. 3).

The output of the data signal separator 2228 may provide a visible data output to a suitable radio display, such as display 312 (FIG. 3). It is a particular feature of the present invention that the data signal separator 2228 also provides a non-audio, non-visible output, which may be stored in a signal storage medium 2230. Such storage may be, but need not necessarily be, governed by a switch 2232 controlled by an operator using an operator interface 2234.

In the example shown in FIG. 3, the operator interface 2234 may be speech actuated, such that when the operator says "CAPTURE" as illustrated in FIG. 3, the non-audio, non-visible output of data signal separator is stored in storage medium 2230.

Additionally or alternatively, a switch 2236 may be provided at an output of storage medium 2230 and may be actuated by an operator using operator interface 2234. The operation of switch 2236 may be similar to that of switch 2232, the only difference in their effect being that switch 2232 governs storage of the non-audio, non-visible output, while switch 2236 governs supply thereof to a transceiver 2238.

The non-audio, non-visible output transmitted by transceiver 2238 may be received by a transceiver 2240 forming part of a mobile communicator 315 (FIG. 3). It is appreciated that transceivers 2238 and 2240 and the communication link therebetween may be replaced by any other suitable wired or wireless communication link, such as a ohmic connection, an IR communication link, a Bluetooth communication link or another short range communication link.

The output of transceiver 2240 is preferably supplied to a data signal processor 2242. The output of the data signal processor 2242 may be supplied to a data signal separator 2244, which may provide a visible data output which may be displayed on a screen 317 of the mobile communicator 315. The output from the data signal separator 2244 is typically a non product-specific telephone number and a product-specific code which, in the context of FIG. 3 is shown as 1-800-864-2222 and #1234#, and which may be stored in a signal storage medium 2246. As distinct from the embodiment in FIG. 9C, non product-specific contact information, in a form that may include a telephone number, together with product-specific contact information that may include a code, is preferably contained within the non-audio, non-visible output. Alternatively, the non product-specific contact information may be provided by means other than the inaudible non-audio content portion, such as preset contact information stored in the mobile communicator 315. Such storage 2246 may be, but need not necessarily be, governed by a switch 2248 controlled by an operator using an operator interface 2250.

In the example shown in FIG. 10A, the operator interface 2250 may be speech actuated, such that when the operator says "CONTACT" as illustrated in FIG. 3, the product-specific contact information output of data signal separator 2244 is stored in storage medium 2246.

Additionally or alternatively, a switch 2252 may be provided at an output of storage medium 2246 and may be actuated by an operator using operator interface 2250. The operation of switch 2252 may be similar to that of switch 2248, the only difference in their effect being that switch 2248 governs storage of the product-specific contact information output, while switch 2252 governs supply of both the product-specific contact information and the non product-specific to a transceiver 2254.

Transceiver 2254 preferably includes a wireless modem which is enabled to communicate via the Internet with a server 318 (FIG. 3), which in turn communicates with database 313 (FIG. 3).

A GPS device 2255 may be associated with the mobile communicator and may transmit via the transceiver 2254 the user's geographic coordinates to the server 318.

In the illustrated embodiment, which is described functionally hereinabove with reference to FIG. 3, the user may at any time actuate the mobile communicator 315 (FIG. 3) to establish contact via transceiver 2254 on the basis of part or all of the product-specific contact information output from data signal separator 2244 and the non product-specific contact information preferably stored in the storage medium 2246.

FIG. 3 shows an example wherein a user actuates the mobile communicator 315, typically embodied as a cellular telephone or a WAP phone, to access a product-specific telephone center 330 (FIG. 3) identified by phone number 1-800-WATER4U. In the illustrated embodiment, this access is achieved via a non product-specific telephone center, embodied in telephone center 324, which is accessed via a cellular telephone link by use of a non product-specific telephone number, such as "1-800-864-2222".

The non product-specific telephone center 330 preferably maintains an Internet connection with a non product-specific server 318 as shown in FIG. 3. Upon accessing the non product-specific telephone center 324, the product-specific contact information, such as a code, may be transferred to the non product-specific server 318 via the pathway designated as A. The non product-specific server 318 may transfer the product-specific contact information, such as a code, to a database 313 via the pathway designated as B. The code may be matched against the full product-specific information, shown as 310 in FIG. 3. The product-specific contact information may be transferred from the database 313 via the pathway designated as C to the non product-specific server 318. The non product-specific server 318 may transfer the product-specific contact information to the non product-specific telephone center 324 via the pathway designated as D. The non product-specific telephone center 324 allows contact to be established between the user and a product-specific telephone center 330 (FIG. 3). Once the user has accessed the product-specific telephone center identified by the telephone number 1-800-WATER4U, the user may obtain information or, as shown in FIG. 3, enter into any appropriate commercial transaction, such as one which results in water being delivered to the residence of the user.

It is appreciated that where the mobile communicator 315 is embodied as a WAP enabled phone then the product specific contact information may be in the form of a web address such as WWW.MWATER/FREE.COM.

In accordance with a preferred embodiment of the present invention, database 313 may receive all or part of the content information output from data signal separator 2244 via a computer network communication, as from data signal processor 2214. Database 313 is preferably operative to collect and correlate user information and activities in connection with given contact information and to communicate with a facilitator 2256. The facilitator 2256 may have multiple functionalities which may be combined in a single entity or divided among various separate entities. The facilitator 2256 preferably interfaces among and between a broadcast facility 300 (FIG. 3) a user, a supplier of goods or services 2258 and various elements of communication facility 326 (FIG. 3) such as database 313, server 314 and telephone center 324. The facilitator 2256 may be operated by the operator of communication facility 326 or by another entity.

The facilitator 2256 preferably provides at least one of coordination and financial arrangements between one or more of a broadcast facility 300 (FIG. 3) a user, a supplier of goods or services 2258 and various elements of communication facility 326 (FIG. 3) such as database 313, server 314 and telephone center 324. Thus it is appreciated that the facilitator may provide payment arrangements between two or more of a broadcast facility 300 (FIG. 3), a user, a supplier of goods or services 2258 and an advertiser.

In the illustrated embodiment of FIG. 10D, the radio broadcast facility 300 (FIG. 3), typically a digital broadcast facility, includes a voice to data processor 2310, receiving an audio signal input. Output of processor 2310 and data signal input are supplied to a signal processor 2314, which combines these outputs with suitable synthesis therebetween and supplies a combined output to a transmitter 2316.

As illustrated in FIG. 3, the digitized broadcast message, preferably includes an audible audio content portion, and an inaudible non-audio content portion.

The broadcast message may be received, for example, by a radio 306 (FIG. 3), typically located in a vehicle. As seen in FIG. 10D, the radio is a non-standard radio including a signal receiver 2320 which outputs to a signal processor 2322. The processed signal is delivered to a signal separator 2324 which is operative to separate the received signal into audio and data portions which are processed respectively by a data to voice processor 2326 and a data signal separator 2328. The output of the data to voice processor 2326 may be heard by a user via a speaker, such as speaker 309 (FIG. 3).

The output of the signal processor 2324 is supplied to a data signal separator 2328 which may provide a visible data output to a suitable radio display, such as display 312 (FIG. 3). The output from the data signal separator 2328 may be supplied to a storage medium 2330. It is a particular feature of the present invention that the data signal separator 2328 also provides a non-audio, non-visible output, which may be provided to a transceiver 2338

The non-audio, non-visible output transmitted by transceiver 2338 may be received by a transceiver 2340 forming part of a mobile communicator 315 (FIG. 3). It is appreciated that transceivers 2338 and 2340 and the communication link therebetween may be replaced by any other suitable wired or wireless communication link, such as a ohmic connection, an IR communication link, a Bluetooth communication link or another short range communication link.

The output of transceiver 2340 may be supplied to a storage medium 2342 but need not necessarily be, governed by a switch 2344 controlled by an operator using an operator interface 2346.

In the example shown in FIG. 3, the operator interface 2346 may be speech actuated, such that when the operator says "CAPTURE" as illustrated in FIG. 3, the non-audio, non-visible output of data signal separator is stored in storage medium 2342.

Additionally or alternatively, a switch 2348 may be provided at an output of storage medium 2342 and may be actuated by an operator using operator interface 2346. The operation of switch 2348 may be similar to that of switch 2344, the only difference in their effect being that switch 2348 governs storage of the non-audio, non-visible output, while switch 2344 governs supply thereof to a data signal processor 2350.

The output of the data signal processor 2350 may be supplied to a data signal separator 2352, which may provide a visible data output which may be displayed on a screen 317 of the mobile communicator 315. The output from the data signal separator 2352 is typically a non product-specific telephone number and a product-specific code which, in the context of FIG. 3 is shown as 1-800-864-2222 and #1234#, and which may be stored in a signal storage medium 2356. As distinct from the embodiment in FIG. 10D, non product-specific contact information, in a form that may include a telephone number, together with product-specific contact information that may include a code, is preferably contained within the non-audio, non-visible output. Alternatively, the non product-specific contact information may be provided by means other than the inaudible non-audio content portion, such as preset contact information stored in the mobile communicator 315. Such storage 2356 may be, but need not necessarily be, governed by a switch 2358 controlled by an operator using an operator interface 2360.

In the example shown in FIG. 10A, the operator interface 2360 may be speech actuated, such that when the operator says "CONTACT" as illustrated in FIG. 3, the product-specific contact information output of data signal separator 2352 is stored in storage medium 2356.

Additionally or alternatively, a switch 2359 may be provided at an output of storage medium 2356 and may be actuated by an operator using operator interface 2360. The operation of switch 2359 may be similar to that of switch 2358, the only difference in their effect being that switch 2358 governs storage of the product-specific contact information output, while switch 2359 governs supply of both the product-specific contact information and the non product-specific to a transceiver 2364.

Transceiver 2364 preferably includes a wireless modem which is enabled to communicate via the Internet with a server 314 (FIG. 3), which in turn communicates with database 313 (FIG. 3).

A GPS device 2365 may be associated with the mobile communicator and may transmit via the transceiver 2364 the user's geographic coordinates to the server 318.

In the illustrated embodiment, which is described functionally hereinabove with reference to FIG. 3, the user may at any time actuate the mobile communicator 315 (FIG. 3) to establish contact via transceiver 2364 on the basis of part or all of the product-specific contact information output from data signal separator 2352 and the non product-specific contact information preferably stored in the storage medium 2356.

FIG. 3 shows an example wherein a user actuates the mobile communicator 315, typically embodied as a cellular telephone or a WAP phone, to access a product-specific telephone center 330 (FIG. 3) identified by phone number 1-800-WATER4U. In the illustrated embodiment, this access is achieved via a non product-specific telephone center, embodied in telephone center 324, which is accessed via a cellular telephone link by use of a non product-specific telephone number, such as "1-800-864-2222".

The non product-specific telephone center 324 preferably maintains an Internet connection with a non product-specific server 318 as shown in FIG. 3. Upon accessing the non product-specific telephone center 324, the product-specific contact information, such as a code, may be transferred to the non product-specific server 318 via the pathway designated as A. The non product-specific server 318 may transfer the product-specific contact information, such as a code, to a database 313 via the pathway designated as B. The code may be matched against the full product-specific information, shown as 311 in FIG. 3. The product-specific contact information may be transferred from the database 313 via the pathway designated as C to the non product-specific server 318. The non product-specific server 318 may transfer the product-specific contact information to the non product-specific telephone center 324 via the pathway designated as D. The non product-specific telephone center 324 allows contact to be established between the user and a product-specific telephone center 330 (FIG. 3). Once the user has accessed the product-specific telephone center identified by the telephone number 1-800-WATER4U, the user may obtain information or, as shown in FIG. 3, enter into any appropriate commercial transaction, such as one which results in water being delivered to the residence of the user.

In accordance with a preferred embodiment of the present invention, database 313 may receive all or part of the content information output from data signal separator 2352 via a computer network communication, and from data signal processor 2314. Database 313 is preferably operative to collect and correlate user information and activities in connection with given contact information and to communicate with a facilitator 2367. The facilitator 2367 may have multiple functionalities which may be combined in a single entity or divided among various separate entities. The facilitator preferably interfaces among and between a broadcast facility 300 (FIG. 2) a user, a supplier of goods or services 2368 and various elements of communication facility 326 (FIG. 2) such as database 313, server 314 and telephone center 324. The facilitator 2367 may be operated by the operator of communication facility 326 or by another entity.

The facilitator preferably provides at least one of coordination and financial arrangements between one or more of a broadcast facility 300 (FIG. 2) a user, a supplier of goods or services 2368 and various elements of communication facility 326 (FIG. 2) such as database 313, server 314 and telephone center 324. Thus it is appreciated that the facilitator may provide payment arrangements between two or more of a broadcast facility 300 (FIG. 2), a user, a supplier of goods or services 2368 and an advertiser.

Figure 10E:
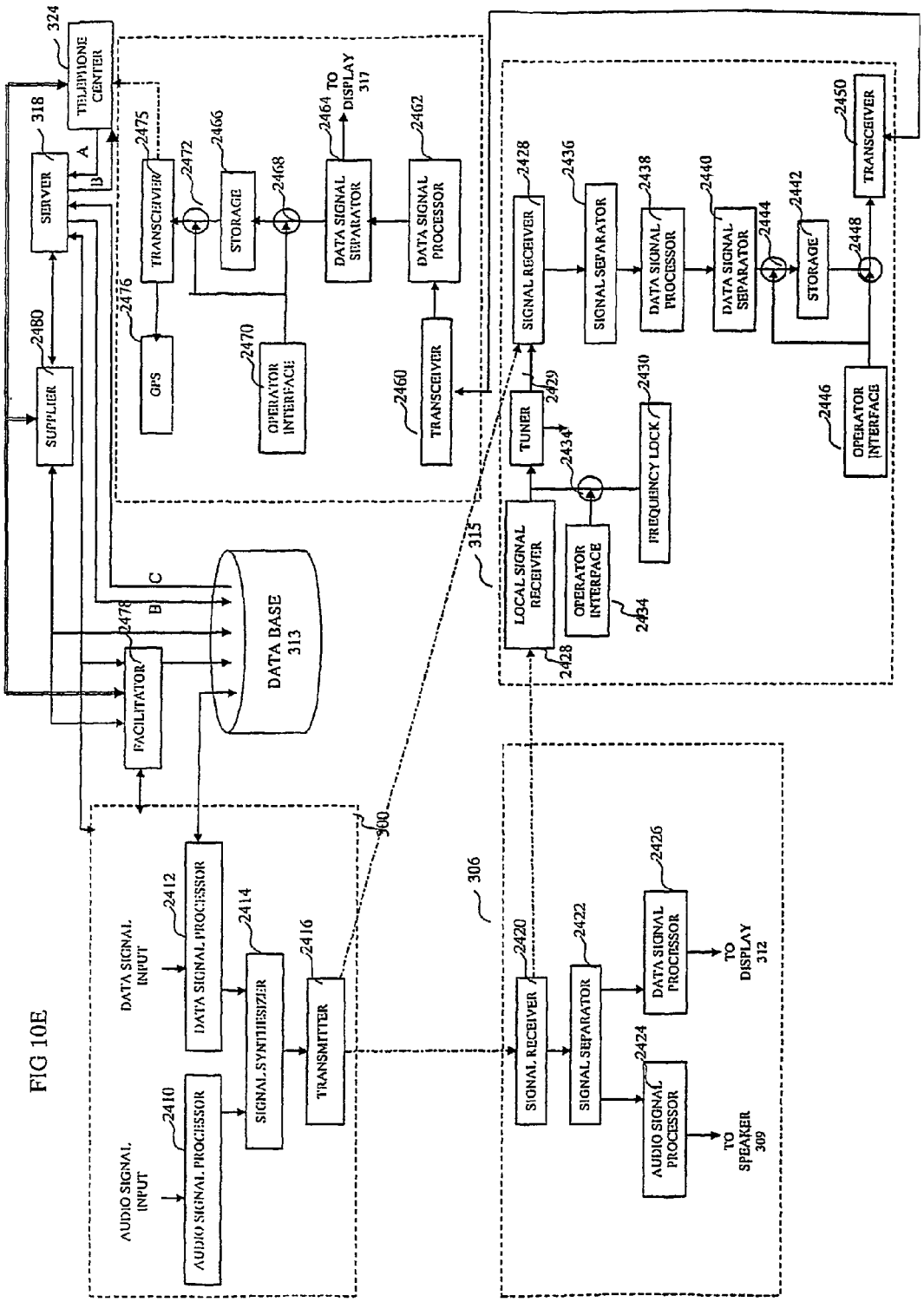

In the illustrated embodiment of FIG. 10E, the radio broadcast facility 300 (FIG. 3), typically a FM broadcast facility having subcarrier broadcast functionality, such as via a RDS, RBDS or a DARC protocol, includes an audio signal processor 2410, receiving an audio signal input, as well as a data signal processor 2412, receiving a data signal input. Outputs of processors 2410 and 2412 are supplied to a signal synchronizer 2414, which combines these outputs with suitable synchronization therebetween and supplies a combined output to a transmitter 2416.

As illustrated in FIG. 3, the broadcast message, preferably includes an audible audio content portion and an inaudible non-audio content portion.

The broadcast message may be received, for example, by a radio 306 (FIG. 3), typically located in a vehicle. As seen in FIG. 10E, the radio may be a conventional RDS enabled radio, such as a JVC CH-KP950R, including a signal receiver 2420 which outputs to a signal separator 2422, which is operative to separate the received signal into audio and data portions which are processed respectively by an audio signal processor 2424 and a data signal processor 2426. The output of the audio signal processor 2424 may be beard by a user via a speaker, such as speaker 309 (FIG. 3) and the output of the data signal processor 2426 may provide a visible data output to a suitable radio display, such as display 312 (FIG. 3). Alternatively, radio 306 may be a conventional non-RDS enabled radio, such as a Pioneer KEH-1900, which does not include a signal separator or a data signal processor.

It is typical of conventional radios 306 that a local signal is transmitted from the signal receiver 2420 over short distances typically 3 feet. In accordance with a preferred embodiment of the present invention, this local signal is employed by a wireless interface assembly 2427 to provide contact information from the radio 306 to the mobile communicator 315 (FIG. 3).

Interface assembly 2427, which is not shown in FIG. 3, may reside anywhere within the local signal reception range of the radio 306 and may be a separate element or may be integrated with a mobile communicator or in any other suitable vehicle element.

Interface assembly 2427 preferably includes a local signal receiver 2428, which receives the local signal from radio and configures a tuner 2429 to the identical frequency of the signal receiver 2420 in radio 306 (FIG. 3). This allows the signal receiver 2428 to receive the identical broadcast message as signal receiver 2420. The tuned frequency number can be made visible on a display such as an LED display (not shown). It is a particular feature of the present invention that the frequency of the tuner 2429 may be manually locked by means of a frequency lock 2430 via a switch 2432 operated by an operator interface 2434, typically a touch button. The signal receiver 2428 provides the signal received from the transmitter 2416 to a signal separator 2436 that isolates therefrom a non-audio, non-visible output. The non-audio, non visible output, is received by a data signal processor 2438 which outputs to a data signal separator 2440, the output of which may be stored in a signal storage medium 2442. Such storage may be but need not necessarily be governed by a switch 2444 controlled by an operator using an operator interface 2446.

In the example shown in FIG. 10E, the operator interface 2446 may be speech actuated, such that when the operator says "CAPTURE" as illustrated in FIG. 3, the non-audio, non-visible output of data signal separator is stored in storage medium 2442.

Additionally or alternatively, a switch 2448 may be provided at an output of storage medium 2442 and may be actuated by an operator using operator interface 2446. The operation of switch 2442 may be similar to that of switch 2444, the only difference in their effect being that switch 2444 governs storage of the non-audio, non-visible output, while switch 2248 governs supply thereof to a transceiver 2450.

The non-audio, non-visible output transmitted by transceiver 2450 may be received by a transceiver 2460 forming part of a mobile communicator 315 (FIG. 3). It is appreciated that transceivers 2450 and 2460 and the communication link therebetween may be replaced by any other suitable wired or wireless communication link, such as a ohmic connection, an IR communication link, a Bluetooth communication link or another short range communication link.

The output of transceiver 2460 is preferably supplied to a data signal processor 2462. The output of the data signal processor 2462 may be supplied to a data signal separator 2464, which may provide a visible data output which may be displayed on a screen 317 of the mobile communicator 315. The output from the data signal separator 2464 is typically a non product-specific telephone number and a product-specific code which, in the context of FIG. 3 is shown as 1-800-864-2222 and #1234#, and which may be stored in a signal storage medium 2466. As distinct from the embodiment in FIG. 10E, non product-specific contact information, in a form that may include a telephone number, together with product-specific contact information that may include a code, is preferably contained within the non-audio, non-visible output. Alternatively, the non product-specific contact information may be provided by means other than the inaudible non-audio content portion, such as preset contact information stored in the mobile communicator 315. Such storage 2466 may be, but need not necessarily be, governed by a switch 2468 controlled by an operator using an operator interface 2470.

In the example shown in FIG. 10F, the operator interface 2470 may be speech actuated, such that when the operator says "CONTACT" as illustrated in FIG. 3, the product-specific contact information output of data signal separator 2464 is stored in storage medium 2466.

Additionally or alternatively, a switch 2472 may be provided at an output of storage medium 2466 and may be actuated by an operator using operator interface 2470. The operation of switch 2472 may be similar to that of switch 2468, the only difference in their effect being that switch 2468 governs storage of the product-specific contact information output, while switch 2472 governs supply of both the product-specific contact information and the non product-specific to a transceiver 2474.

Transceiver 2474 preferably includes a wireless modem which is enabled to communicate via the Internet with a server 315 (FIG. 3), which in turn communicates with database 313 (FIG. 3).

A GPS device 2476 may be associated with the mobile communicator and may transmit via the transceiver 2475 the user's geographic coordinates to the server 314.

In the illustrated embodiment, which is described functionally hereinabove with reference to FIG. 3, the user may at any time actuate the mobile communicator 315 (FIG. 3) to establish contact via transceiver 2475 on the basis of part or all of the product-specific contact information, output from data signal separator 2464 and the non product-specific contact information preferably stored in the storage medium 2466.

FIG. 3 shows an example wherein a user actuates the mobile communicator 315, typically embodied as a cellular telephone or a WAP phone, to access a product-specific telephone center 330 (FIG. 3) identified by phone number 1-800-WATER4U. In the illustrated embodiment, this access is achieved via a non product-specific telephone center, embodied in telephone center 324, which is accessed via a cellular telephone link by use of a non product-specific telephone number, such as "1-800-864-2222".

The non product-specific telephone center 324 preferably maintains an Internet connection with a non product-specific server 314 as shown in FIG. 3. Upon accessing the non product-specific telephone center 324, the product-specific contact information, such as a code, may be transferred to the non product-specific server 318 via the pathway designated as A. The non product-specific server 314 may transfer the product-specific contact information, such as a code, to a database 313 via the pathway designated as B. The code may be matched against the full product-specific information, shown as 311 in FIG. 3. The product-specific contact information may be transferred from the database 313 via the pathway designated as C to the non product-specific server 318. The non product-specific server 318 may transfer the product-specific contact information to the non product-specific telephone center 324 via the pathway designated as D. The non product-specific telephone center 324 allows contact to be established between the user and a product-specific telephone center 330 (FIG. 3). Once the user has accessed the product-specific telephone center identified by the telephone number 1-800-WATER4U, the user may obtain information or, as shown in FIG. 3, enter into any appropriate commercial transaction, such as one which results in water being delivered to the residence of the user.

It is appreciated that where the mobile communicator 315 is embodied as a WAP enabled phone then the product specific contact information may be in the form of a web address such as WWW.MWATER/FREE.COM.

In accordance with a preferred embodiment of the present invention, database 313 may receive all or part of the content information output from data signal separator 2464 via a computer network communication, and from data signal processor 2412. Database 313 is preferably operative to collect and correlate user information and activities in connection with given contact information and to communicate with a facilitator 2478. The facilitator 2478 may have multiple functionalities which may be combined in a single entity or divided among various separate entities. The facilitator 2478 preferably interfaces among and between a broadcast facility 30 (FIG. 3) a user, a supplier of goods or services 2480 and various elements of communication facility 326 (FIG. 3) such as database 313, server 314 and telephone center 324. The facilitator 2478 may be operated by the operator of communication facility 326 or by another entity.

The facilitator 2478 preferably provides at least one of coordination and financial arrangements between one or more of a broadcast facility 300 (FIG. 3) a user, a supplier of goods or services 2480 and various elements of communication facility 326 (FIG. 3) such as database 313, server 314 and telephone center 324. Thus it is appreciated that the facilitator may provide payment arrangements between two or more of a broadcast facility 300 (FIG. 3), a user, a supplier of goods or services 2480 and an advertiser.

In the illustrated embodiment of FIG. 10F, the radio broadcast facility 220 (FIG. 3), typically a FM broadcast facility having subcarrier broadcast functionality, such as via a RDS, RBDS or a DARC protocol, includes an audio signal processor 2510, receiving an audio signal input, as well as a data signal processor 2512, receiving a data signal input. Outputs of processors 2511 and 2512 are supplied to a signal synchronizer 2514, which combines these outputs with suitable synchronization therebetween and supplies a combined output to a transmitter 2516.

As illustrated in FIG. 3, the broadcast message, preferably includes an audible audio content portion and an inaudible non-audio subcarrier content portion.

The broadcast message may be received, for example, by a radio 306 (FIG. 3), typically located in a vehicle. As seen in FIG. 10F, the radio is a standard radio including a signal receiver 2520 which outputs to a signal separator 2522, which is operative to separate the received signal into audio and data portions which are received respectively by an audio signal processor 2524 and a data signal processor 2526. The output of the audio signal processor 2524 may be heard by a user via a speaker, such as speaker 309 (FIG. 3) and the output of the data signal processor 2526 may provide a visible data output to a suitable radio display, such as display 312 (FIG. 3).

It is typical of conventional radios 306 that a local signal is transmitted from the signal receiver 2520 over short distances typically 3 feet. In accordance with a preferred embodiment of the present invention, this local signal is employed by a wireless interface assembly 2527 to provide contact information from the radio 306 to the mobile communicator 315 (FIG. 3).

Interface assembly 2527, which is not shown in FIG. 3, may reside anywhere within the local signal reception range of the radio 306 and may be a separate element or may be integrated with a mobile communicator or in any other suitable vehicle element.

Interface assembly 2527 preferably includes a local signal receiver 2528, which receives the local signal from radio 306 and configures a tuner 2526 to the identical frequency of the signal receiver 2520 in radio 306 (FIG. 3). This allows the signal receiver 2528 to receive the identical broadcast message as signal receiver 2520. The tuned frequency number can be made visible on a display such as an LED display (not shown). It is a particular feature of the present invention that the frequency of the tuner 2526 may be manually locked by means of a frequency lock 2530 via a switch 2532 operated by an operator interface 2534, typically a touch button. Alternatively the frequency lock 2530 maybe operated automatically.

The signal receiver 2530 passes on the signal received from the transmitter 2516 to a signal separator 2536 that separates a non-audio, non-visible output from the audio signal. The non-audio, non-visible output is received by a data signal processor 2538 and is subsequently received by a data signal separator 2540 the output of which is received by a transceiver 2542.

The non-audio, non-visible output transmitted by transceiver 2542 may be received by a transceiver 2544 forming part of a mobile communicator 315 (FIG. 3). It is appreciated that transceivers 2542 and 2544 and the communication link therebetween may be replaced by any other suitable wired or wireless communication link, such as a ohmic connection, an IR communication link, a Bluetooth communication link or another short range communication link.

The output from the transceiver 2544 may be stored in a signal storage medium 2546. Such storage may be but need not necessarily be controlled by a switch 2548 controlled by an operator using an operator interface 2550.

In the example shown in FIG. 3, the operator interface 2550 may be speech actuated, such that when the operator says "CAPTURE" as illustrated in FIG. 3, the non-audio, non-visible output of data signal separator is stored in storage medium 2546.

Additionally or alternatively, a switch 2552 may be provided at an output of storage medium 2546 and may be actuated by an operator using operator interface 2550. The operation of switch 2552 may be similar to that of switch 2548, the only difference in their effect being that switch 2548 governs storage of the non-audio, non-visible output, while switch 2552 governs supply thereof to a data signal processor 2562.

The output of the data signal processor 2562 may be supplied to a data signal separator 2554, which may provide a visible data output which may be displayed on a screen of the mobile communicator 315. The output from the data signal separator 2554 is typically a product-specific code which, in the context of FIG. 3 is shown as #1234#, and which may be stored in a signal storage medium 2556. As distinct from the embodiment in FIG. 10F, non product-specific contact information is not necessarily contained within the non-audio, non-visible output and may be provided by means other than the inaudible non-audio content portion, such as by a cookie. The non product-specific contact information may also be stored in signal storage medium 2556. In the context of FIG. 3, the non-product specific contact information may include, for example, a web address such as "WWW.PORTAL.COM" and/or a telephone number, such as 1-800-864-2222. Such storage may be, but need not necessarily be, governed by a switch 2558 controlled by an operator using an operator interface 2560.

In the example shown in FIG. 10F, the operator interface 2560 may be speech actuated, such that when the operator says "CONTACT" as illustrated in FIG. 3, the product-specific contact information output of data signal separator 2554 is stored in storage medium 2556.

Additionally or alternatively, a switch 2562 may be provided at an output of storage medium 2556 and may be actuated by an operator using operator interface 2560. The operation of switch 2562 may be similar to that of switch 2558, the only difference in their effect being that switch 2558 governs storage of the product-specific contact information output, while switch 2562 governs supply of both the product-specific contact information and the non product-specific to a transceiver 2564.

Transceiver 2564 preferably includes a wireless modem which is enabled to communicate via the Internet with a server 318 (FIG. 3), which in turn communicates with database 313 (FIG. 3).

A GPS device 2565 may be associated with the mobile communicator may transmit the user's geographic coordinates to the server.

In the illustrated embodiment, which is described functionally hereinabove with reference to FIG. 3, the user may at any time actuate the mobile communicator 315 (FIG. 3) to establish contact via transceiver 2564 on the basis of part or all of the product-specific contact information output from data signal separator 2554 and the non product-specific contact information preferably stored in the storage medium 2556.

FIG. 3. shows an example wherein a user actuates the mobile communicator 315 typically embodied as a web-enabled wireless personal digital assistant, to access a product-specific web site 328 (FIG. 3) identified by the web address WWW.MWATER/FREE.COM. In the illustrated embodiment, this access is achieved via a non product-specific server, embodied in server 318, which is accessed via the Internet by use of a non product-specific web address, such as "WWW.PORTAL.COM".

Upon accessing the non product-specific web server 318, the product-specific contact information, such as a code, may be transferred to the database 313 via the pathway designated as A. The code may be matched against the full product-specific information, shown as 311 in FIG. 3. The product-specific contact information may be transferred from the database 313 via the pathway designated as B to the non product-specific server 318. The non product-specific server 318 allows contact to be established between the user and a product-specific server 328 (FIG. 3). Once the user has accessed the product-specific web site identified by the web address "WWW.MWATER/FREE.COM", the user may obtain information or, as shown in FIG. 3, enter into any appropriate commercial transaction, such as one which results in water being delivered to the residence of the user.

In accordance with a preferred embodiment of the present invention, database 313 may receive all or part of the content information output from data signal separator 2554 via a computer network communication, as from data signal processor 2562. Database 313 is preferably operative to collect and correlate user information and activities in connection with given contact information and to communicate with a facilitator 2567. The facilitator 2567 may have multiple functionalities which may be combined in a single entity or divided among various separate entities. The facilitator preferably interfaces among and between a broadcast facility 300 (FIG. 3) a user, a supplier of goods or services 2568 and various elements of communication facility 326 (FIG. 3) such as database 313, server 318 and telephone center 324. The facilitator 2567 may be operated by the operator of communication facility 326 or by another entity.

The facilitator 2567 preferably provides at least one of coordination and financial arrangements between one or more of a broadcast facility 300 (FIG. 3) a user, a supplier of goods or services 2568 and various elements of communication facility 326 (FIG. 3) such as database 313, server 318 and telephone center 324. Thus it is appreciated that the facilitator may provide payment arrangements between two or more of a broadcast facility 300 (FIG. 3), a user, a supplier of goods or services 2568 and an advertiser.

Reference is now made to FIGS. 11A AND 11B, are simplified functional block diagrams of six alternative embodiments of the system of FIG. 4. As seen in FIG. 11A, there is provided a system and methodology of the type shown in FIG. 4, wherein a commercial message is broadcast by a radio broadcast facility, such as an FM or digital broadcast facility.

In the illustrated embodiment of FIG. 11A, the radio broadcast facility 400 (FIG. 4), typically a short range digital broadcast facility such as a Bluetooth transmitter associated with a static or mobile billboard, includes a voice to data processor 2610, receiving an audio signal input. The output of processor 2610 and a data signal input are supplied to a digital signal processor 2614, which combines these outputs with suitable synchronization therebetween and supplies a combined output to a digital transmitter 2616.

As illustrated in FIG. 4, the broadcast message, preferably includes an audible audio content portion 403, and an inaudible non-audio content portion 404.

The broadcast message may be received, for example, by a Bluetooth enabled mobile communicator 405 (FIG. 4), which, in the embodiment shown in FIG. 4 is located in a vehicle 402 (FIG. 4). In distinction to the embodiments described previously, a radio 410 (FIG. 4) co-located within same vehicle 402 (FIG. 4) may not be a direct recipient of the broadcast message from the broadcast facility 400 (FIG. 4). It is appreciated that if the radio 410 is a Bluetooth enabled radio that it may also be a recipient of all or part of the broadcast message from the broadcast facility 400 (FIG. 4). The broadcast message output transmitted by digital transceiver 2616 may be received by a digital transceiver 2640, such as a Bluetooth transceiver, forming part of a mobile communicator 405 (FIG. 4).

The output of digital transceiver 2640 may be supplied to a storage medium 2642. but need not necessarily be, governed by a switch 2644 controlled by an operator using an operator interface 2646.

In the example shown in FIG. 11A, the operator interface 2646 may be speech actuated, such that when the operator says "CAPTURE" as illustrated in FIG. 4, the output of data signal separator is stored in storage medium 2642.

Additionally or alternatively, a switch 2648 may be provided at an output of storage medium 2642 and may be actuated by an operator using operator interface 2646. The operation of switch 2648 may be similar to that of switch 2644, the only difference in their effect being that switch 2644 governs storage of the output, while switch 2648 governs supply thereof to a data signal processor 2650.

The output: of the data signal processor 2650 may be supplied to a data signal separator 2654, which may provide a visible data output of part or all of the non-audio, non-visible portion of the broadcast message, which may be displayed on a screen 412 of the mobile communicator 405 (FIG. 4). Data signal separator 2654 may additionally provide an audio output of part or all of the audio, portion of the broadcast message, which may be heard via a speaker attached to the mobile communicator 405 (FIG. 4).

The output from the data signal separator 2654 is typically, but not necessarily, a product-specific code which, in the context of FIG. 4 is shown as #1234#, and non product-specific contact information which, in the context of FIG. 4 is shown as a non product-specific web address, http://WWW.PORTAL.COM and a non product-specific telephone number, 1-800-864-2222, and which may be stored in a signal storage medium 2661. The non product-specific contact information is not necessarily contained within the non-audio, non-visible output and may be provided by means other than the inaudible non-audio content portion, such as by a cookie or SMS.

Such storage may be, but need not necessarily be, governed by a switch 2658 controlled by an operator using an operator interface 2660.

In the example shown in FIG. 11A, the operator interface 2660 may be speech actuated, such that when the operator says "CONTACT" as illustrated in FIG. 4, the product-specific contact information output of data signal separator 2654 is stored in storage medium 2661.

Additionally or alternatively, a switch 2662 may be provided at an output of storage medium 2661 and may be actuated by an operator using operator interface 2660. The operation of switch 2662 may be similar to that of switch 2658, the only difference in their effect being that switch 2658 governs storage of the product-specific contact information output, while switch 2662 governs supply of both the product-specific contact information and the non product-specific to a transceiver 2664.

Transceiver 2664 preferably includes a wireless modem which is enabled to communicate via the Internet with a server 409409 (FIG. 4), which in turn communicates with database 408 (FIG. 4).

A GPS device 2665 may be associated with the mobile communicator 405 and may transmit the user's geographic coordinates to the server 409 via the transceiver 2664.

In the illustrated embodiment, which is described functionally hereinabove with reference to FIG. 4, the user may at any time actuate the mobile communicator 405 (FIG. 4) to establish contact via transceiver 2664 on the basis of part or all of the product-specific contact information output from data signal separator 2654 and the non product-specific contact information preferably stored in the storage medium 2661.

FIG. 11A shows an example wherein a user actuates the mobile communicator 405, typically embodied as a Bluetooth-enabled personal digital assistant with wireless connectivity to the Internet, to access a product-specific web site 430 (FIG. 4) identified by the web address WWW.MWATER/FREE.COM. In the illustrated embodiment, this access is achieved via a non product-specific server, embodied in server 409, which is accessed via the Internet by use of a non product-specific web address, such as "WWW.PORTAL.COM".

Upon accessing the non product-specific web server 409, the product-specific contact information, such as a code, may be transferred to the database 408 via the pathway designated as A. The code may be matched against the full product-specific information, shown as 406 in FIG. 4. The product-specific contact information may be transferred from the database 408 via the pathway designated as B to the non product-specific server 409. The non product-specific server 409 allows contact to be established between the user and a product-specific server 430 (FIG. 4). Once the user has accessed the product-specific web site identified by the web address "WWW.MWATER/FREE.COM", the user may obtain information or, as shown in FIG. 4, enter into any appropriate commercial transaction, such as one which results in water being delivered to the residence of the user.

In accordance with a preferred embodiment of the present invention; database 408 may receive all or part of the content information output from data signal separator 2654 via a computer network communication, and from data signal processor 2614. Database 408 is preferably operative to collect and correlate user information and activities in connection with given contact information and to communicate with a facilitator 2667. The facilitator 2667 may have multiple functionalities which may be combined in a single entity or divided among various separate entities. The facilitator 2667 preferably interfaces among and between a broadcast facility 400 (FIG. 4) a user, a supplier of goods or services 2668 and various elements of communication facility 434 (FIG. 4) such as database 408, server 409 and telephone center 418. The facilitator 2667 may be operated by the operator of communication facility 434 or by another entity.

The facilitator 2667 preferably provides at least one of coordination and financial arrangements between one or more of a broadcast facility 400 (FIG. 4) a user, a supplier of goods or services 2668 and various elements of communication facility 434 (FIG. 4) such as database 408, server 409 and telephone center 418. Thus it is appreciated that the facilitator may provide payment arrangements between two or more of a broadcast facility 400 (FIG. 4), a user, a supplier of goods or services 2668 and an advertiser.

In the illustrated embodiment of FIG. 11B, the radio broadcast facility 400 (FIG. 4), typically a short range digital broadcast facility such as a Bluetooth transmitter associated with a static or mobile billboard, includes a voice to data processor 2710, receiving an audio signal input. The output of processor 2710 and a data signal input are supplied to a digital signal processor 2714, which combines these outputs with suitable synchronization therebetween and supplies a combined output to a digital transmitter 2716.

As illustrated in FIG. 4, the broadcast message, preferably includes an audible audio content portion and an inaudible non-audio content portion.

The broadcast message may be received, for example, by a Bluetooth enabled mobile communicator 405 (FIG. 4), which, in the embodiment shown in FIG. 4 is located in a vehicle 402 (FIG. 4). In distinction to the embodiments described previously, a radio 410 (FIG. 4) co-located within same vehicle 402 may not be a direct recipient of the broadcast message from the broadcast facility 400 (FIG. 4). It is appreciated that if the radio 410 is a Bluetooth enabled radio that it may also be a recipient of all or part of the broadcast message from the broadcast facility 400 (FIG. 4).

The broadcast message output transmitted by digital transceiver 2716 may be received by a digital transceiver 2740, such as a Bluetooth transceiver, forming part of a mobile communicator 405 (FIG. 4). The output of digital transceiver 2740 may be supplied to a storage medium 2742, but need not necessarily be, governed by a switch 2744 controlled by an operator using an operator interface 2746.

In the example shown in FIG. 11B, the operator interface 2746 may be speech actuated, such that when the operator says "CAPTURE" as illustrated in FIG. 4, the non-audio, non-visible output of data signal separator is stored in storage medium 2742.

Additionally or alternatively, a switch 2748 may be provided at an output of storage medium 2742 and may be actuated by an operator using operator interface 2746. The operation of switch 2744 may be similar to that of switch 2744, the only difference in their effect being that switch 2748 governs storage of the non-audio, non-visible output, while switch 2748 governs supply thereof to a data signal processor 2750.

The output of the data signal processor 2750 may be supplied to a data signal separator 2754, which may provide a visible data output which may be displayed on a screen 412 of the mobile communicator 405. The output from the data signal separator 2754 is typically, but not necessarily, a product-specific code which, in the context of FIG. 4 is shown as #1234#, and non product-specific contact information which, in the context of FIG. 4 is shown as a non product-specific web address, WWW.PORTAL.COM and a non product-specific telephone number, 1-800-864-2222, and which may be stored in a signal storage medium 2756. The non product-specific contact information is not necessarily contained within the non-audio, non-visible output and may be provided by means other than the inaudible non-audio content portion, such as by a coolie or SMS. Such storage may be, but need not necessarily be, governed by a switch 2758 controlled by an operator using an operator interface 2760.

In the example shown in FIG. 11B, the operator interface 2760 may be speech actuated, such that when the operator says "CONTACT" as illustrated in FIG. 4, the product-specific contact information output of data signal separator 2754 is stored in storage medium 2756.

Additionally or alternatively, a switch 2762 may be provided at an output of storage medium 2756 and may be actuated by an operator using operator interface 2760. The operation of switch 2762 may be similar to that of switch 2758, the only difference in their effect being that switch 2758 governs storage of the product-specific contact information output, while switch 2762 governs supply of both the product-specific contact information and the non product-specific to a transceiver 2764.

Transceiver 2764 preferably includes a wireless modem which is enabled to communicate via the Internet with a server 409 (FIG. 4), which in turn communicates with database 408 (FIG. 4).

A GPS device 2765 may be associated with the mobile communicator 405 and may transmit the user's geographic coordinates to the server 409 via the transceiver 2764.

In the illustrated embodiment, which is described functionally hereinabove with reference to FIG. 4, the user may at any time actuate the mobile communicator 405.

FIG. 11B to establish contact via transceiver 2764 on the basis of part or all of the product-specific contact information output from data signal separator 2754 and the non product-specific contact information preferably stored in the storage medium 2756.

FIG. 4 shows an example wherein a user actuates the mobile communicator 405, typically embodied as a Bluetooth-enabled personal digital assistant with wireless connectivity via a cellular provider, to access a product-specific telephone center 432 (FIG. 4) identified by phone number 1-800-WATER4U. In the illustrated embodiment, this access is achieved via a non product-specific telephone center, embodied in telephone center 418, which is accessed via a cellular telephone link by use of a non product-specific telephone number, such as "1-800-864-2222".

The non product-specific telephone center 432 preferably maintains an Internet connection with a non product-specific server 409 as shown in FIG. 4. Upon accessing the non product-specific telephone center 418, the product-specific contact information, such as a code, may be transferred to the non product-specific server 409 via the pathway designated as A. The non product-specific server 409 may transfer the product-specific contact information, such as a code, to a database 408 via the pathway designated as B. The code may be matched against the full product-specific information, shown as 406 in FIG. 4. The product-specific contact information may be transferred from the database 408 via the pathway designated as C to the non product-specific server 409. The non product-specific server 409 may transfer the product-specific contact information to the non product-specific telephone center 418 via the pathway designated as D. The non product-specific telephone center 418 allows contact to be established between the user and a product-specific telephone center 432 (FIG. 4). Once the user has accessed the product-specific telephone center identified by the telephone number 1-800-WATER4U, the user may obtain information or, as shown in FIG. 4, enter into any appropriate commercial transaction, such as one which results in water being delivered to the residence of the user.

It is appreciated that where the mobile communicator 405 is embodied as a WAP enabled phone then the product specific contact information may be in the form of a web address such as WWW.MWATER/FREE.COM.

In accordance with a preferred embodiment of the present invention, database 408 may receive all or part of the content information output from data signal separator 2754 via a computer network communication, as from data signal processor 2750. Database 408 is preferably operative to collect and correlate user information and activities in connection with given contact information and to communicate with a facilitator 2766. The facilitator 2766 may have multiple functionalities which may be combined in a single entity or divided among various separate entities. The facilitator 2766 preferably interfaces among and between a broadcast facility 400 (FIG. 4) a user, a supplier of goods or services 2768 and various elements of communication facility 434 (FIG. 4) such as database 408, server 409 and telephone center 418. The facilitator 2766 may be operated by the operator of communication facility 434 or by another entity.

The facilitator 2766 preferably provides at least one of coordination and financial arrangements between one or more of a broadcast facility 400 (FIG. 4) a user, a supplier of goods or services 2768 and various elements of communication facility 434 (FIG. 4) such as database 408, server 409 and telephone center 418. Thus it is appreciated that the facilitator may provide payment arrangements between two or more of a broadcast facility 400 (FIG. 4), a user, a supplier of goods or services 2768 and an advertiser.

In the illustrated embodiment of FIG. 12A, the radio broadcast facility 500 (FIG. 5), typically a digital broadcast facility, includes a voice to data processor 2810, receiving an audio signal input. Output of processor 2810 and data signal input are supplied to a digital signal processor 2814, which combines these outputs with suitable synthesis therebetween and supplies a combined output to a transmitter 2816.

As illustrated in FIG. 5, the digitized broadcast message, preferably includes an audible audio content portion, and an inaudible non-audio content portion.

The broadcast message may be received, for example, by a radio 510 (FIG. 5), typically located in a vehicle 512 (FIG. 5). As seen in FIG. 12A, the radio is a digital radio including a digital signal receiver 2820 which outputs to a digital signal processor 2822. The digital processed signal is delivered to a digital signal separator 2824 which is operative to separate the received digital signal into audio and data portions which are received respectively by a data to voice processor 2826 and a data signal separator 2828. The output of the data to voice processor 2826 may be heard by a user via a speaker, such as speaker 514 (FIG. 5).

The output of the digital signal separator 2824 is supplied to a data signal separator 2828 which may provide a visible data output to a suitable radio display, such as display 517 (FIG. 5).

In contrast to embodiments described hereinabove in FIGS. 8A-8F, 9A-9F, 10A-D, and 11A-B, and further described hereinbelow in FIGS. 13A-B, in the present embodiment, shown in FIG. 12A, there need not necessarily be any transfer of information, between a radio and a mobile communicator.

Simultaneously, or at any time previous to the transmission of the broadcast message, contact information 504 (FIG. 5) pertaining to the broadcast message may be received by a non product-specific server 506 (FIG. 5) via an Internet communication from a computer 508 (FIG. 5) associated with broadcasting facility 500 (FIG. 5). The contact information may be stored in a database 520 (FIG. 5).

A user may receive all or part of the contact information 504 (FIG. 5) by accessing a non product-specific web server, along pathway labeled A in FIG. 12A, and specifying a radio channel, preferably the same radio channel as being listened to on radio 510, via a browser (not shown) associated with the mobile communicator 516 (FIG. 5), using an operator interface 2829. The non product-specific server web address, shown in FIG. 5 as WWW.PORTAL.COM", may be loaded into the mobile communicator browser by such means as manually or orally, or accessed from a storage medium associated with the mobile communicator 516 (FIG. 5), such a contact address being previously received by such means as a cookie.

In the present embodiment, the mobile communicator 516 (FIG. 5) is preferably a GPRS or 3G communicator able to be on-line-all-the-time and receive streaming data from an Internet server, such as designated by the web address WWW.PORTAL.COM".

Alternatively, the radio station specifications may be inputted into the mobile communicator 516 by means of an interface assembly associated with the mobile communicator and described hereinabove in FIG. 8E. Part or all or the contact information 504 (FIG. 5) may be transmitted from the non product-specific server 506 (FIG. 5) to the transceiver 2830 via communication pathway labeled B.

The output of transceiver 2830 may be supplied to a data signal processor 2850 output of the data signal processor 2850 may be supplied to a data signal separator 2854, which may provide a visible data output which may be displayed on a screen 518 (FIG. 5) of the mobile communicator 516 (FIG. 5). The output from the data signal separator 2854 is typically non product-specific contact information, such as a web address and telephone number, and product-specific web address and product-specific telephone number, and other information pertaining to the broadcast message and which may be stored in a signal storage medium 2856. Such storage 2856 may be, but need not necessarily be, governed by a switch 2858 controlled by an operator using an operator interface 2860.

In the example shown in FIG. 12A, the operator interface 2860 may be speech actuated, such that when the operator says "CAPTURE" as illustrated in FIG. 5, the contact information from data signal separator is stored in storage medium 2856.

A similar operator interface 2860 may activate switch 2862 by speech actuated, such that when the operator says "CONTACT" as illustrated in FIG. 5, the product-specific contact information stored in storage medium 2856 may be provided to transceiver 2830. The contact information, which may or may not include user identification information, may be transmitted by the transceiver 2830, preferably by wireless modem which is able to communicate with the non product-specific server 506 (FIG. 5) with web address designated in FIG. 5 as WWW.PORTAL.COM, via pathway C. The non product-specific server 506 may in turn communicates with database 520 (FIG. 5). The non product-specific telephone center 506 may establish connection with a product-specific server 519 with a product-specific web address designated in FIG. 5 as WWW.MWATER/FREE.COM.

A GPS device 2857 may be associated with the mobile communicator and may transmit via the transceiver 2830 the user's geographic coordinates to the server 506.

In the illustrated embodiment, which is described functionally hereinabove with reference to FIG. 5, the user may at any time actuate the mobile communicator 516 (FIG. 5) to establish contact via transceiver 2830 on the basis of part or all of the product-specific contact information output from data signal separator 2862 and the non product-specific contact information preferably stored in the storage medium 2856.

In accordance with a preferred embodiment of the present invention, database 520 may receive all or part of the content information output from data signal separator 2854 via a computer network communication, and from data signal processor 2814. Database 520 is preferably operative to collect and correlate user information and activities in connection with given contact information and to communicate with a facilitator 2867. The facilitator 2867 may have multiple functionalities which may be combined in a single entity or divided among various separate entities. The facilitator 2867 preferably interfaces among and between a broadcast facility 500 (FIG. 5) a user, a supplier of goods or services 2868 and various elements of communication facility 526 (FIG. 5) such as database 520, server 506 and telephone center 524. The facilitator 2867 may be operated by the operator of communication facility 526 or by another entity.

The facilitator 2867 preferably provides at least one of coordination and financial arrangements between one or more of a broadcast facility 500 (FIG. 5) a user, a supplier of goods or services 2868 and various elements of communication facility 526 (FIG. 5) such as database 520, server 506 and telephone center 524. Thus it is appreciated that the facilitator may provide payment arrangements between two or more of a broadcast facility 500 (FIG. 5), a user, a supplier of goods or services 2868 and an advertiser.

In the illustrated embodiment of FIG. 12B, the radio broadcast facility 500 (FIG. 5), typically a digital broadcast facility, includes a voice to data processor 2910, receiving an audio signal input. Output of processor 2910 and data signal input are supplied to a digital signal processor 2914, which combines these outputs with suitable synthesis therebetween and supplies a combined output to a transmitter 2916.

As illustrated in FIG. 5, the digitized broadcast message, preferably includes an audible audio content portion and an inaudible non-audio content portion.

The broadcast message may be received, for example, by a radio 510 (FIG. 5), typically located in a vehicle 512 (FIG. 5). As seen in FIG. 12B, the radio is a digital radio including a digital signal receiver 2920 which outputs to a digital signal processor 2922. The digital processed signal is delivered to a digital signal separator 2924 which is operative to separate the received digital signal into audio and data portions which are received respectively by a data to voice processor 2926 and a data signal separator 2928. The output of the data to voice processor 2926 may be heard by a user via a speaker, such as speaker 514 (FIG. 5).

The output of the digital signal separator 2924 is supplied to a data signal separator 2928 which may provide a visible data output to a suitable radio display, such as display 517 (FIG. 5).

In contrast to embodiments described hereinabove in FIGS. 8A-8F, 9A-9F, 10A-D, and 11A-B, and further described hereinbelow in FIGS. 13A-B, in the present embodiment, shown in FIG. 12B, there need not necessarily be any transfer of information, between a radio and a mobile communicator.

Simultaneously, or at any time previous to the transmission of the broadcast message, contact information 504 (FIG. 5) pertaining to the broadcast message may be received by a non product-specific server 506 (FIG. 5) via an Internet communication from a computer 508 (FIG. 5) associated with broadcasting facility 500 (FIG. 5). The contact information may be stored in a database 520 (FIG. 5).

A user may receive all or part of the contact information 504 (FIG. 5) by accessing a non product-specific web server, along pathway labeled A in FIG. 12B, and specifying a radio channel, preferably the same radio channel as being listened to on radio 510, via a browser (not shown) associated with the mobile communicator 516 (FIG. 5), using an operator interface 2929. The non product-specific server web address, shown in FIG. 5 as WWW.PORTAL.COM" may be loaded into the mobile communicator browser by such means as manually or orally, or accessed from a storage medium associated with the mobile communicator 516 (FIG. 5), such a contact address being previously received by such means as a cookie.

In the present embodiment, the mobile communicator 516 (FIG. 5) is preferably a GPRS or 3G communicator able to be on-line-all-the-time and receive streaming data from an Internet server, such as designated by the web address WWW.PORTAL.COM.

Alternatively, the radio station specifications may be inputted into the mobile communicator 516 by means of an interface assemble associated with the mobile communicator and described hereinabove in FIG. 8E. Part or all or the contact information 504 (FIG. 5) may be transmitted from the non product-specific server 506 (FIG. 5) to the transceiver 2930 via communication pathway labeled B.

The output of transceiver 2930 may be supplied to a data signal processor 2950. Output of the data signal processor 2950 may be supplied to a data signal separator 2954, which may provide a visible data output which may be displayed on a screen 518 (FIG. 5) of the mobile communicator 516 (FIG. 5). The output from the data signal separator 2954 is typically non product-specific contact information, such as a web address and telephone number, and product-specific web address and product-specific telephone number, and other information pertaining to the broadcast message and which may be stored in a signal storage medium 2956. Such storage 2956 may be, but need not necessarily be, governed by a switch 2958 controlled by an operator using an operator interface 2960.

In the example shown in FIG. 12B, the operator interface 2960 may be speech actuated, such that when the operator says "CAPTURE" as illustrated in FIG. 5, the contact information from data signal separator is stored in storage medium 2956.

A similar operator interface 2960 may activate switch 2962 by speech actuated, such that when the operator says "CONTACT" as illustrated in FIG. 5, the product-specific contact information stored in storage medium 2956 may be provided to transceiver 2930. The contact information, which may or may not include user identification information, may be transmitted by the transceiver 2930, preferably by wireless modem which is able to communicate via with a non product-specific telephone center 524 (FIG. 5) with telephone number designated in FIG. 5 as 1-800-864-2222, via pathway C. The non product-specific telephone center 524 may communicate with the non product-specific server 506 which in turn communicates with database 520 (FIG. 5).

The non product-specific telephone center 524 may establish connection with a product-specific telephone center 530 with a product-specific telephone number designated in FIG. 5 as 1-800-WATER4U.

A GPS device 2957 may be associated with the mobile communicator and may transmit via the transceiver 2930 the user's geographic coordinates to the server 506.

In the illustrated embodiment, which is described functionally hereinabove with reference to FIG. 5, the user may at any time actuate the mobile communicator 516 (FIG. 5) to establish contact via transceiver 2930 on the basis of part or all of the product-specific contact information output from data signal separator 2954 and the non product-specific contact information preferably stored in the storage medium 2956.

In accordance with a preferred embodiment of the present invention, database 520 may receive all or part of the content information output from data signal separator 2954 via a computer network communication, and from data signal processor 2914. Database 520 is preferably operative to collect and correlate user information and activities in connection with given contact information and to communicate with a facilitator 2967. The facilitator 2967 may have multiple functionalities which may be combined in a single entity or divided among various separate entities. The facilitator 2967 preferably interfaces among and between a broadcast facility 500 (FIG. 5) a user, a supplier of goods or services 2968 and various elements of communication facility 526 (FIG. 5) such as database 520, server 506 and telephone center 524. The facilitator 2967 may be operated by the operator of communication facility 526 or by another entity.

The facilitator preferably 2967 provides at least one of coordination and financial arrangements between one or more of a broadcast facility 500 (FIG. 5) a user, a supplier of goods or services 2968 and various elements of communication facility 526 (FIG. 5) such as database 520, server 506 and telephone center 524. Thus it is appreciated that the facilitator 2967; may provide payment arrangements between two or more of a broadcast facility 500 (FIG. 5), a user, a supplier of goods or services 2968 and an advertiser.

Turning to FIG. 13A, there is provided a system and methodology of the type shown in FIG. 6, wherein a message, here a commercial message, is broadcast, typically by a radio broadcast facility, such as an FM broadcast facility.

In the illustrated embodiment of FIG. 13A, the radio broadcast facility 600 (FIG. 6), typically a FM broadcast facility having subcarrier broadcast functionality, such as via a RDS, RBDS or a DARC protocol, includes an audio signal processor 3210, receiving an audio signal input, as well as a data signal processor 3212, receiving a data signal input. Outputs of processors 3210 and 3212 are supplied to a signal synchronizer 3214, which combines these outputs with suitable synchronization therebetween and supplies a combined output to a transmitter 3216.

As illustrated in FIG. 6, the broadcast message, preferably includes an audible audio content portion and an inaudible non-audio content portion.

The broadcast message may be received, for example, by a computerized integrated vehicle system 606 (FIG. 6), typically located in a vehicle 608. As seen in FIG. 13A, the computerized integrated vehicle system may contain an integrated 606 radio including a signal receiver 3220 which outputs to a signal separator 3222, which is operative to separate the received signal into audio and data portions which are perceived respectively by an audio signal processor 3224 and a data signal processor 3226. The output of the audio signal processor 3224 may be heard by a user via a speaker, such as speaker 610 (FIG. 6).

The output of the data signal processor 3226 is supplied to a data signal separator 3228 which may provide a visible data output to a suitable radio display, such as display 613 (FIG. 6). It is a particular feature of the present invention that the data signal separator 3228 also provides a non-audio, non-visible output, which may be stored in a storage medium 3242. Such storage may be, but need not necessarily be, governed by a switch 3244 controlled by an operator using an operator interface 3246.

In the example shown in FIG. 6, the operator interface 3246 may be speech actuated, such that when the operator says "CAPTURE" as illustrated in FIG. 6, the non-audio, non-visible output of data signal separator is stored in storage medium 3242.

Additionally or alternatively, a switch 3248 may be provided at an output of storage medium 3242 and may be actuated by an operator using operator interface 3246. The operation of switch 3248 may be similar to that of switch 3244, the only difference in their effect being that switch 3244 governs storage of the non-audio, non-visible output, while switch 3248 governs supply thereof to a data signal processor 3250.

The output of the data signal processor 3250 may be supplied to a data signal separator 3252, which may provide a visible output which may be displayed on a screen 613 of the computerized integrated vehicle system 606 (FIG. 6) and also provides a contact information output, which may be stored in a signal storage medium 3254. In the context of FIG. 6, the contact information output may include, for example, a product-specific web address, such as WWW.MWATER/FREE.COM, a product-specific telephone number, such as 1-800-WATER4U, a non product-specific web address, such as WWW.PORTAL.COM, or a non product-specific telephone number, such as 1-800-864-2222. Such storage may be, but need not necessarily be, governed by a switch 3256 controlled by an operator using an operator interface 3258.

In the example shown in FIG. 6, the operator interface 3258 may be speech actuated, such that when the operator says "CONTACT" as illustrated in FIG. 6, the contact information, output is stored in storage medium 3254.

Additionally or alternatively, a switch 3260 may be provided at an output of storage medium 3254 and may be actuated by an operator using operator interface 3258. The operation of switch 3260 may be similar to that of switch 3256, the only difference in their effect being that switch 3256 governs storage of the contact information output, while switch 3260 governs supply thereof to a transceiver 3262.

Transceiver 3262 preferably includes a wireless modem which is enabled to communicate via the Internet with server 619 (FIG. 6), which in turn communicates with a database 620 (FIG. 6). Typically a GPS device 608 (FIG. 6), associated with the computerized integrated vehicle system 606 (FIG. 6), may supply transceiver 3262 with the user's geographic coordinates.

In the illustrated embodiment, which is described functionally hereinabove with reference to FIG. 6, the user may at any time actuate the integrated mobile communicator within the computerized integrated vehicle system 606 (FIG. 6) to establish contact via transceiver 3262 on the basis of part or all of the contact information output from data signal separator 3252.

FIG. 6 shows an example wherein a user actuates the integrated mobile communicator within the computerized integrated vehicle system 606 (FIG. 6) to access a web site identified by the web address "WWW.MWATER/FREE.COM" which forms part of the product-specific content information output. In the illustrated embodiment, this access is achieved via a non product-specific portal, embodied in server 619 (FIG. 6), which is accessed via the Internet by use of a non product-specific web address, such as "WWW.PORTAL.COM". The non product-specific web address need not be broadcast and is typically stored in the computerized integrated vehicle system 606 (FIG. 6), such as by means of a cookie. Alternatively, the non product-specific web address may be broadcast as part of content portion 647 (FIG. 6) or otherwise.

An additional switch operator 3264 governed by operator interface 3266 may be speech actuated, such that when the operator says "TRANSFER" as illustrated in FIG. 6, the non-audio, non-visible output may be supplied from the storage medium 3242 to a further transceiver 3268 that may transfer the content information to a suitably enabled mobile communicator 614 (FIG. 6). It is appreciated that the transceiver 3268 and the communication link therebetween may be replaced by any other suitable wired or wireless communication link, such as a ohmic connection, an IR communication link, a Bluetooth communication link or another short range communication link.

Once the user has accessed the product-specific web site identified by the web address "WWW.MWATER/FREE.COM", the user may obtain information or, as shown in FIG. 6 enter into any appropriate commercial transaction, such as one which results in water being delivered to the residence of the user.

In accordance with a preferred embodiment of the present invention, database 620 may receive all or part of the content information output from data signal separator 3252 or via a computer network communication, as from data signal processor 3212. Database 620 is preferably operative to collect and correlate user information and activities in connection with given contact information and to communicate with a facilitator 3270. The facilitator 3270 may have multiple functionalities which may be combined in a single entity or divided among various separate entities. The facilitator preferably interfaces among and between a broadcast facility 600 (FIG. 6) a user, a supplier of goods or services 3272 and various elements of communication facility 626 (FIG. 6) such as database 620, server 619 and telephone center 624. The facilitator 3270 may be operated by the operator of communication facility 626 or by another entity.

The facilitator 3270 preferably provides at least one of coordination and financial arrangements between one or more of a broadcast facility 600 (FIG. 6) a user, a supplier of goods or services 3272 and various elements of communication facility 626 (FIG. 6) such as database 620, server 619 and telephone center 624. Thus it is appreciated that the facilitator 3270 may provide payment arrangements between two or more of a broadcast facility 600 (FIG. 6), a user, a supplier of goods or services 3272 and an advertiser.

Turning to FIG. 13B, there is provided a system and methodology of the type shown in FIG. 6, wherein a message, here a commercial message, is broadcast, typically by a radio broadcast facility, such as an FM broadcast facility.

In the illustrated embodiment of FIG. 13B, the radio broadcast facility 600 (FIG. 6), typically a FM broadcast facility having subcarrier broadcast functionality, such as via a RDS, RBDS or a DARC protocol, includes an audio signal processor 3310, receiving an audio signal input, as well as a data signal processor 3312, receiving a data signal input. Outputs of processors 3310 and 3312 are supplied to a signal synchronizer 3314, which combines these outputs with suitable synchronization therebetween and supplies a combined output to a transmitter 3316.

As illustrated in FIG. 6, the broadcast message, preferably includes an audible audio content portion, and an inaudible non-audio content portion.

The broadcast message may be received, for example, by a computerized integrated vehicle system 606 (FIG. 6), typically located in a vehicle 608. As seen in FIG. 13B, the computerized integrated vehicle system may contain an integrated 606 radio including a signal receiver 3320 which outputs to a signal separator 3322, which is operative to separate the received signal in audio and data portions which are perceived respectively by an audio signal processor 3324 and a data signal processor 3326. The output of the audio signal processor 3324 may be heard by a user via a speaker, such as speaker 610 (FIG. 6).

The output of the data signal processor 3326 is supplied to a data signal separator 3328 which may provide a visible data output to a suitable radio display, such as display 613 (FIG. 6). It is a particular feature of the present invention that the data signal separator 3328 also provides a non-audio, non-visible output, which may be stored in a storage medium 3342. Such storage may be, but need not necessarily be, governed by a switch 3344 controlled by an operator using an operator interface 3346.

In the example shown in FIG. 6, the operator interface 3346 may be speech actuated, such that when the operator says "CAPTURE" as illustrated in FIG. 6, the non-audio, non-visible output of data signal separator is stored in storage medium 3342.

Additionally or alternatively, a switch 3348 may be provided at an output of storage medium 3342 and may be actuated by an operator using operator interface 3346. The operation of switch 3348 may be similar to that of switch 3344, the only difference in their effect being that switch 3344 governs storage of the non-audio, non-visible output, while switch 3348 governs supply thereof to a data signal processor 3350.

The output of the data signal processor 3350 may be supplied to a data signal separator 3352, which may provide a visible output which may be displayed on a screen 613 of the computerized integrated vehicle system 606 (FIG. 6) and also provides a contact information output, which may be stored in a signal storage medium 3354. In the context of FIG. 6, the contact information output may include, for example, a product-specific web address, such as WWW.MWATER/FREE.COM, a product-specific telephone number, such as 1-800-WATER4U, a non product-specific web address, such as WWW.PORTAL.COM, or a non product-specific telephone number, such as 1-800-864-2222. Such storage may be, but need not necessarily be, governed by a switch 3356 controlled by an operator using an operator interface 3358.

In the example shown in FIG. 6, the operator interface 3358 may be speech actuated, such that when the operator says "CONTACT" as illustrated in FIG. 6, the contact information output is stored in storage medium 3354.

Additionally or alternatively, a switch 3360 may be provided at an output of storage medium 3354 and may be actuated by an operator using operator interface 3358. The operation of switch 3360 may be similar to that of switch 3356, the only difference in their effect being that switch 3356 governs storage of the contact information output, while switch 3360 governs supply thereof to a transceiver 3362.

Transceiver 3362 preferably includes a wireless modem which is enabled to communicate via the Internet with server 619 (FIG. 6), which in turn communicates with a database 620 (FIG. 6). Typically a GPS device 608 (FIG. 6), associated with the computerized integrated vehicle system 606 (FIG. 6), may supply transceiver 3362 with the user's geographic coordinates.

In the illustrated embodiment, which is described functionally hereinabove with reference to FIG. 6, the user may at any time actuate the integrated mobile communicator within the computerized integrated vehicle system 606 (FIG. 6) to establish contact via transceiver 3362 on the basis of part or all of the contact information output from data signal separator 3352.

FIG. 13B shows an example wherein a user actuates the integrated mobile communicator within the computerized integrated vehicle system 606 (FIG. 6) to access a product-specific telephone center 617 (FIG. 6) identified by the telephone number 1-800-WATER4U which forms part of the product-specific content information output. In the illustrated embodiment, this access is achieved via a non product-specific telephone center 624 (FIG. 6), which is accessed via the non product-specific telephone number, such as 1-800-864-2222. The non product-specific telephone number need not be broadcast and is typically stored in the computerized integrated vehicle system 606 (FIG. 6), such as by means of a cookie. Alternatively, the telephone number may be broadcast as part of content portion 647 (FIG. 6) or otherwise.

An additional switch operator 3364 governed by operator interface 3366 may be speech actuated, such that when the operator says "TRANSFER" as illustrated in FIG. 6, the non-audio, non-visible output may be supplied from the storage medium 3342 to a further transceiver 3368 that may transfer the content information to a suitably enabled mobile communicator 614 (FIG. 6). It is appreciated that the transceiver 3368 and the communication link therebetween may be replaced by any other suitable wired or wireless communication link, such as a ohmic connection, an IR communication link, a Bluetooth communication link or another short range communication link.

Once the user has accessed the product-specific web site identified by the telephone number "1-800-WATER4U", the user may obtain information or, as shown in FIG. 6 enter into any appropriate commercial transaction, such as one which results in water being delivered to the residence of the user.

In accordance with a preferred embodiment of the present invention, database 620 may receive all or part of the content information output from data signal separator 3352 or via a computer network communication, as from data signal processor 3312. Database 620 is preferably operative to collect and correlate user information and activities in connection with given contact information and to communicate with a facilitator 3370. The facilitator 3370 may have multiple functionalities which may be combined in a single entity or divided among various separate entities. The facilitator 3370 preferably interfaces among and between a broadcast facility 600 (FIG. 6) a user, a supplier of goods or services 3372 and various elements of communication facility 626 (FIG. 6) such as database 620, server 619 and telephone center 624. The facilitator 3370 may be operated by the operator of communication facility 626 or by another entity.

The facilitator 3370 preferably provides at least one of coordination and financial arrangements between one or more of a broadcast facility 600 (FIG. 6) a user, a supplier of goods or services 3372 and various elements of communication facility 626 (FIG. 6) such as database 620, server 619 and telephone center 624. Thus it is appreciated that the facilitator 3370 may provide payment arrangements between two or more of a broadcast facility 600 (FIG. 6), a user, a supplier of goods or services 3372 and an advertiser.

Reference is now made to FIG. 14 is a simplified functional block diagram of an embodiments of the system of FIG. 7. As seen in FIG. 14, there is provided a system and methodology of the type shown in FIG. 7, wherein a commercial message is broadcast by a radio broadcast facility, such as an FM or digital broadcast facility.

In the illustrated embodiment of FIG. 14, the radio broadcast facility 700 (FIG. 2), typically a FM broadcast facility having subcarrier broadcast functionality, such as via a RDS, RBDS or a DARC protocol, includes an audio signal processor 3410, receiving an audio signal input, as well as a data signal processor 3412, receiving a data signal input. Outputs of processors 3410 and 3412 are supplied to a signal synchronizer 3414, which combines these outputs with suitable synchronization therebetween and supplies a combined output to a transmitter 3416.

As illustrated in FIG. 7, the broadcast message preferably includes an audible audio content portion and an inaudible non-audio content portion.

The broadcast message may be received, for example, by a signal receiver 3418 (FIG. 7), typically located in a headend facility 704. As seen in FIG. 14, the signal receiver 3418 which outputs to a signal separator 3420, which is operative to separate the received signal into audio and data portions which are received respectively by an audio signal processor 3422 and a data signal processor 3424. The data signal processor 3424 may be received by a data signal separator 3426 that enables part if not all of the inaudible non-audio content portion to be displayed or otherwise viewed. The output of the audio signal processor 3422 and the output of the data signal separator 3426 may be passed to a signal synchronizer 3428. A cable headend processor 3430 may receive both the audible audio content and the inaudible non-audio content for simultaneous transmission via broadband cable, where the inaudible non-audio content portion may be configured for cable radio reception and the audible audio content portion may be configured for cable television reception or cable PC reception. After passing through a downstream gate 3432 at the headend facility 704 (FIG. 7) the signals, that may be multiplexed signals, may be passed by a cable connection to a downstream gate 3434 situated in a user end facility, which is a residential facility 706 as shown in FIG. 7.

The output of the downstream gate 3434 is supplied to a distributor box 707 (FIG. 7), which may be a set top box. The distributor box 707 (FIG. 7) may distribute the signals to various cable-enabled appliances, such as a television 708, radio 710 and personal computer 728, as shown in FIG. 7.

In the example shown in FIG. 7, a user hears all or part of the audio content of the broadcast message 701 on the cable radio 710 (FIG. 7) simultaneous to which the user views all or part of the data content portion 712 (FIG. 7) on the television 708 (FIG. 7) or the PC 709 (FIG. 7). The data content portion appears in a form that may be teletext and may allow for hyperlinking. In FIG. 7 this is shown on the cable-enabled television 708, by way of example, as "FREE WATER". The hyperlink allows connection via the Internet to the non product-server 7738 (FIG. 7) with a non product-specific address such as WWW.PORTAL.COM. The user may wish to respond to such an offer by capturing the information and establishing contact with a product-specific web site, such as WWW.MWATER/FREE.COM. The user, using an operator interface, such as a remote device 722 (FIG. 7) that may be actuated manual or orally, may click on the designated area of the television display causing all or part of the data content information to be relayed back to the headend facility 704 via the distributor 707 (FIG. 7) and the upsteam gates 3436 and 3438. The headend facility 704 (FIG. 7) may access the product-specific server 724 (FIG. 7) via the non product-specific web server 720 (FIG. 7). In the example illustrated in FIG. 7 the product-specific data content is in the form of a code, such as #1234#.

It is appreciated that the distributor box 707, the TV 708, or the PC 709 may possess storage abilities that may allow a number of captured messages to be stored before accessing them over the Internet Upon accessing the non product-specific web server 720, the product-specific contact information, such as a code, may be transferred to the database 728 via the pathway designated as A. The code may be matched against the full product-specific information, shown as 711 in FIG. 7. The product-specific contact information may be transferred from the database 728 via the pathway designated as B to the non product-specific server 720. The non product-specific server 720 allows contact to be established between the user and a product-specific server 724 (FIG. 7). Once the user has accessed the product-specific web site identified by the web address "WWW.MWATER/FREE.COM", the user may obtain information or, as shown in FIG. 7, enter into any appropriate commercial transaction, such as one which results in water being delivered to the residence of the user.

In accordance with a preferred embodiment of the present invention, database 728 may receive all or part of the content information output from the broadcast facility 700 (FIG. 7) via a computer network communication, as from a computer 713 (FIG. 7). Alternatively, the database 728 may receive all or part of the content information from the cable headend facility 704.

It is appreciated that the contact information may also be supplied to the headend facility 704 from the database 728 directly from the broadcasting facility 700 (FIG. 7) via a computer network communication, as from a computer 713 (FIG. 7). From the headend facility 704 (FIG. 7) the contact information may be supplied to the residential facility 706 (FIG. 7) as previously described.

Database 728 is preferably operative to collect and correlate user information and activities in connection with given contact information and to communicate with a facilitator 3440. The facilitator 3440 may have multiple functionalities which may be combined in a single entity or divided among various separate entities. The facilitator 3440 preferably interfaces among and between a broadcast facility 700 (FIG. 7) a user, a supplier of goods or services 3442 and various elements of communication facility 736 (FIG. 7) such as database 728 and server 720. The facilitator 3440 may be operated by the operator of communication facility 736 or by another entity.

The facilitator 3440 preferably provides at least one of coordination and financial arrangements between one or more of a broadcast facility 700 (FIG. 7) a user, a supplier of goods or services 3442 and various elements of communication facility 736 (FIG. 7) such as database 728 and server 720. Thus it is appreciated that the facilitator may provide payment arrangements between two or more of a broadcast facility 700 (FIG. 7) a user, a supplier of goods or services 3442 and an advertiser.

Figure 22:
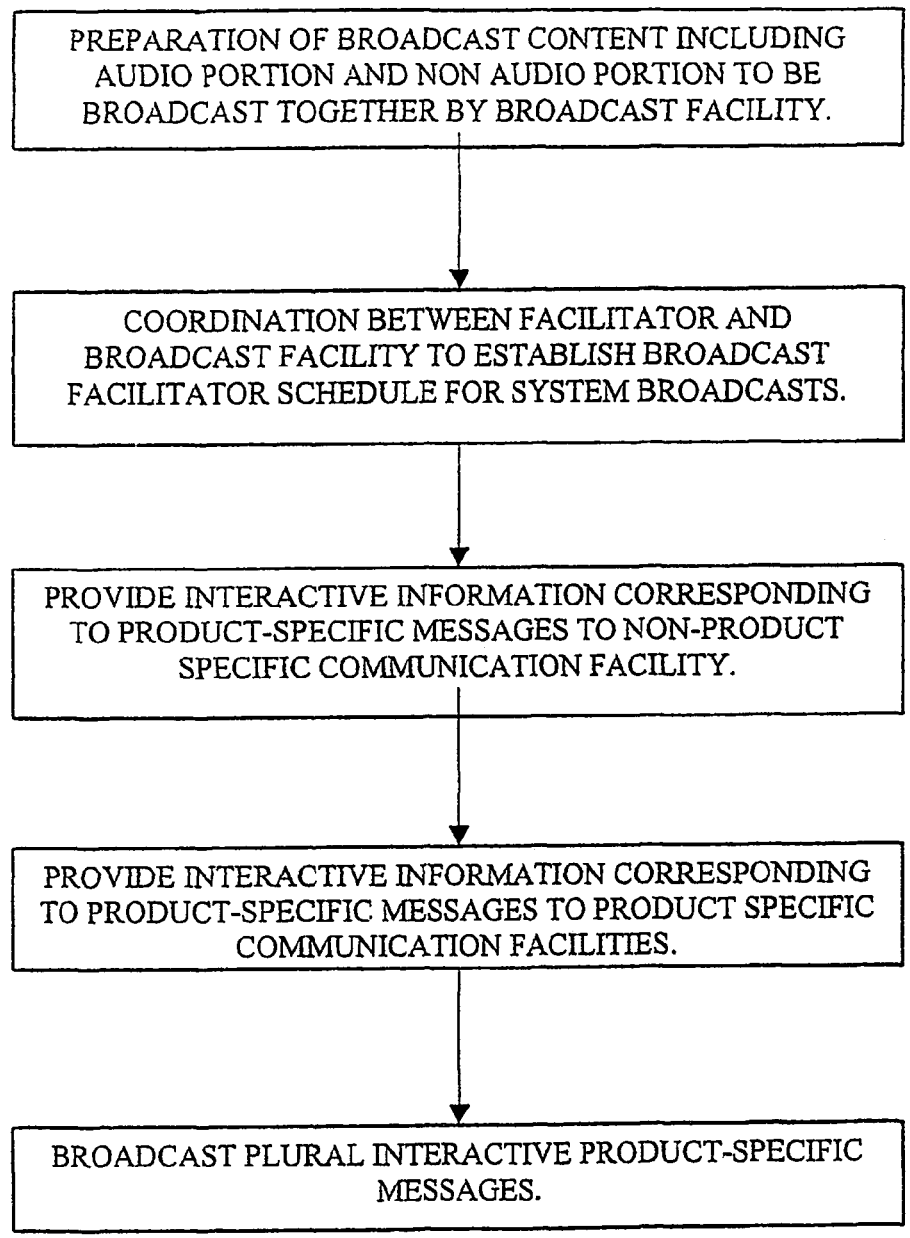
FIG. 22 is a simplified flowchart of a first part of the functionality common to FIGS. 1-7.

Reference is now made to FIG. 22, which is a simplified flowchart of a first part of the functionality common to FIGS. 1-7. FIG. 22 illustrates interaction between at least one broadcast facility such as, for example, broadcast facility 100 in FIG. 1, at least one non-product specific communication facility, such as, for example, non product-specific communication facility 130 in FIG. 1 and at least one product-specific communication facility, such as, for example, a product-specific communication facility embodied in a server such as server 118 or a telephone center such as telephone center 120 in the embodiment of FIG. 1, in accordance with a preferred embodiment of the present invention.

As seen in FIG. 22, a broadcast schedule for broadcasts is preferably established by coordination between one or more facilitators and one or more broadcast facilities. Typically, this broadcast schedule includes broadcast of plural product-specific messages for plural advertisers and/or suppliers for interaction via at least one non-product specific communication facility.

Preferably prior to broadcast of the product-specific messages, interactive information relating to each broadcast is supplied, typically other than by broadcast to at least one non-product specific communication facility and optionally to one or more product specific communication facilities. This interactive information enables the non-product specific communication facility to automatically respond to contact commands provided by the user. Similarly, the interactive information provided to the product-specific communication facilities enables them to automatically respond to product-specific contacts established therewith by a user, typically via the non-product specific communication facility.

Figure 23:
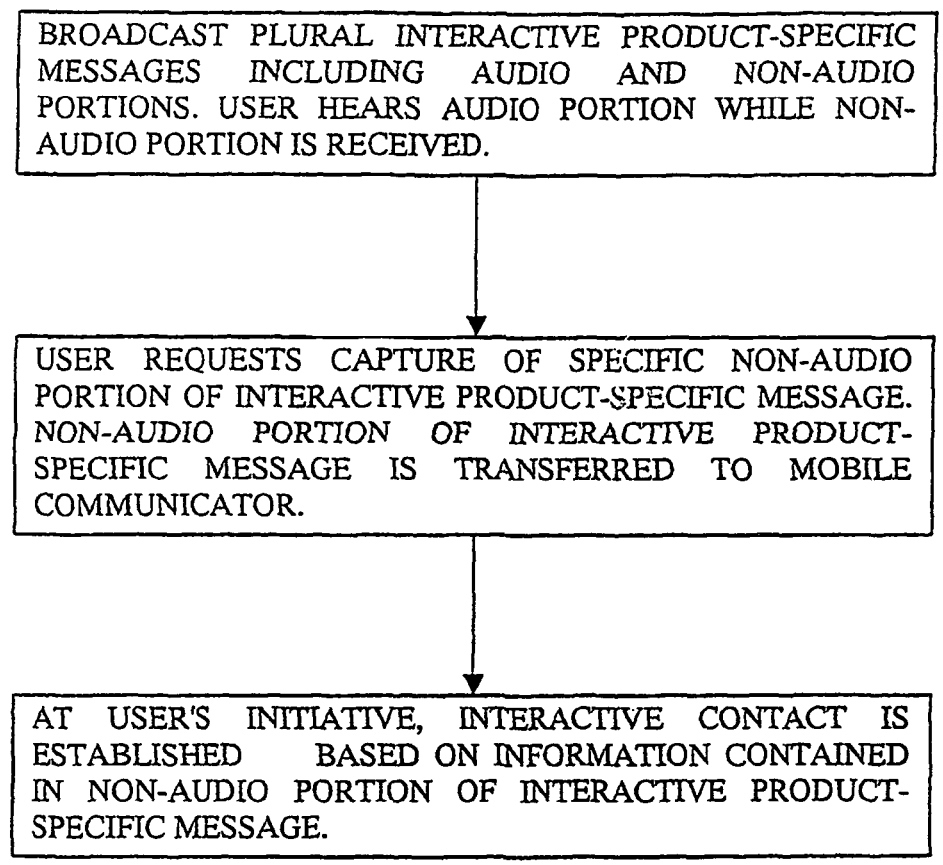
FIG. 23 is a simplified flowchart of a second part of the functionality common to FIGS. 1-6.

Reference is now made to FIG. 23 which is a simplified flowchart of a second part of the functionality common to FIGS. 1-7. FIG. 23 illustrates interaction between the broadcast facility, such as, for example, broadcast facility 100 in the embodiment of FIG. 1 and listeners to its broadcasts, such as listeners listening using a radio 106, as in the embodiment of FIG. 1. The broadcast facility broadcasts plural interactive product-specific messages, the contents of which may be, for example, of any of the types shown in FIGS. 1-7 and designated by reference numerals 102, 104, 202, 204, 302, 304, 402, 404, 502, 602, 604, 701 and 712.

In the embodiments of FIGS. 1-4, 6 and 7, the product specific messages contain both audio and non-audio portions. In the embodiment of FIG. 5, the product-specific messages contain only audio portions.

In all of the embodiments of FIGS. 1-3 and 5-7, the user hears the audio portion. In the embodiment of FIG. 4, which illustrates a billboard, the user need not hear an audio portion.

The user may, upon either hearing the audio portion of a product-specific message, as in the embodiments of FIGS. 1-3 and 5-7 or seeing a visual message, request capture of a non-audio portion of the product-specific message. In response to a user CAPTURE command, the non-audio portion of the product-specific message is transferred to a mobile communicator, such as mobile communicator 114 in the embodiment of FIG. 1. It is noted that in the embodiment of FIG. 6, the scenario is somewhat different, in that capture is carried out internally of a computerized integrated vehicle information system 606 and the non-audio portions of product-specific messages may be transferred to a mobile communicator in response to a user's TRANSFER command.

At a user's initiative, interactive contact may be established based on information contained in the non-audio portion of the product-specific message. The functionality of that contact is described hereinbelow with respect to FIG. 24.

Figure 25:
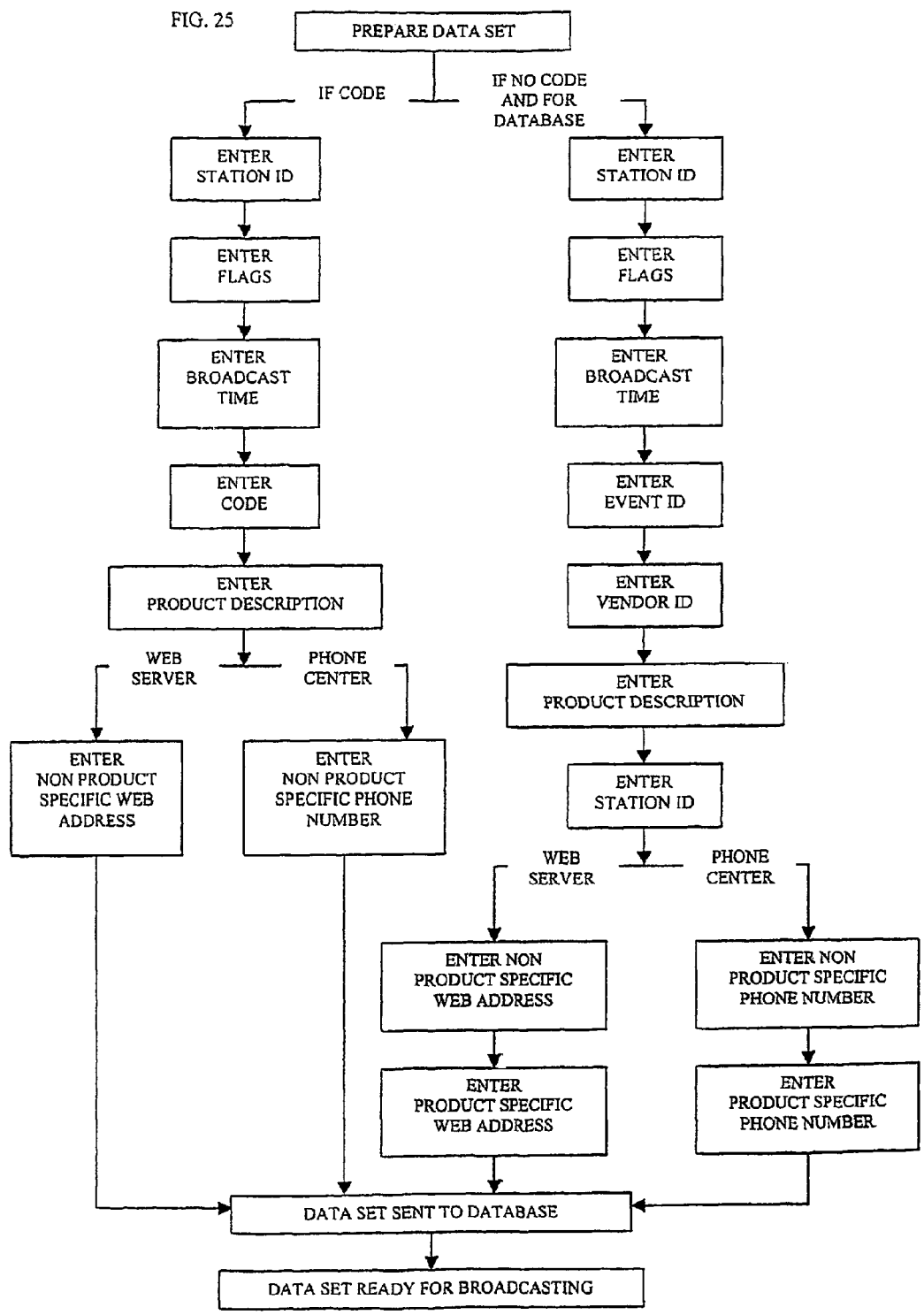
FIG. 25 is a simplified flowchart illustrating certain features shown in FIG. 22.

Reference is now made to FIG. 25 which illustrates data set preparation employed in the embodiment of FIG. 22 and FIGS. 1-7. Priori to a broadcasting facility broadcasting a message, at least two data sets may be prepared of information fields containing, amongst other possible information, pertinent contact information, pertinent product information, pertinent timing information, pertinent source information and other pertinent information to the item broadcast.

At least one data set, containing all the pertinent information, is sent to a database associated with a communication facility, as shown in FIGS. 1-7.

Figure 27:
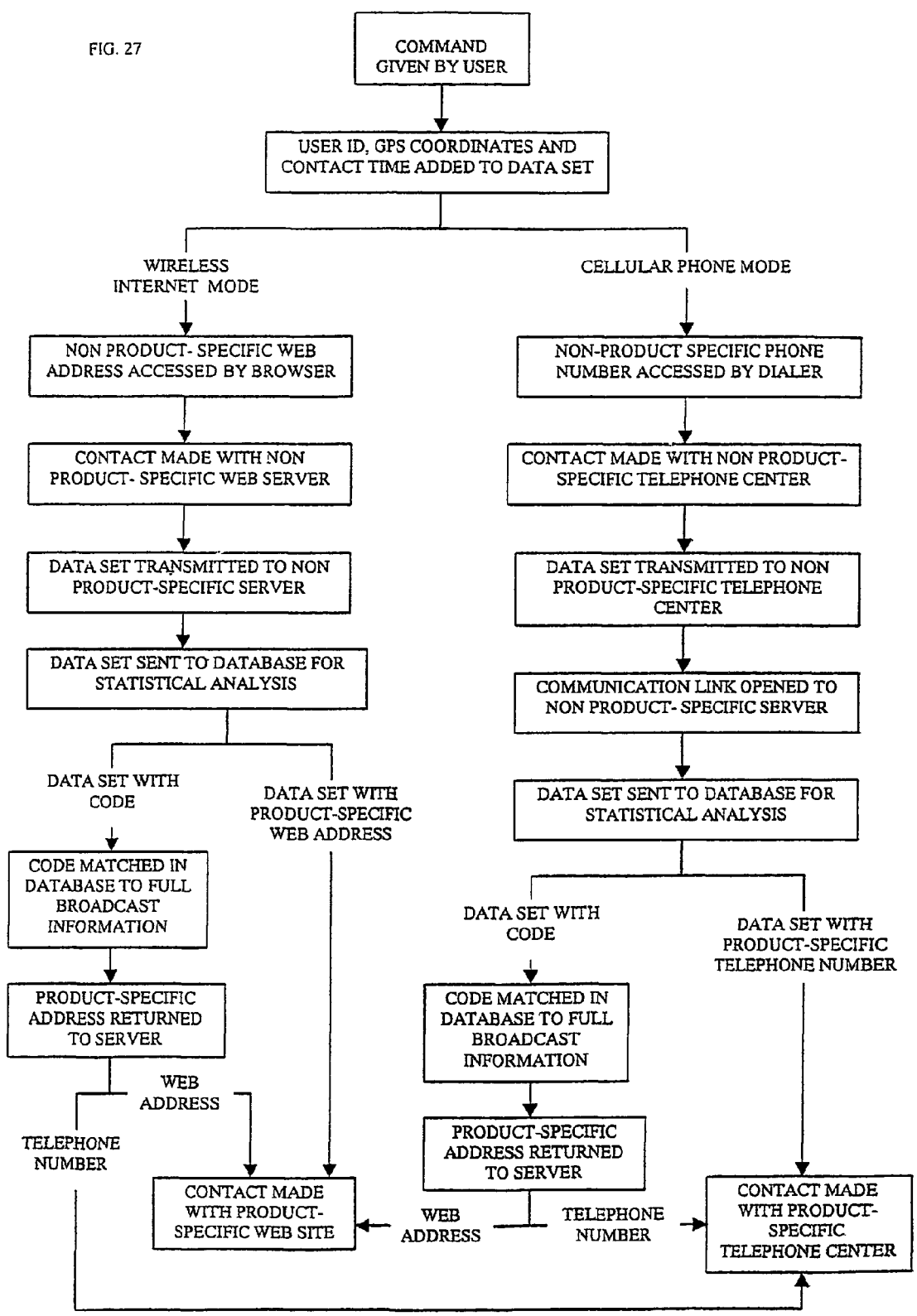
FIG. 27 is a simplified flowchart illustrating certain features shown in FIG. 24.

At least one other data set is prepared for broadcasting, as shown in FIGS. 1-4, FIGS. 6-7, and FIGS. 15A, 16A, 17A, 18A, 19A, and 21A. Information fields can be added to the data set in the second and third parts of functionality common to FIGS. 1-7 and as shown in FIG. 27.

This information, collated from the data sets sent directly to the database and the data sets that are received by the database as a result of user response, may be of interest to a facilitator, broadcasting facility, advertising agency, vendors, and others, such as statistical data concerning audience response tracking.

In FIGS. 15A-21 examples of data sets and fields are shown that relate to the data sets broadcast by the broadcasting facility. Information into a field may be added, such as GPS coordinates, time of contact, and relevant user identity details, as indicated by an arrow pointing into a field, at various points in the described embodiments of FIGS. 1-4 and FIGS. 6-7. Information in a field may be accessed at various points in the described embodiments of FIGS. 1-4 and FIGS. 6-7, as indicated by an arrow pointing out of a field. The abbreviations used to describe the information fields, as shown in FIGS. 15A-15E 16A-16E 17A-17E 18A-18E 19A-19E 20A-20E 21A-21E, are elucidated hereinbelow.

The embodiments of FIGS. 1-4 and FIGS. 6-7 data sets are broadcast in synchronicity with an audio broadcast, for instance as an RDS subcarrier signal (FIGS. 1-3 and 6), as an embedded digital signal (FIG. 4) or as a multiplexed cable signal (FIG. 7).

Figure 20A:
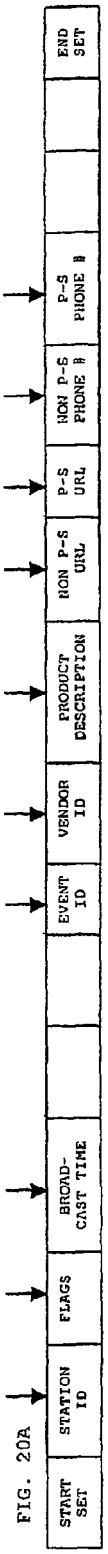
FIGS. 20A-20E are simplified illustrations of typical data sets employed in the embodiment of FIG. 6.
Figure 20B:
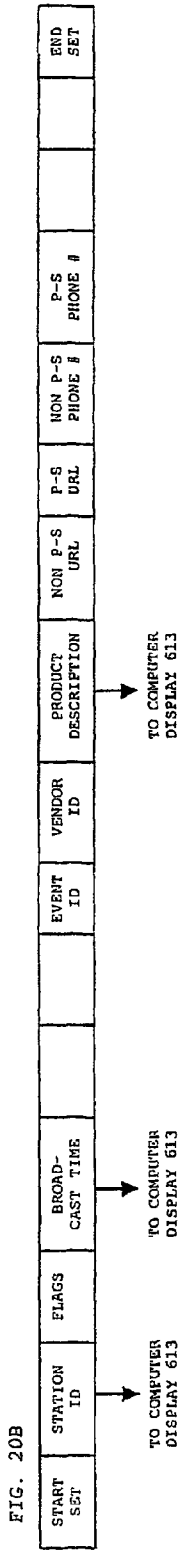
Figure 20C:
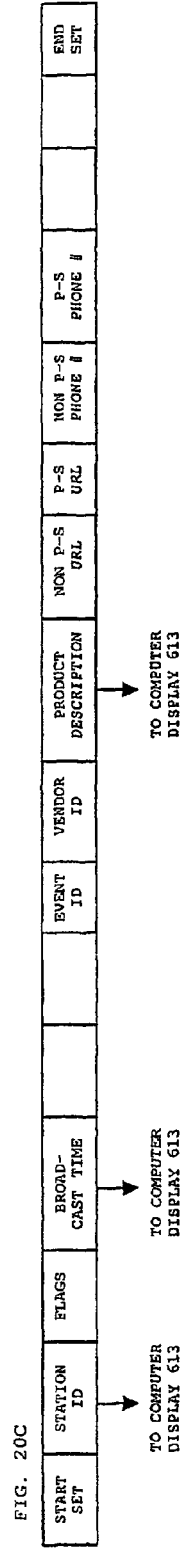
Figure 20D:
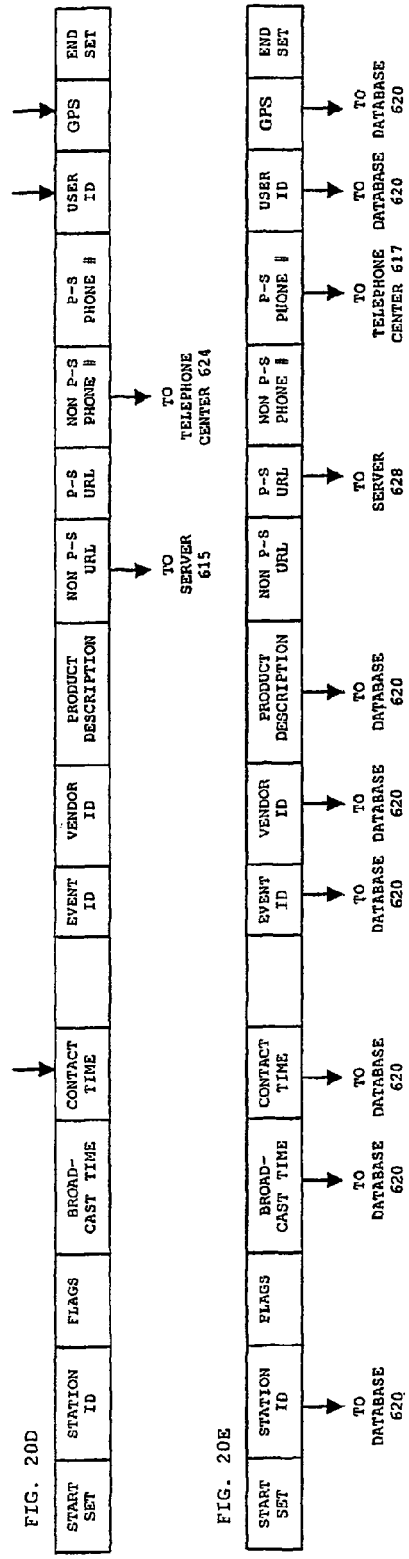
Figure 20E:
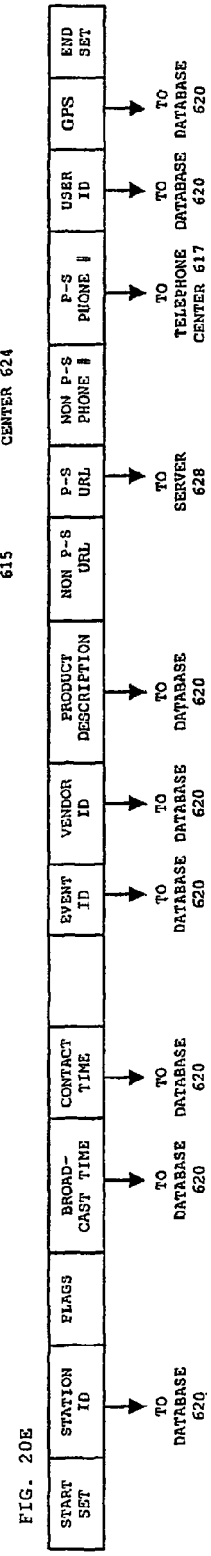

In embodiments of FIGS. 1 and 6, the broadcast data set, as shown in FIGS. 15A, 19A, and 20A, contains both the non product-specific (NON P-S) contact information and the product-specific (P-S) contact information together with pertinent information pertaining to the product description and other pertinent information not necessarily pertaining to the product description. It is appreciated that product description can include information concerning product offers, music, regular programs, news items, and traffic reports. Pertinent information pertaining to the product description may include information such as a product name, for instance "WATER" or "FREE WATER" as shown in the embodiments described herein. It is appreciated that other pertinent information can include, song lyrics, artist name, discount deals, and coupon details, and stock price quotes.

Other fields, as shown in FIGS. 15-21, include the station ID, such as RADIO NY; broadcast time, that is the time the data set was broadcast; the event ID, that is a unique identifier of the data set; a vendor ID, that is a unique identifier of a vendor associated with the broadcast message; NON P-S URL, that is a non product-specific web site address; P-S URL, that is a product-specific web site address; NON P-S PHONE #, that is a non product-specific telephone number; and P-S PHONE #, that is a product-specific telephone number.

In embodiments of FIGS. 2, 3, 4, and 7, the data set broadcast as the non-audio content portion contains a product-specific code, such as #1234#. The identical code is also part of the data set sent directly to the database of the communication facility, as shown for example in FIG. 2. As shown for example in FIGS. 16A-16E, a broadcast data set containing a product-specific code need not contain such information as the event ID, the vendor ID, the non product-specific contact information, nor the product-specific contact information. In such a case the non product-specific contact information has been previously downloaded into the mobile communicator by means such as a cookie or entered manually.

It is appreciated that all or part of the information contained in the data set fields may be encrypted. Decryption may take place when information contained within a field is accessed for use, for instance for display on a display or for directing a browser to a web site.

In the embodiment described by FIG. 5, no data set is broadcast by the broadcasting facility with the audio message. The pertinent information is transmitted directly from the non product-specific server to the mobile communicator.

Figure 26:
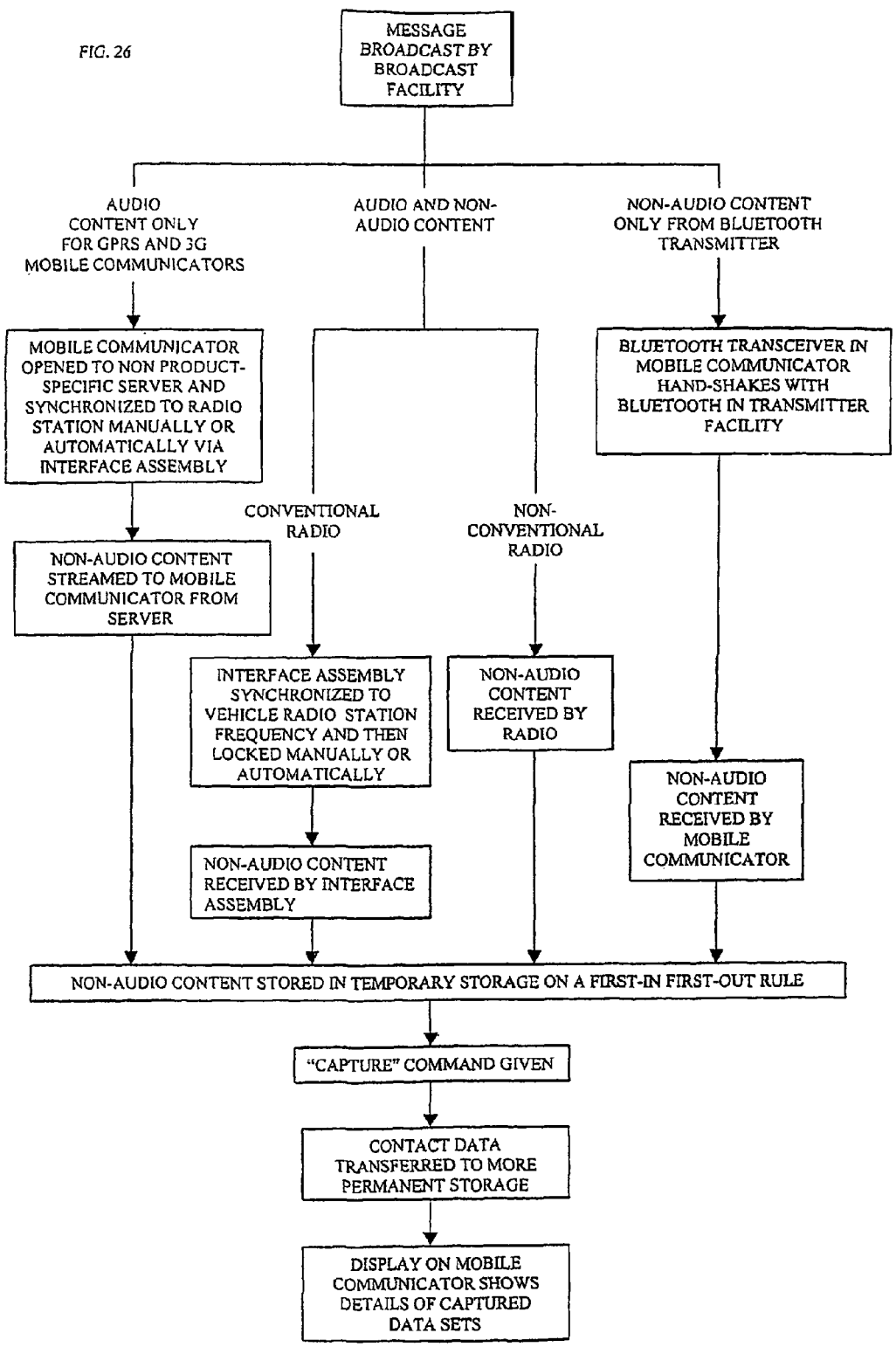
FIG. 26 is a simplified flowchart illustrating certain features shown in FIG. 23.

Reference is now made to FIG. 26 which illustrates capture functionality employed in the embodiment of FIG. 23 and of FIGS. 1-4 and 6. If the radio station being listened to is not automatically known to the mobile communicator, it must be entered by the user. If the mobile communicator is a GPRS or 3G communicator, such as in the embodiment of FIG. 5, a browser is opened to a non product-specific portal. If the mobile communicator is not a GPRS or 3G device, such as in the embodiments of FIGS. 1-4 and 6, the CAPTURE command of the user may be acted upon either by the radio or by the mobile communicator. It is noted that the CAPTURE command, if not provided simultaneously with receipt of the audio portion of the product-specific message may be effective to produce a scroll-back functionality to capture earlier received and temporarily stored non-audio portions of product-specific messages.

The CAPTURE command may be effected orally, or manually, as by pressing a button on a radio, a mobile communicator or an interface assembly as inter alia in the embodiments of FIGS. 8E, 8F, 9E and 9F.

The captured data set, such as the data set appearing in FIG. 15C, is stored in the mobile communicator until needed. A successful capture indication may be provided to the user.

Figure 24:
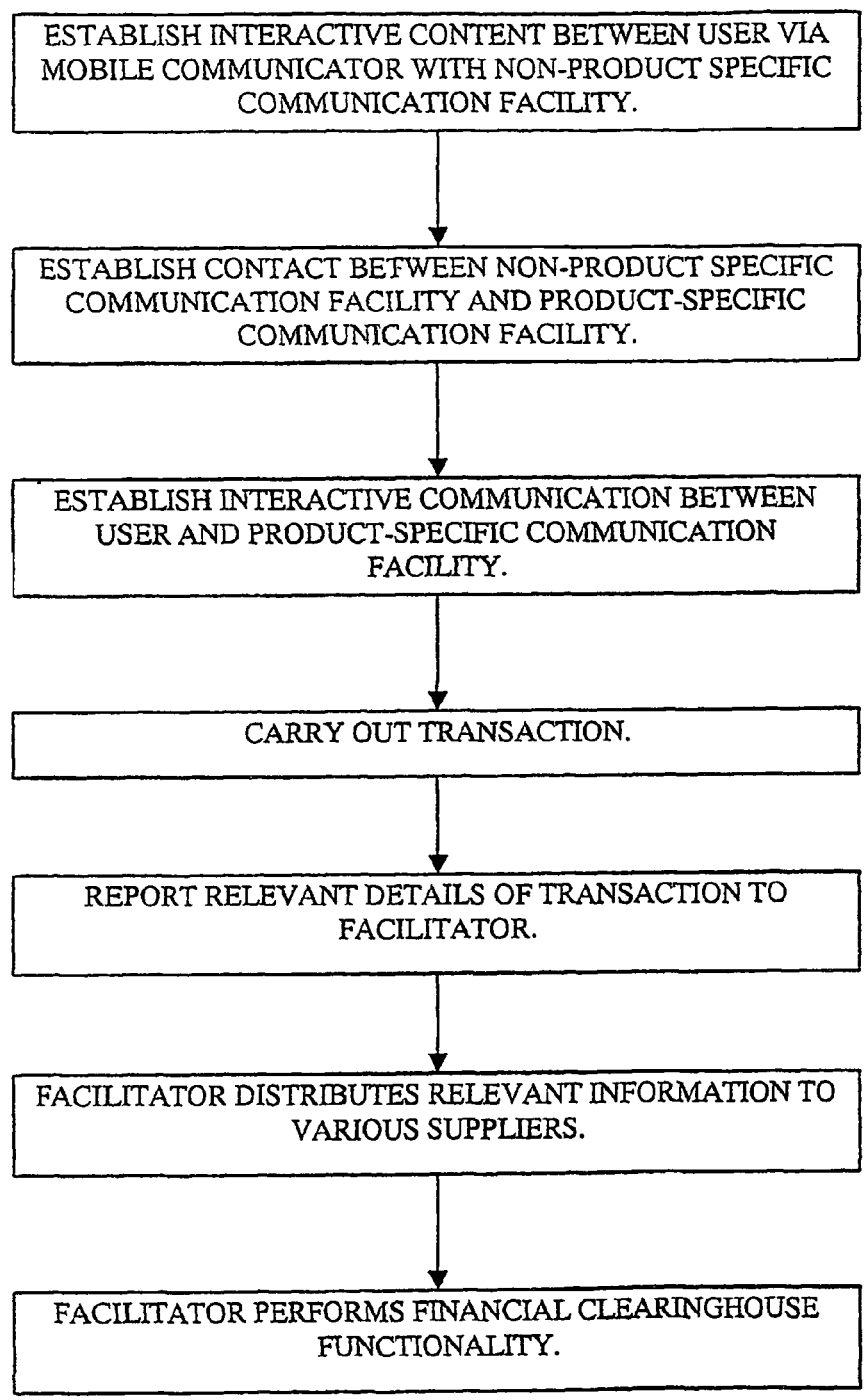
FIG. 24 is a simplified flowchart of a third part of the functionality common to FIGS. 1-6

Reference is now made to FIG. 24, which is a simplified flowchart illustrating of a third part of the functionality common to FIGS. 1-6. FIG. 24 illustrates interaction between the mobile communicator and the non-product specific communication facility and product specific communication facilities. As seen in FIG. 24, interactive contact preferably is initially established between the user via the mobile communicator with the non product-specific communication facility. This may include contact established via a telephone communication, an Internet communication or any other suitable type of communication and may involve a server or a telephone center at the non product-specific communication facility.

Concurrently with or following establishment of the contact between the mobile communicator and the non product-specific communication facility, there is preferably established contact between the non product-specific communication facility and an appropriate product-specific communication facility, preferably identified by information contained in the data set received by and stored in the mobile communicator. Preferably, such contact established effective contact between the user and the product-specific communication facility. This effective contact may be directly between the mobile communicator and the product-specific communication facility or it may be indirect, such as via the non product-specific communication facility. One or more transaction may be carried out based on this effective contact.

For the purposes of the present application, the term "transaction" may refer to a commercial transaction but need not be so limited. Particularly in the case of commercial transactions, various details of the transaction are preferably provided via a facilitator to pertinent parties. For example, when a product is purchased, a series of financial transfers may result, including, for example, a transfer of funds from a user or his bank to a supplier, a transfer of funds from the supplier to an advertiser or vice versa and a transfer of funds from the supplier to a broadcast facility. Where a free product is provided to a user, for example, a transfer of funds from the advertiser to the supplier may be involved. Another type of transaction may be simply provision of information with or without cost to the user. In such a case, the product is a service. An example is in depth news content which may be made available to a user upon capture of non-audio content accompanying a news flash.

The facilitator may have multiple functions, not limited to financial arrangements and transfers. For example, the facilitator may provide market data based on the various contacts and transactions to one or more interested parties. In accordance with a preferred embodiment of the present invention, the facilitator functionality may advantageously be provided by the same party as that which operates the non product-specific communication facility and may employ some of the computer equipment, such as a database, at least partially in common.

Reference is now made to FIG. 27, which is a simplified flowchart illustrating the contact feature of a third part of the functionality common to FIGS. 1-6. Upon issuing a "CONTACT" command, either orally or manually, a mobile communicator, such as shown in FIGS. 1-6, will establish a communication link between the user and a product-specific communication center via a non-product specific communication center. Such a communication link may be an Internet connection to a web server or a telephone connection to a telephone center or any combination thereof. FIGS. 1-6 describe mobile communicators, such as web-enabled PDAs, WAP phones, a cellular phone-enabled PDAs, vehicle PCs and regular cellular phones that may operate in at least one of these two modes.

In the case where the mode of mobile communication is by wireless Internet connectivity, contact is established primarily between the mobile communicator and a non product-specific web site using the URL address obtained by means such as the non-audio content data set, a resident cookie or directly by the user. In FIGS. 1, 3, 4, 5 and 6 such a non product-specific URL is shown as WWW.PORTAL.COM.

Upon establishing such a connection, information such as a user ID and GPS coordinates may be added to the data set, as shown for example in FIG. 15D.

In the cases that the broadcast data set contains the product-specific contact information the server may directly enable the user to establish a secondary communication link with a product-specific web site. In FIGS. 1 and 6, for example, such a product-specific URL is shown as WWW.MWATER/FREE.COM. It is appreciated that the URL accessed in this manner may be of varying length and complication so as to permit the user access to very specific web locations. By such means, a user can receive information pertaining to very specific products or services.

In embodiments such as of FIGS. 3 and 4, where product-specific codes are broadcast within the non-audio data set instead of explicit product-specific contact information, the mobile communicator primarily establishes contact with a non product-specific web server as described hereinabove. The code is transferred to the database where it is matched against the data set sent directly by the broadcasting facility to the database, as described in FIG. 25. The product-specific contact information is transferred back to the non product-specific server thus enabling a secondary communication link to be established between the user an the product-specific web site. It is appreciated that the URL accessed in this manner may be of varying length and complication so as to permit the user access to very specific web locations. By such means, a user can receive information pertaining to very specific products or services.

In the case where the mode of mobile communication is by a cellular phone connection, contact is established primarily between the mobile communicator and a non product-specific telephone center using the telephone number obtained by means such as the non-audio content data set, a resident cookie or directly by the user. In FIGS. 1, 2, 3, 4, 5 and 6 such a non product-specific telephone number is shown as 1-800-864-2222.

Upon establishing such a connection, information such as a user ID and GPS coordinates may be added to the data set, as shown for example in FIG. 15D. Alternatively, positional information may be obtained from the cellular operators and attached to the data set in the database.

In the cases that the broadcast data set contains the product-specific contact information the server may directly enable the user to establish a secondary communication link with a product-specific telephone center. In FIGS. 1 and 6, for example, such a product-specific telephone number is shown as 1-800-WATER4U. By such means, a user can receive information pertaining to very specific products or services.

In embodiments such as of FIG. 2, where product-specific codes are broadcast within the non-audio data set instead of explicit product-specific contact information, the mobile communicator primarily establishes contact with a non product-specific telephone center as described hereinabove. The telephone center establishes contact with a non-product-specific server maintained within a common communication facility. The code is transferred to the database where it is matched against the data set sent directly by the broadcasting facility to the database, as described in FIG. 25. The product-specific contact information is transferred back to the non product-specific server and from there to the non product-specific telephone center. Accessing the product-specific contact information enables the non product-specific telephone center to establish a secondary communication link between the user and the product-specific telephone center. By such means, a user can receive information pertaining to very specific products or services.

All information pertaining to communication transactions between the user and a product-specific communication center, whether obtained from the data sets or otherwise, is stored in the database that may be maintained within a common communication facility as the non product-specific server and the non product-specific telephone center.

Figure 28:
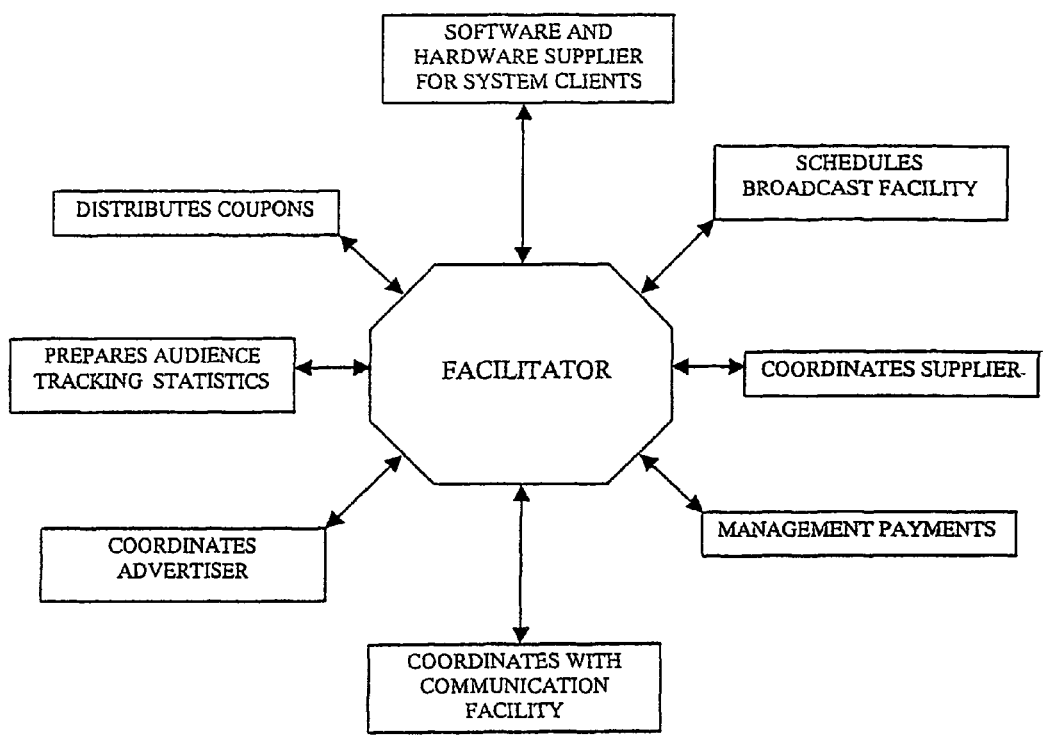
FIG. 28 is a simplified functional block diagram illustrating certain features shown in FIG. 24.

Reference is now made to FIG. 28 which is a simplified block diagram illustrating the multi-functionality that a facilitator may have within the functionality common to FIGS. 1-7. The facilitator may have multiple functions, not limited to financial arrangements and transfers. For example, the facilitator may provide market data based on the various contacts and transactions to one or more interested parties. The facilitator may be responsible for the distribution of coupons to users as a result of a transaction performed by a user using the system described herewithin. The facilitator may coordinate between the supplier of goods purchased using the system described herewithin and the purchaser. The facilitator may coordinate scheduling of broadcast messages with non-audio data content as described herein with the broadcasting facility. The facilitator may have access to and prepare audience tracking statistics for interested parties, such as advertising agencies, vendors and broadcasting facility management. The facilitator may coordinate with an advertising agency the non-audio data content that is associated with a commercial message. In accordance with a preferred embodiment of the present invention, the facilitator functionality may advantageously be provided by the same party as that which operates the non product-specific communication facility and may employ some of the computer equipment, such as a database, at least partially in common.

The invention claimed is:

1. A method comprising:
causing, at least in part, a wireless broadcast of content from a broadcast facility that is accessible to a multiplicity of users and that includes audio content and non-audio content, the non-audio content being not viewable by the users without user actuation and including product-specific information;
enabling a user to select a portion of said non-audio content;
causing, at least in part, a capture of at least part of said non-audio content corresponding to said portion of said content selected by said user; and
employing at least part of said captured content to access a contact using a mobile communicator by initially establishing contact with the non product-specific communication facility and employing product-specific information contained in said non-audio content.

2. A method of claim 1, wherein said employing involves an action by said user.

3. A method of claim 1, wherein said employing takes place automatically.

4. A method of claim 1, wherein said wireless broadcast comprises radio broadcasting.

5. A method of claim 1, wherein said wireless broadcast comprises television broadcasting.

6. A method of claim 1, wherein said wireless broadcast comprises Bluetooth transmitting.

7. A method of claim 4, wherein said radio broadcasting comprises FM broadcasting.

8. A method of claim 1, wherein said wireless broadcast comprises satellite broadcasting.

9. A method of claim 1, wherein said enabling comprises prompting said user to make a selection.

10. A method of claim 1, wherein said enabling comprises enabling said user to make an unprompted selection.

11. A method of claim 1, wherein said enabling comprises enabling said user to make a selection orally.

12. A method of claim 1, wherein said enabling comprises enabling said user to make a selection by a manual actuation.

13. A method of claim 1, wherein said enabling comprises enabling said user to preselect certain content based on user determined criteria.

14. A method of claim 1, wherein said capture comprises capturing at least part of said content carried by a sub-carrier, corresponding to said portion of said content selected by said user.

15. A method of claim 1, wherein said contact is a web site.

16. A method of claim 1, wherein said contact is a telephone communicator.

17. A method of claim 1, wherein said wireless broadcast comprises digital broadcasting.

18. A method of claim 1, further comprising:
causing, at least in part, a provision of communication via at least one facilitator between the broadcast facility providing said wireless broadcast and at least one of a product-specific communication facility and a non product-specific communication facility,
wherein the facilitator prepares audience tracking statistics.

19. A method of claim 1, wherein the non-audio content is concurrently provided to a server from the broadcast facility.

20. A method of claim 1, wherein concurrently with the reception of the audio content, the non-audio content is received.

21. A method of claim 20, wherein the non-audio content is concurrently received as streaming data.

22. A method of claim 20, wherein the non-audio content is concurrently received via a streaming data channel.

23. A method comprising:
causing, at least in part, a preparation of broadcast content including an audio portion and a non-audio portion to be broadcast together by a broadcast facility;
causing, at least in part, a coordination between a facilitator and the broadcast facility to establish a broadcast facilitator schedule for system broadcasts;
causing, at least in part, a provision of interactive information corresponding to product-specific messages to a non-product specific communication facility;
causing, at least in part, a provision of interactive information corresponding to said product-specific messages to product specific communication facilities; and
causing, at least in part, a broadcast of plural interactive product-specific messages.

24. The method according to claim 23, further comprising determining to accept user selections of products advertised by the plural product-specific messages.

25. An apparatus comprising:
at least one processor; and
at least one memory including computer program code for one or more programs,
the at least one memory and the computer program code configured to, with the at least one processor, cause the apparatus to perform at least the following,
receive both user-sensible and non user-sensible content from a first facility, the user-sensible content comprising an offer of at least one product from a product-specific facility;

capture a product of interest from the at least one product; and causing, at least in part, a wireless placing of an order for the captured product of interest to a second facility through a communications link that does not include the first facility, wherein the second facility is a non-product specific facility.

26. An apparatus of claim 25, wherein the first facility is a broadcast facility.

27. An apparatus of claim 25, wherein the non-product specific facility communicates with the product-specific facility.

28. An apparatus of claim 25, wherein the apparatus directly communicates with the non-product specific facility.

29. A method comprising:

causing, at least in part, a wireless broadcast of content from a broadcast facility that is accessible to a multiplicity of users and that includes audio content and non-audio content, wherein the broadcasted audio content and non-audio content is received by a first receiver in a first device that provides the audio content to a user;

causing, at least in part, concurrently, a provision of product-specific content associated with the wirelessly broadcasted content from the broadcast facility to a server;

causing, at least in part, a provision of the product-specific content from the server to a second receiver in a second device that is receptive to input from the user;

enabling the user to select and capture a portion of said product-specific content in synchronization with the broadcast audio content;

causing, at least in part, a provision of communication via at least one facilitator between the server and at least one of a product-specific communication facility and a non product-specific communication facility; and employing at least part of said captured product-specific content to access a contact using the second device by initially establishing contact with the non product-specific communication facility and employing product-specific information contained in said product-specific content.

30. The method according to claim 29, wherein the second device includes a location determining feature.

31. The method according to claim 29, wherein the server provides the product-specific content to the second device as streaming data.

32. The method according to claim 31, wherein the streaming data is provided in a streaming data channel.

33. A system comprising:

a broadcast facility that broadcasts user-sensible content;

a server communicatively linked to the broadcast facility and receiving non user-sensible content from the broadcast facility; and a mobile communications device that is arranged to wirelessly receive the user-sensible content from the broadcast facility and arranged to wirelessly receive the non user-sensible content from the server, wherein the broadcasting of the user-sensible content from the broadcast facility is synchronized with providing the non user-sensible content from the server, wherein a user of the mobile communications device is enabled to capture the non user-sensible content.

34. A system comprising:

a broadcast facility that broadcasts user-sensible content;

a server communicatively linked to the broadcast facility and receiving non user-sensible content from the broadcast facility;

a first receiver arranged to wirelessly receive the user-sensible content from the broadcast facility; and a second receiver arranged to wirelessly receive the non user-sensible content from the server, wherein the broadcasting of the user-sensible content from the broadcast facility is synchronized with providing the non user-sensible content from the server, wherein a user is enabled to capture the non user-sensible content from the second receiver in synchronization with perceiving the user-sensible content from the first receiver.

35. The system of claim 34, further comprising a device with an input that includes the second receiver.

36. The system of claim 35, wherein the non user-sensible content is captured upon input actuation of the device.

37. The system of claim 36, wherein the input actuation is by voice of the user.

* * * * *